United States Patent
Murakami et al.

(10) Patent No.: US 11,856,604 B2
(45) Date of Patent: Dec. 26, 2023

(54) ACCESS POINT AND COMMUNICATION METHOD

(71) Applicant: Panasonic Intellectual Property Corporation of America, Torrance, CA (US)

(72) Inventors: Yutaka Murakami, Kanagawa (JP); Nobuhiko Hashida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 528 days.

(21) Appl. No.: 17/136,696

(22) Filed: Dec. 29, 2020

(65) Prior Publication Data

US 2021/0120587 A1    Apr. 22, 2021

Related U.S. Application Data

(63) Continuation of application No. PCT/JP2019/026753, filed on Jul. 4, 2019.

(60) Provisional application No. 62/756,832, filed on Nov. 7, 2018, provisional application No. 62/716,009, filed on Aug. 8, 2018, provisional application No. 62/701,184, filed on Jul. 20, 2018, provisional application No. 62/695,273, filed on Jul. 9, 2018.

(51) Int. Cl.
| | |
|---|---|
| *H04W 74/08* | (2009.01) |
| *H04W 72/0453* | (2023.01) |
| *H04W 74/00* | (2009.01) |
| *H04W 80/02* | (2009.01) |
| *H04W 72/23* | (2023.01) |

(52) U.S. Cl.
CPC ... *H04W 74/0816* (2013.01); *H04W 72/0453* (2013.01); *H04W 72/23* (2023.01); *H04W 74/008* (2013.01); *H04W 80/02* (2013.01)

(58) Field of Classification Search
CPC ..... H04W 72/0453; H04W 72/23–232; H04W 74/008; H04W 74/0816; H04W 80/02
See application file for complete search history.

(56) References Cited

U.S. PATENT DOCUMENTS

| | | | |
|---|---|---|---|
| 2015/0063189 A1* | 3/2015 | Merlin | H04W 72/23 370/312 |
| 2016/0164652 A1 | 6/2016 | Huang et al. | |
| 2016/0330663 A1* | 11/2016 | Zhou | H04W 4/025 |
| 2017/0208627 A1* | 7/2017 | You | H04W 74/0816 |
| 2018/0192421 A1 | 7/2018 | Ahn et al. | |

OTHER PUBLICATIONS

Extended European Search Report dated Aug. 9, 2021 in corresponding European Patent Application No. 19833171.2

(Continued)

*Primary Examiner* — Thomas R Cairns
(74) *Attorney, Agent, or Firm* — Wenderoth, Lind & Ponack, L.L.P.

(57) ABSTRACT

An access point includes a first interface that wirelessly communicates using a first band; a second interface that wirelessly communicates using a second band; and a controller that selects one type of request to send (RTS)/clear to send (CTS) control from among three mutually different types using at least one of the first interface and the second interface, and carries out the selected one type of RTS/CTS control with a terminal.

4 Claims, 88 Drawing Sheets

(56) References Cited

OTHER PUBLICATIONS

International Search Report (ISR) dated Sep. 17, 2019 in International (PCT) Application No. PCT/JP2019/026753.
"Draft Standard for Information technology—Telecommunications and information exchange between systems Local and metropolitan area networks—Specific requirements, Part 11: Wireless LAN Medium Access Control (MAC) and Physical Layer (PHY) Specifications", IEEE P802.11-REVmd/D1.0, Feb. 2018.
Boris Bellalta, "IEEE 802.11AX: High-Efficiency WLANs", IEEE Wireless Communications, vol. 23, No. 1, Feb. 2016.

* cited by examiner

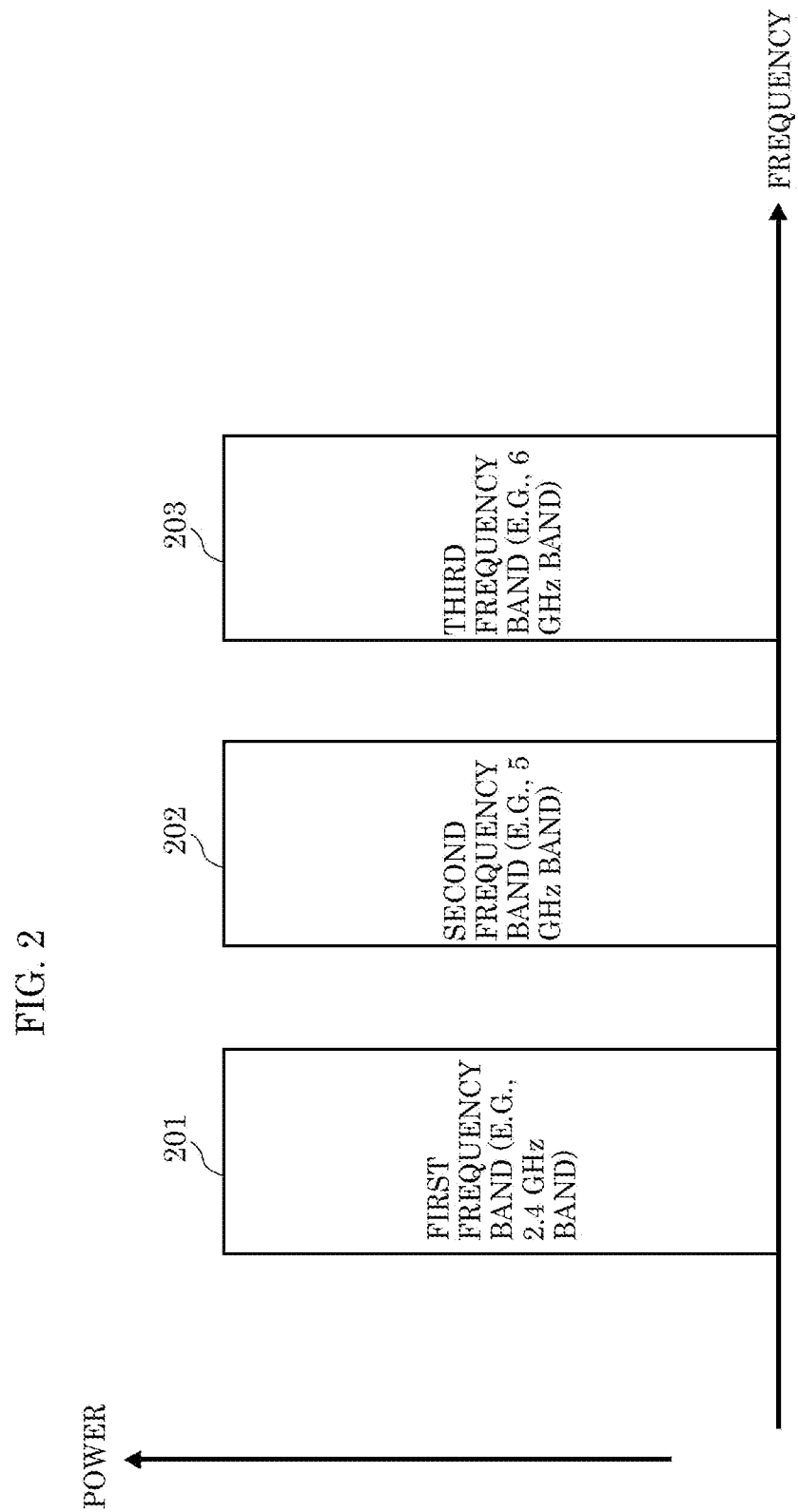

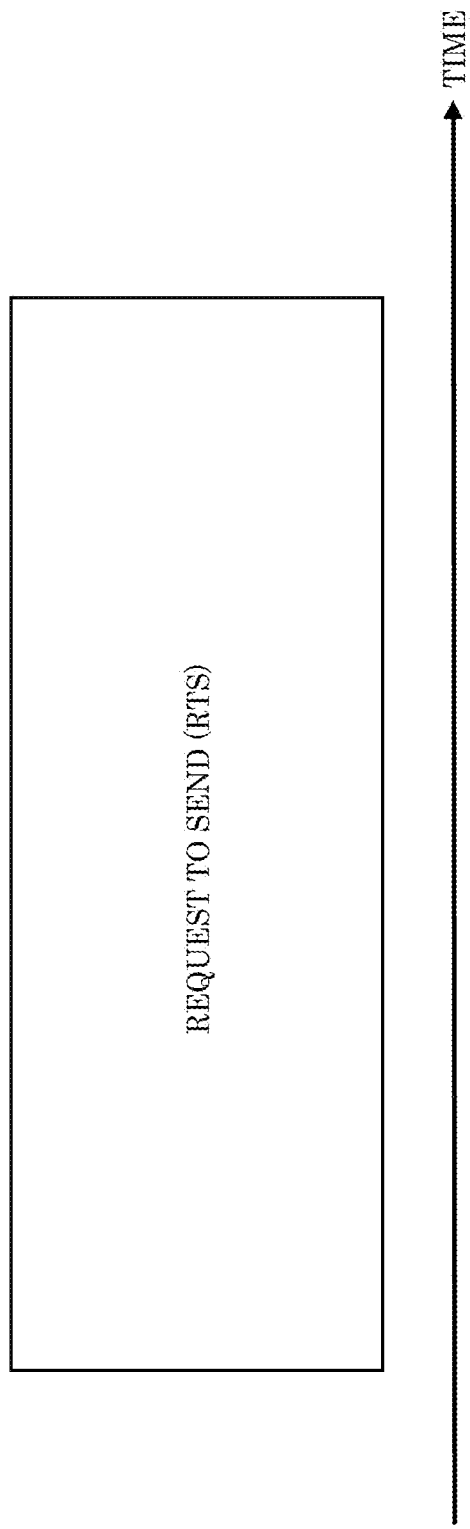

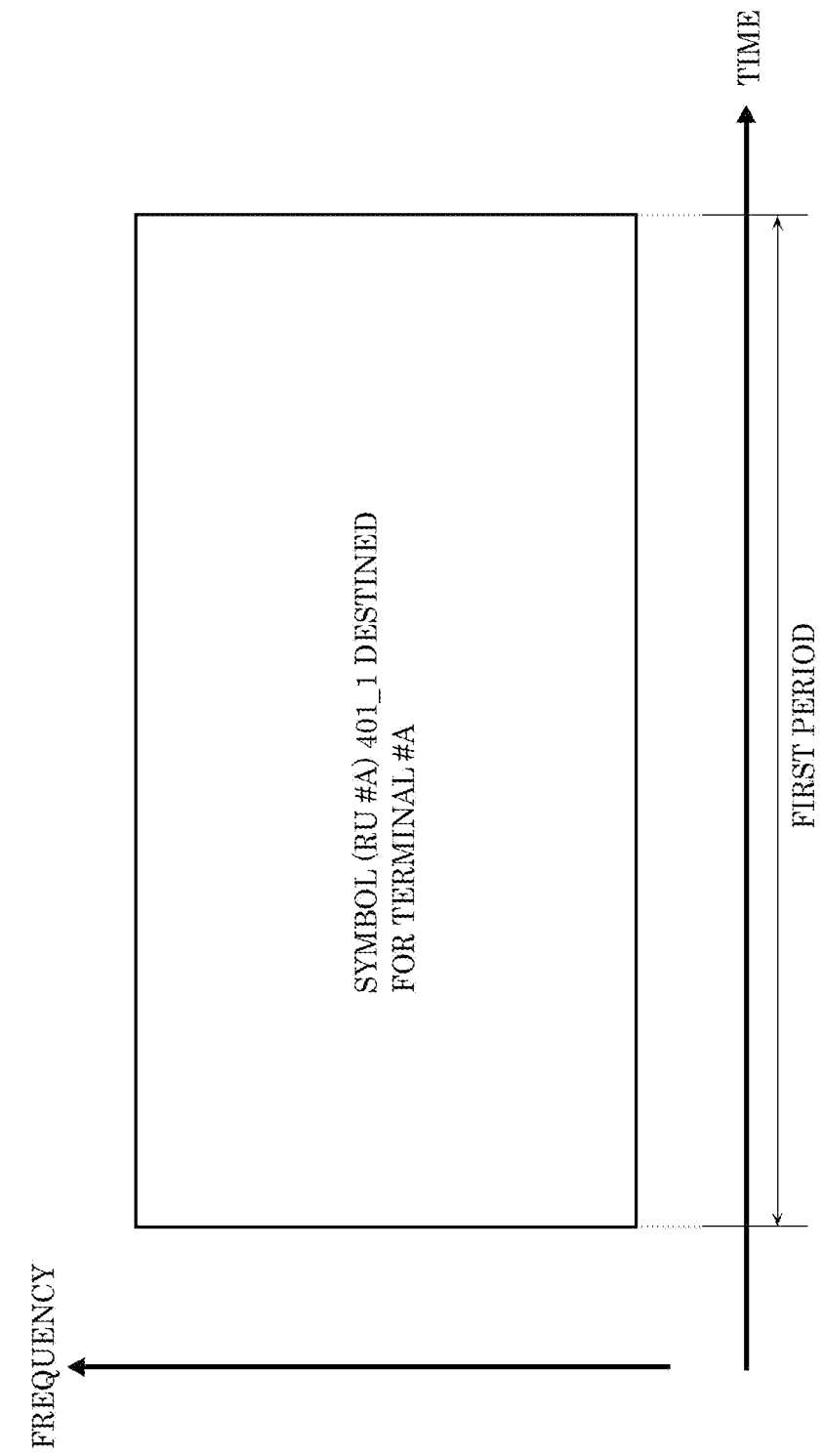

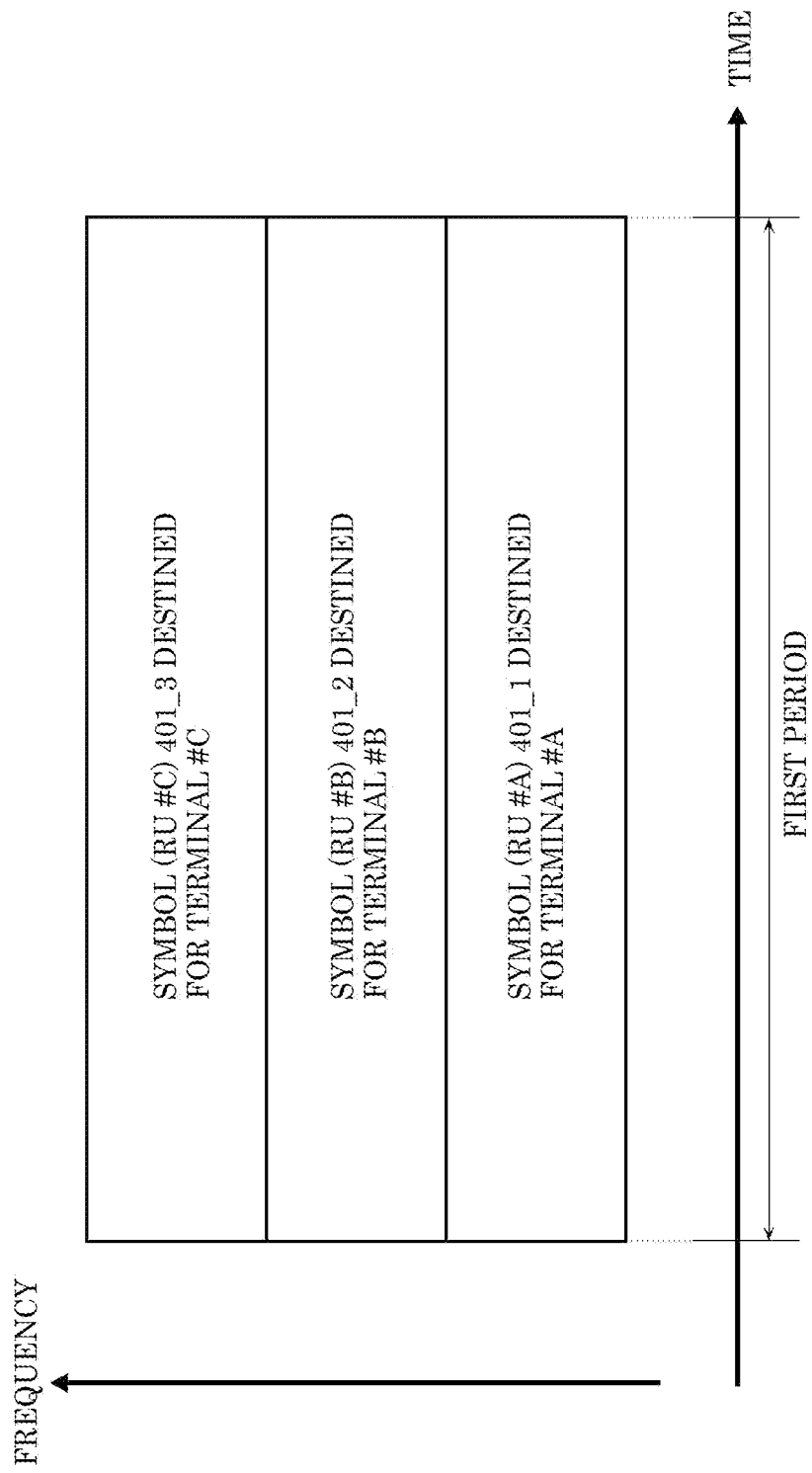

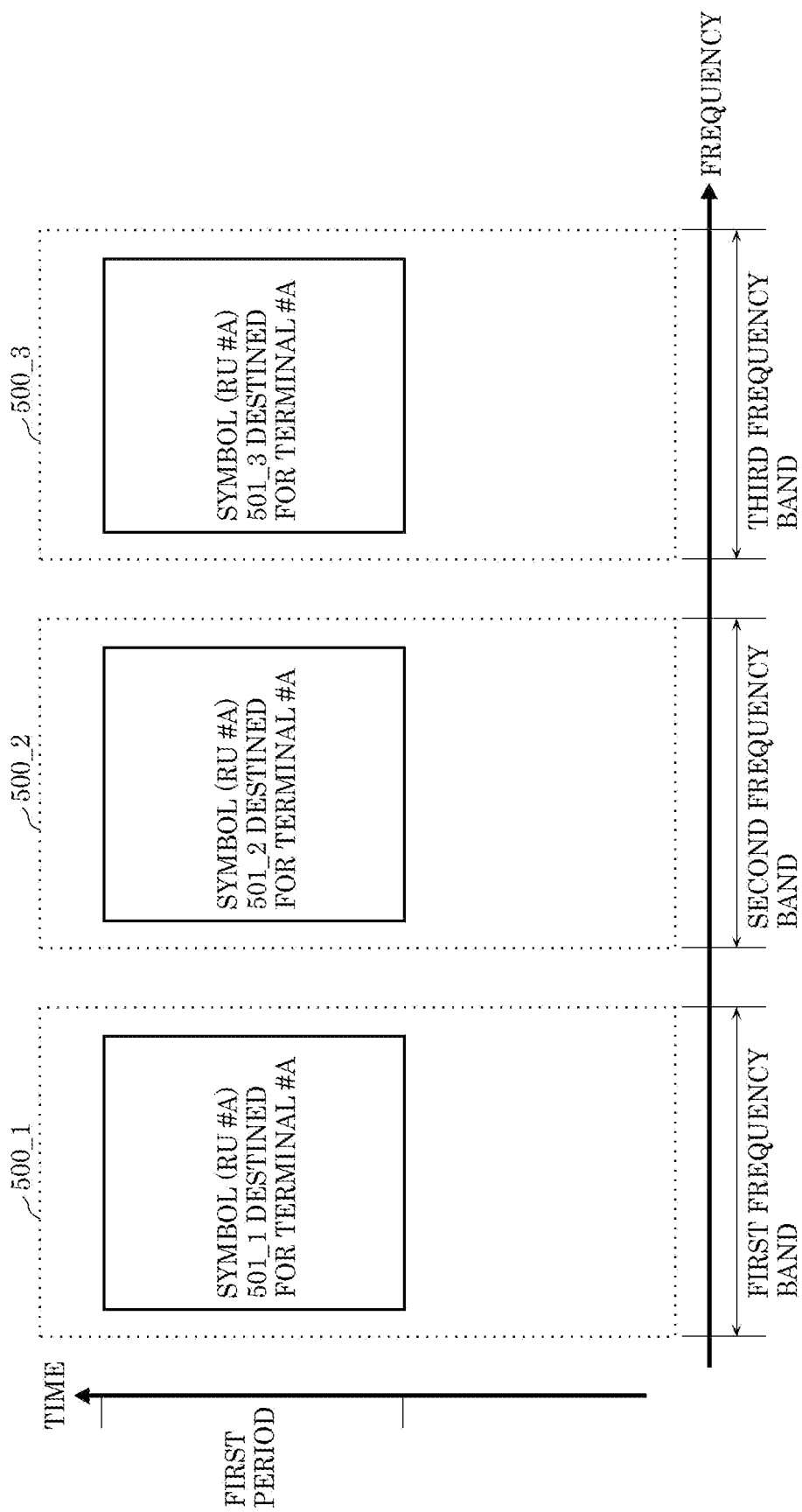

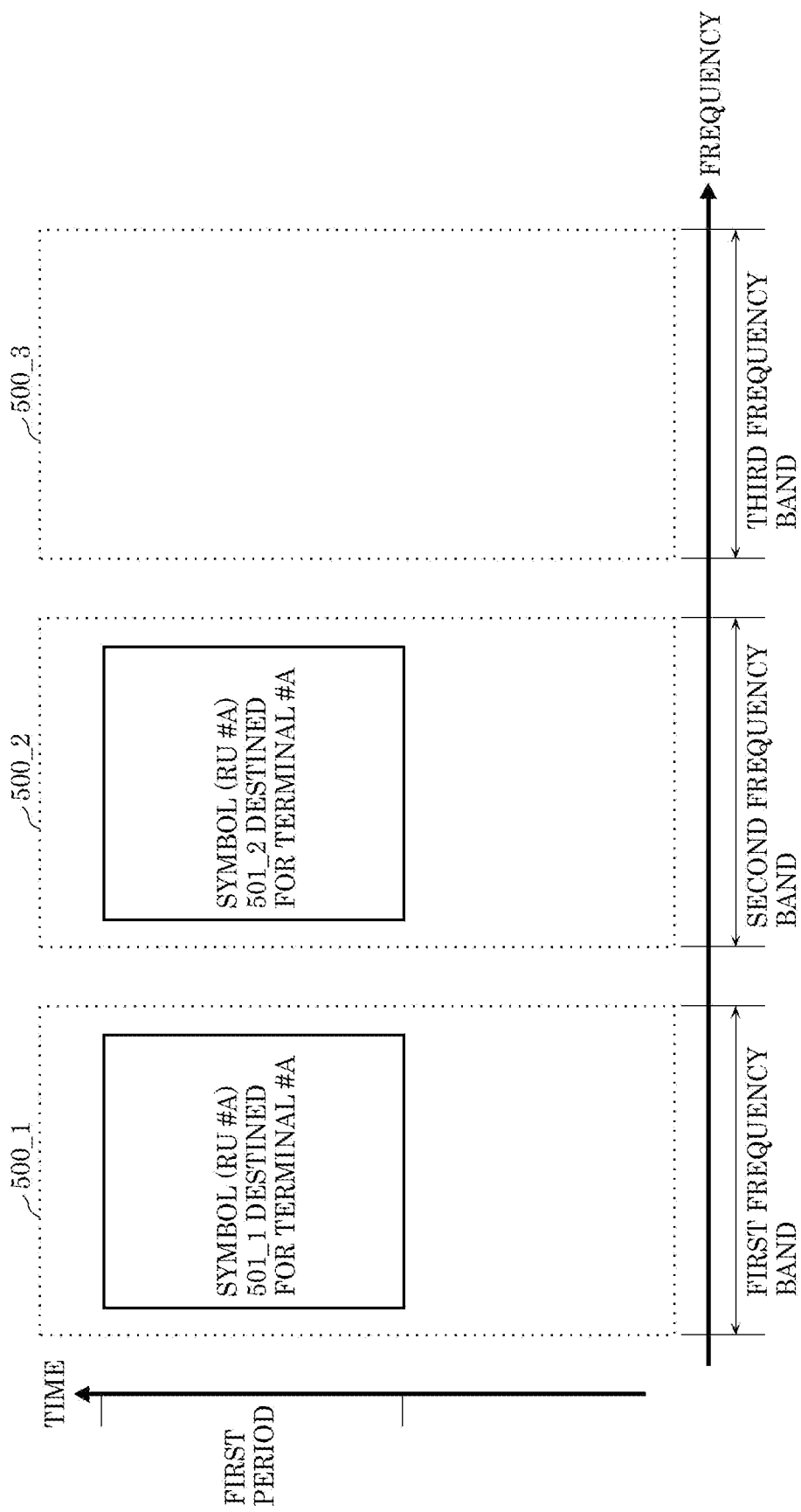

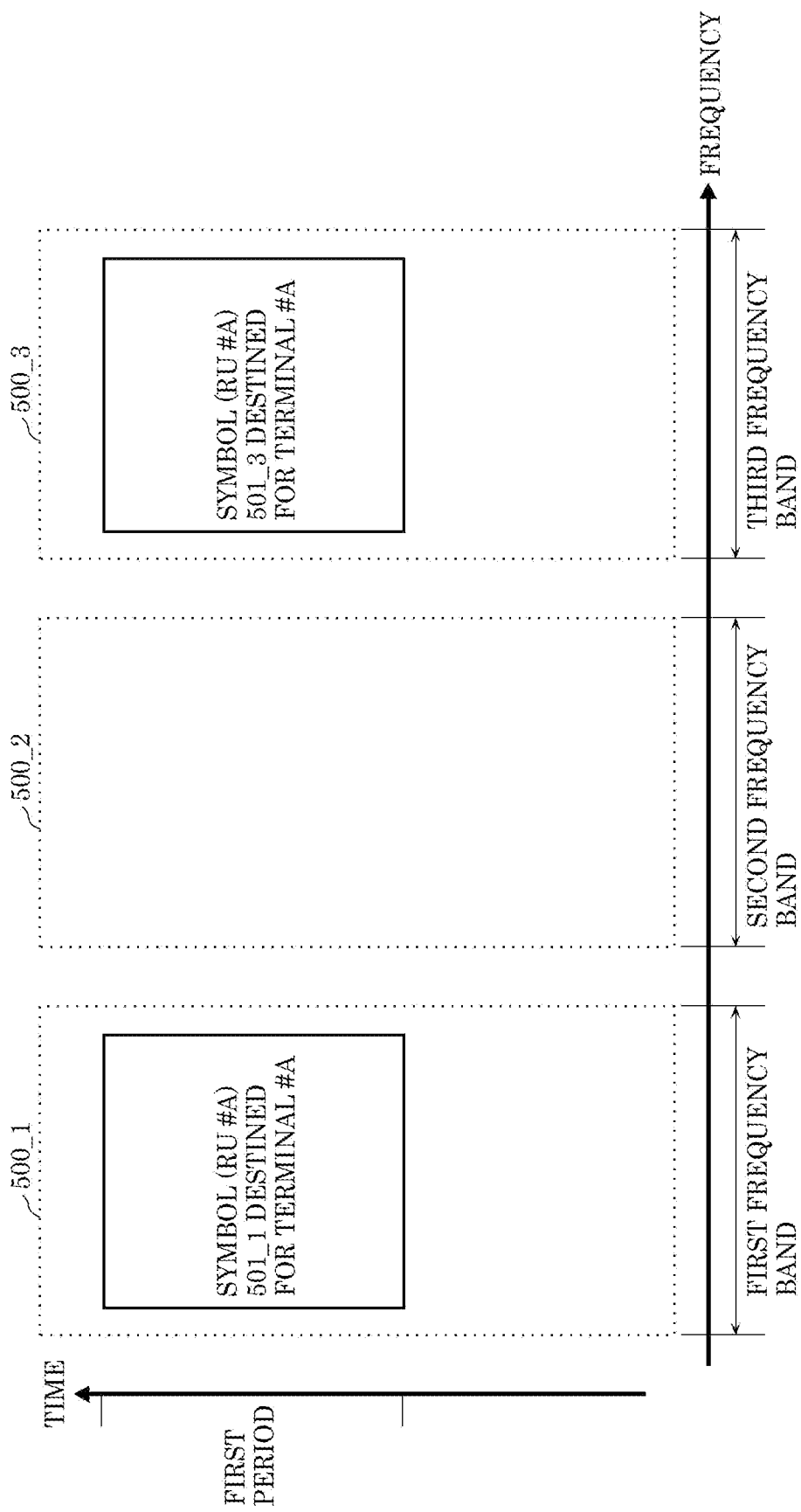

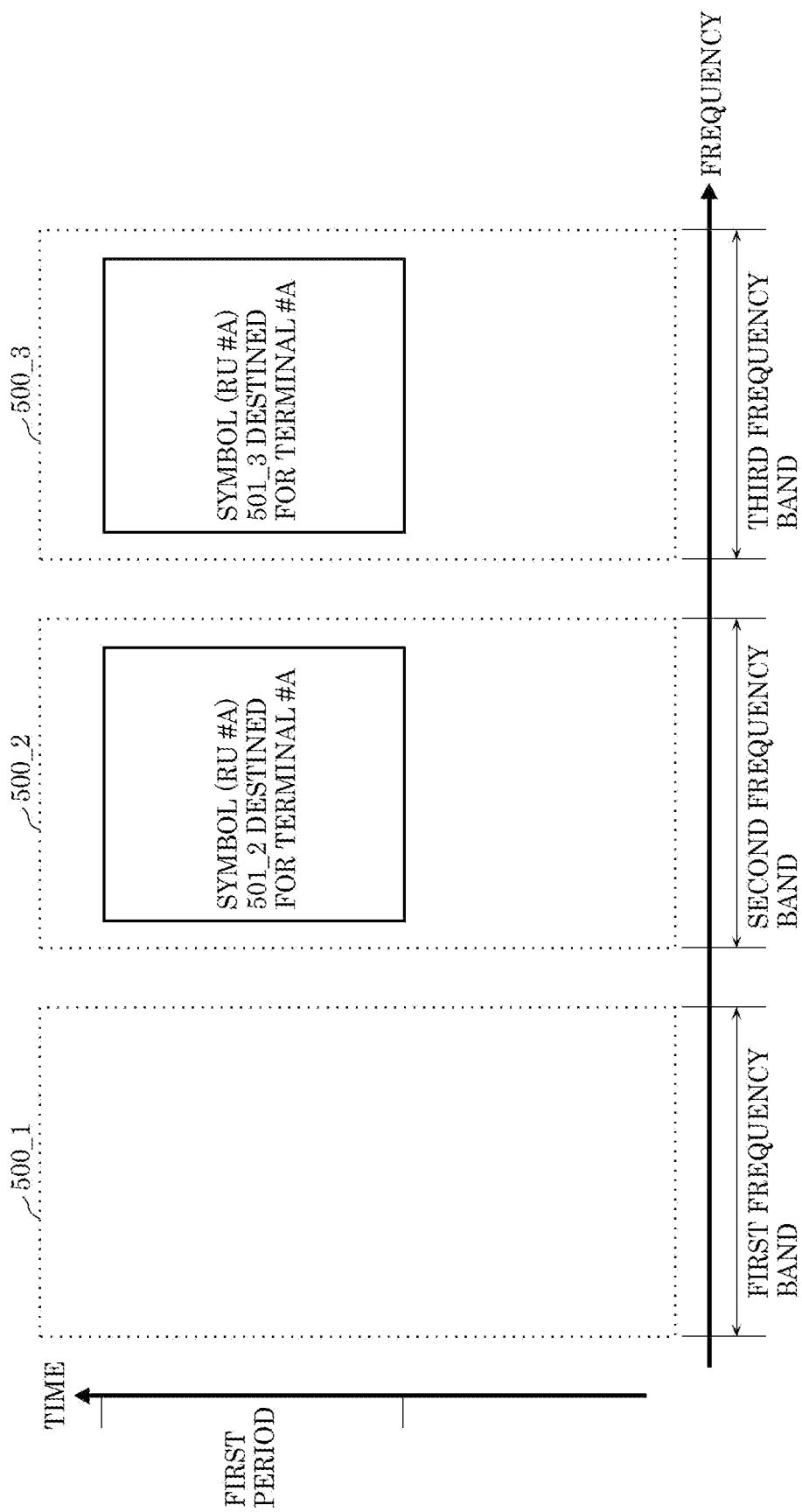

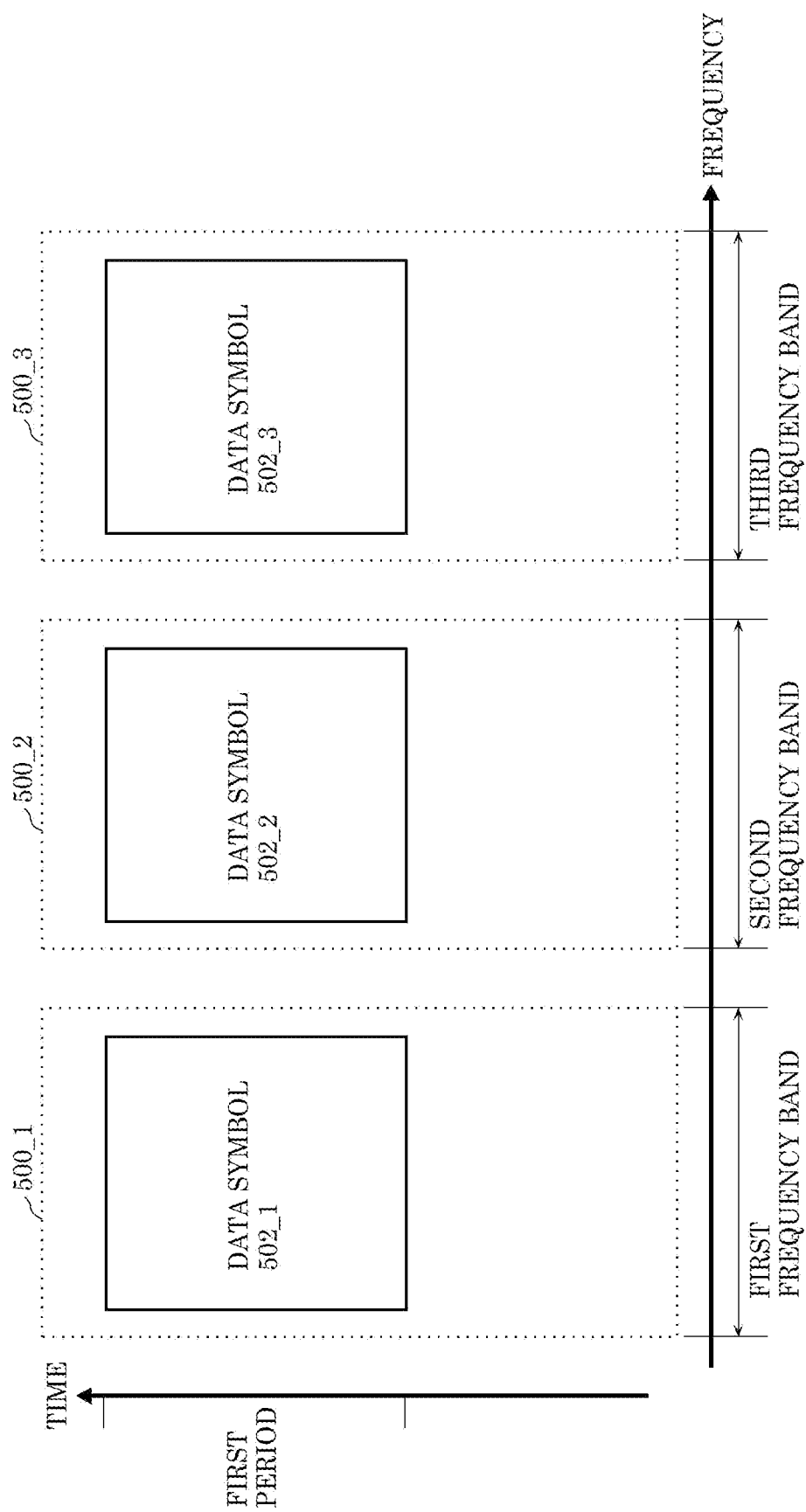

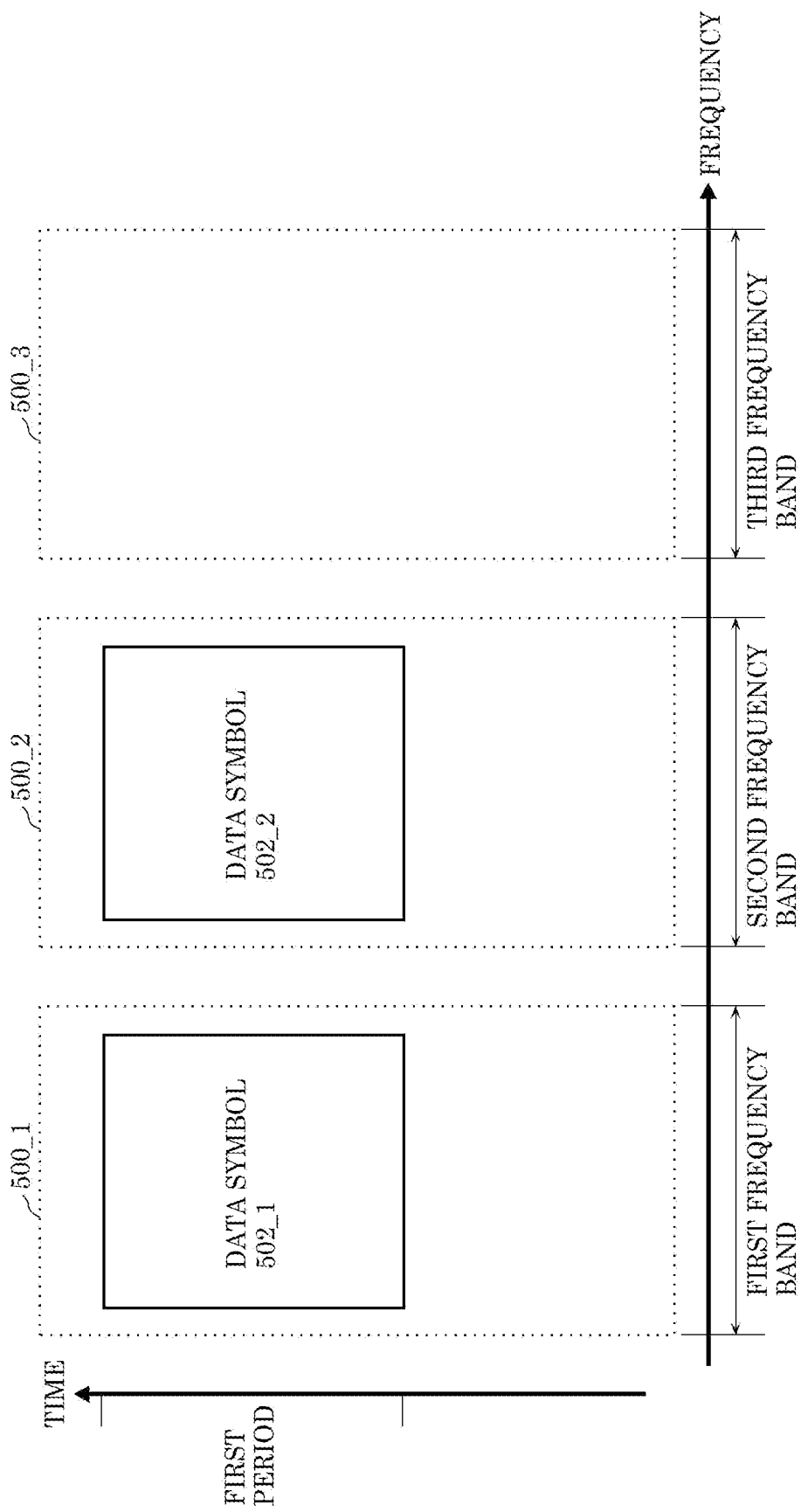

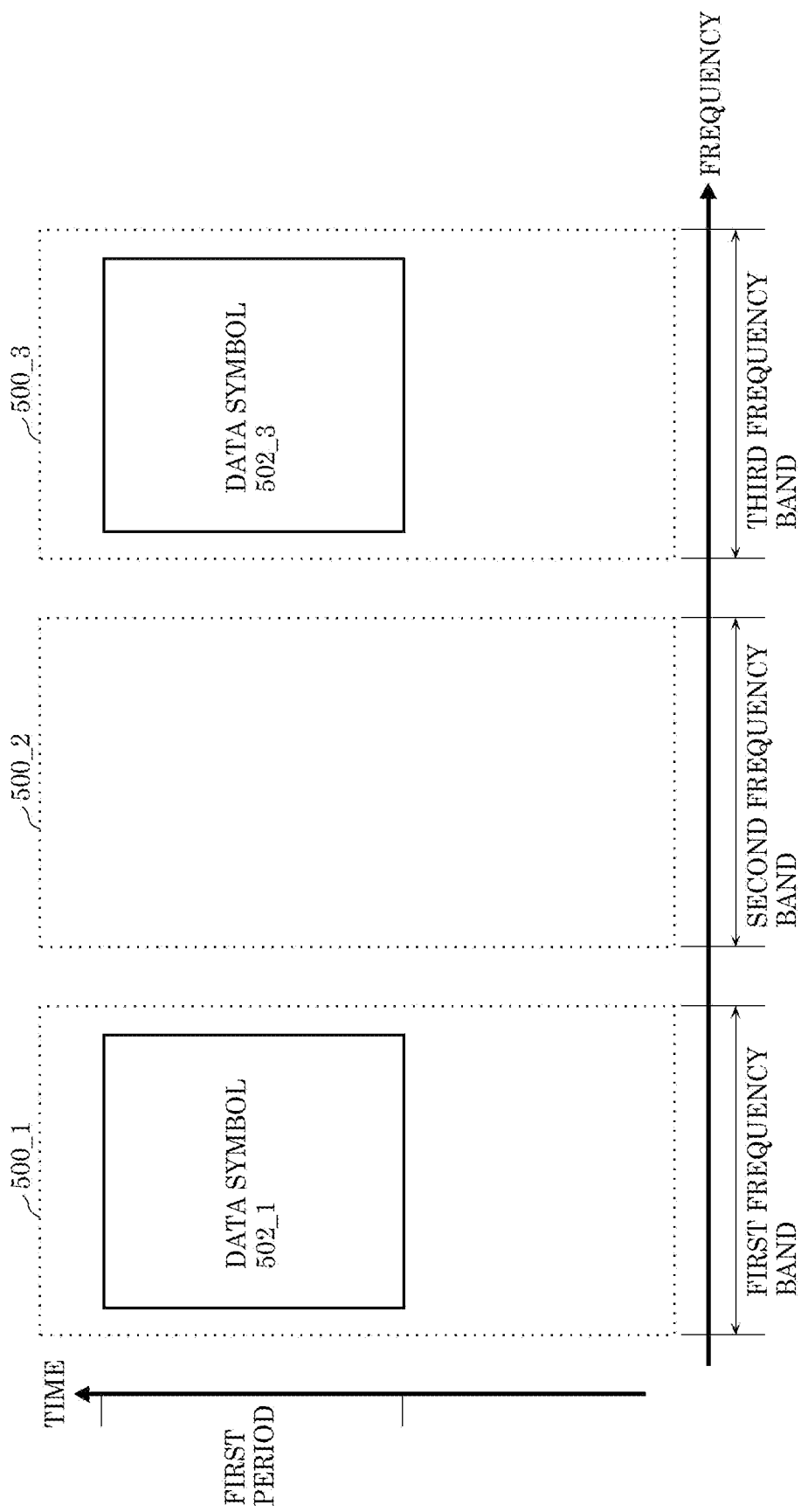

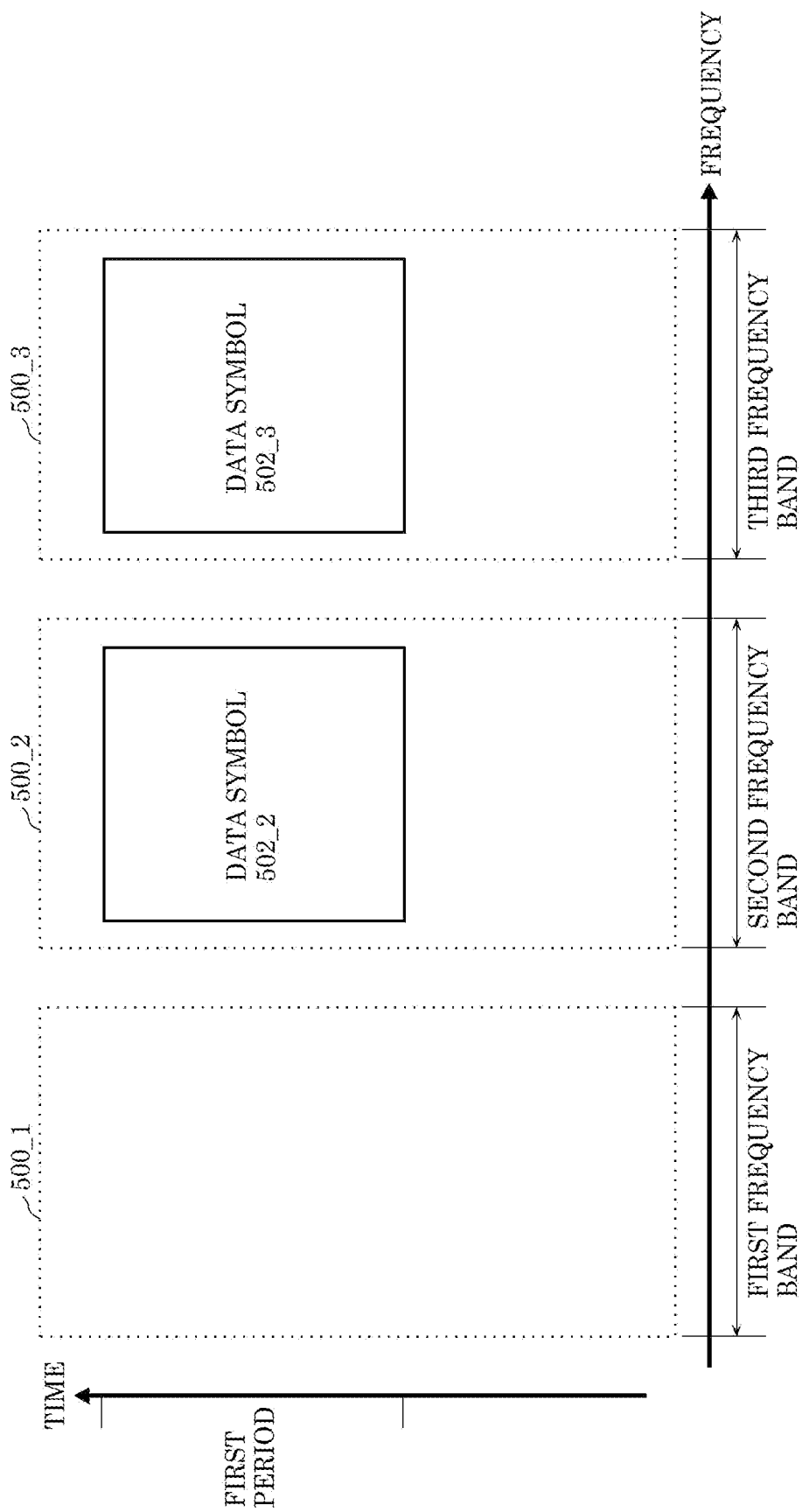

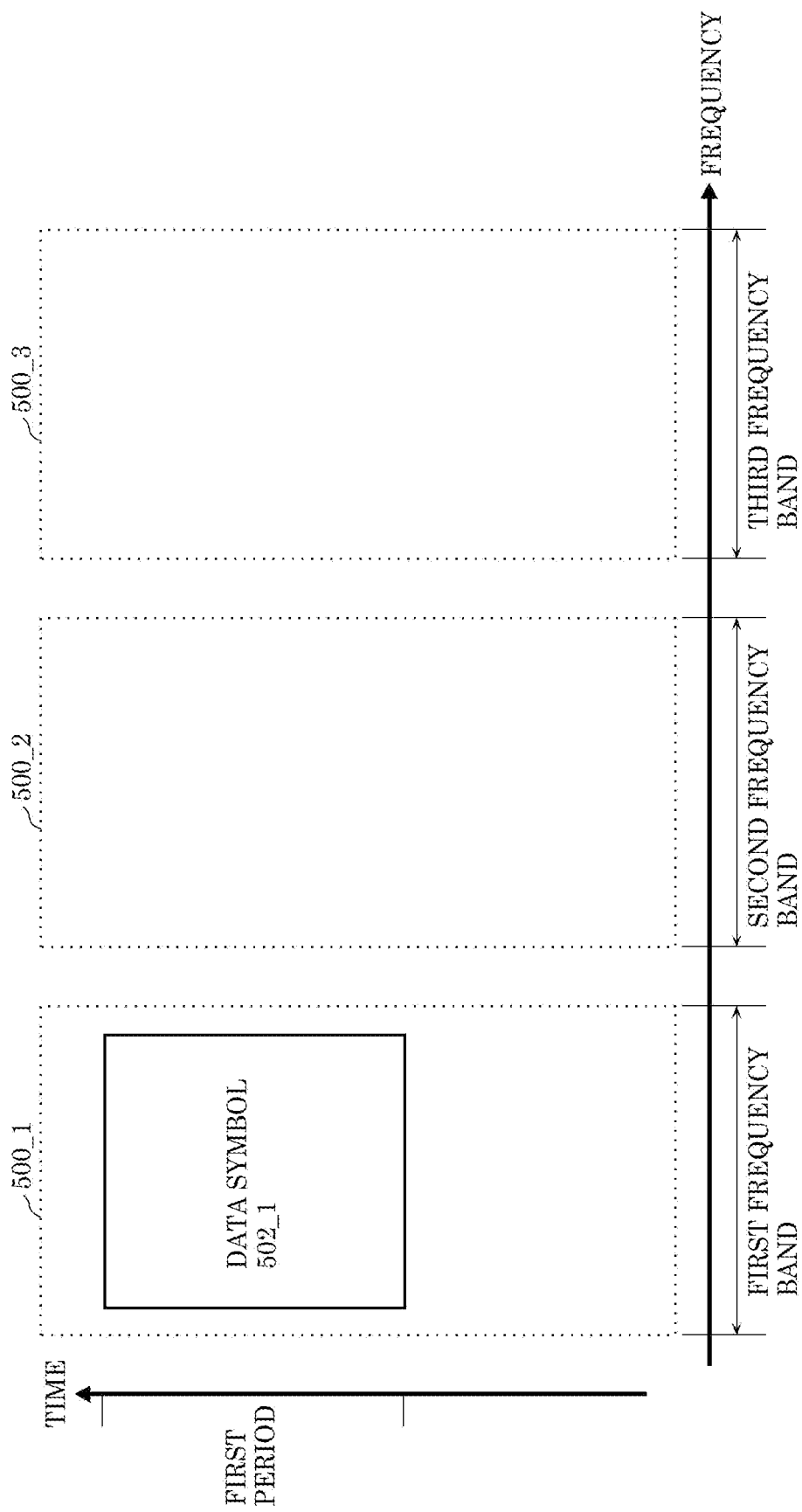

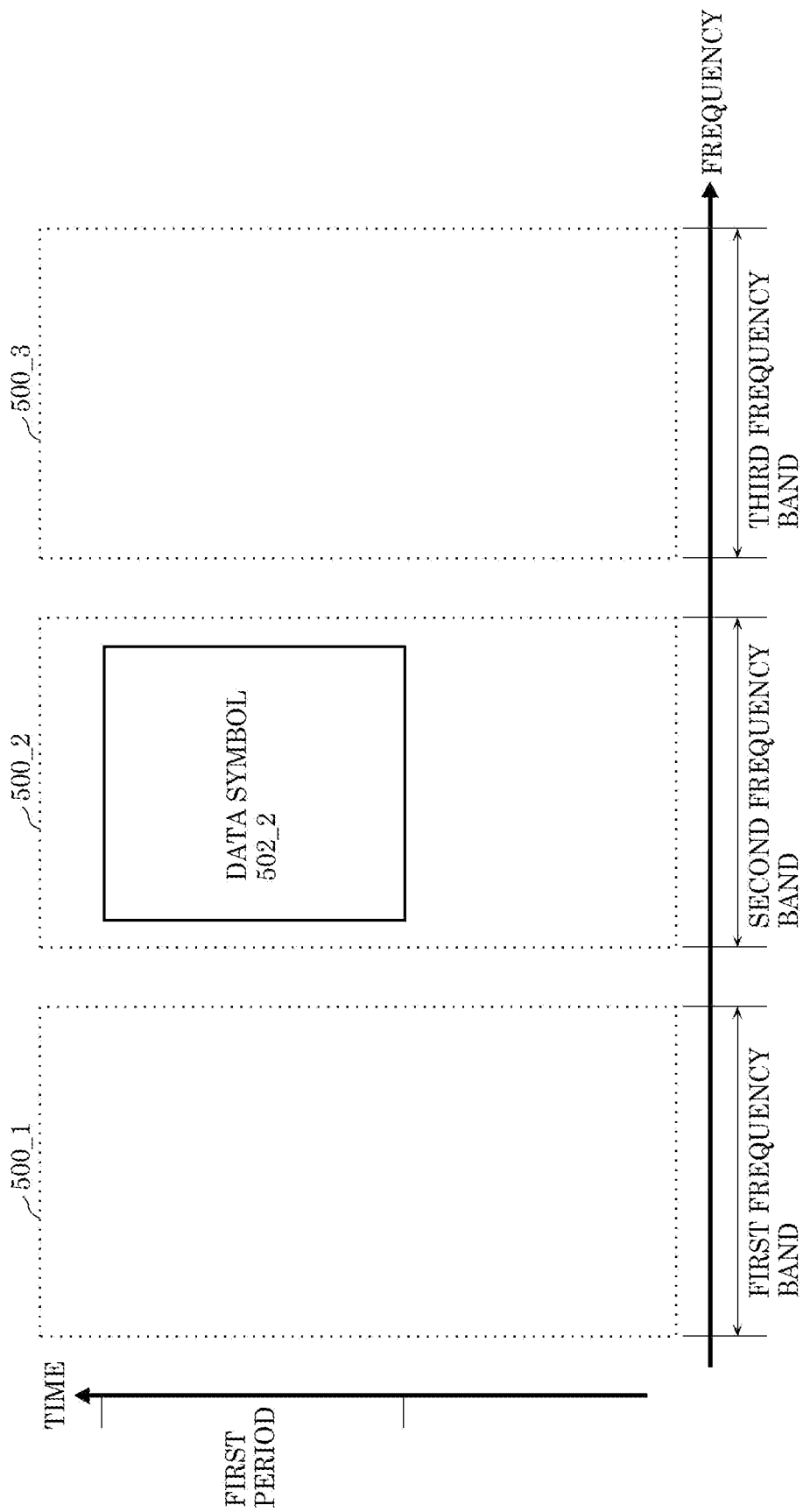

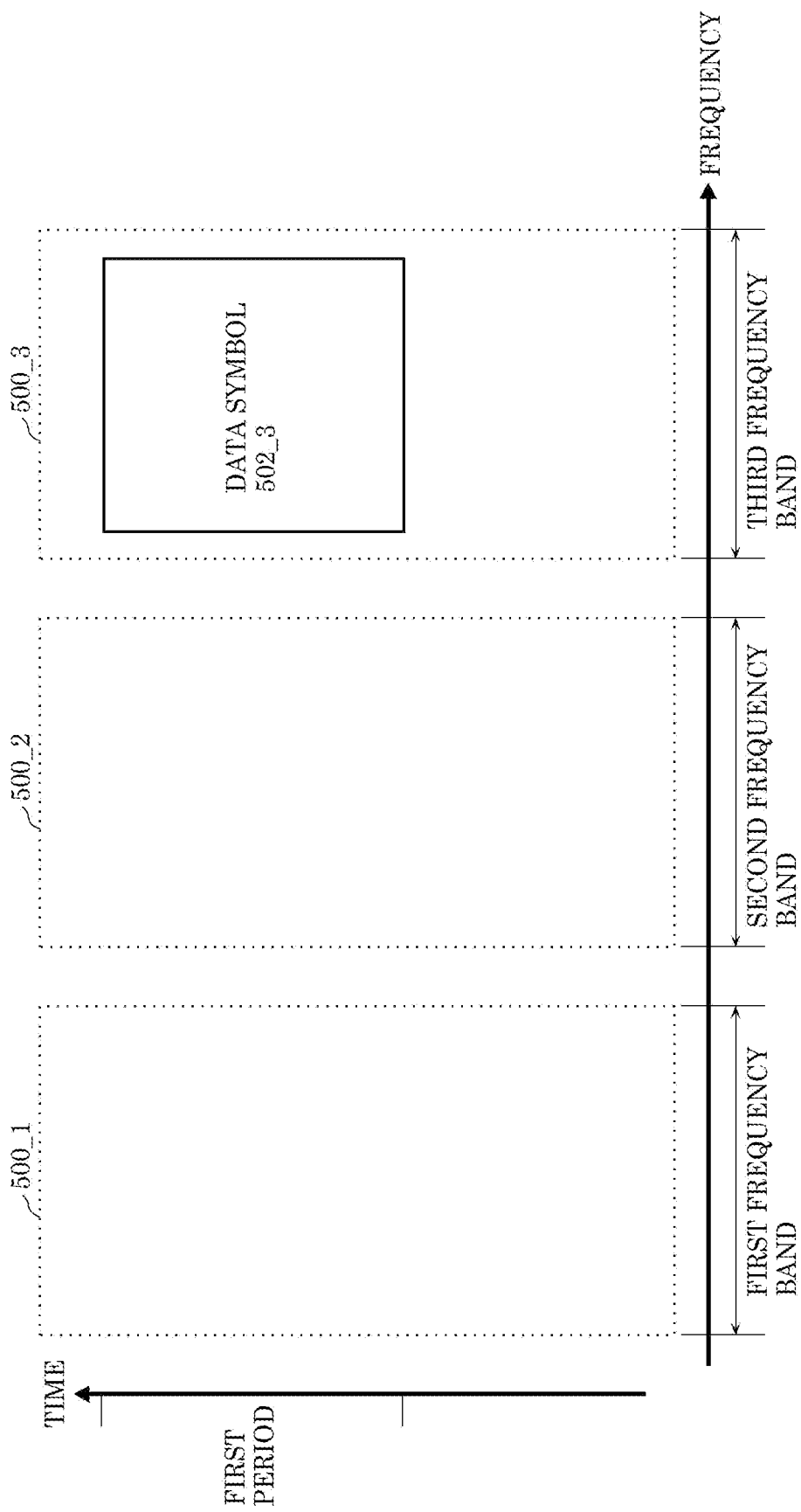

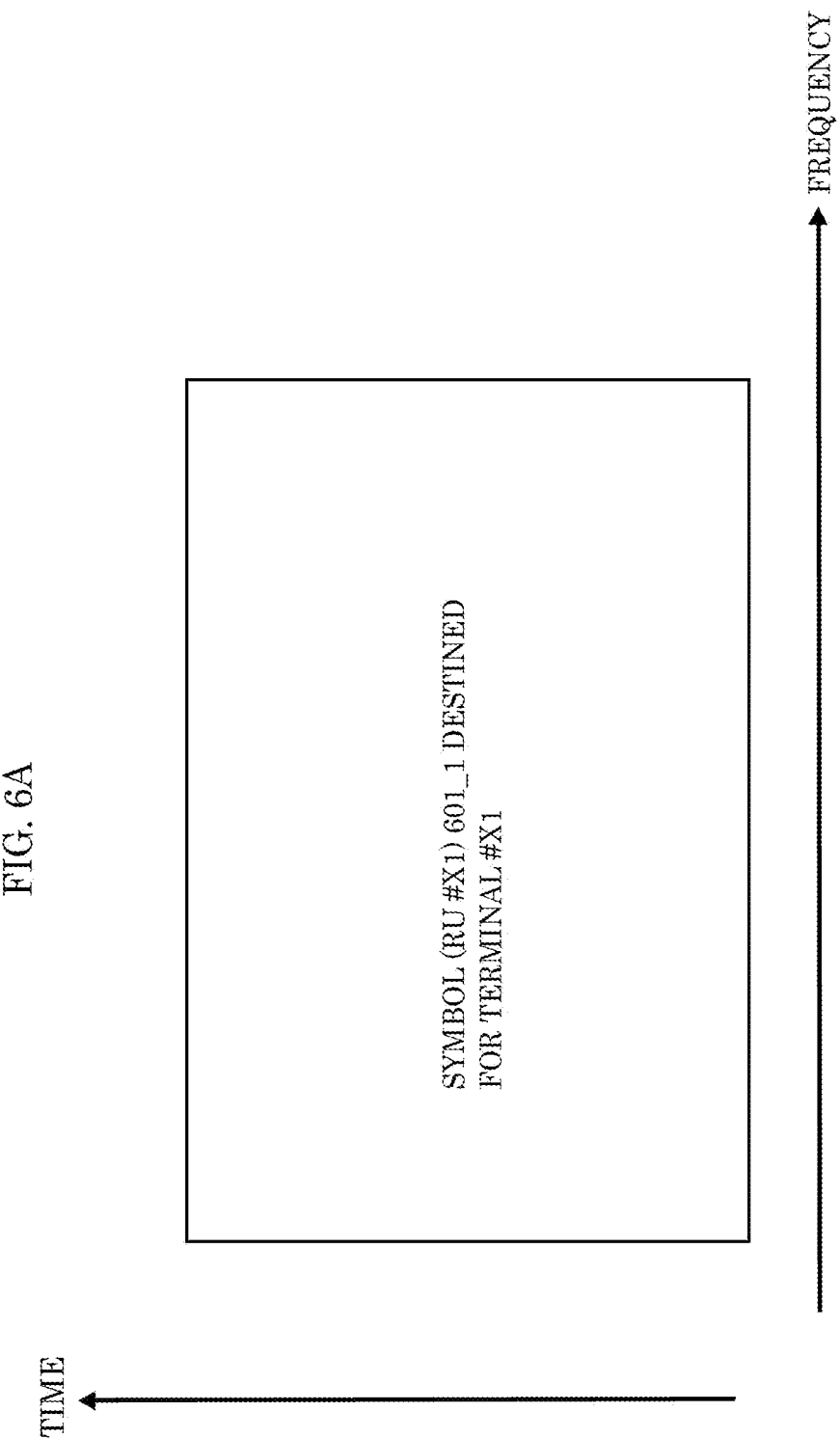

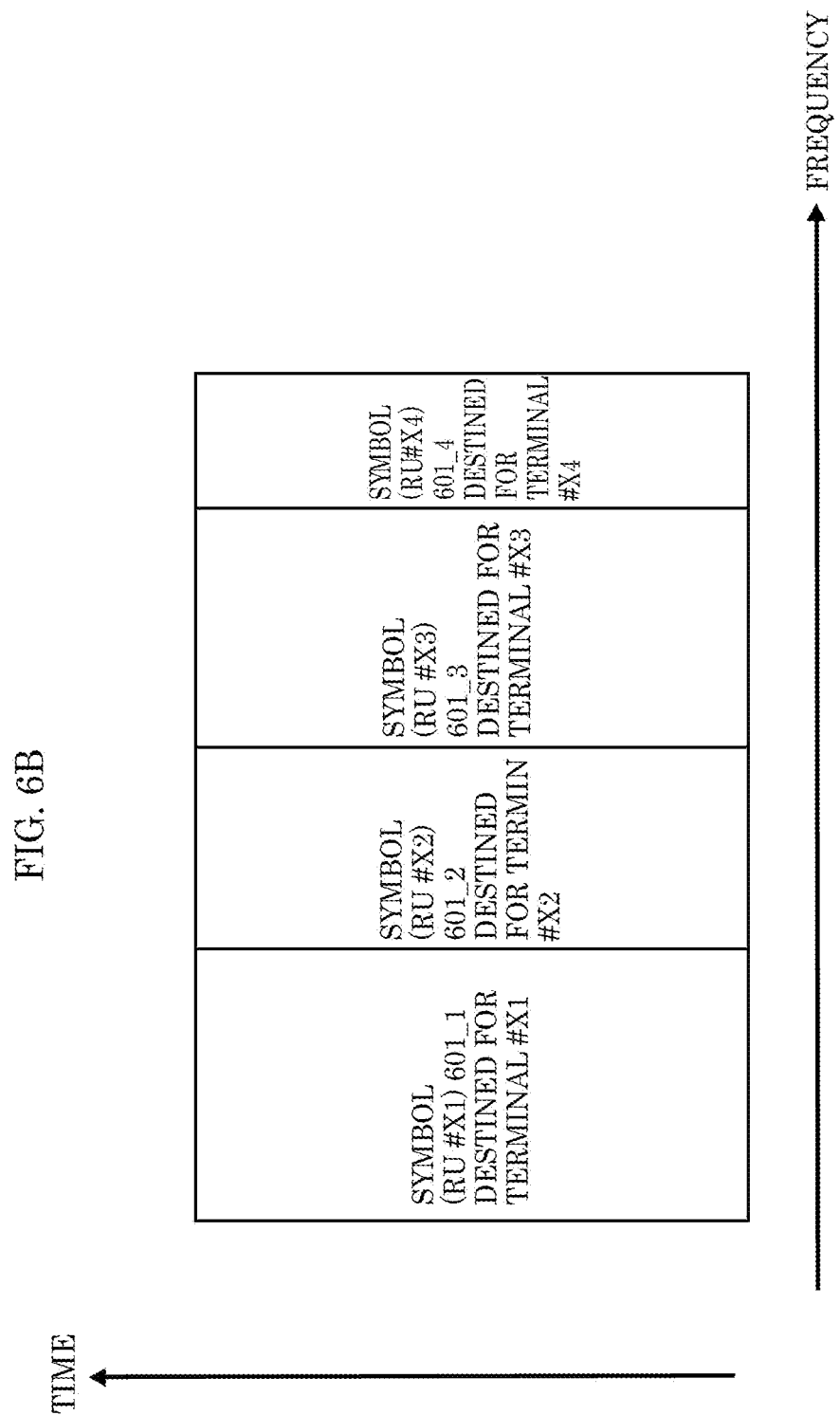

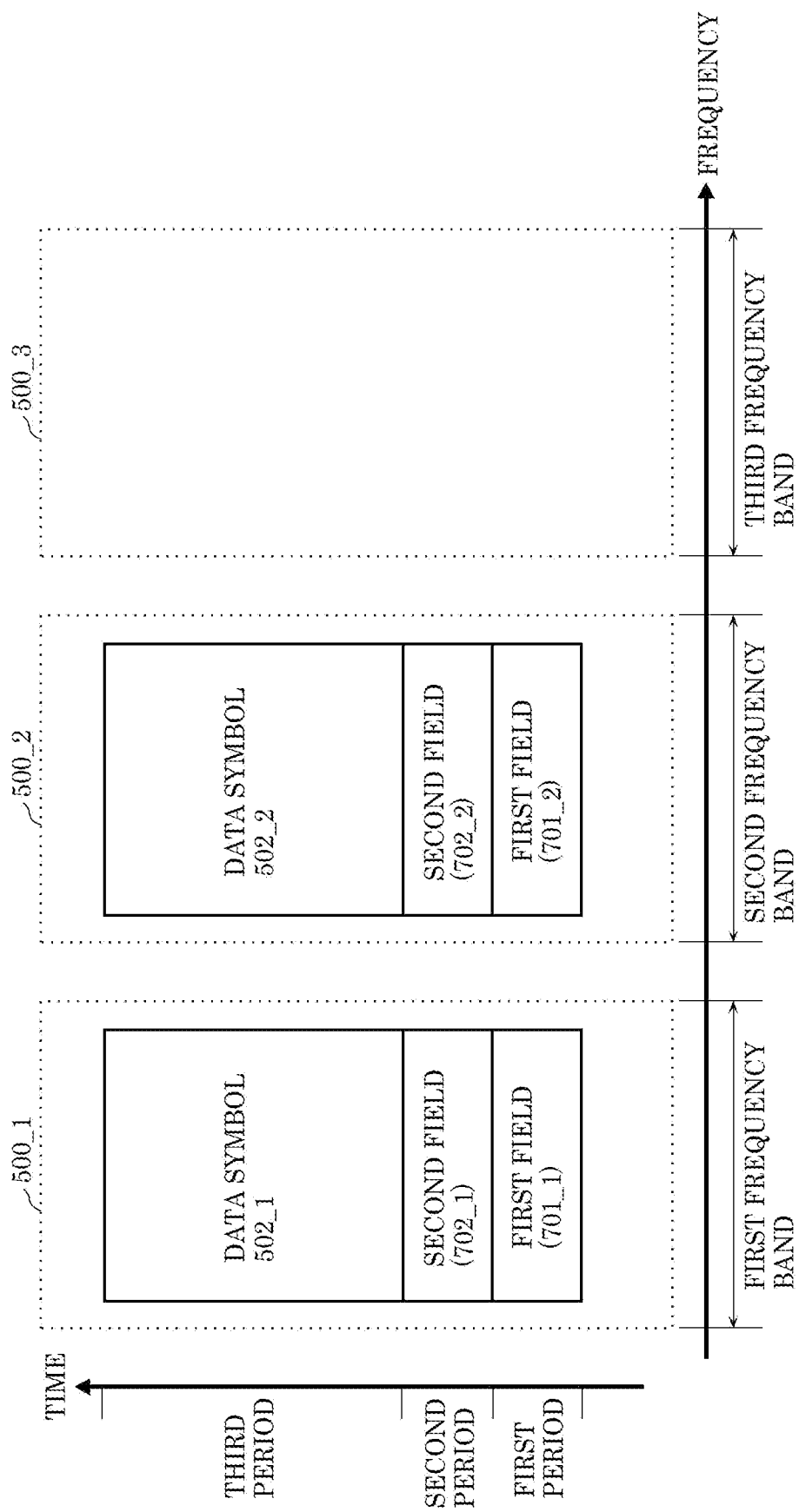>

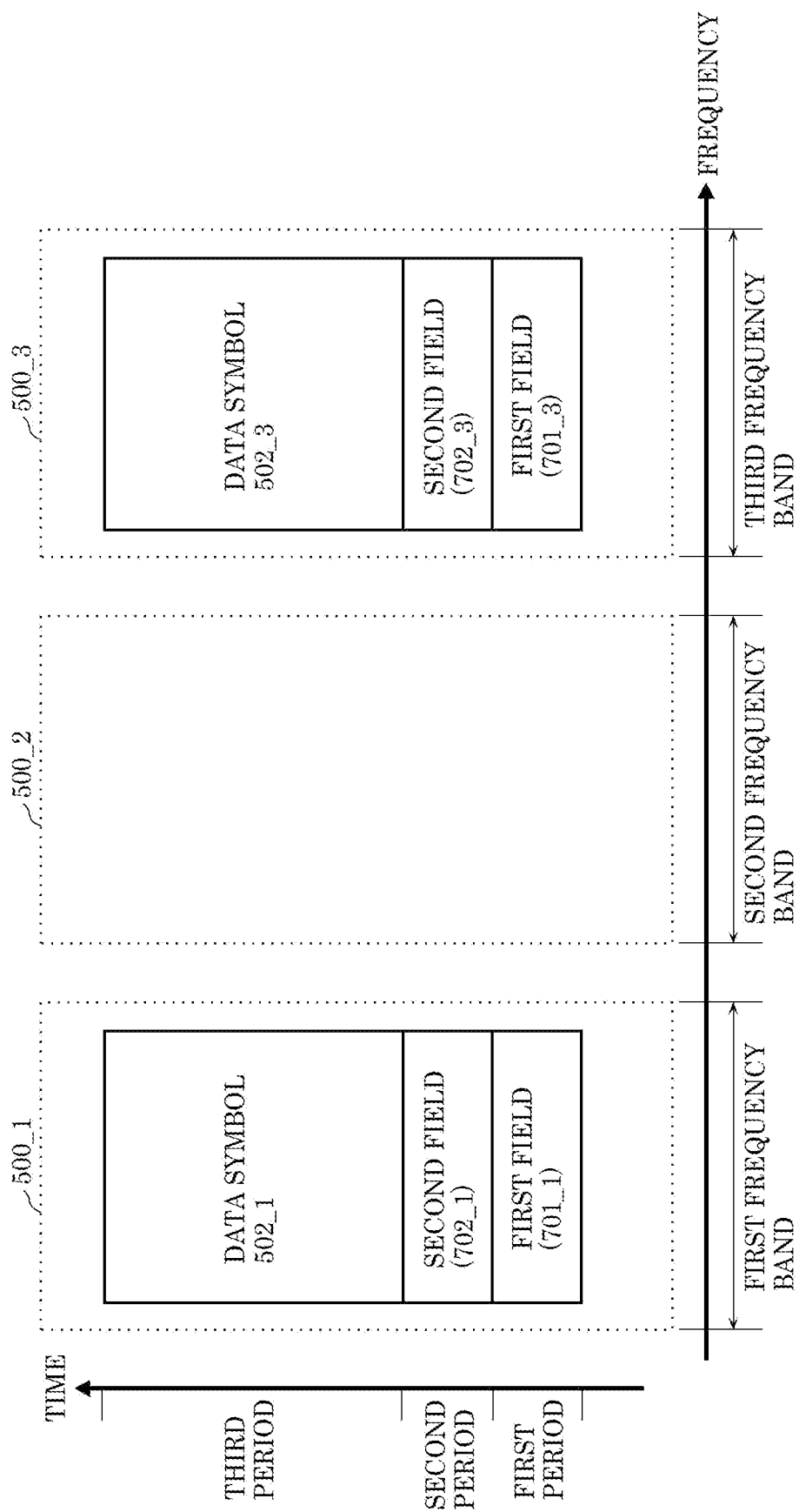

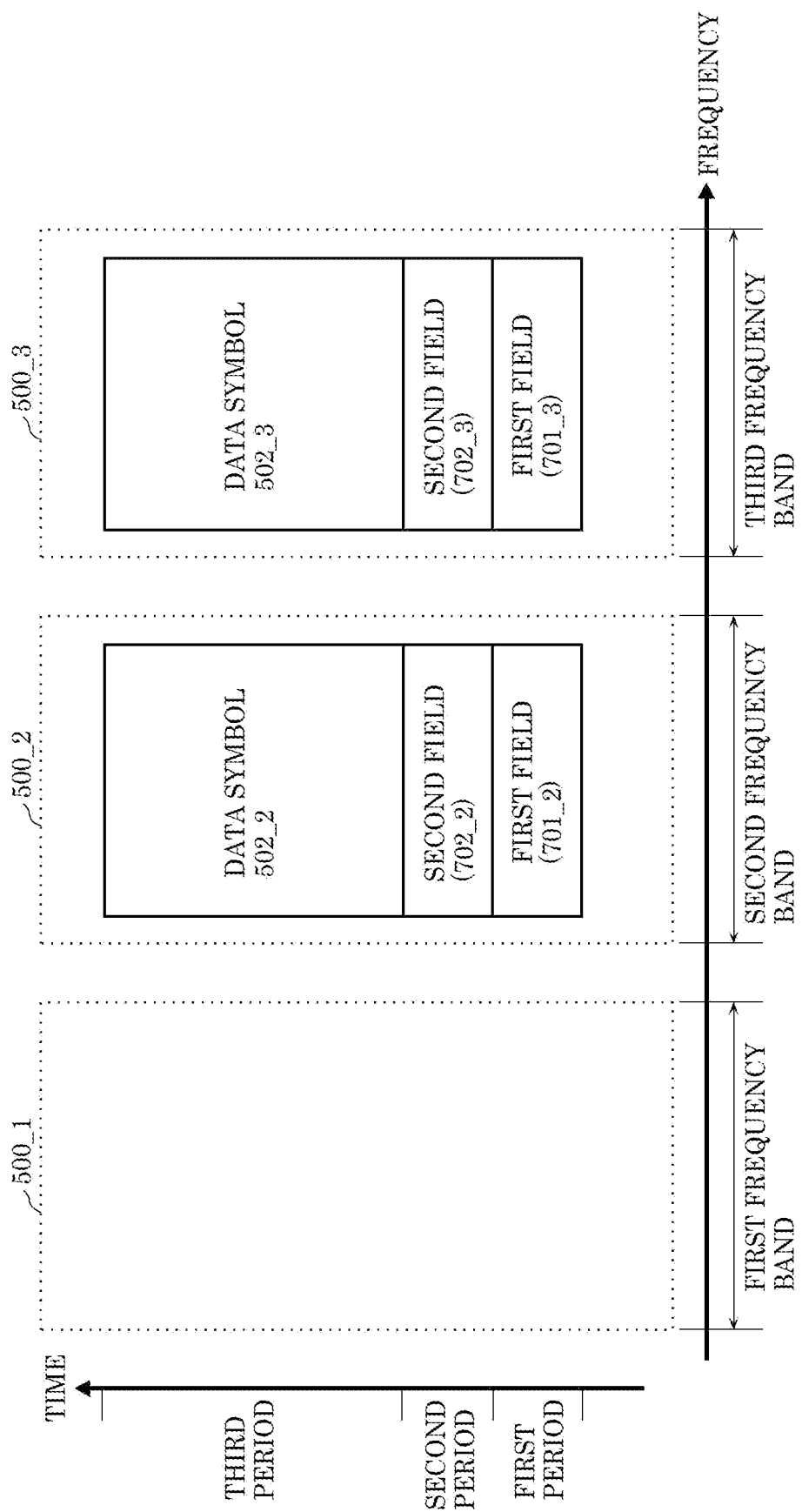

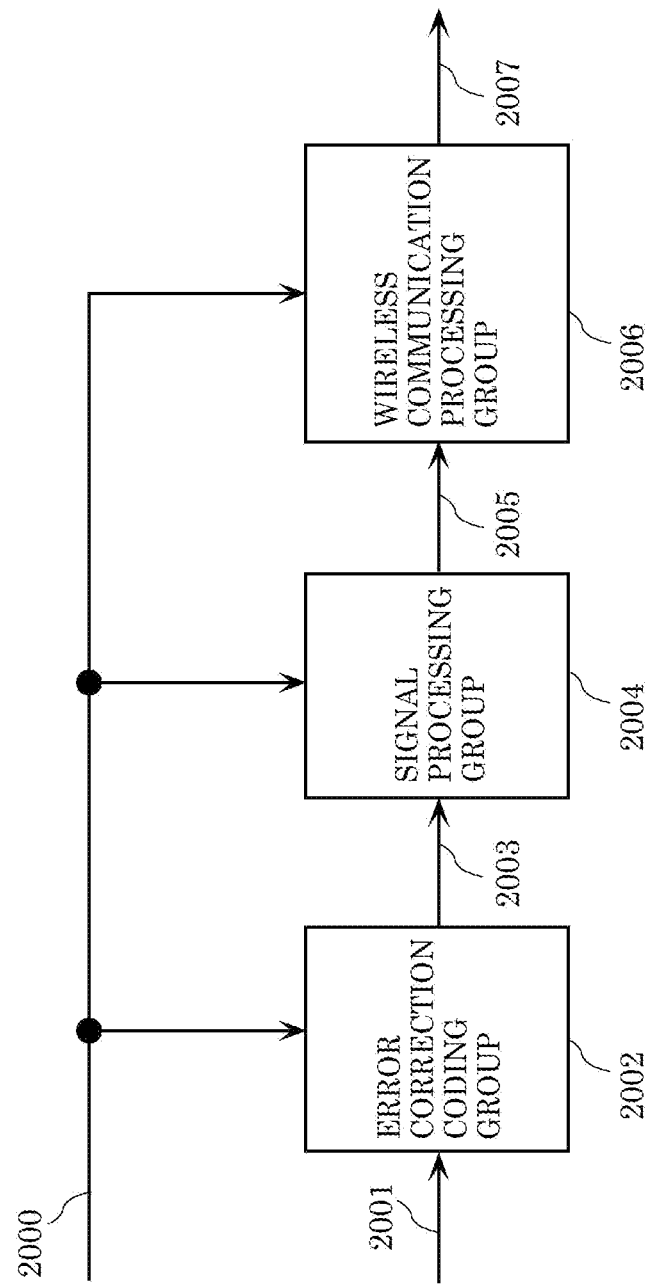

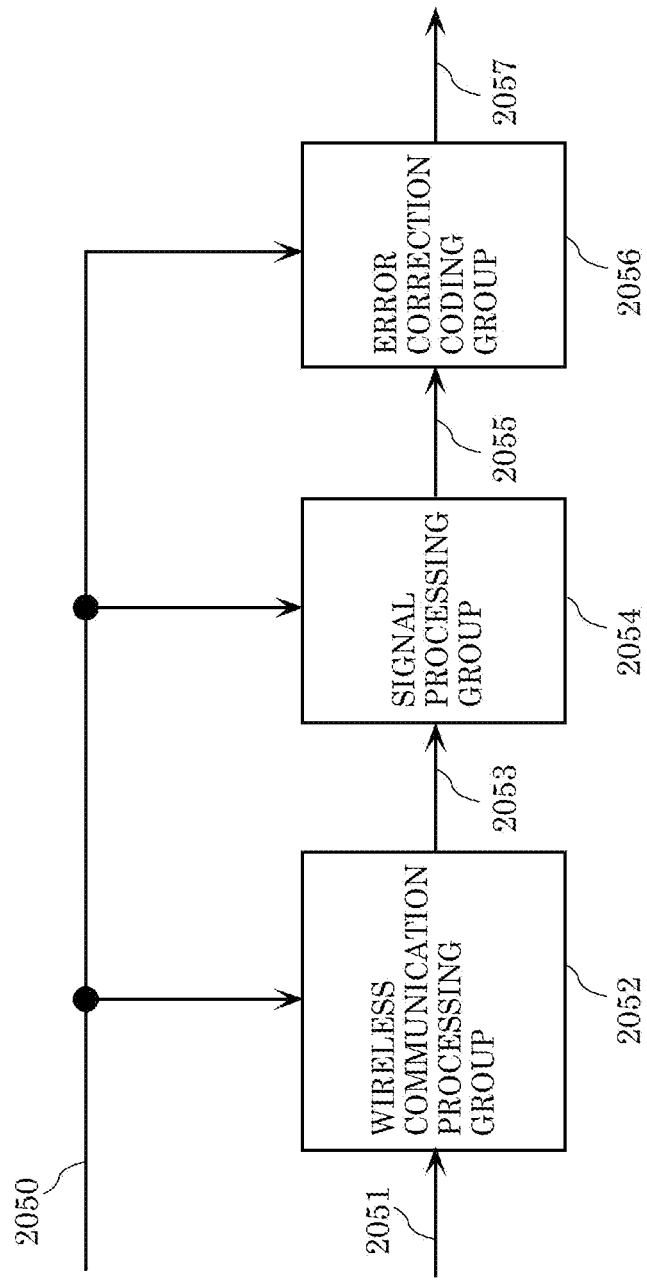

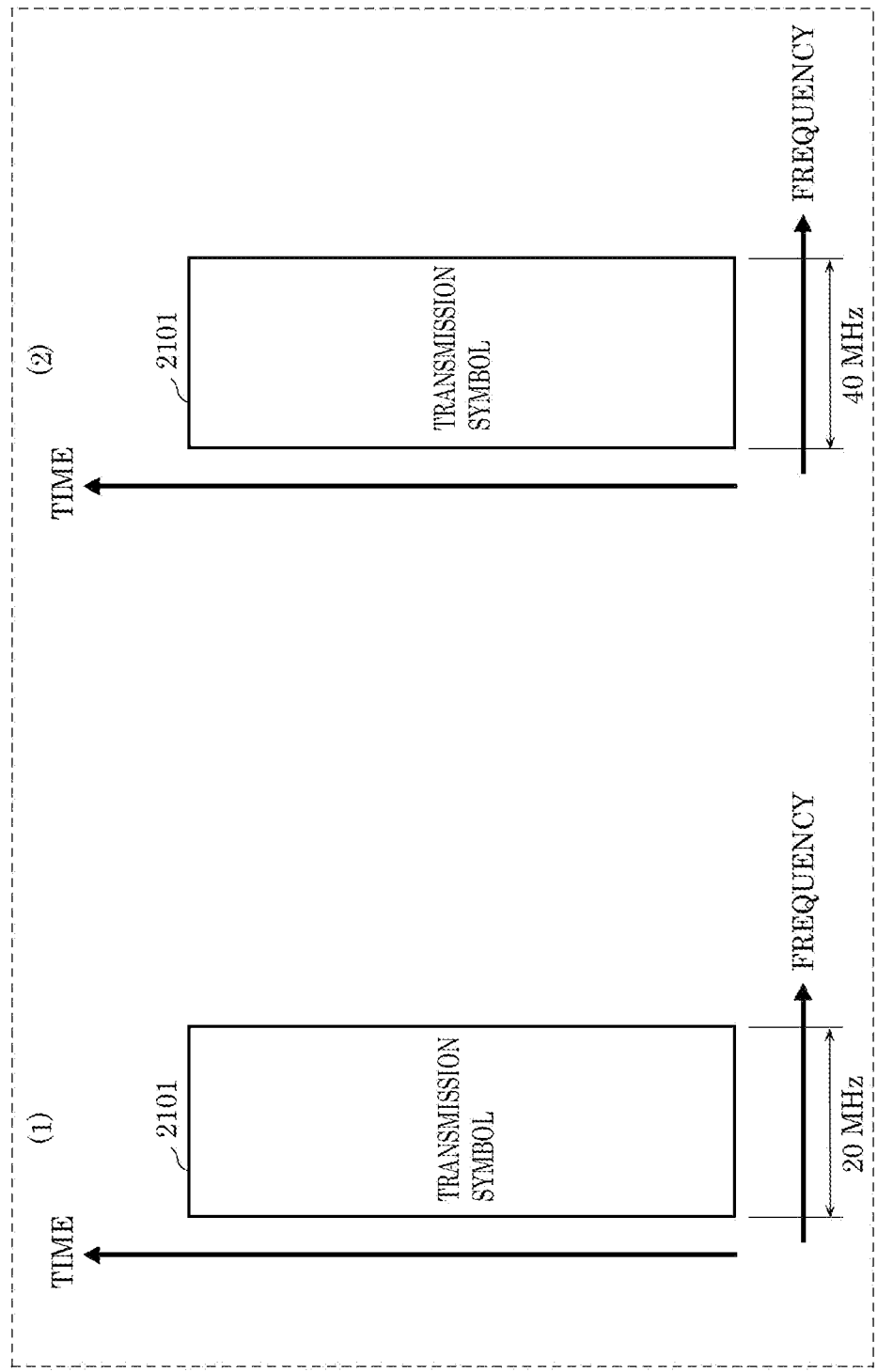

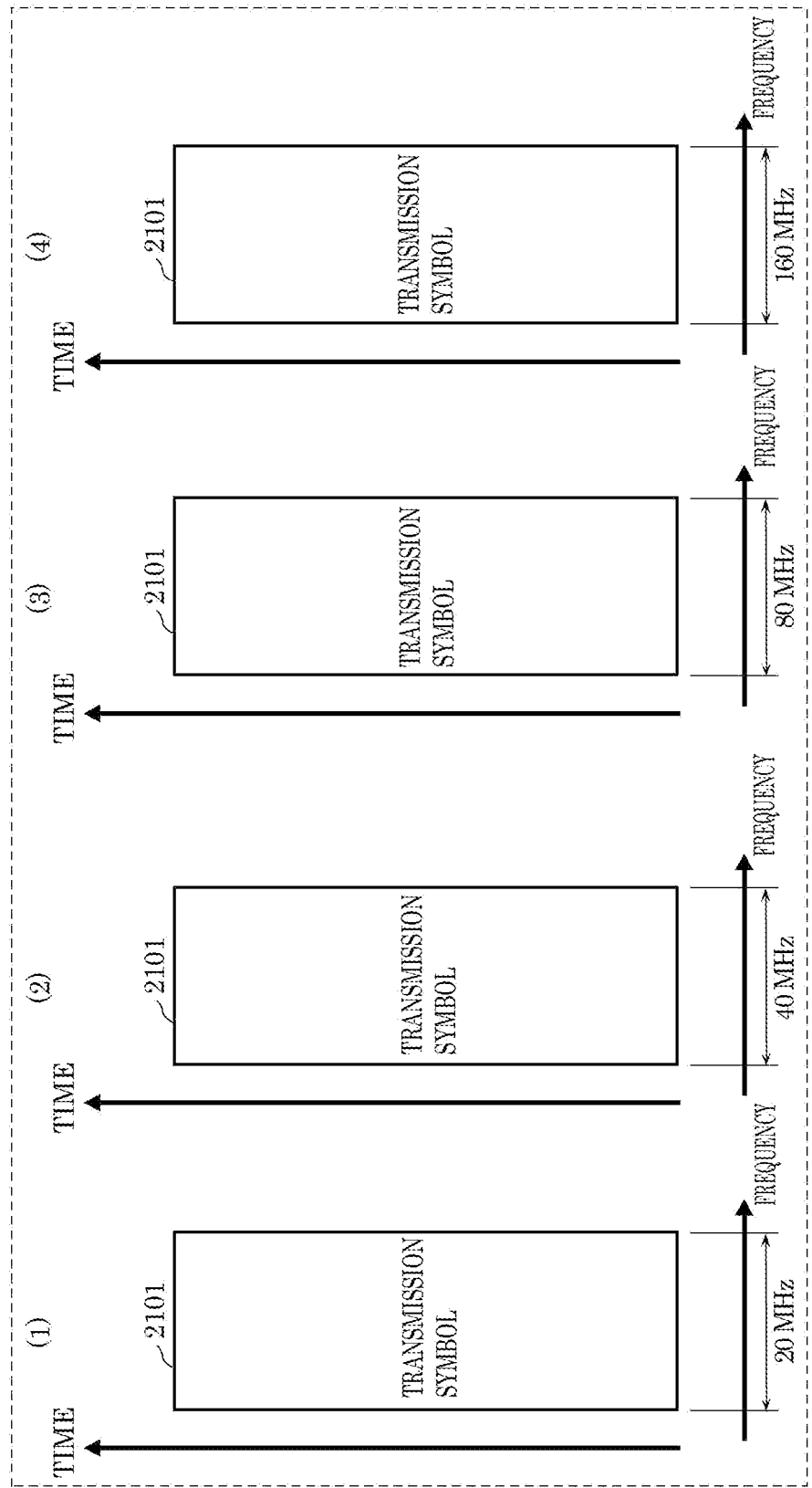

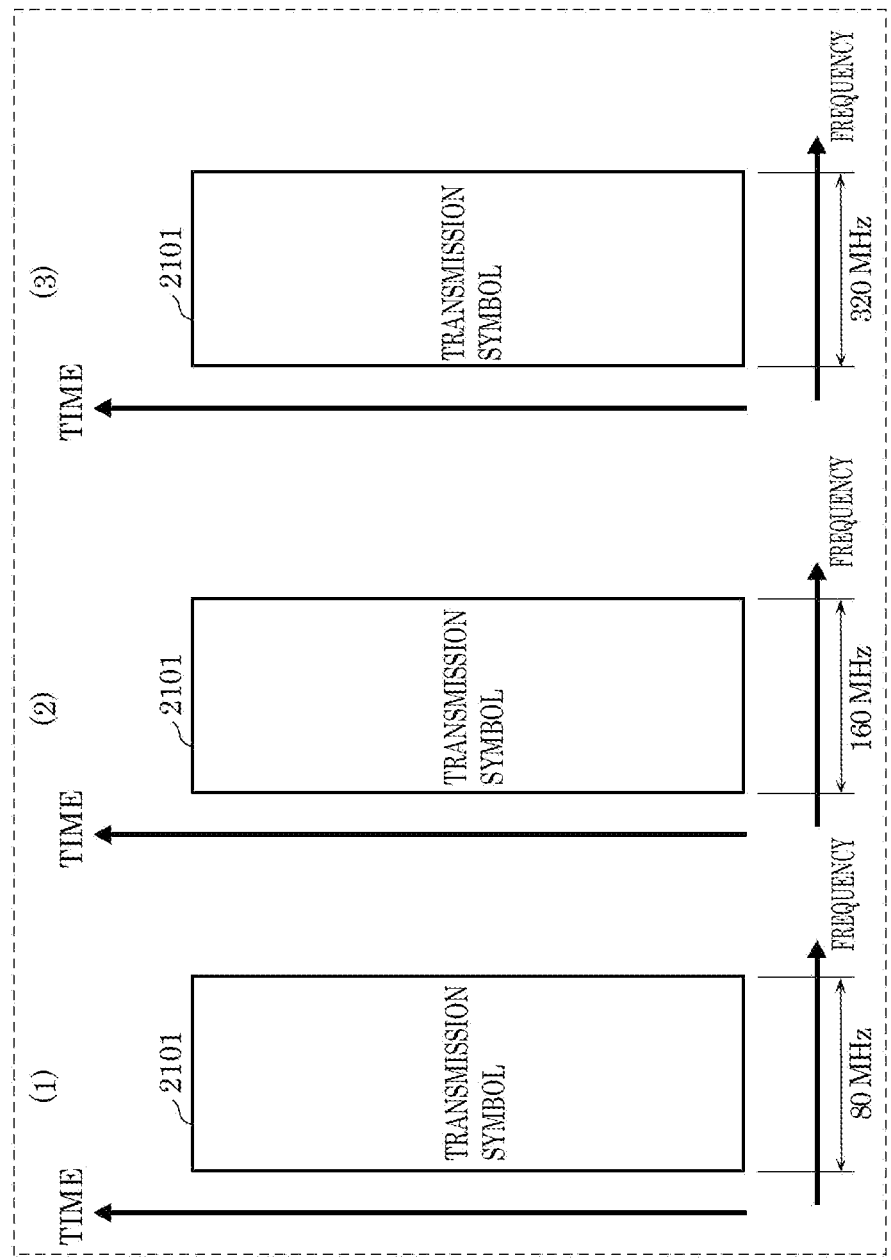

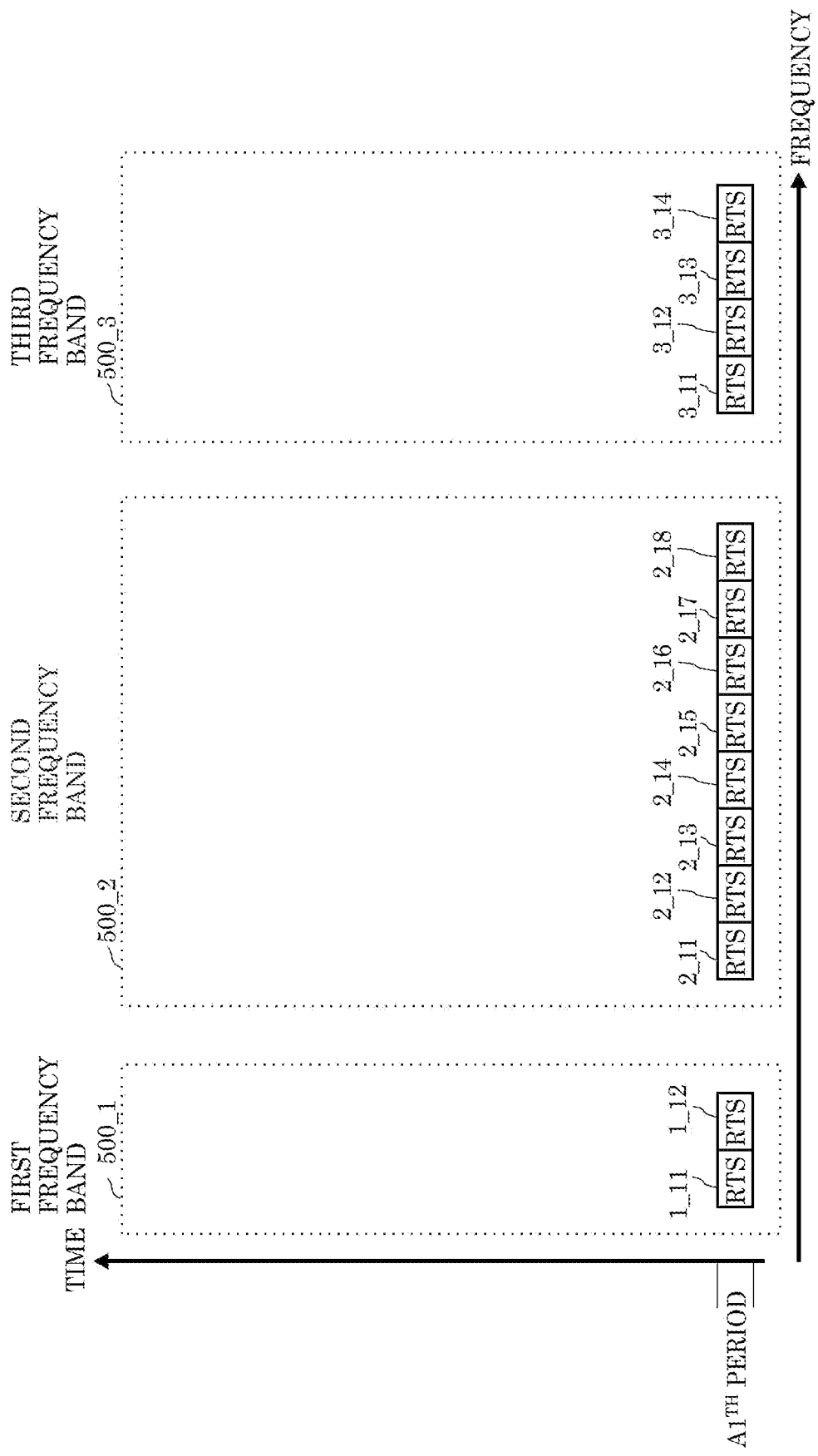

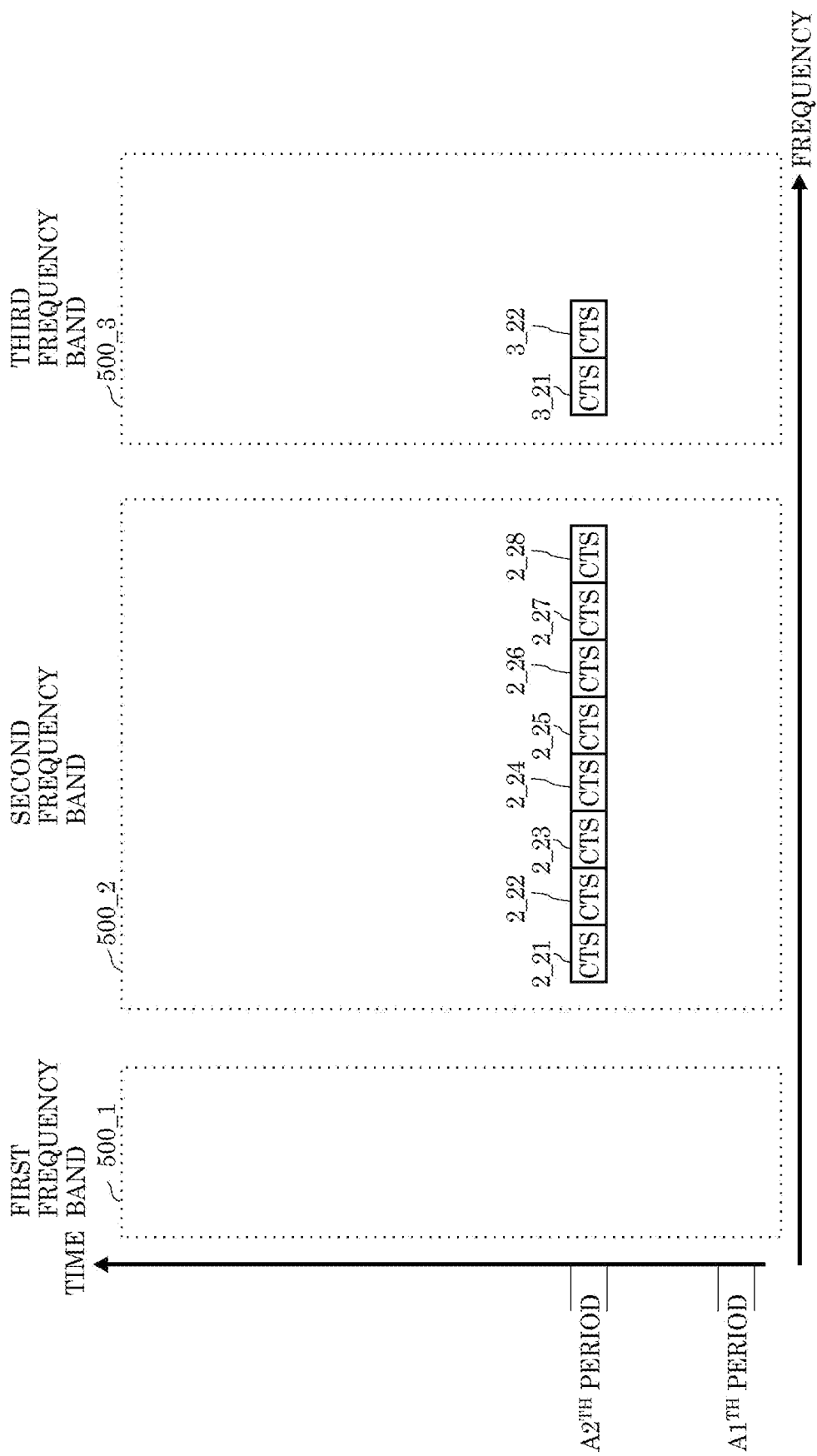

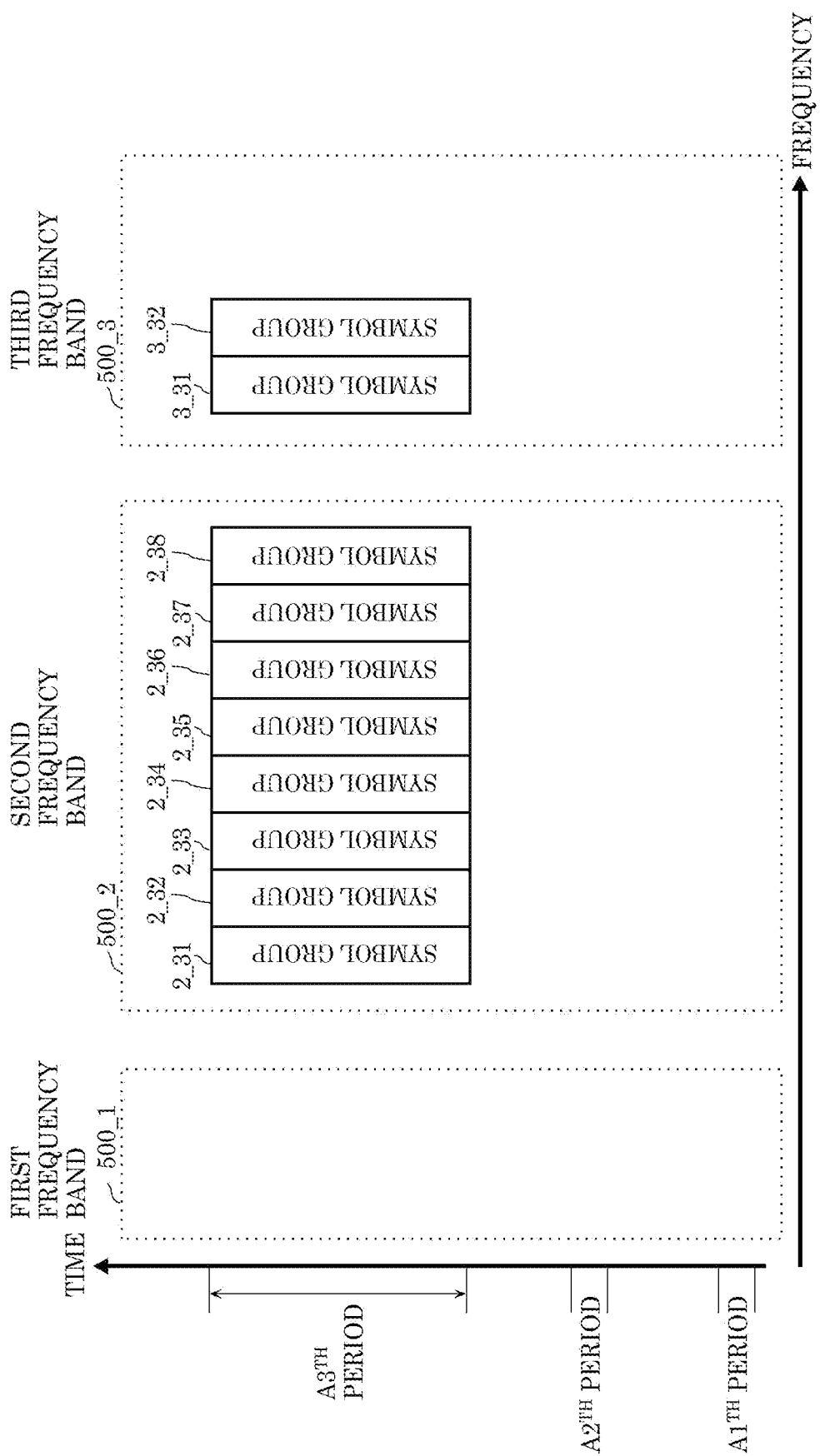

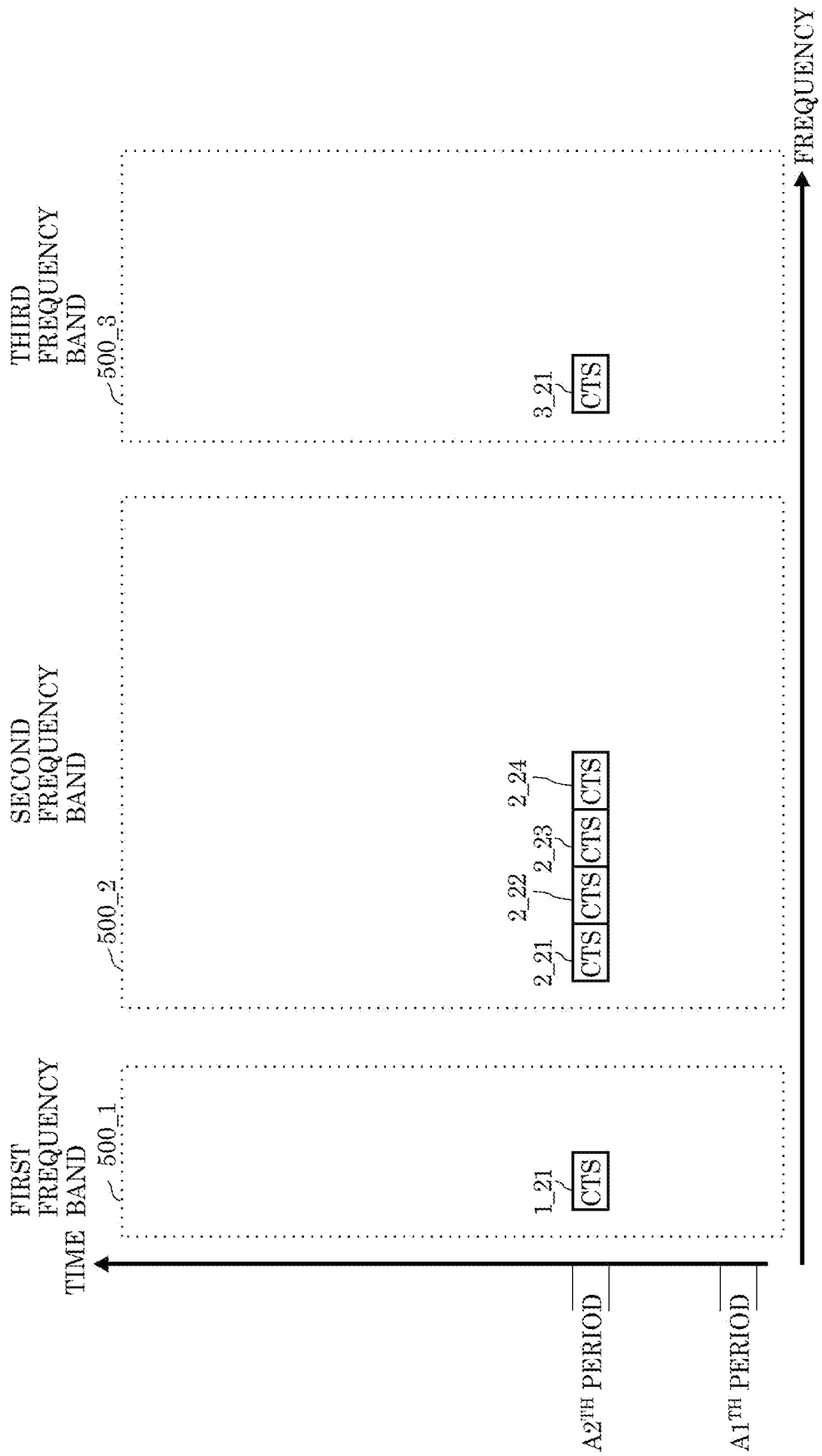

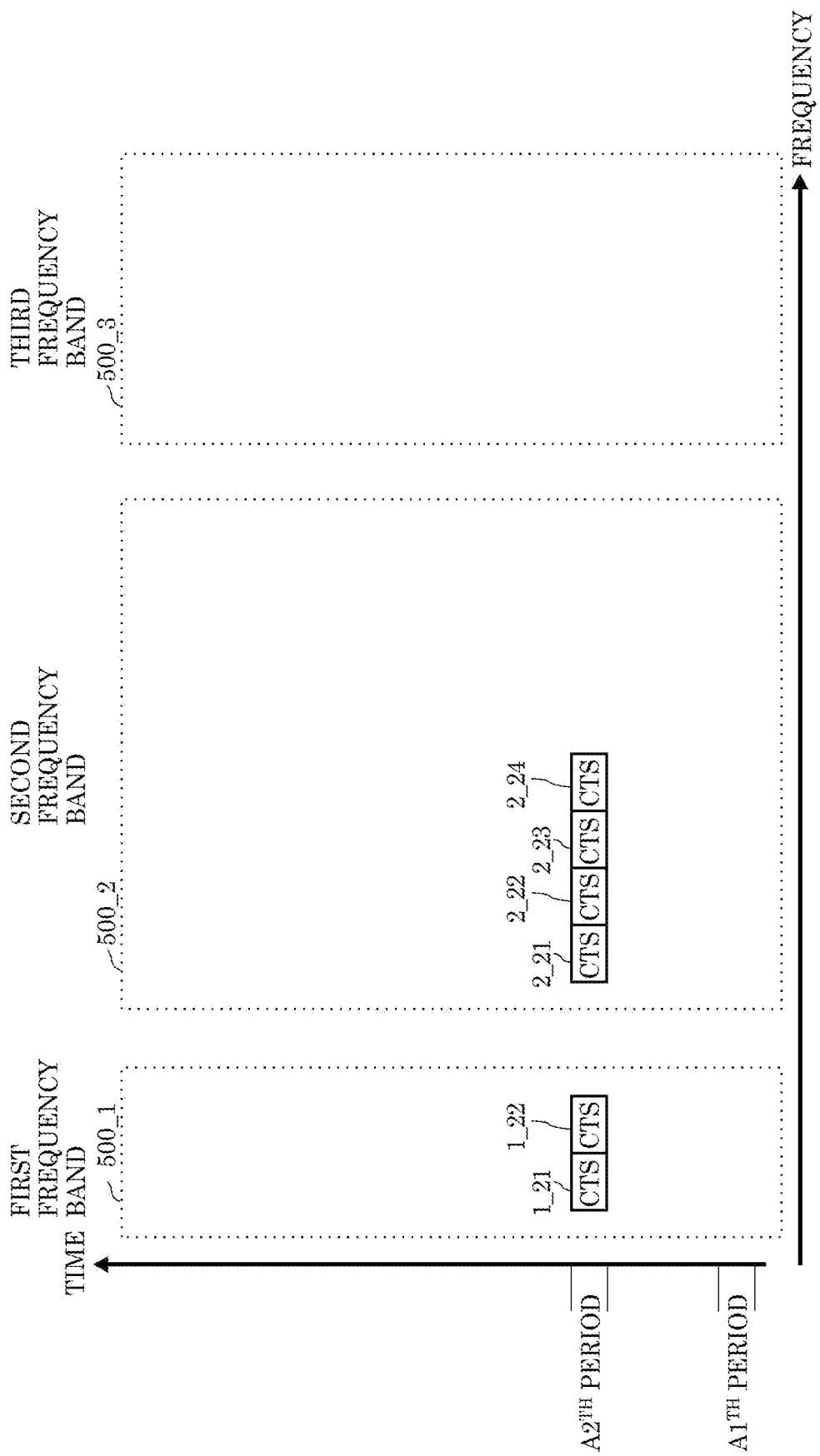

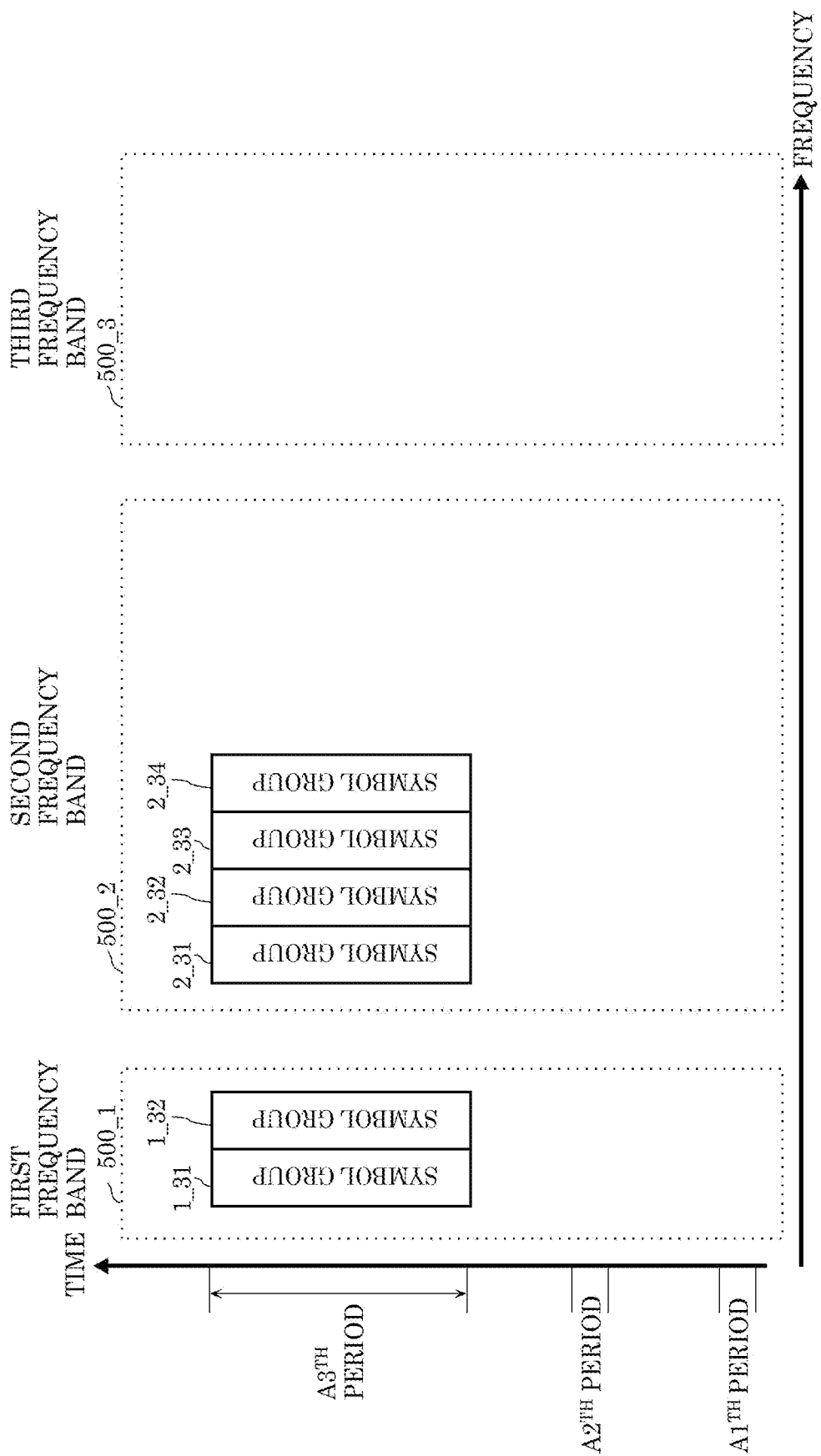

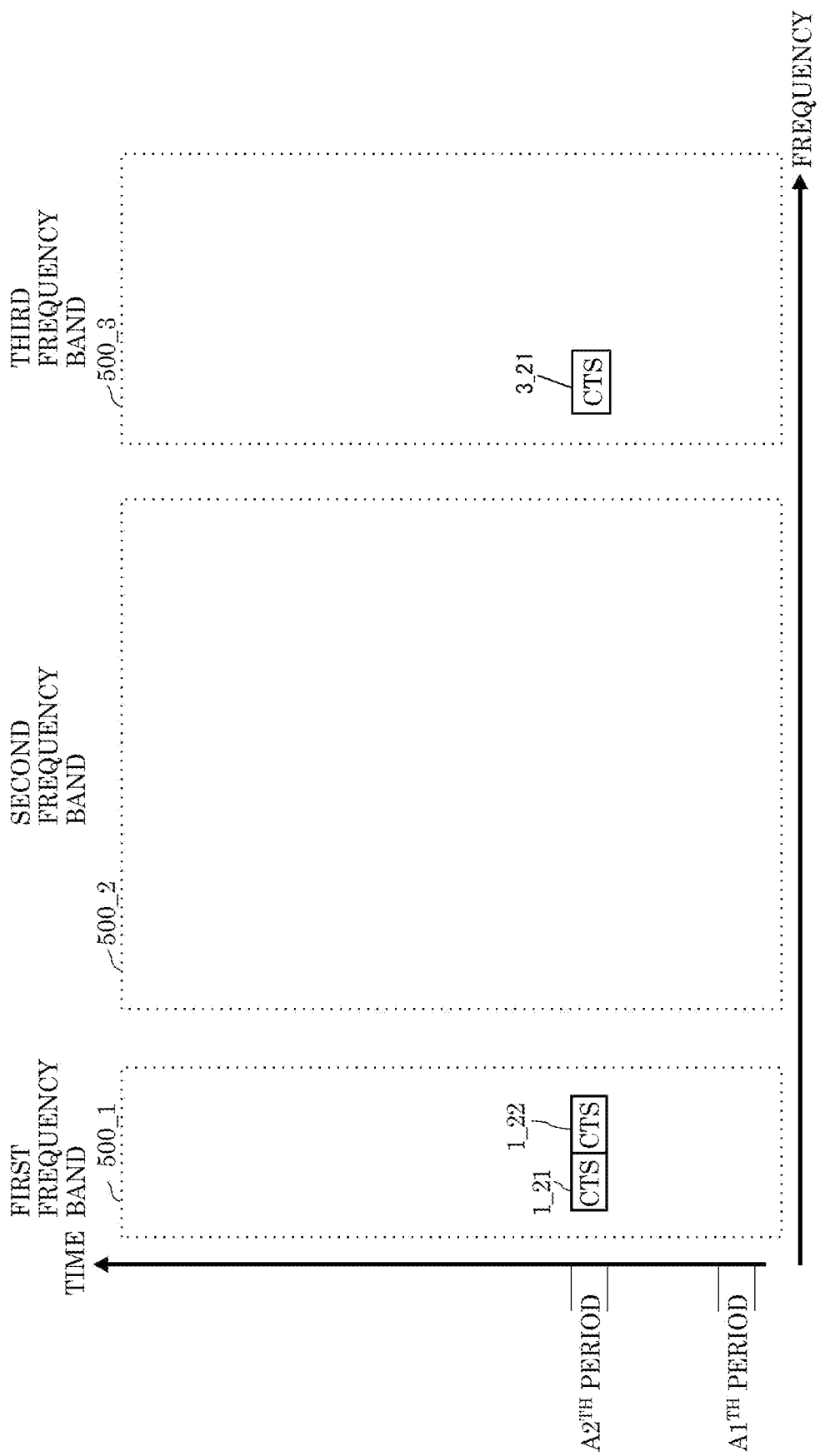

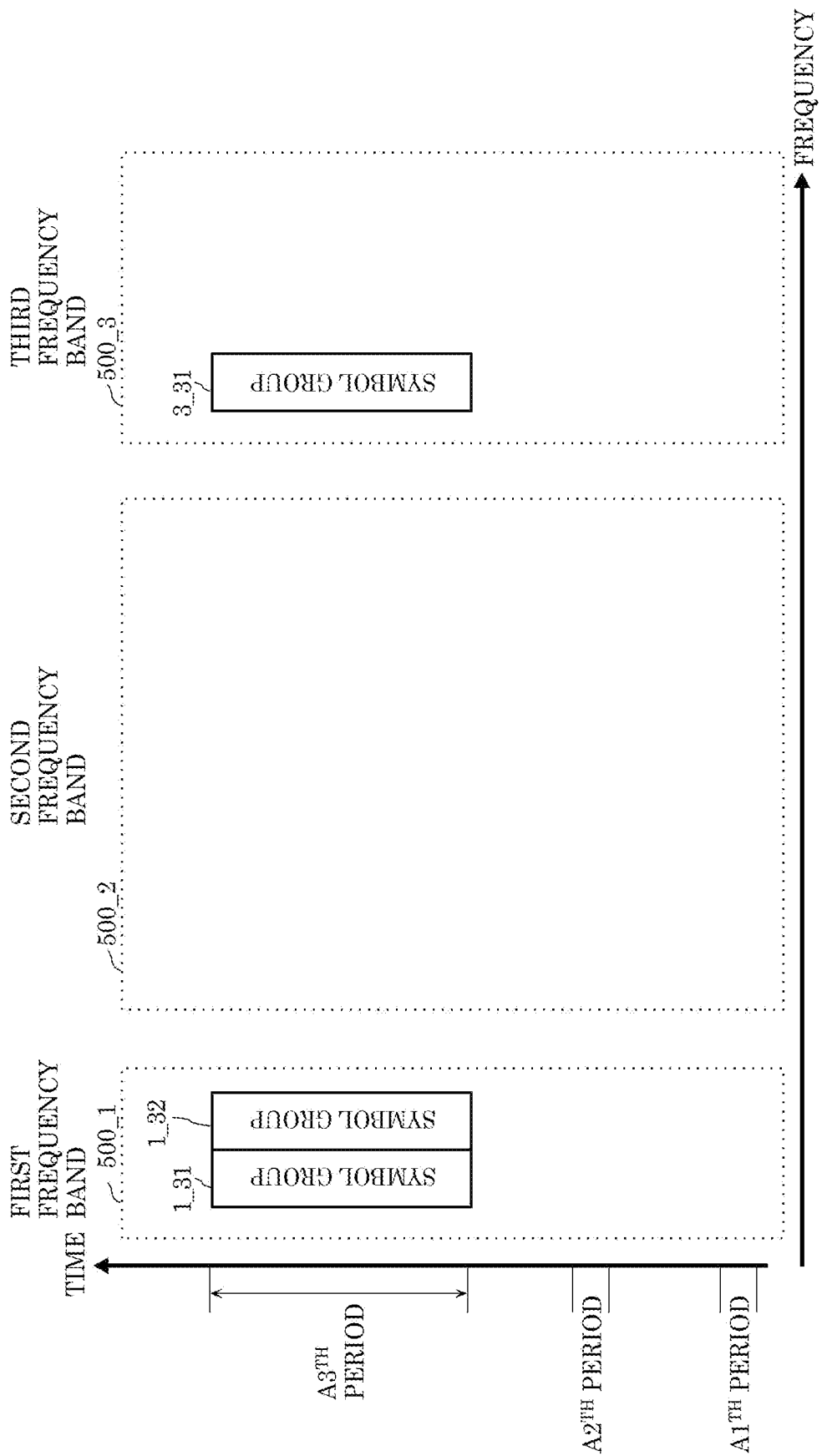

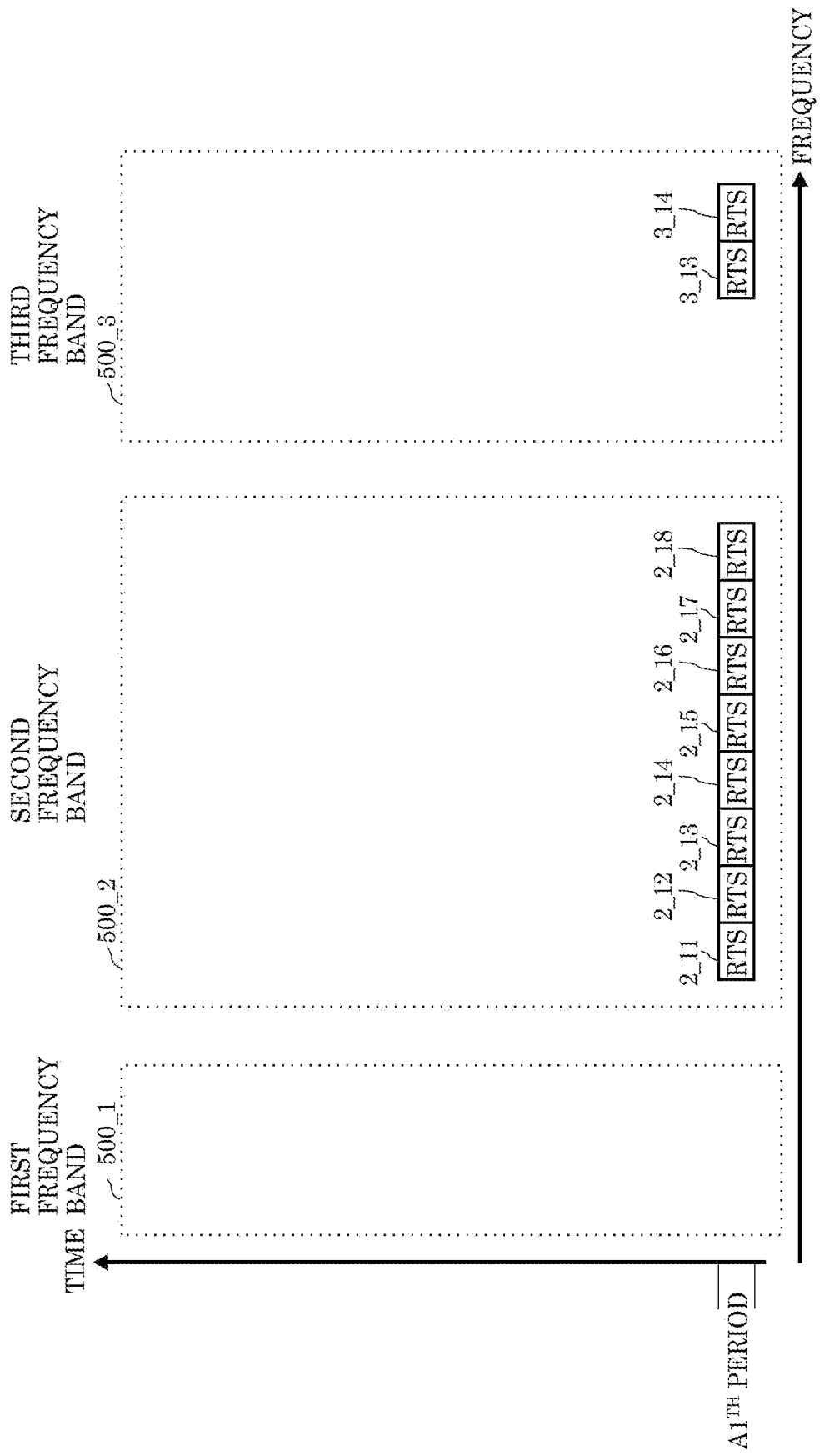

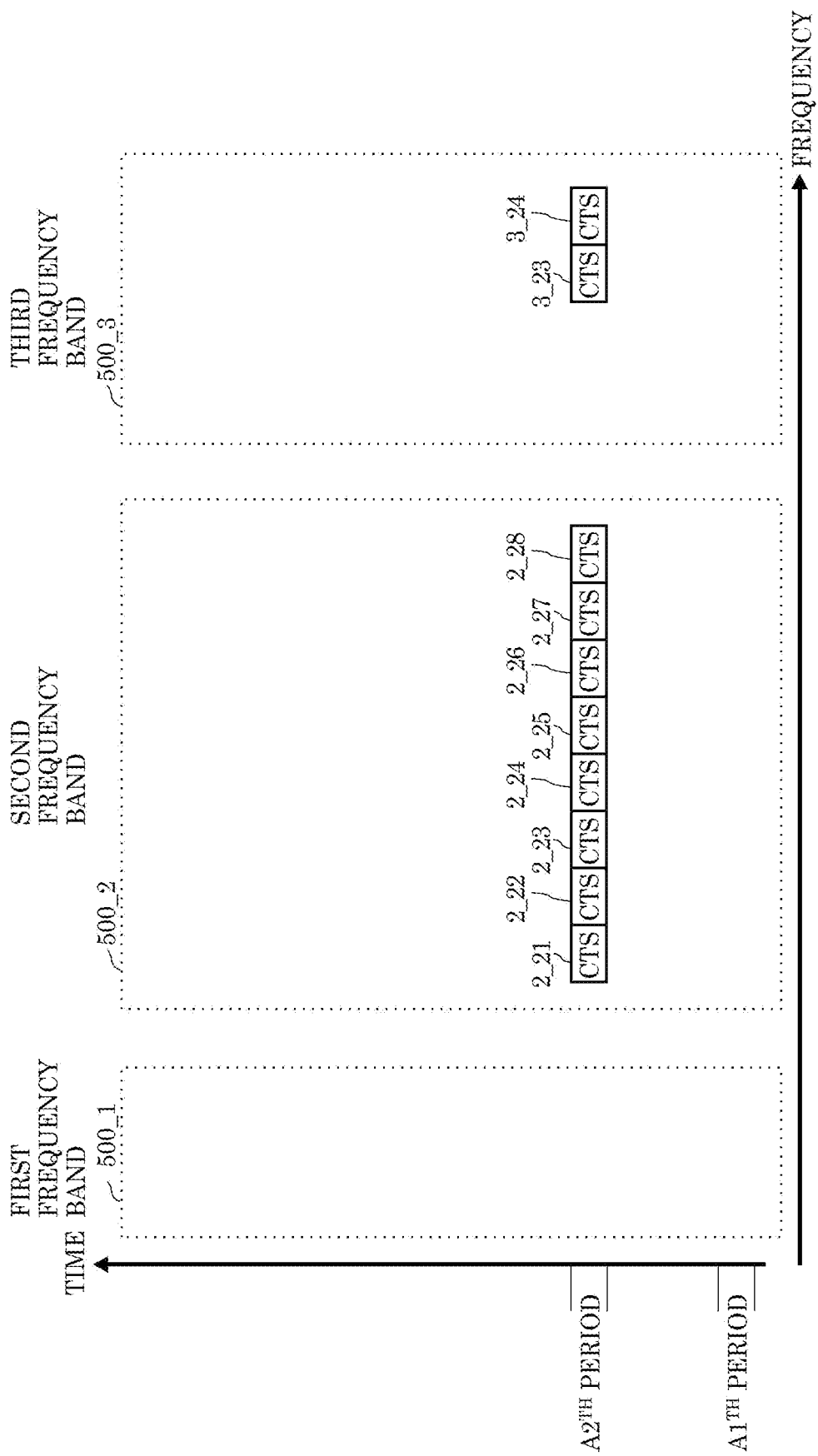

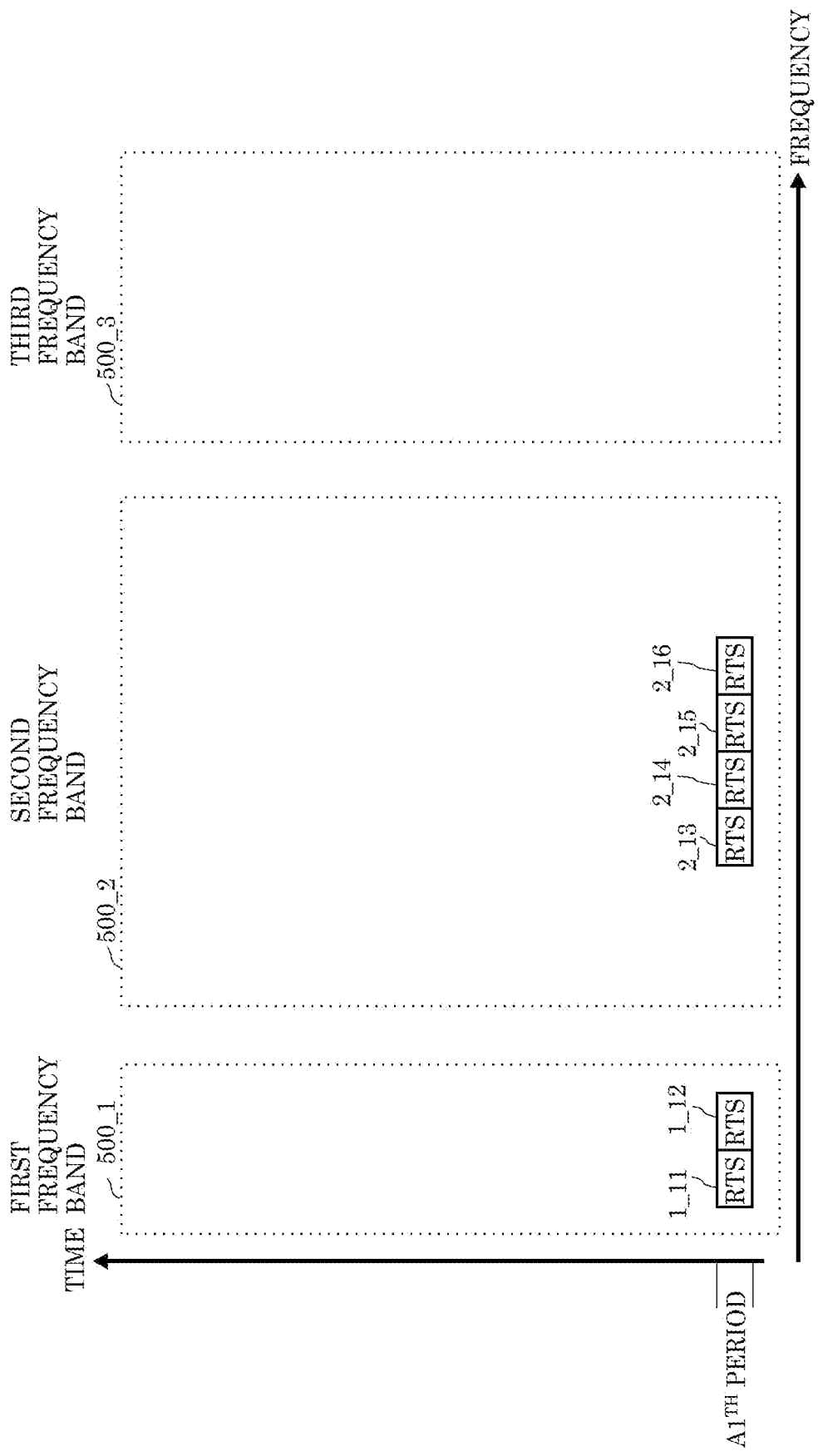

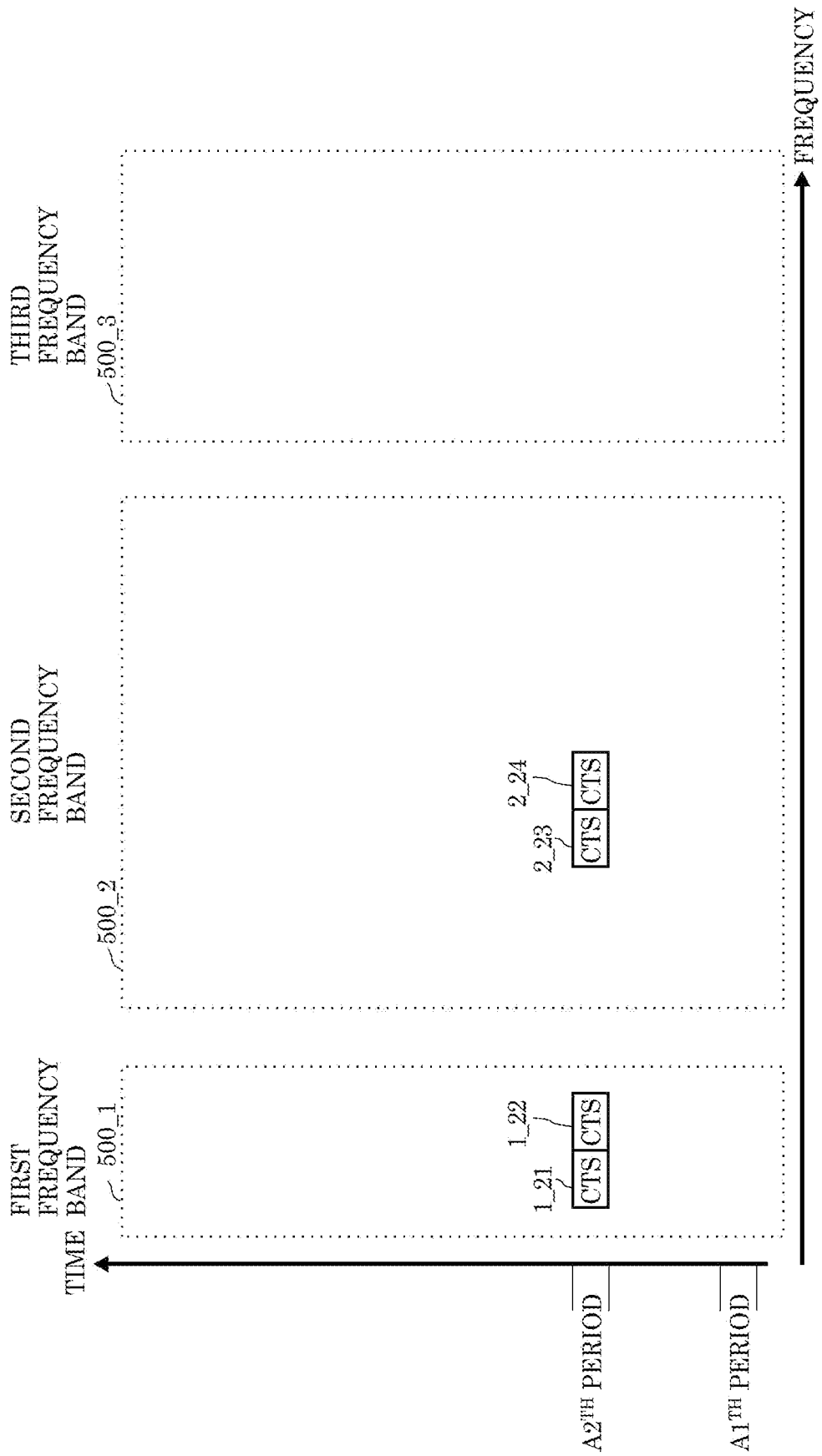

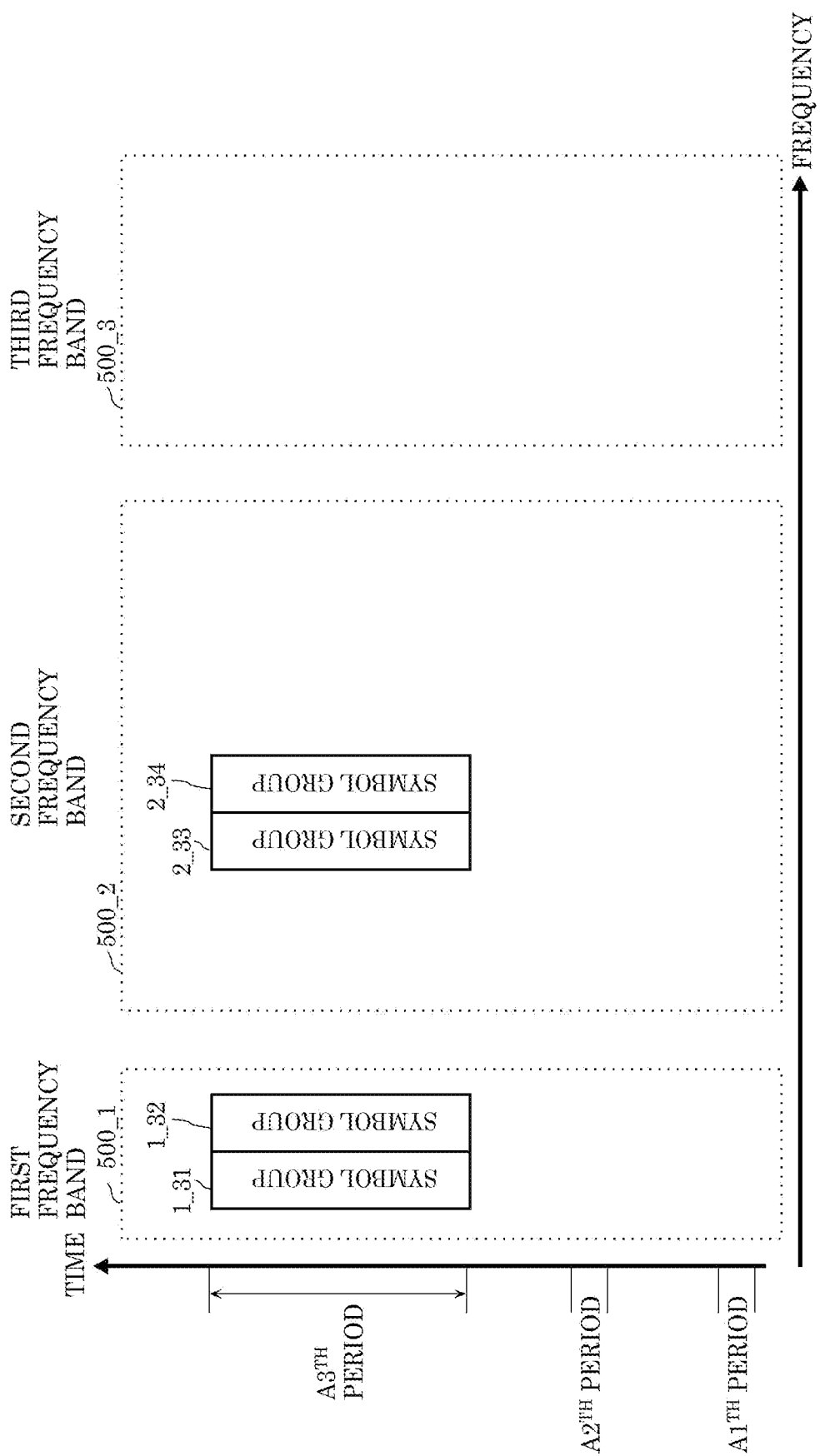

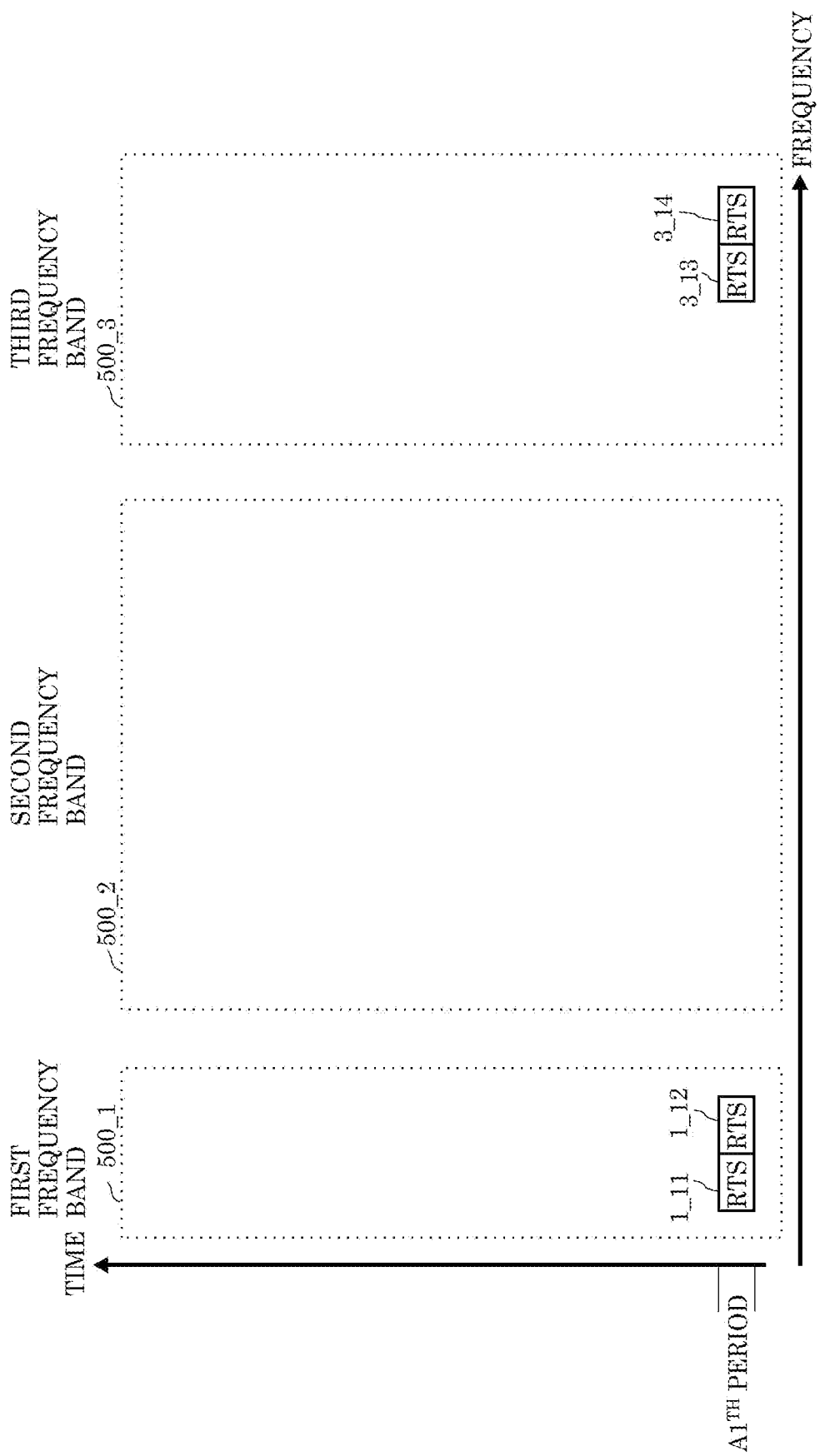

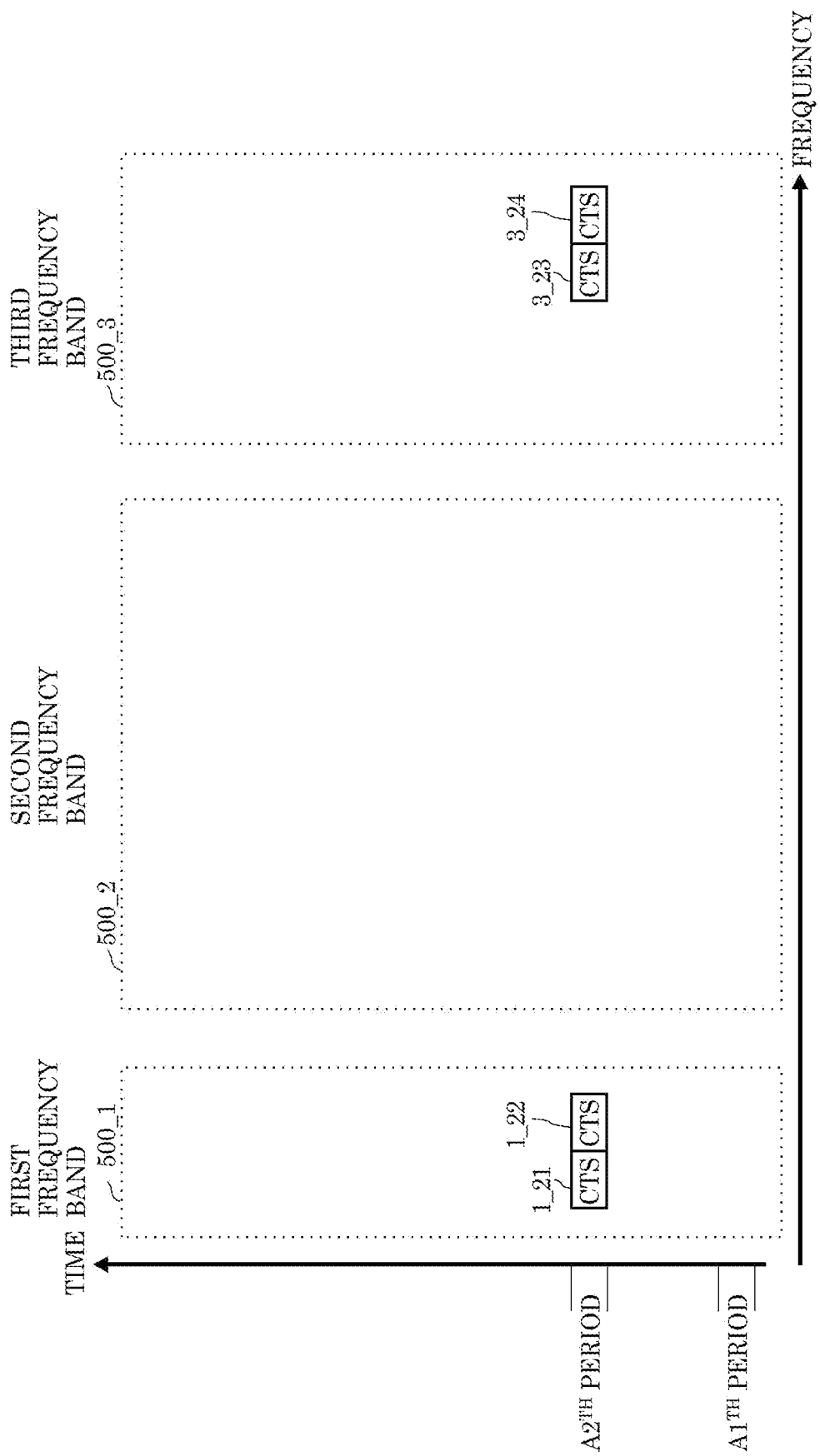

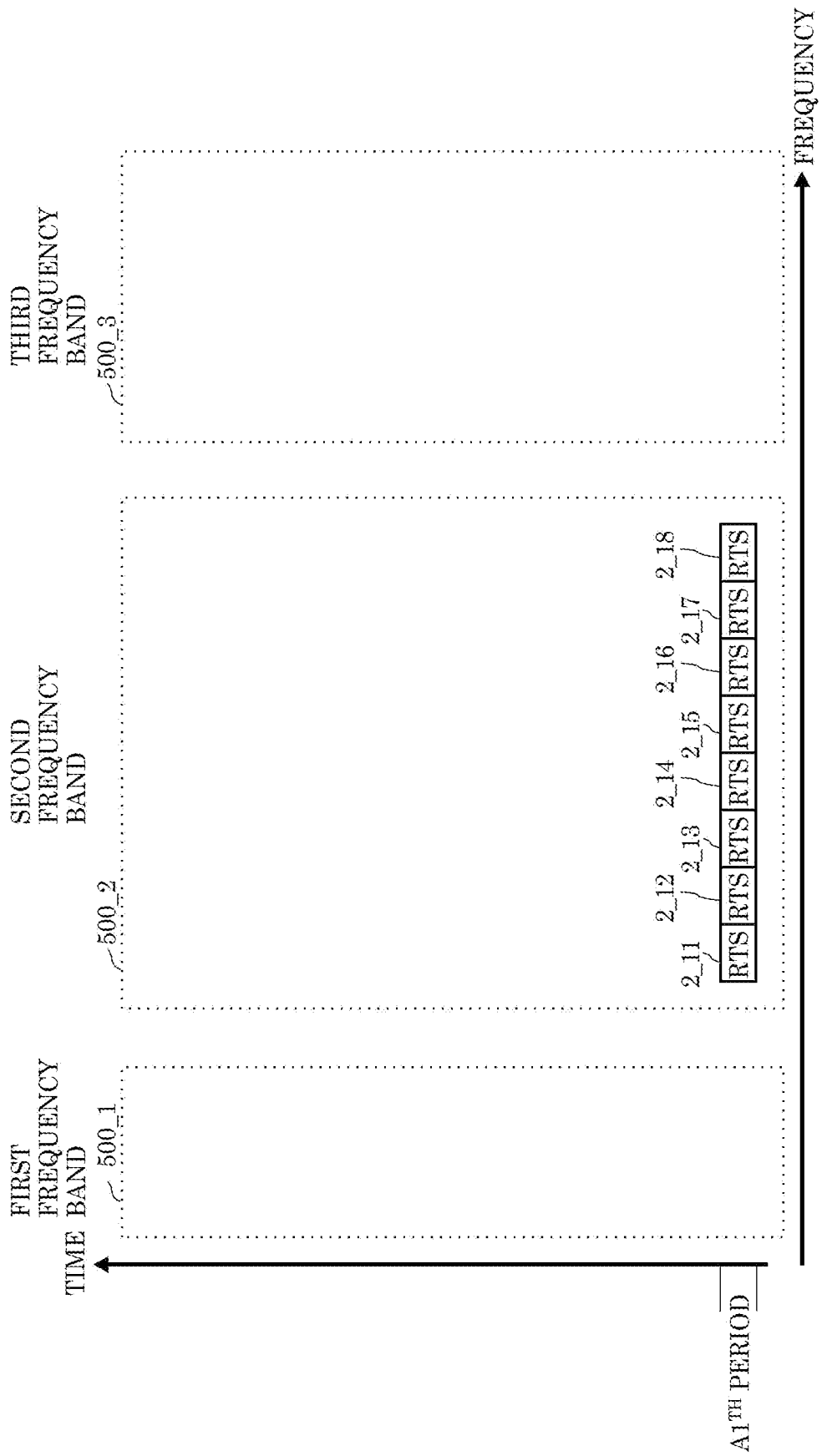

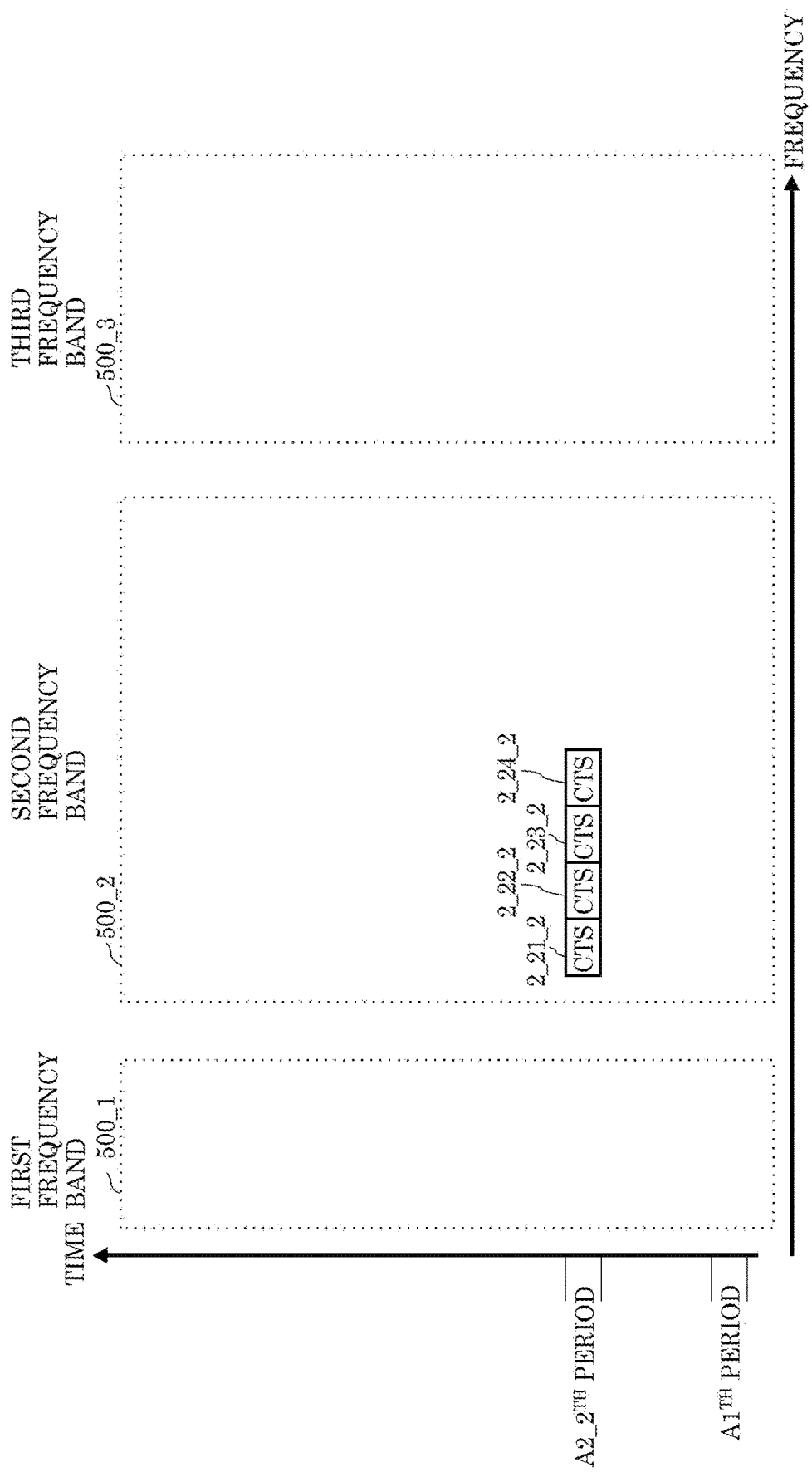

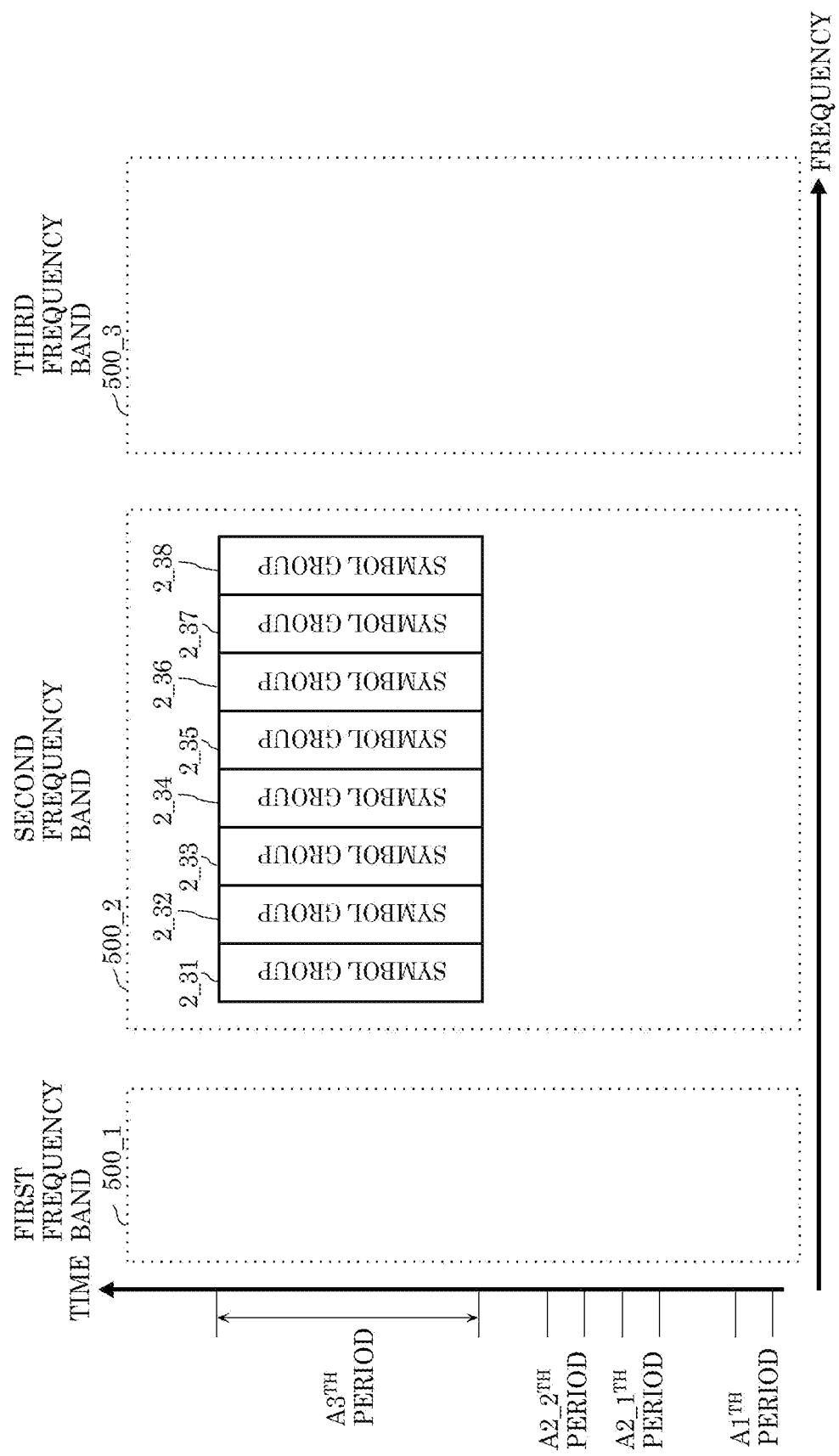

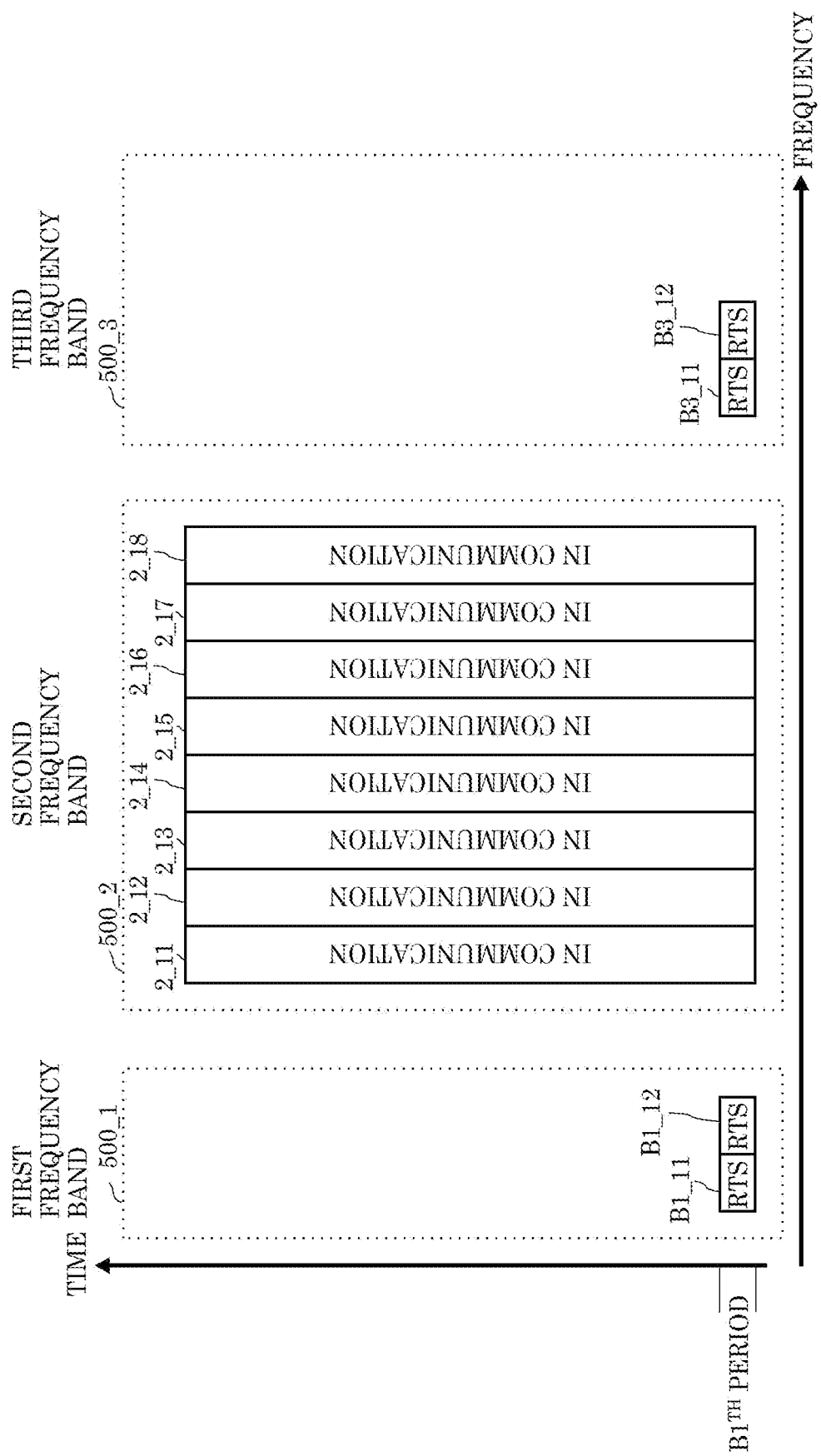

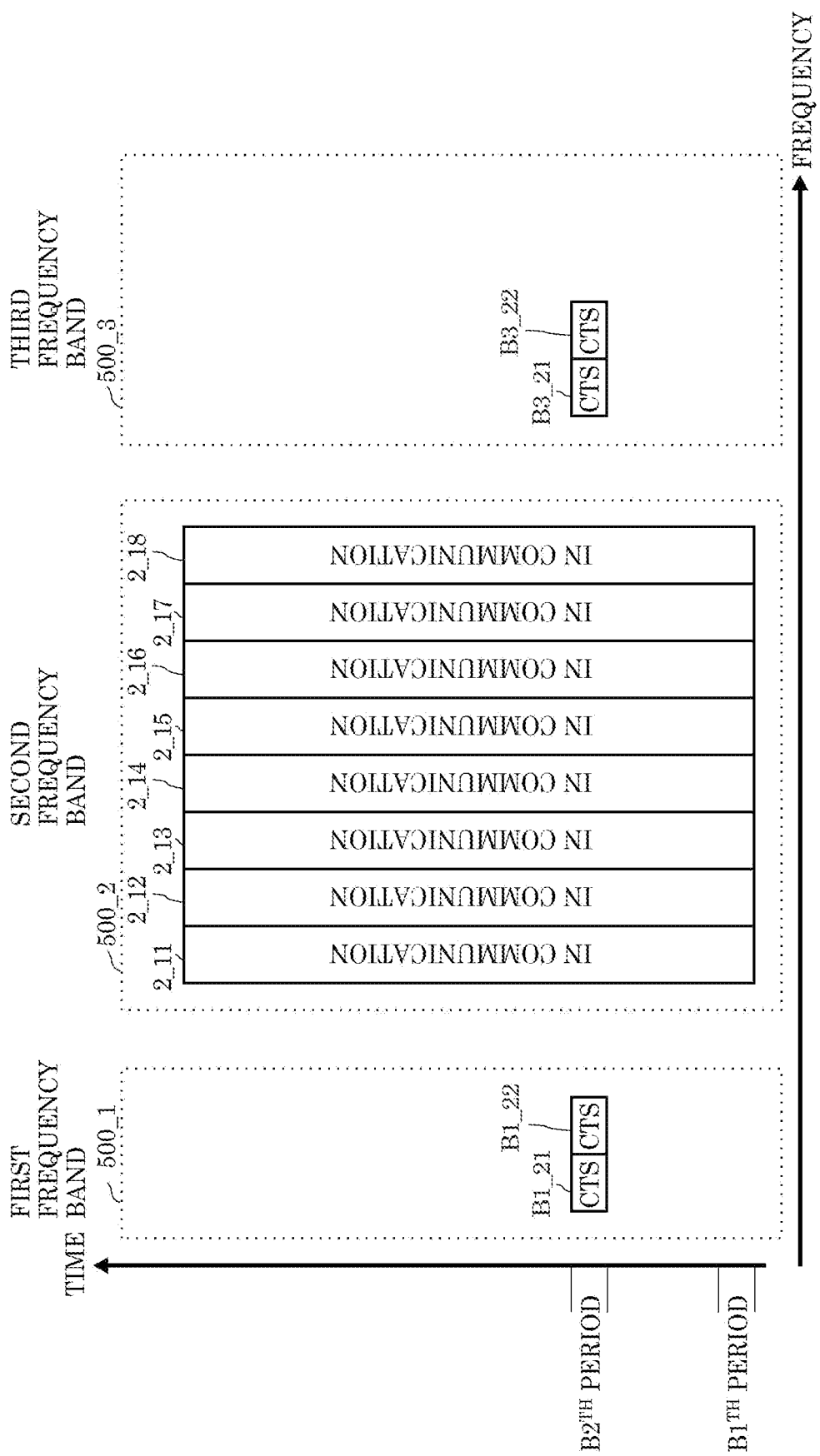

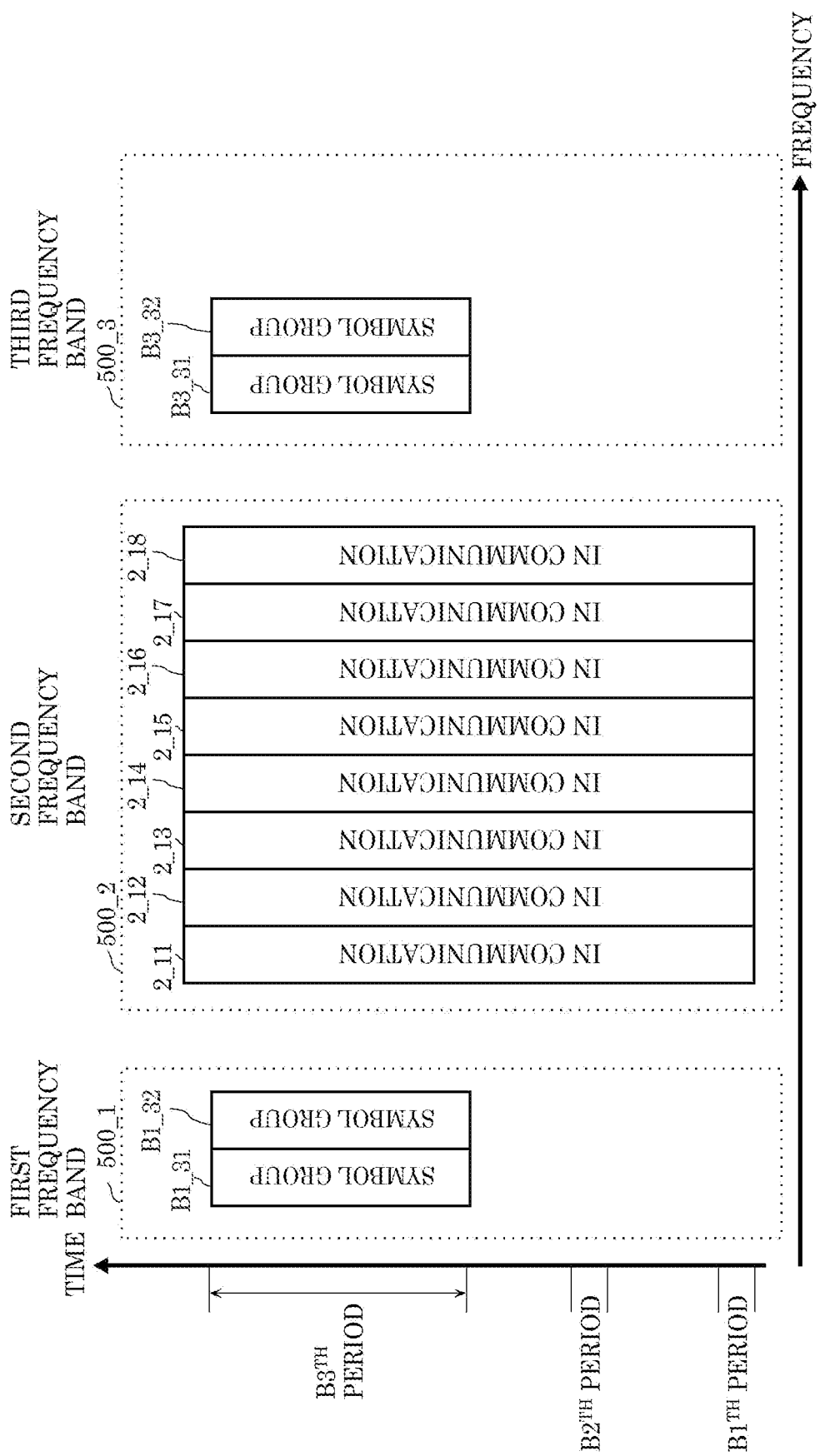

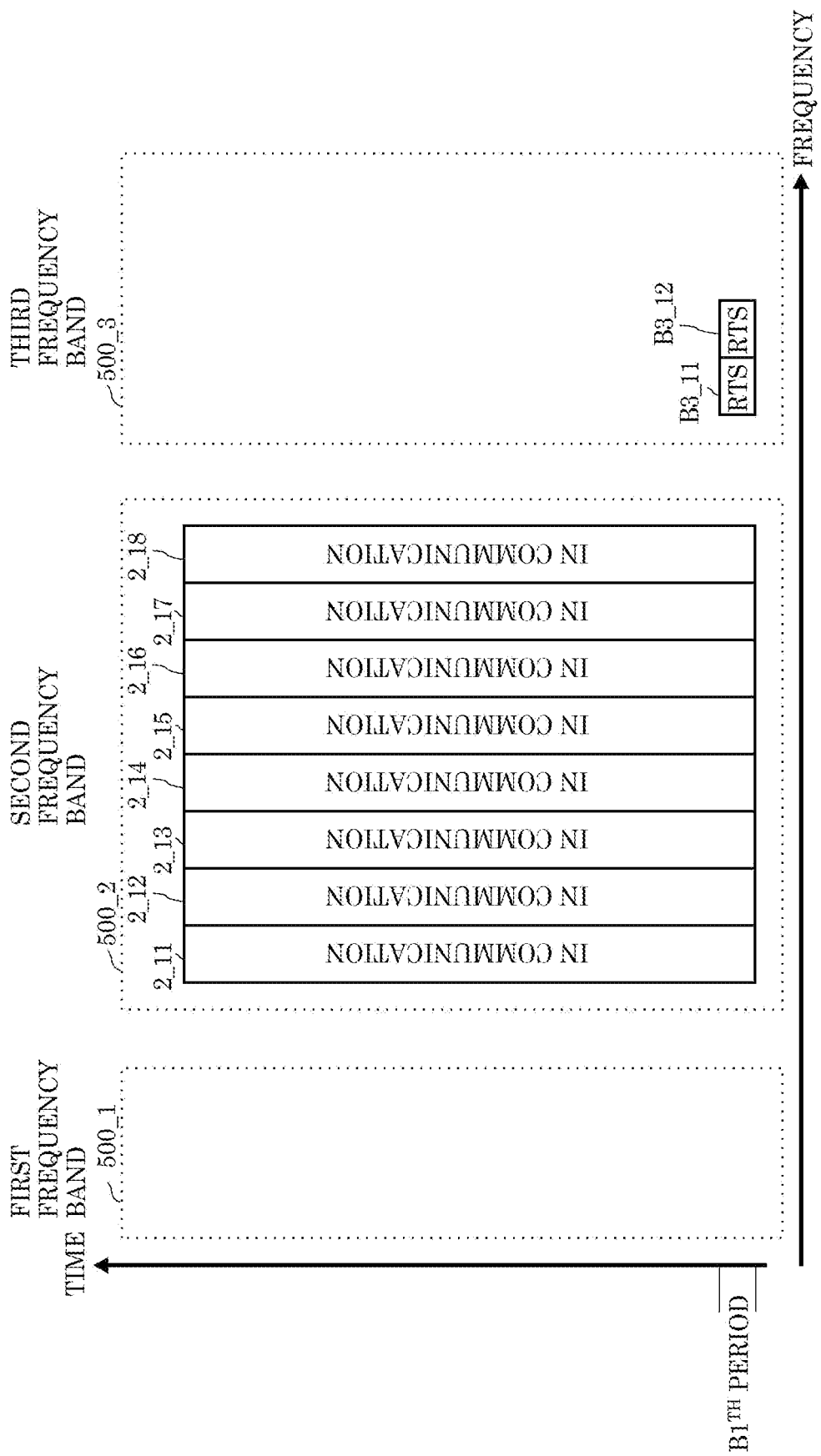

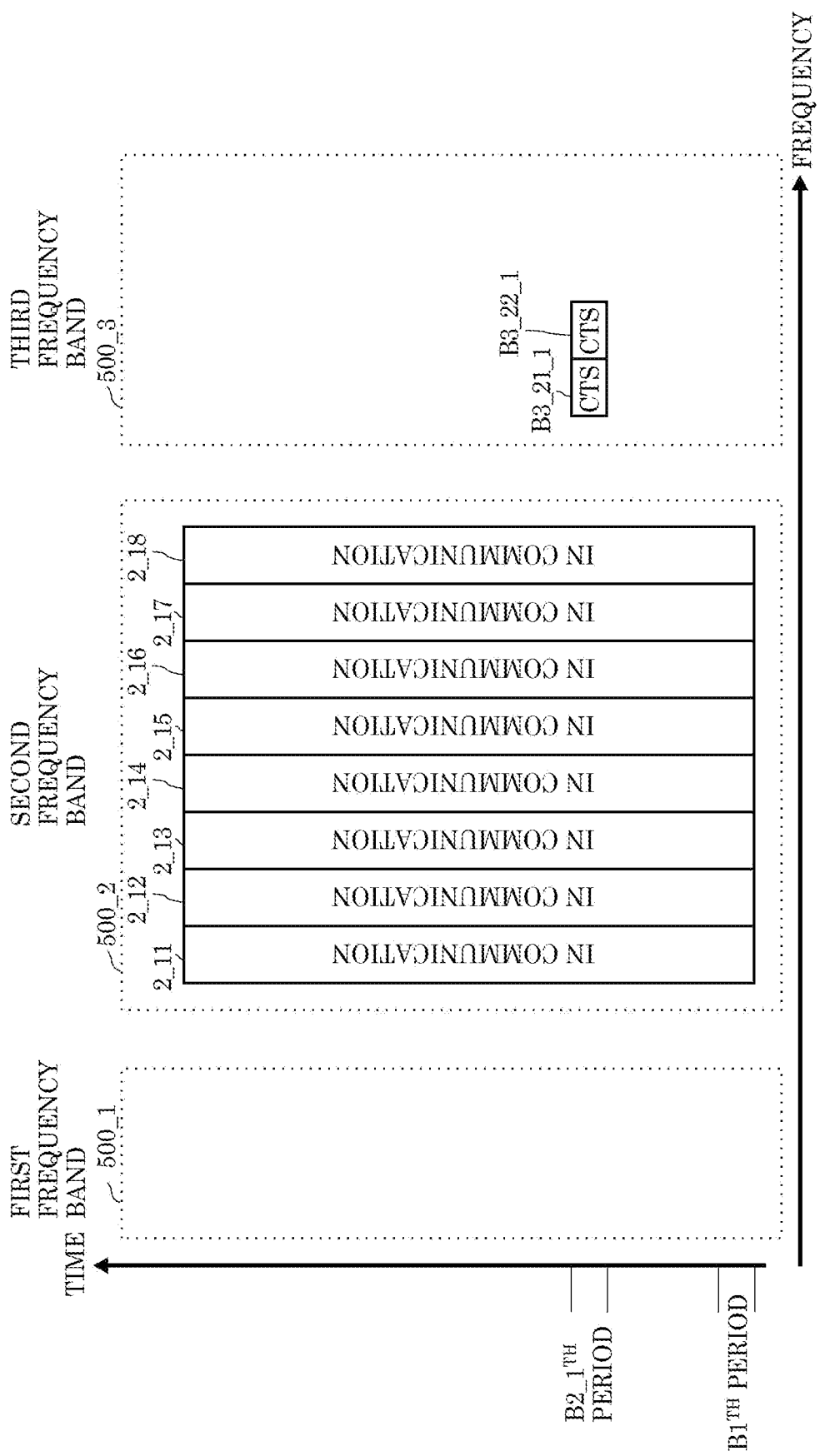

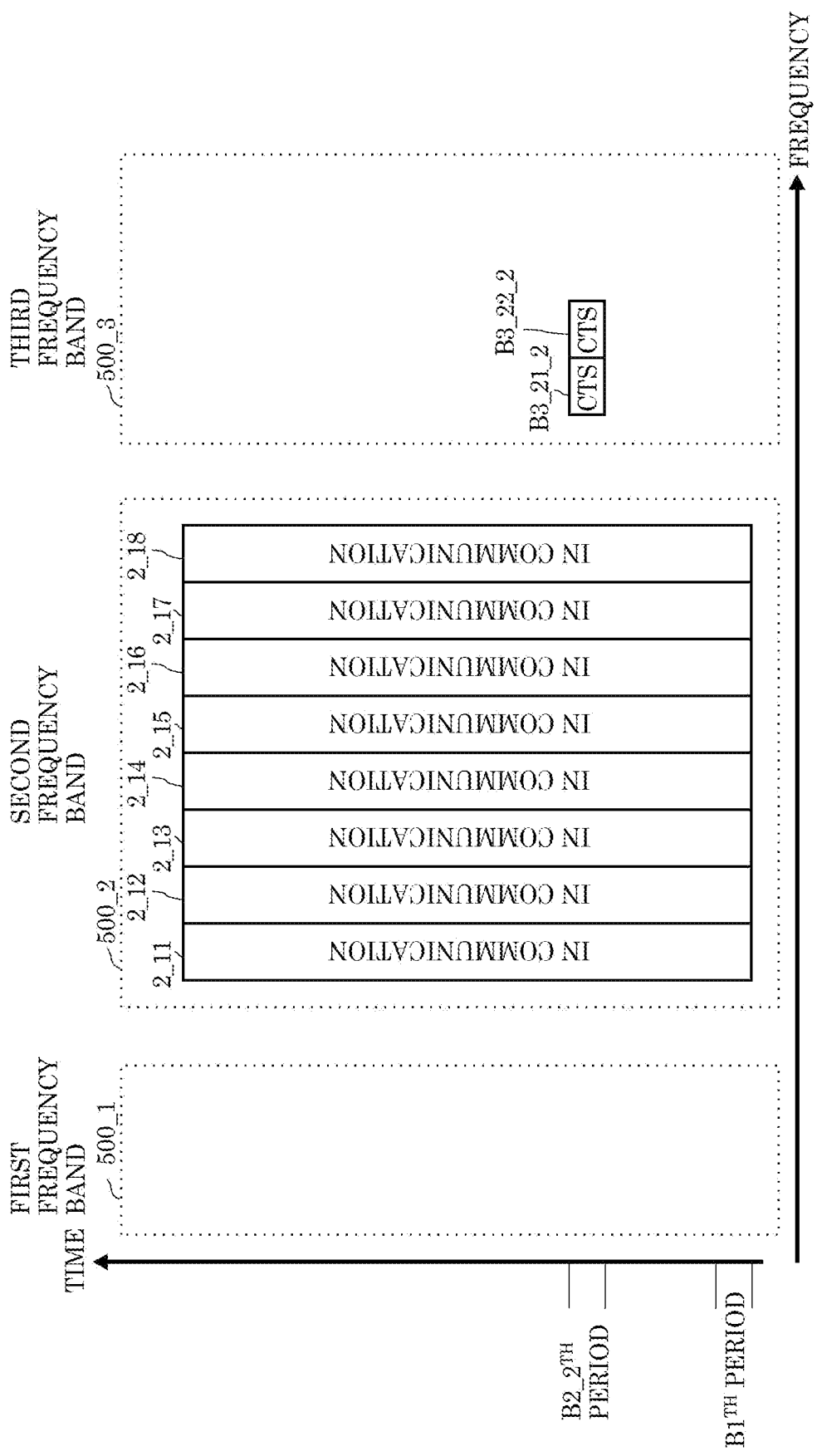

FIG. 44

| FRAME CONTROL | DURATION | ... | SUPPORTED RATES | FCS | MULTI-BAND TRANSMISSION CAPABILITY INFORMATION | MULTI-BAND RECEPTION CAPABILITY INFORMATION |

FIG. 45

| FRAME CONTROL | DURATION | ... | SUPPORTED RATES | FCS | MULTI-BAND CAPABILITY INFORMATION |

FIG. 46

| FRAME CONTROL | DURATION | ... | SUPPORTED RATES | FCS | MULTI-BAND TRANSMISSION SUPPORT INFORMATION | MULTI-BAND RECEPTION SUPPORT INFORMATION |

FIG. 47

| FRAME CONTROL | DURATION | ... | SUPPORTED RATES | FCS | MULTI-BAND RECEPTION SUPPORT INFORMATION |

FIG. 48

| FRAME CONTROL | DURATION | ... | EXTENDED SUPPORTED RATES | RSN | MULTI-BAND TRANSMISSION SUPPORT INFORMATION | MULTI-BAND RECEPTION SUPPORT INFORMATION |

FIG. 49

| FRAME CONTROL | DURATION | ... | EXTENDED SUPPORTED RATES | RSN | MULTI-BAND RECEPTION SUPPORT INFORMATION |

ACCESS POINT AND COMMUNICATION METHOD

CROSS REFERENCE TO RELATED APPLICATIONS

This application is a U.S. continuation application of PCT international Patent Application Number PCT/JP2019/026753 filed on Jul. 4, 2019, claiming the benefit of priority of U.S. Provisional Patent Application No. 62/695,273 filed on Jul. 9, 2018, U.S. Provisional Patent Application No. 62/701,184 filed on Jul. 20, 2018, U.S. Provisional Patent Application No. 62/716,009 filed on Aug. 8, 2018, and U.S. Provisional Patent Application No. 62/756,832 filed on Nov. 7, 2018 the entire contents of which are hereby incorporated by reference.

BACKGROUND

1. Technical Field

The present invention relates to an access point and a communication method.

2. Description of the Related Art

Conventional wireless communication schemes related to wireless local area networks (LANs) include IEEE 802.11a and IEEE 802.11ax disclosed in IEEE Draft Standard for information Technology—Telecommunications and Information Exchange Between Systems Local and Metropolitan Area Networks—Specific Requirements—Part 11: Wireless LAN Medium Access Control (MAC) and Physical Layer (PHY) Specifications IEEE P802.11-REVmd/D1.0, February 2018 and "IEEE 802.11ax: High-efficiency WLANS" IEEE Wireless Communications, vol. 23, no. 1, 2016. IEEE 802.11ax is a wireless communication scheme having a maximum bandwidth of 160 MHz in the 2.4 Ghz and 5 Ghz bands. This wireless communication scheme uses a communication method known as multiple-input multiple-output (MIMO) that increases data reception quality and/or increases data communication speed (per unit time), by transmitting a plurality of streams of modulated signals at the same frequency (at a common frequency) and at the same time, using a plurality of antennas.

SUMMARY

When there are size constraints for the communication device, providing the communication device with a given number of antennas or more is difficult, which means a new communication method needs to be introduced in order to further improve data transmission speed.

In view of this, the present invention provides an access point and the like that implements a new communication method for further improving data transmission speed.

An access point according to one aspect of the present disclosure includes: a first interface that wirelessly communicates using a first band; a second interface that wirelessly communicates using a second band different than the first band; and a controller that selects one type of request to send (RTS)/clear to send (CTS) control from among three mutually different types using at least one of the first interface and the second interface, and carries out the selected one type of RTS/CTS control with a terminal. A first type among the three mutually different types transmits a first RTS signal and receives a first CTS signal transmitted in response to the first RTS signal in one of the first band and the second band, a second type among the three mutually different types transmits a second RTS signal destined for a plurality of terminals and receives a second CTS signal transmitted in response to the second RTS signal in one of the first band and the second band, and a third type among the three mutually different types transmits a third RTS signal destined for a plurality of terminals and receives a third CTS signal in response to the third RTS signal in each of the first band and the second band.

General or specific aspects of these may be realized as a system, method, integrated circuit, computer program, computer-readable recording medium such as a CD-ROM, or any given combination thereof.

With the present disclosure, it is possible to achieve the advantageous effect of improved communication system data transmission speed, because it is possible to select and use one or more favorable bandwidths.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 illustrates transmission and reception of modulated signals;
FIG. 3A illustrates a configuration of an RTS signal;
FIG. 4A illustrates an example of a frame configuration;
FIG. 4B illustrates an example of a frame configuration;
FIG. 5A illustrates an example of frame configurations;
FIG. 5B illustrates an example of frame configurations;
FIG. 5C illustrates an example of frame configurations;
FIG. 5D illustrates an example of frame configurations;
FIG. 5E illustrates an example of frame configurations;
FIG. 5F illustrates an example of frame configurations;
FIG. 5G illustrates an example of frame configurations;
FIG. 5H illustrates an example of frame configurations;
FIG. 5I illustrates an example of frame configurations;
FIG. 5J illustrates an example of frame configurations;
FIG. 5K illustrates an example of frame configurations;
FIG. 6A illustrates an example of a configuration of a data symbol;
FIG. 6B illustrates an example of a configuration of data symbols;
FIG. 16 illustrates an example of frame configurations;
FIG. 17 illustrates an example of frame configurations;
FIG. 18 illustrates an example of frame configurations.

FIG. 20A illustrates a configuration of a transmission unit included in a transceiver device;

FIG. 20B illustrates a configuration of a reception unit included in a transceiver device;

FIG. 21A illustrates bandwidths in which modulated signals are transmitted;

FIG. 21B illustrates bandwidths in which modulated signals are transmitted;

FIG. 21C illustrates bandwidths in which modulated signals are transmitted;

FIG. 22A illustrates an example of transmission of RTSs;

FIG. 22B illustrates an example of transmission of CTSs;

FIG. 22C illustrates an example of transmission of symbol groups;

FIG. 23A illustrates an example of transmission of CTSs;

FIG. 24A illustrates an example of transmission of CTSs;

FIG. 24B illustrates an example of transmission of symbol groups;

FIG. 25A illustrates an example of transmission of CTSs;

FIG. 25B illustrates an example of transmission of symbol groups;

FIG. 26A illustrates an example of transmission of RTSs;

FIG. 26B illustrates an example of transmission of CTSs;

FIG. 27A illustrates an example of transmission of RTSs;

FIG. 27B illustrates an example of transmission of CTSs;

FIG. 27C illustrates an example of transmission of symbol groups;

FIG. 28A illustrates an example of transmission of RTSs;

FIG. 28B illustrates an example of transmission of CTSs;

FIG. 29A illustrates an example of transmission of RTSs;

FIG. 29C illustrates an example of transmission of CTSs;

FIG. 29D illustrates an example of transmission of symbol groups;

FIG. 31A illustrates an example of transmission of RTSs;

FIG. 31B illustrates an example of transmission of CTSs;

FIG. 31C illustrates an example of transmission of symbol groups;

FIG. 33A illustrates an example of transmission of RTSs;

FIG. 33B illustrates an example of transmission of CTSs;

FIG. 33C illustrates an example of transmission of CTSs;

FIG. 44 illustrates an example of a configuration of an association request frame;

FIG. 45 illustrates an example of a configuration of an association request frame;

FIG. 46 illustrates an example of a configuration of an association response frame;

FIG. 47 illustrates an example of a configuration of an association response frame;

FIG. 48 illustrates an example of a configuration of a beacon frame;

FIG. 49 illustrates an example of a configuration of a beacon flame;

DETAILED DESCRIPTION OF THE EMBODIMENTS

Figure 1:
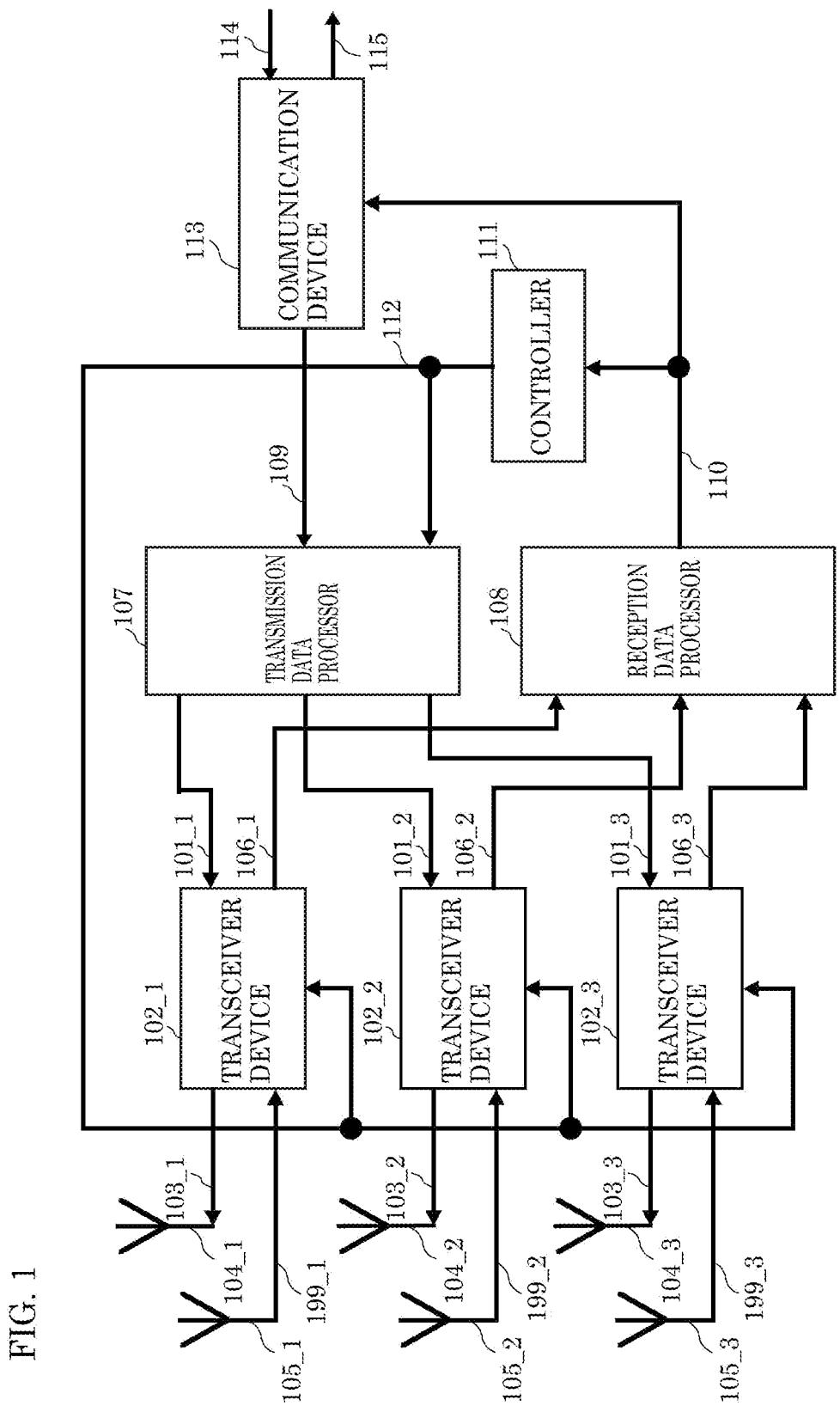
FIG. 1 illustrates one example of a configuration of a communication device.

An access point according to one aspect of the present disclosure includes: a first interface that wirelessly communicates using a first band; a second interface that wirelessly communicates using a second hand different than the first band; and a controller that selects one type of request to send (RTS)/clear to send (CTS) control from among three mutually different types using at least one of the first interface and the second interface, and carries out the selected one type of RTS/CTS control with a terminal. A first type among the three mutually different types transmits a first RTS signal and receives a first CTS signal transmitted in response to the first RTS signal in one of the first band and the second band, a second type among the three mutually different types transmits a second RTS signal destined for a plurality of terminals and receives a second CTS signal transmitted in response to the second. RTS signal in one of the first band and the second band, and a third type among the three mutually different types transmits a third RTS signal destined for a plurality of terminals and receives a third CTS signal in response to the third RTS signal in each of the first band and the second band.

According to this aspect, the access point can secure an opportunity to communicate with a terminal, by using a selected one of the three types of RTS/CTS control. This makes it possible to contribute to the improvement of data transmission speed in communication between an access point and a terminal. In this way, the access point improves the data transmission speed of the communication system.

For example, after receiving a CTS signal via the selected one type of RTS/CTS control, the controller may transmit communication data using at least one resource unit in which the CTS signal was received.

According to this aspect, the access point can use, in communication with a terminal, a resource unit in which a CTS signal was received under RTS/CTS control. Here, there may be a plurality of resource units in which CTS signals are received. In such cases, the access point can use at least one of the plurality of resource units in the communication with the terminal in this way, the access point improves the data transmission speed of the communication system.

For example, in the third type, a medium access control (MAC) address of a source of the third. RTS signal transmitted in each of the first band and the second band may be the same.

According to this aspect, in the third type, the access point transmits, in a plurality of bands, RTS signals that are destined for a plurality of terminals and include a common source MAC address. With this, the access point improves the data transmission speed of the communication system in a simpler manner based on a more specific configuration.

A communication method according to one aspect of the present disclosure is executed by an access point including a first interface that wirelessly communicates using a first band and a second interface that wirelessly communicates using a second band different than the first band. The communication method includes; selecting one type of request to send (RTS)/clear to send (CTS) control from among three mutually different types using at least, one of the first, interface and the second interface; and carrying out the selected one type of PTS/CTS control with a terminal. A first type among the three mutually different types transmits a first RTS signal destined for a single terminal and receives a first CTS signal transmitted in response to the first RTS signal in one of the first band and the second band, a second type among the three mutually different types transmits a second RTS signal destined for a plurality of terminals and receives a second CTS signal transmitted in response to the second RTS signal in one of the first band and the second band, and a third type among the three mutually different types transmits a third RTS signal destined for a plurality of terminals and receives a third CTS signal in response to the third RTS signal in each of the first band and the second band.

This aspect achieves the same advantageous effects as the access point described above.

General or specific aspects of these may be realized as a system, method, integrated circuit, computer program, computer-readable recording medium such as a CD-ROM, or any given combination thereof.

Hereinafter, embodiments will be described in detail with reference to the drawings.

Each of the following embodiments describes a general or specific example. The numerical values, shapes, materials, elements, the arrangement and connection of the elements, the steps, the order of the steps, etc., shown in the following embodiments rare mere examples, and therefore do not limit the scope of the present disclosure. Therefore, among elements in the following embodiments, those not recited in any of the independent claims indicating the broadest scope are described as optional elements.

EMBODIMENT 1

For example, the communication device illustrated in FIG. 1 is a communication device for transmitting and receiving modulated signals of first frequency band 201, which is the 2.4 GHz band, transmitting and receiving modulated signals of second frequency band 202, which is the 5 GHz band, and transmitting and receiving modulated signals of third frequency band 203, which is the 6 (or 7) GHz band, such as is illustrated in FIG. 2.

In FIG. 2 frequency is represented on the horizontal axis, and modulated signal power is represented on the vertical axis.

In FIG. 1, antennas 1041 and 1051 and transceiver device 1021 are for transmitting and receiving modulated signals of first frequency band 201, antennas 104_2 and 105_2 and transceiver device 102_2 are for transmitting and receiving modulated signals of second frequency band 202, and antennas 104_3 and 105_3 and transceiver device 102_3 are for transmitting and receiving modulated signals of third frequency band 203.

For example, the communication device illustrated in FIG. 1 is configured as an access point (AP) device. The AP is a communication device that can communicate with one or more terminals, and, as a communications standard example, can transmit and receive modulated signals in accordance with the IEEE 802.11 communication method.

A communication method related to IEEE 802.11 is disclosed in, for example, IEEE Draft Standard for information Technology—Telecommunications and Information Exchange Between Systems Local and Metropolitan Area Networks—Specific Requirements—Part 11: Wireless LAN Medium Access Control (MAC) and Physical Layer (PHY) Specifications IEEE P802.11-REVmd/D1.0, February 2018.

IEEE Draft Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications IEEE P802.11-REVmd/D1.0, February 2018 discloses transmission and reception using a carrier sense multiple access with collision avoidance (CSMA/CA) method in IEEE 802.11. In CSMA/CA, the transmission and reception of request to send (RTS) signals and the transmission and reception of clear to send (CTS) signals are performed by communication devices. For example, assume an AP transmits an RTS signal. Here, a terminal receives the RTS signal, and if necessary, transmits a CTS signal. This addresses the hidden terminal problem.

The following description will describe a case in which, for example, an AP transmits an RTS signal. Note that as used herein, an AP is a device that can transmit the following modulated signals.

First Transmitting Method: Orthogonal Frequency Division Multiplexing (OFDM)

In this method, a modulated signal destined for one terminal is transmitted using the first frequency band or the second frequency band.

Second Transmitting Method: Orthogonal Frequency Division Multiple Access (OFDMA)

In this method, a modulated signal destined for one or more terminals is transmitted using the first frequency band or the second frequency band.

Third Transmitting Method:

In this method, a modulated signal destined for one or more terminals is transmitted using one or more of the first frequency band, the second frequency band and the third frequency band and using OFDM or OFDMA in each frequency band.

FIG. 3A illustrates the configuration of a request to send (RTS) signal for the first transmitting method. In FIG. 3A, time is represented on the horizontal axis. Here, an AP having the configuration illustrated in FIG. 1 transmits the RTS illustrated in FIG. 3A.

The RTS illustrated in FIG. 3A includes information indicating the address of the receive station (communication partner) and information indicating the address of the transmit station (in this example, the AP). Here, the receive station address is information indicating the address of a single receive station (communication partner).

Figure 3B:
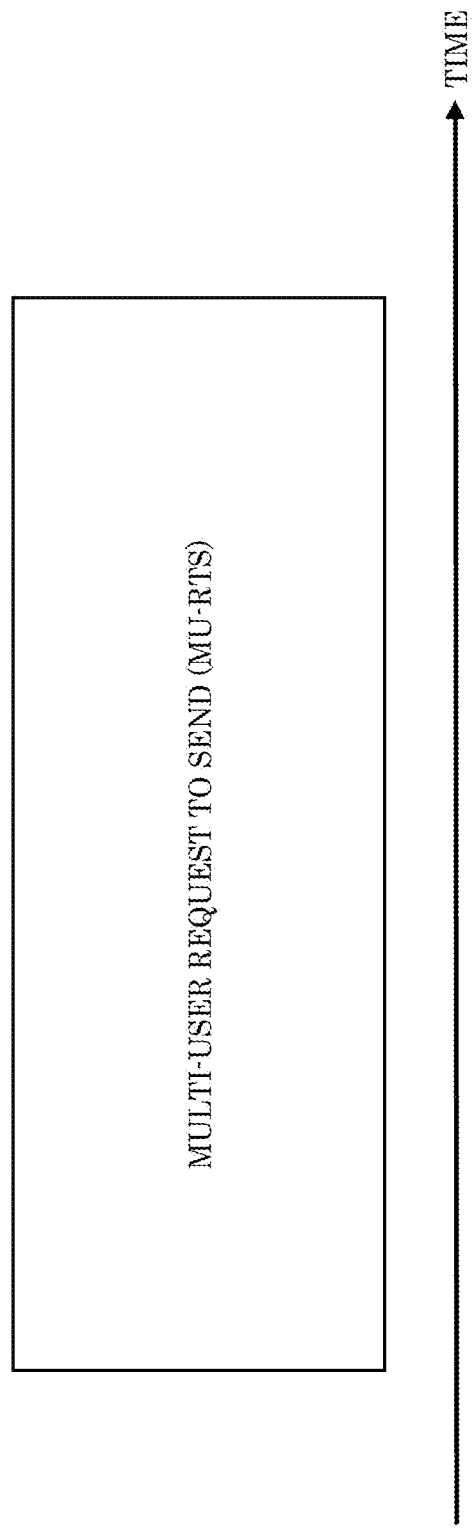
FIG. 3B illustrates a configuration of an MU-RTS signal.

FIG. 3B illustrates the configuration of a multi-user request to send (MU-RTS) signal for the second transmitting method. In FIG. 3B, time is represented on the horizontal axis. Here, an AP having the configuration illustrated in FIG. 1 transmits the MU-RTS illustrated in FIG. 3B.

The MU-RTS illustrated in FIG. 3B includes information indicating the address of the receive station (communication partner) and information indicating the address of the transmit station (in this example, the AP). Here, the receive station address is information indicating the address or addresses of one or more receive stations (communication partners) or information indicating the addresses of two or more receive stations (communication partners).

Figure 3C:
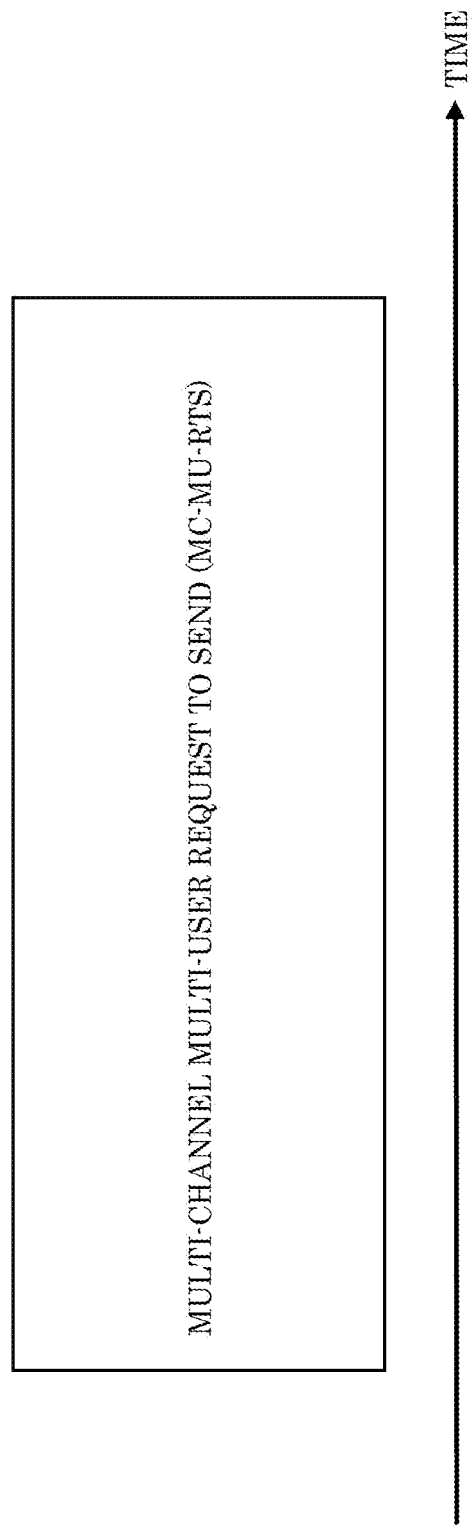
FIG. 3C illustrates a configuration of an MC-MU-RTS signal.

FIG. 3C illustrates the configuration of a multi-channel multi-user request to send (MC-MU-RTS) signal for the third transmitting method. In FIG. 3C, time is represented on the horizontal axis. Here, an AP having the configuration illustrated in FIG. 1 transmits the MC-MU-RTS illustrated in FIG. 3C.

The MC-MU-RTS illustrated in FIG. 3C includes information indicating the address of the receive station (communication partner) and information indicating the address of the transmit station (in this example, the AP). Here, the receive station address is information indicating the address or addresses of one or more receive stations (communication partners) or information indicating the addresses of two or more receive stations (communication partners).

Transceiver device 102_1 included in the AP having the configuration illustrated in FIG. 1 transmits and receives modulated signals of the first frequency band. Accordingly, when transmitting an RTS signal, transceiver device 102_1 transmits any one of the RTS illustrated in FIG. 3A, the MU-RTS illustrated in FIG. 3B, and the MC-MU-RTS illustrated in FIG. 3C.

Transceiver device 102_2 included in the AP having the configuration illustrated in FIG. 1 transmits and receives modulated signals of the second frequency band. Accordingly, when transmitting an RTS signal, transceiver device 102_2 transmits any one of the RTS illustrated in FIG. 3A, the MU-RTS illustrated in FIG. 3B, and the MC-MU-RTS illustrated in FIG. 3C.

Transceiver device 102_3 included in the AP having the configuration illustrated in FIG. 1 transmits and receives modulated signals of the third frequency band. Accordingly, when transmitting an RTS signal, transceiver device 102_3 transmits the MC-MU-RTS illustrated in FIG. 3C.

When transmitting the MC-MU-RTS illustrated in FIG. 3C, the AP does so using one or more of the first frequency band, the second frequency band, and the third frequency band. Accordingly, the following cases are conceivable.

First Case:
The AP transmits a first MC-MU-RTS in only the first frequency band.

Second Case:
The AP transmits a second MC-MU-RTS in only the second frequency band.

Third Case:
The AP transmits a third MC-MU-RTS in only the third frequency band.

Fourth Case:
The AP transmits a first MC-MU-RTS in the first frequency band and transmits a second MC-MU-RTS in the second frequency band.

Fifth Case:
The AP transmits a first MC-MU-RTS in the first frequency band and transmits a third MC-MU-RTS in the third frequency band.

Sixth Case:
The AP transmits a second MC-MU-RTS in the second frequency band and transmits a third MC-MU-RTS in the third frequency band.

Seventh Case:
The AP transmits a first MC-MU-RTS in the first frequency band, transmits a second MC-MU-RTS in the second frequency band, and transmits a third MC-MU-RTS in the third frequency band.

The AP can achieve the advantageous effect that the following communication can be performed as a result of transmitting the MC-MU-RTS illustrated in FIG. 3C as described above: the AP can communicate with a single terminal in only the third frequency band; the AP can communicate with two or more terminals in only the third frequency band; and the AP can communicate with one or more terminals in the third frequency band and communicate with one or more terminals in another frequency band.

A feature can be said to be that the AP does not transmit, in the third frequency band, the RTS signal illustrated in FIG. 3A or the MU-RTS signal illustrated in FIG. 3B.

Second Example:
The AP is a device that can transmit the following modulated signals.

Fourth Transmitting Method: OFDM
In this method, a modulated signal destined for one terminal is transmitted using the first frequency band or the second frequency band.

Fifth Transmitting Method: OFDMA
In this method, a modulated signal destined for one or more terminals is transmitted using the first frequency band, the second frequency band, or the third frequency band.

Sixth Transmitting Method:
In this method, a modulated signal destined for one or more terminals is transmitted using one or more of the first frequency band, the second frequency band and the third frequency band and using OFDM or OFDMA in each frequency band.

In the second transmitting method and the fifth transmitting method, a given period or a modulated signal in a given period includes a symbol destined for one or more terminals (one or more resource units (RUs)). Examples include the frame configurations illustrated in FIG. 4A and FIG. 4B.

In FIG. 4A, frequency is (carriers are) represented on the vertical axis, and time is represented on the horizontal axis. As illustrated in FIG. 4A, symbol 401_1 destined for terminal #A (RU #A) is present in a first period.

In FIG. 4B, frequency is (carriers are) represented on the vertical axis, and time is represented on the horizontal axis. As illustrated in FIG. 4B, symbol 401_1 destined for terminal #A (RU #A), symbol 401_2 destined for terminal #B (RU #B), and symbol 401_3 destined for terminal #C (RU #C) are present in a first period.

Although the example in FIG. 4B illustrates frequency division into three RUs, the number of frequency divisions is not limited to three. Moreover, the frame configuration is not limited to the examples illustrated in FIG. 4A and FIG. 4B. The number of frequency divisions, that is to say, the number of destination terminals may be 2, and, alternatively, may be four or more. Moreover, the number of carriers assigned to each terminal may be different.

Although frequency division is performed in FIG. 4B, time division into three RUs may be performed if time is represented on the vertical axis and frequency is represented on the horizontal axis in FIG. 4B. The number of slots in the case of time division, that is to say, the number of destination terminals may be two or more, and the number of time slots assigned to each terminal may be different.

In the third transmitting method and the sixth transmitting method, in a given period, one or more of the first frequency band, the second frequency band, and the third frequency band is used, and the given period includes one or more symbols destined for a terminal (i.e., one or more RU symbols). Such a frame has, for example, one of the frame configurations illustrated in FIG. 5A, FIG. 5B, FIG. 5C, FIG. 5D, FIG. 5E, FIG. 5F, FIG. 5G, FIG. 5H, FIG. 5I, FIG. 5J, and FIG. 5K.

In FIG. 5A, time is represented on the vertical axis, and frequency is (carriers are) represented on the horizontal axis. 500_1 indicates a frame configuration in the first frequency band, 500_2 indicates a frame configuration in the second frequency band, and 500_3 indicates a frame configuration in the third frequency band.

As illustrated in FIG. 5A, symbol (RU #A) 501_1 destined for terminal #A is present in the first period in the first frequency band, symbol (RU #A) 501_2 destined for terminal #A is present in the first period in the second frequency band, and symbol (RU #A) 501_3 destined for terminal #A is present in the first period in the third frequency band.

In FIG. 5B, time is represented on the vertical axis, and frequency is (carriers are) represented on the horizontal axis, Elements that operate the same as those in FIG. 5A have the same reference signs, and repeated description thereof will be omitted.

As illustrated in FIG. 5B, symbol (RU #A) 501_1 destined for terminal #A is present in the first period in the first frequency band, and symbol (RU, #A) 501_2 destined for terminal #A is present in the first period in the second frequency band.

In FIG. 5C, time is represented on the vertical axis, and frequency is (carriers are) represented on the horizontal axis. Elements that operate the same as those in FIG. 5A have the same reference signs, and repeated description thereof will be omitted.

As illustrated in FIG. 5C, symbol (RU #A) 501_1 destined for terminal #A is present in the first period in the first frequency band, and symbol (RU #A) 501_3 destined for terminal #A is present in the first period in the third frequency band.

In FIG. 5D, time is represented on the vertical axis, and frequency is (carriers are) represented on the horizontal axis. Elements that operate the same as those in FIG. 5A have the same reference signs, and repeated description thereof will be omitted.

As illustrated in FIG. 5D, symbol (RU #A) 501_2 destined for terminal #A is present in the first period in the second frequency band, and symbol (RU #A) 501_3 destined for terminal #A is present in the first period in the third frequency band.

In FIG. 5E, time is represented on the vertical axis, and frequency is (carriers are) represented on the horizontal axis. Elements that operate the same as those in FIG. 5A have the same reference signs, and repeated description thereof will be omitted.

As illustrated in FIG. 5E, data symbol 502_1 is present in the first period in the first frequency band, data symbol 502_2 is present in the first period in the second frequency band, and data symbol 502_3 is present in the first period in the third frequency band, Data symbols 502_1, 502_2, and 502_3 are symbols for transmitting data. The configuration of data symbols 502_1, 502_2, and 502_3 will be described later with reference to FIG. 6A and FIG. 6B.

In FIG. 5F, time is represented on the vertical axis, and frequency is (carriers are) represented on the horizontal axis. Elements that operate the same as those in FIG. 5A and FIG. 5E have the same reference signs, and repeated description thereof will be omitted.

As illustrated in FIG. 5F, data symbol 502_1 is present in the first period in the first frequency band, and data symbol 502_2 is present in the first period in the second frequency band. Data symbols 502_1, 502_2, and 502_3 are symbols for transmitting data. The configuration of data symbols 502_1, 502_2, and 502_3 will be described later with reference to FIG. 6A and FIG. 6B.

In FIG. 5G, time is represented on the vertical axis, and frequency is (carriers are) represented on the horizontal axis. Elements that operate the same as those in FIG. 5A and FIG. 5E have the same reference signs, and repeated description thereof will be omitted.

As illustrated in FIG. 5G, data symbol 502_1 is present in the first period in the first frequency band, and data symbol 502_3 is present in the first period in the third frequency band. Data symbols 502_1, 502_2, and 502_3 are symbols for transmitting data. The configuration of data symbols 502_1, 502_2, and 502_3 will be described later with reference to FIG. 6A and FIG. 6B.

In FIG. 5H, time is represented on the vertical axis, and frequency is (carriers are) represented on the horizontal axis. Elements that operate the same as those in FIG. 5A and FIG. 5E have the same reference signs, and repeated description thereof will be omitted.

As illustrated in FIG. 5H, data symbol 502_2 is present in the first period in the second frequency band, and data symbol 502_3 is present in the first period in the third frequency band. Data symbols 502_1, 502_2, and 502_3 are symbols for transmitting data. The configuration of data symbols 502_1, 502_2, and 502_3 will be described later with reference to FIG. 6A and FIG. 6B.

In FIG. 5I, time is represented on the vertical axis, and frequency is (carriers are) represented on the horizontal axis. Elements that operate the same as those in FIG. 5A and FIG. 5E have the same reference signs, and repeated description thereof will be omitted.

As illustrated in FIG. 5I, data symbol 502_1 is present in the first period in the first frequency band. Data symbols 502_1, 502_2, and 502_3 are symbols for transmitting data. The configuration of data symbols 502_1, 502_2, and 502_3 will be described later with reference to FIG. 6A and FIG. 6B.

In FIG. 5J, time is represented on the vertical axis, and frequency is (carriers are) represented on the horizontal axis. Elements that operate the same as those in FIG. 5A and FIG. 5E have the same reference signs, and repeated description thereof will be omitted.

As illustrated in FIG. 5J, data symbol 502_2 is present in the first period in the second frequency band. Data symbols 502_1, 502_2, and 502_3 are symbols for transmitting data. The configuration of data symbols 502_1, 502_2, and 502_3 will be described later with reference to FIG. 6A and FIG. 6B.

In FIG. 5K, time is represented on the vertical axis, and frequency is (carriers are) represented on the horizontal axis, Elements that operate the same as those in FIG. 5A and FIG. 5E have the same reference signs, and repeated description thereof will be omitted.

As illustrated in FIG. 5K, data symbol 502_3 is present in the first period in the third frequency band. Data symbols 502_1, 502_2, and 502_3 are symbols for transmitting data. The configuration of data symbols 502_1, 502_2, and 502_3 will be described later with reference to FIG. 6A and FIG. 6B.

FIG. 6A illustrates an example of a configuration of data symbol 502_X in an $X^{th}$ frequency band in FIG. 5E, FIG. 5F, FIG. 5G, FIG. 5H, FIG. 5I, FIG. 5J, and FIG. 5K. Note that X is 1, 2, or 3. In FIG. 6A, time is represented on the vertical axis, and frequency is (carriers are) represented on the horizontal axis. As illustrated in FIG. 6A, data symbol 502_X is configured of symbol #X1) 601_1 destined for terminal #X1.

FIG. 6B illustrates an example of a configuration of data symbol 502_X in an $X^{th}$ frequency band in FIG. 5E, FIG. 5F, FIG. 5G, FIG. 5H, FIG. 5I, FIG. 5J, and FIG. 5K. Note that X is 1, 2, or 3. In FIG. 6B, time is represented on the vertical axis, and frequency is (carriers are) represented on the horizontal axis. As illustrated in FIG. 6B, data symbol 502_X is configured of symbol (RU #X1) 601_1 destined for terminal #X1, symbol (RU #X2) 601_2 destined for terminal #X2, symbol (RU #X3) 601_3 destined for terminal #X3, and symbol (RU #X4) 601_4 destined for terminal #X4.

FIG. 6A illustrates an example of a configuration of data symbol 502_X in an $X^{th}$ frequency band in FIG. 5E, FIG. 5F, FIG. 5G, FIG. 5H, FIG. 5I, FIG. 5J, and FIG. 5K. Note that X is 1, 2, or 3. In FIG. 6A, time is represented on the vertical axis, and frequency is (carriers are) represented on the horizontal axis. As illustrated in FIG. 6A, data symbol 502_X is configured of symbol (RU #X1) 601_1 destined for terminal #X1.

FIG. 6B illustrates an example of a configuration of data symbol 502_X in an $X^{th}$ frequency band in FIG. 5E, FIG. 5F, FIG. 5G, FIG. 5H, FIG. 5I, FIG. 5J, and FIG. 5K. Note that X is 1, 2, or 3. In FIG. 6B, time is represented on the vertical axis, and frequency is (carriers are) represented on the horizontal axis. As illustrated in FIG. 6B, data symbol 502_X, is configured of symbol (RU #X1) 601_1 destined for terminal #X1, symbol (RU #X2) 601_2 destined for terminal #X2, symbol (RU #X3) 601_3 destined for terminal #X3, and symbol (RU #X4) 6014 destined for terminal #X4.

Although the example in FIG. 6B illustrates frequency division into four RUs, the number of frequency divisions is not limited to four. The configuration of data symbols 502_1, 502_2, and 502_3 are not limited to the examples illustrated in FIG. 6A and FIG. 6B.

In one example, data symbol 502_1 has either one of the frame configurations illustrated in FIG. 6A, and FIG. 6B. In this example, data symbol 502_2 also has either one of the frame configurations illustrated in FIG. 6A, and FIG. 6B, and data symbol 502_3 also has either one of the frame configurations illustrated in FIG. 6A and FIG. 6B.

Data symbols 502_1, 502_2, and 502_3 may include symbols destined for the same terminal (for example, data symbols 502_1, 502_2, and 502_3 may include symbols destined for terminal #A).

Similarly, data symbols 502_1 and 502_2 may include symbols destined for the same terminal (for example, data symbols 502_1 and 502_2 may include symbols destined for terminal #A).

Similarly, data symbols 502_1 and 502_3 may include symbols destined for the same terminal (for example, data symbols 502_1 and 502_3 may include symbols destined for terminal #A).

Similarly, data symbols 502_2 and 502_3 may include symbols destined for the same terminal (for example, data symbols 502_2 and 502_3 may include symbols destined for terminal #A).

An AP that transmits the modulated signal using the third transmitting method or the sixth transmitting method selects, for example, any one of the frame configurations illustrated in FIG. 5A, FIG. 5B, FIG. 5C, FIG. 5D, FIG. 5E, FIG. 5F, FIG. 5G, FIG. 5H, FIG. 5I, FIG. 5J, and FIG. 5K, and transmits the modulated signal.

As another example, any two or more of the frame configurations illustrated in, for example, FIG. 5A, FIG. 5B, FIG. 5C, FIG. 5D, FIG. 5E, 5F, FIG. 5G, FIG. 5H, FIG. 5I, FIG. 5J, and FIG. 5K are selection candidates, and the AP that transmits the modulated signal using the third transmitting method or the sixth transmitting method selects one frame configuration from among the selection candidates and transmits the modulated signal.

FIG. 5A, FIG. 5B FIG. 5C, FIG. 5D, FIG. 5E, FIG. 5F, FIG. 5G, FIG. 5H, FIG. 5I, FIG. 5J, and FIG. 5K, may include symbols other than those illustrated. For example, these figures may include a preamble, a reference symbol, a control information symbol, a pilot symbol, a mid-amble, a null symbol (absence of a symbol), and/or a null carrier (absence of a symbol).

FIG. 6A and FIG. 6B may include symbols other than those illustrated. For example, these figures may include a preamble, a reference symbol, a control information symbol, a pilot symbol, a mid-amble, a null symbol (absence of a symbol), and/or a null carrier (absence of a symbol).

FIG. 3A illustrates the configuration of a request to send (RTS) signal for the fourth transmitting method. In FIG. 3A, time is represented on the horizontal axis. Here, an AP having the configuration illustrated in FIG. 1 transmits the RTS illustrated in FIG. 3A.

The RTS illustrated in FIG. 3A includes information indicating the address of the receive station (communication partner) and information indicating the address of the transmit station (in this example, the AP). Here, the receive station address is information indicating the address of one receive station (communication partner).

FIG. 3B illustrates the configuration of a multi-user request to send (MU-RTS) signal for the fifth transmitting method. In FIG. 3B, time is represented on the horizontal axis. Here, an AP having the configuration illustrated in FIG. 1 transmits the MU-RTS illustrated in FIG. 3B.

The MU-RTS illustrated in FIG. 3B includes information indicating the address of the receive station (communication partner) and information indicating the address of the transmit station (in this example, the AP). Here, the receive station address is information indicating the address or addresses of one or more receive stations (communication partners) or information indicating the addresses of two or more receive stations (communication partners).

FIG. 3C illustrates the configuration of a multi-channel multi-user request to send (MC-MU-RTS) signal for the sixth transmitting method. In FIG. 3C, time is represented on the horizontal axis. Here, an AP having the configuration illustrated in FIG. 1, transmits the MC-MU-RTS illustrated in FIG. 3C.

The MC-MU-RTS illustrated in FIG. 3C includes information indicating the address of the receive station (communication partner) and information indicating the address of the transmit station (in this example, the AP). Here, the receive station address is information indicating the address or addresses of one or more receive stations (communication partners) or information indicating the addresses of two or more receive stations (communication partners).

Transceiver device 102_1 included in the AP having the configuration illustrated in FIG. 1 transmits acid receives modulated signals of the first frequency band. Accordingly, when transmitting an RTS signal, transceiver device 102_1 transmits any one of the RTS illustrated in FIG. 3A, the MU-RTS illustrated in FIG. 3B, and the MC-MU-RTS illustrated in FIG. 3C.

Transceiver device 102_2 included in the AP having the configuration illustrated in FIG. 1 transmits and receives modulated signals of the second frequency band. Accordingly, when transmitting an RTS signal, transceiver device 102_2 transmits any one of the RTS illustrated in FIG. 3A, the MU-RTS illustrated in FIG. 3B, and the MC-MU-RTS illustrated in FIG. 3C.

Transceiver device 102_3 included in the AP having the configuration illustrated in FIG. 1 transmits and receives modulated signals of the third frequency band. Accordingly, when transmitting an RTS signal, transceiver device 102_3 transmits any one of the MU-RTS illustrated in FIG. 3B and the MC-MU-RTS illustrated in FIG. 3C.

When transmitting the MC-MU-RTS illustrated in FIG. 8C, the AP does so using one or more of the first frequency band, the second frequency band, and the third frequency band. Accordingly, the following cases are conceivable.

First Case:
The AP transmits a first MC-MU-RTS in only the first frequency band.
Second Case:
The AP transmits a second MC-MU-RTS in only the second frequency band.
Third Case:
The AP transmits a third MC-MU-RTS in only the third frequency band.
Fourth Case:
The AP transmits a first MC-MU-RTS in the first frequency band and transmits a second MC-MU-RTS in the second frequency band.
Fifth Case:
The AP transmits a first MC-MU-RTS in the first frequency band and transmits a third MC-MU-RTS in the third frequency band.
Sixth Case:
The AP transmits a second MC-MU-RTS in the second frequency band and transmits a third MC-MU-RTS in the third frequency band.
Seventh Case:
The AP transmits a first MC-MU-RTS in the first frequency band, transmits a second MC-MU-RTS in the second frequency band, and transmits a third MC-MU-RTS in the third frequency band.

The AP can achieve the advantageous effect that the following communication can be performed as a result of transmitting the MC-MU-RTS illustrated in FIG. 3C as described above: the AP can communicate with a single terminal in only the third frequency band; the AP can communicate with two or more terminals in only the third frequency band; and the AP can communicate with one or more terminals in the third frequency band and communicate with one or more terminals in another frequency band.

A feature of the AP can be said to be that it does not transmit, in the third frequency band, the RTS signal illustrated in FIG. 3A.

Although the above describes an example of operations performed when there are three frequency bands—the first frequency band, the second frequency band, and the third frequency band—the present disclosure is not limited to this example. The above can be implemented in the same manner so long as there are two or more frequency bands.

For example, the following cases are conceivable when there are two types of frequency bands, namely an $A^{th}$ frequency band and a $B^{th}$ frequency band.

Case X:
When the $A^{th}$ frequency band is the 2.4 GHz band and the $B^{th}$ frequency band is the 5 GHz band, the above can be carried out where the $A^{th}$ frequency band is considered to be the first frequency band described above, and the $B^{th}$ frequency band is considered to be the second frequency band described above.
Case Y:
When the $A^{th}$ frequency band is the 2.4 GHz band and the $B^{th}$ frequency band is the 6 GHz band, the above can be carried out where the $A^{th}$ frequency band is considered to be the first frequency band described above, and the $B^{th}$ frequency band is considered to be the third frequency band described above.
Case Z:
When the $A^{th}$ frequency band is the 5 GHz band and the $B^{th}$ frequency band is the 6 GHz band, the above can be carried out where the $A^{th}$ frequency band is considered to be the second frequency band described above, and the $B^{th}$ frequency band is considered to be the third frequency band described above.

Moreover, when there are four or more frequency bands, and the above-described first frequency band, second frequency band, and third frequency band are included in these four frequency bands, the above can be implemented in the same manner.

A terminal that receives the RTSs transmitted by the AP transmits a CTS signal to the AP when the terminal's address is included in a received RTS.

Embodiment 2

In the present embodiment, an example of a favorable frame configuration in the third transmitting method and the sixth transmitting method described above be given. For example, an AP having the configuration illustrated in FIG. 1 transmits a modulated signal having any one of the frame configurations illustrated in FIG. 7, FIG. 8, FIG. 9, FIG. 10, FIG. 11, FIG. 12, FIG. 13, and FIG. 14.

Hereinafter, the frame configurations illustrated in FIG. 7, FIG. 8, FIG. 9, FIG. 10, FIG. 11, FIG. 12, FIG. 13, and FIG. 14 will be described.

Figure 7:
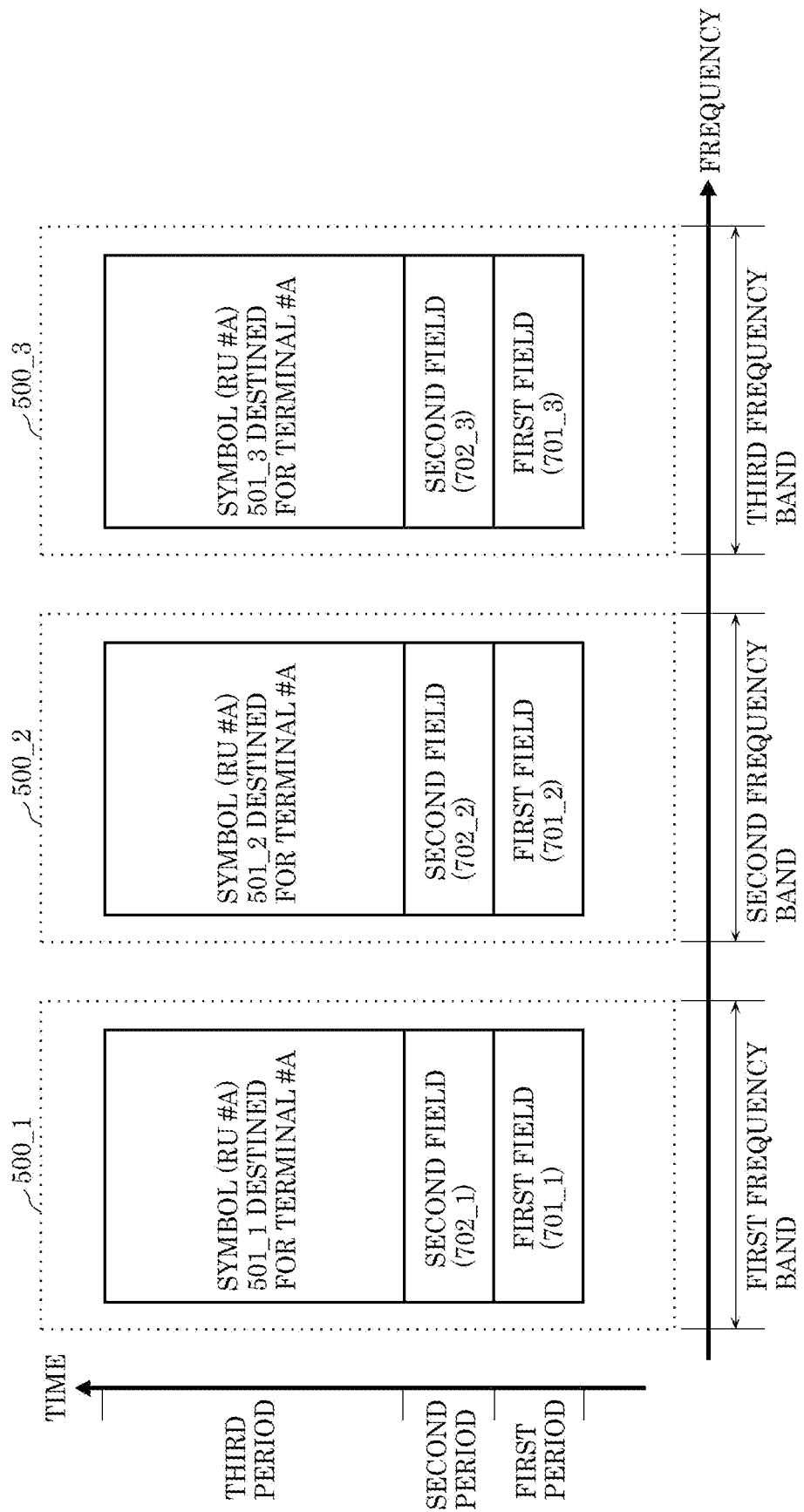
FIG. 7 illustrates an example of frame configurations.

FIG. 7 illustrates an example of a frame configuration of a modulated signal transmitted by the AP Elements in FIG. 7 that operate the same as those in FIG. 5 have the same reference signs, and repeated description thereof will be omitted.

In FIG. 7, time is represented on the vertical axis, and frequency is (carriers are) represented on the horizontal axis 500_1 indicates a frame configuration in the first frequency band, 500_2 indicates a frame configuration in the second frequency band, and 500_3 indicates a frame configuration in the third frequency band.

As illustrated in FIG. 7, first field 701_1 is present in the first period in the first frequency band. First field 701_2 is present in the first period in the second frequency band. First field 701_3 is present in the first period in the third frequency band.

For example, first fields 701_1, 701_2, and 701_3 include a symbol for the communication partner of the AP to perform signal detection, time synchronization, frequency synchronization, channel estimation, etc.

Second field 702_1 is present in the second period in the first frequency band. Second field 702_2 is present in the second period in the second frequency band. Second field 702_3 is present in the second period in the third frequency band.

Second field 701_1 is a field for transmitting control information to the communication partner of the AP, and includes, for example, information on the error encoding method used to generate symbol (RU #A) 501_1 destined for terminal #A, information on the modulation method of symbol (RU #A) 501_1 destined for terminal #A, and information on the transmitting method of symbol (RU #A) 501_1 destined for terminal #A. Second field 701_2 is a field for transmitting control information to the communication partner of the AP, and includes, for example, information on the error encoding method used to generate symbol (RU #A) 501_2 destined for terminal #A, information on the modulation method of symbol (RU #A) 501_2 destined for terminal #A, and information on the transmitting method of symbol (RU #A) 501_2 destined for terminal #A. Second field 701_3 is a field for transmitting control information to the communication partner of the AP, and includes, for example, information on the error encoding method used to generate symbol (RU #A) 501_3 destined for terminal #A, information on the modulation method of symbol (RU #A) 501_3 destined for terminal #A, and information on the transmitting method of symbol (RU #A) 501_3 destined for terminal #A.

Symbol (RU #A) 501_1 destined for terminal #A is present; in the third period in the first frequency band, symbol (RU #A) 501_2 destined for terminal #A is present in the third period in the second frequency band, and symbol (RU #A) 501_3 destined for terminal #A is present in the third period in the third frequency band.

As the example illustrated in FIG. 7 shows, a feature is that, in a given period, data symbols destined for the same terminal are present in the first frequency band, the second frequency band, and the third frequency band. Note that here, no data symbol destined for another terminal is present. The timing at which first fields 701_1, 701_2, and 701_3 and second fields 702_1, 702_2, and 702_3 are transmitted is not limited to the example illustrated in FIG. 7.

Figure 8:
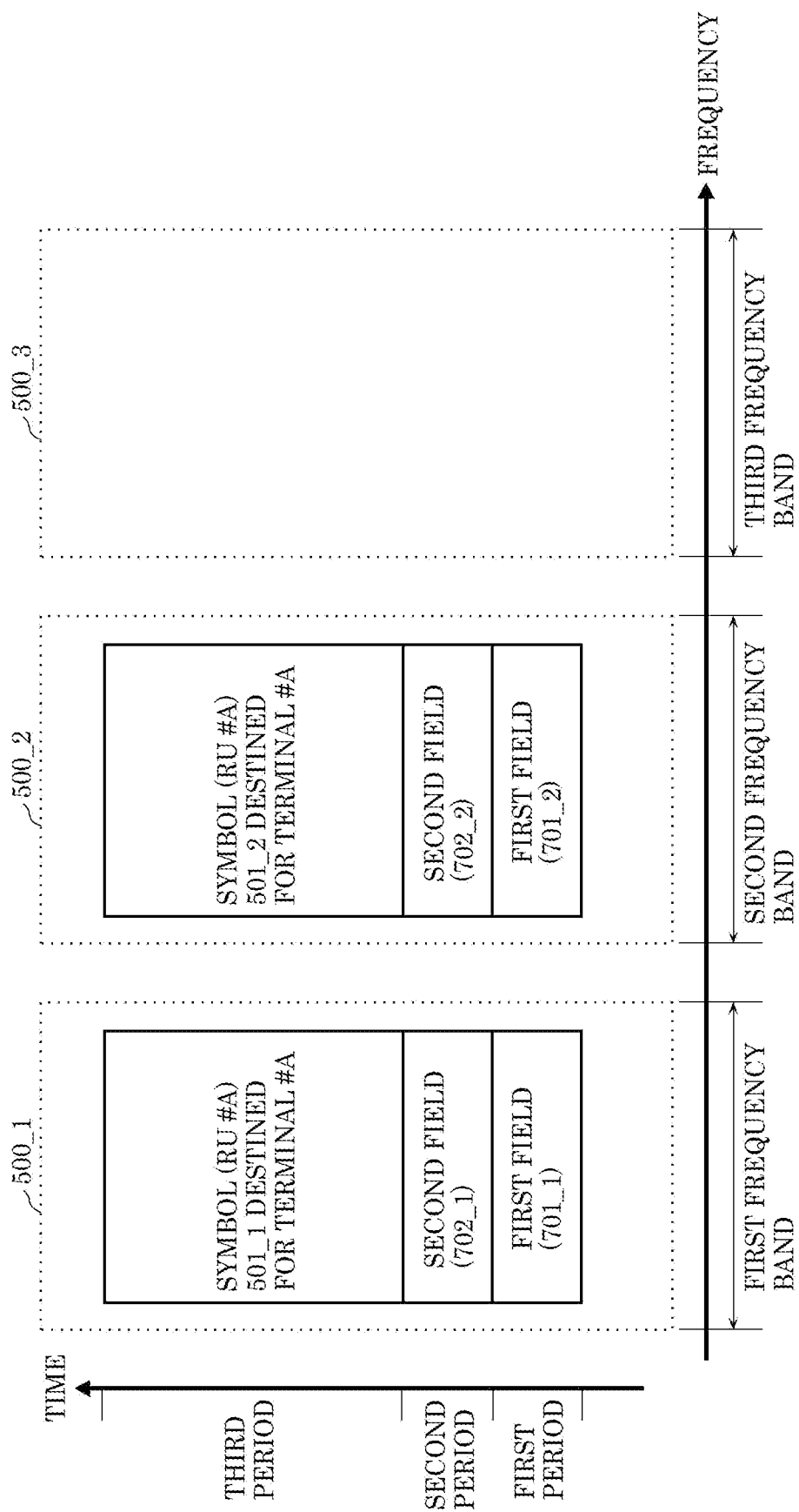
FIG. 8 illustrates an example of frame configurations.

FIG. 8 illustrates an example of a frame configuration of a modulated signal transmitted by the AP Elements in FIG. 8 that operate the same as those in FIG. 5 and FIG. 7 have the same reference signs, and repeated description thereof will be omitted.

In FIG. 8, time is represented on the vertical axis, and frequency is (carriers are) represented on the horizontal axis. 500_1 indicates a frame configuration in the first frequency band, 500_2 indicates a frame configuration in the second frequency band, and 500_3 indicates a frame configuration in the third frequency band.

As illustrated in FIG. 8, first field 701_1 is present in the first period in the first frequency band, First field 701_2 is present in the first period in the second frequency band.

For example, first fields 701_1 and 701_2 include a symbol for the communication partner of the AP to perform signal detection, time synchronization, frequency synchronization, channel estimation, etc.

Second field 702_1 is present in the second period in the first frequency band. Second field 702_2 is present in the second period in the second frequency band.

Second field 701_1 is a field for transmitting control information to the communication partner of the AP, and includes, for example, information on the error encoding method used to generate symbol (RU #A) 501_1 destined for terminal #A, information on the modulation method of symbol (RU #A) 501_1 destined for terminal #A, and information on the transmitting method of symbol (RU #A) 501_1 destined for terminal #A. Second field 701_2 is a field for transmitting control information to the communication partner of the AP, and includes, for example, information on the error encoding method used to generate symbol (RU #A) 501_2 destined for terminal #A, information on the modulation method of symbol (RU #A) 501_2 destined for terminal #A, and information on the transmitting method of symbol (RU #A) 501_2 destined for terminal #A.

Symbol (RU #A) 501_1 destined for terminal #A is present in the third period in the first frequency band, and symbol (RU #A) 501_2 destined for terminal #A is present in the third period in the second frequency band.

As the example illustrated in FIG. 8 shows, a feature is that, in a given period, data symbols destined for the same terminal are present in the first frequency band and the second frequency band. Note that here, no data symbol destined for another terminal is present. The timing at which first fields 701_1 and 701_2 and second fields 702_1 and 702_2 are transmitted is not limited to the example illustrated in FIG. 8.

Figure 9:
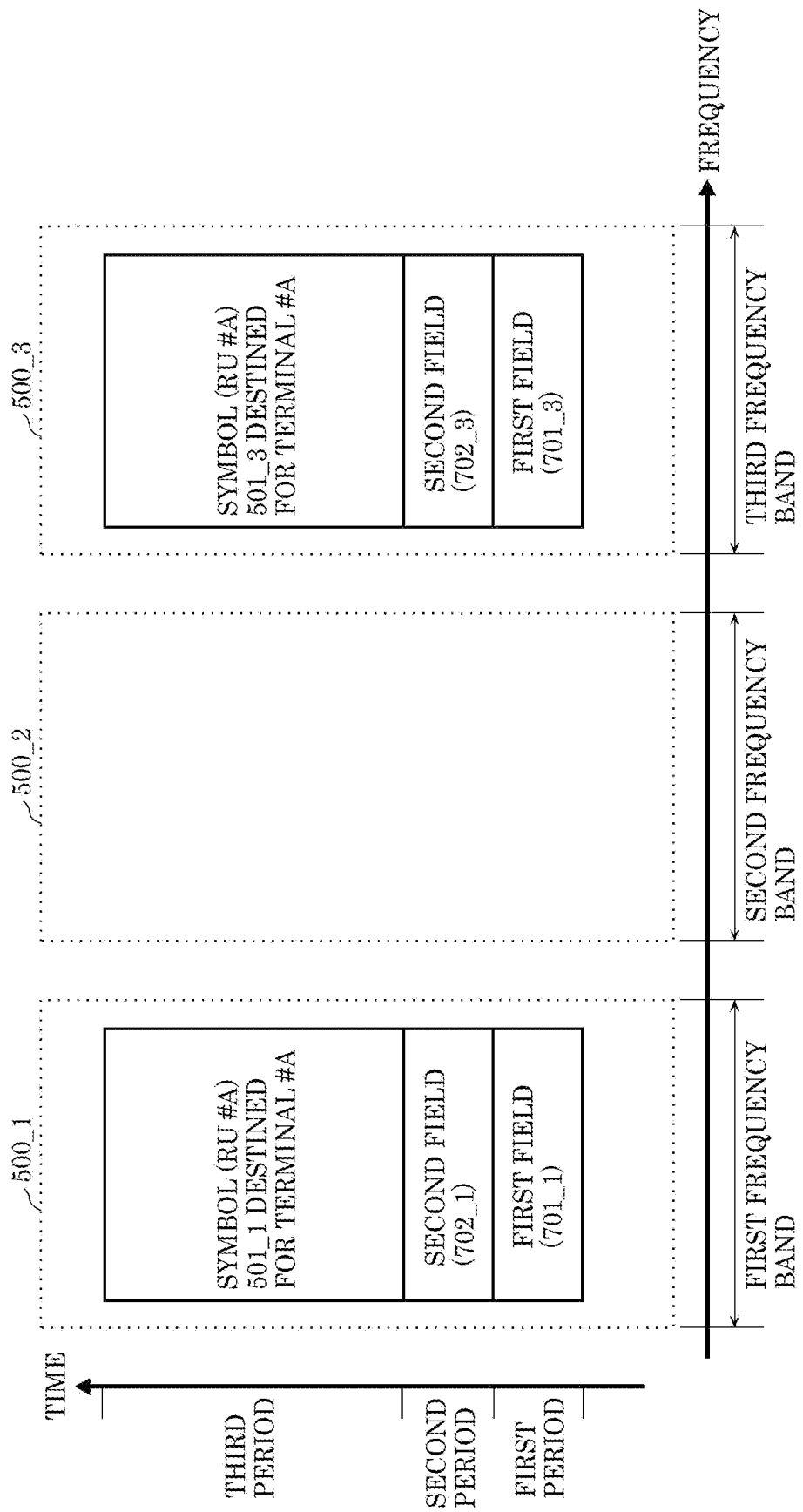
FIG. 9 illustrates an example of frame configurations.

In FIG. 9, time is represented on the vertical axis, and frequency is (carriers are) represented on the horizontal axis. 500_1 indicates a frame configuration in the first frequency band, 500_2 indicates a frame configuration in the second frequency band, and 500_3 indicates a frame configuration in the third frequency band.

As illustrated in FIG. 9, first field 701_1 is present in the first period in the first frequency band. First field 701_3 is present in the first period in the third frequency band.

For example, first fields 701_1 and 701_3 include a symbol for the communication partner of the AP to perform signal detection, time synchronization, frequency synchronization, channel estimation, etc.

Second field. 702_1 is present in the second period in the first frequency band. Second field 702_3 is present in the second period in the third frequency band.

Second field 701_1 is a field for transmitting control information to the communication partner of the AP, and includes, for example, information on the error encoding method used to generate symbol (RU #A) 501_1 destined for terminal #A, information on the modulation method of symbol (RU #A) 501_1 destined for terminal #A, and information on the transmitting method of symbol (RU #A) 501_1 destined for terminal #A. Second field 701_3 is a field for transmitting control information to the communication partner of the AP, and includes, for example, information on the error encoding method used to generate symbol (RU #A) 501_3 destined for terminal #A, information on the modulation method of symbol (RU #A) 501_3 destined for terminal #A, and information on the transmitting method of symbol (RU #A) 501_3 destined for terminal #A.

Symbol (RU #A) 501_1 destined for terminal #A is present in the third period in the first frequency band, and symbol (RU #A) 501_3 destined for terminal #A is present in the third period in the third frequency band.

As the example illustrated in FIG. 9 shows, a feature is that, in a given period, data symbols destined for the same terminal are present in the first frequency band and the third frequency band. Note that here, no data symbol destined for another terminal is present. The timing at which first fields 701_1 and 701_3 and second fields 702_1 and 702_3 are transmitted is not limited to the example illustrated in FIG. 9.

Figure 10:
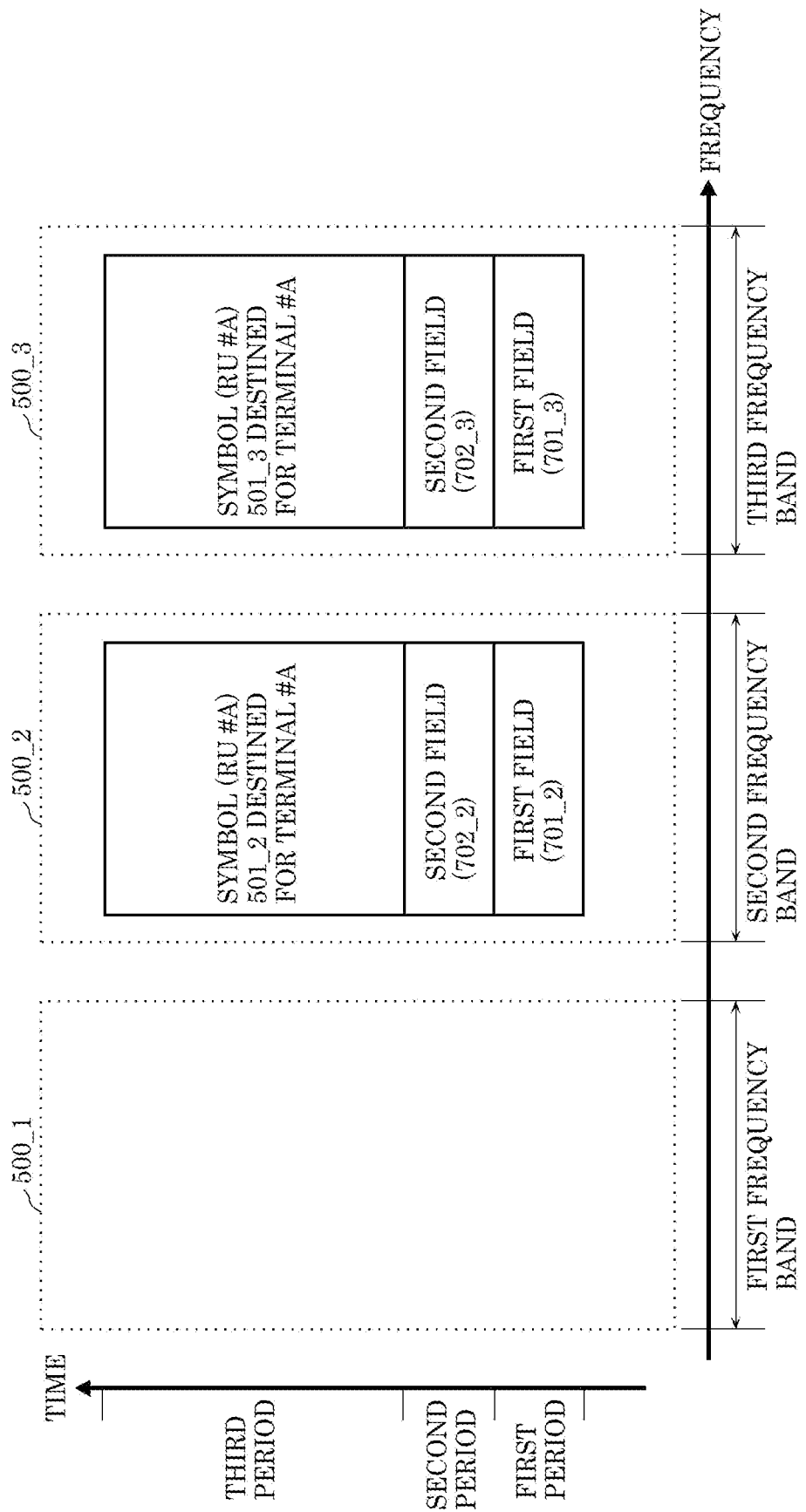
FIG. 10 illustrates an example of frame configurations.

FIG. 10 illustrates an example of a frame configuration of a modulated signal transmitted by the AP. Elements in FIG. 10 that operate the same as those in FIG. 5 and FIG. 7 have the same reference signs, and repeated description thereof will be omitted.

In FIG. 10, time is represented on the vertical axis, and frequency is (carriers are) represented on the horizontal axis. 500_1 indicates a frame configuration in the first frequency band, 500_2 indicates a frame configuration in the second frequency band, and 500_3 indicates a frame configuration in the third frequency band.

As illustrated in FIG. 10, first field 701_2 is present in the first period in the second frequency band. First field 701_3 is present in the first period in the third frequency band.

For example, first fields 701_2 and 701_3 include a symbol for the communication partner of the AP to perform signal detection, time synchronization, frequency synchronization, channel estimation, etc.

Second field 702_2 is present in the second period in the second frequency band. Second field 702_3 is present in the second period in the third frequency band.

Second field 701_2 is a field for transmitting control information to the communication partner of the AP, and includes, for example, information on the error encoding method used to generate symbol (RU #A) 501_2 destined for terminal #A, information on the modulation method of symbol (RU #A) 501_2 destined for terminal #A, and information on the transmitting method of symbol (RU #A) 501_2 destined for terminal #A. Second field 701_3 is a field for transmitting control information to the communication partner of the AP, and includes, for example, information on the error encoding method used to generate symbol (RU #A) 501_3 destined for terminal #A, information on the modulation method of symbol (RU #A) 501_3 destined for terminal #A, and information on the transmitting method of symbol (RU #A) 501_3 destined for terminal #A.

Symbol (RU #A) 501_2 destined for terminal #A is present in the third period in the second frequency band, and symbol (RU #A) 501_3 destined for terminal #A is present in the third period in the third frequency band.

As the example illustrated in FIG. 10 shows, a feature is that, in a given period, data symbols destined for the same terminal are present in the second frequency band and the third frequency band. Note that here, no data symbol destined for another terminal is present. The timing at which first fields 701_2 and 701_3 and second fields 702_2 and 702_3 are transmitted is not limited to the example illustrated in FIG. 10.

Figure 11:
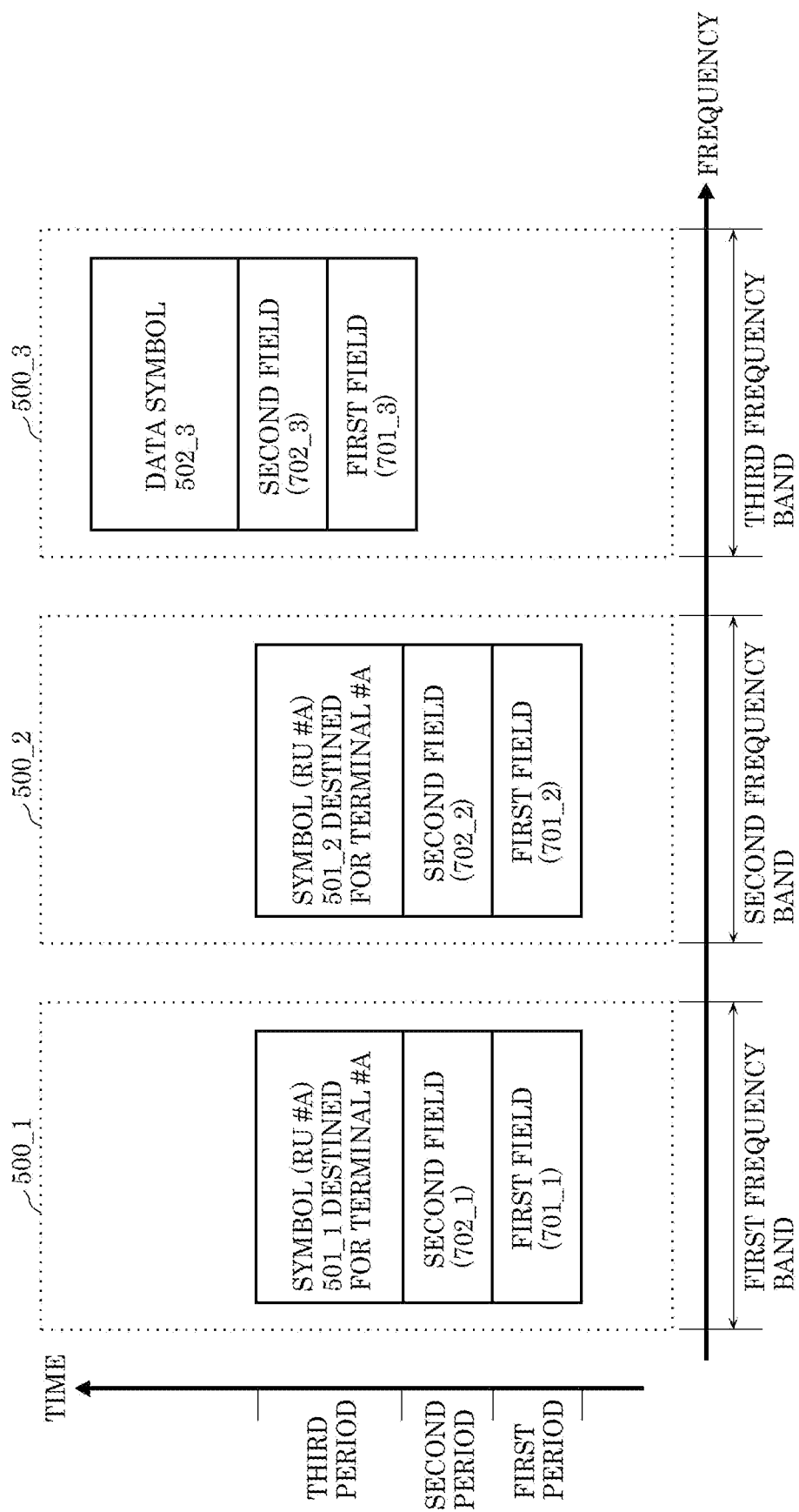
FIG. 11 illustrates an example of frame configurations.

FIG. 11 illustrates an example of a frame configuration of a modulated signal transmitted by the AP. Elements in FIG. 11 that operate the same as those in FIG. 5 and FIG. 7 have the same reference signs, and repeated description thereof will be omitted.

In FIG. 11, time is represented on the vertical axis, and frequency is (carriers are) represented on the horizontal axis, 500_1 indicates a frame configuration in the first frequency band, 500_2 indicates a frame configuration in the second frequency band, and 500_3 indicates a frame configuration in the third frequency band.

As illustrated in FIG. 11, first field 701_1 is present in the first period in the first frequency band. First field 701_2 is present in the first period in the second frequency band.

For example, first fields 701_1 and 701_2 include a symbol for the communication partner of the AP to perform signal detection, time synchronization, frequency synchronization, channel estimation, etc.

Second field 702_1 is present in the second period in the first frequency band. Second field 702_2 is present in the second period in the second frequency band.

Second field 701_1 is a field for transmitting control information to the communication partner of the AP, and includes, for example, information on the error encoding method used to generate symbol (RU #A) 501_1 destined for terminal #A, information on the modulation method of symbol (RU #A) 501_1 destined for terminal #A, and information on the transmitting method of symbol (RU #A) 501_1 destined for terminal #A. Second field 701_2 is a field for transmitting control information to the communication partner of the AP, and includes, for example, information on the error encoding method used to generate symbol (RU #A) 501_2 destined for terminal #A, information on the modulation method of symbol (RU #A) 501_2 destined for terminal #A, and information on the transmitting method of symbol (RU #A) 501_2 destined for terminal #A.

Symbol (RU #A) 501_1 destined for terminal #A is present in the third period in the first frequency band, and symbol (RU #A) 501_2 destined for terminal #A is present in the third period in the second frequency band.

As illustrated in FIG. 11, a modulated signal is present in the third frequency band at a tuning that is unrelated to the modulated signal of the first frequency band or the modulated signal of the second frequency band. For example, as in FIG. 11, first field 701_3, second field. 702_3, and data symbol 502_3 are present.

The configuration of data symbol 502_3 in such a case will be described. FIG. 6A and FIG. 6B are conceivable configurations of data symbol 502_3.

FIG. 6A illustrates an example of a configuration of data symbol 502_X in the $X^{th}$ frequency band. In this example, X is 3. In FIG. 6A, time is represented on the vertical axis, and frequency is (carriers are) represented on the horizontal axis. As illustrated in FIG. 6A, data symbol 502_X is configured of symbol (RU #X1) 601_1 destined for terminal #X1. Note that symbol (RU #X1) 601_1 destined for terminal #X1 is not a symbol (RU #A) destined for terminal #A (however, symbol (RU #X1) 601_1 destined for terminal #X1 may conceivably be a symbol (RU #A) destined for terminal #A).

FIG. 6B illustrates an example of a configuration of data symbol 502_X in the $X^{th}$ frequency band. In this example X is 3. In FIG. 6B, time is represented on the vertical axis, and frequency is (carriers are) represented on the horizontal axis. As illustrated in FIG. 6B, data symbol 502_X is configured of symbol (RU #X1) 601_1 destined for terminal #X1, symbol (RU #X2) 601_2 destined for terminal #X2, symbol (RU #X3) 601_3 destined for terminal #X3, and symbol (RU #X4) 601_4 destined for terminal #X4. Note that data symbol 502_X does not include a symbol (RU #A) destined for terminal #A (data symbol 502_X may conceivably include a symbol (RU #A) destined for terminal #A).

Although the example in FIG. 6B illustrates frequency division into four RUs, the number of frequency divisions is not limited to four. The number of frequency divisions, that is to say, the number of destination terminals may be 2 or more. Moreover, the number of carriers assigned to each terminal may be different. The configuration of data symbol 502_3 is not limited to the examples illustrated in FIG. 6A and FIG. 6B.

Although frequency division is performed in FIG. 6B, time division into four RUs may be performed if time is represented on the vertical axis and frequency is represented on the horizontal axis in FIG. 6B. The number of slots in the case of time division, that is to say, the number of destination terminals may be two or more, and the number of time slots assigned to each terminal may be different.

In one example, data symbol 502_3 has either one of the frame configurations illustrated in FIG. 6A and FIG. 6B.

As the example illustrated in FIG. 11 shows, a feature is that, in a given period, data symbols destined for the same terminal are present in the first frequency band and the second frequency band, and a data symbol destined for another terminal is present in the third frequency band. The timing at which first fields 701_1, 701_2, and 701_3 and second fields 702_1, 702_2, and 702_3 are transmitted is not limited to the example illustrated in FIG. 11.

A feature may be that, in a given period, data symbols destined for the same terminal are present in the first frequency band and the second frequency band.

Figure 12:
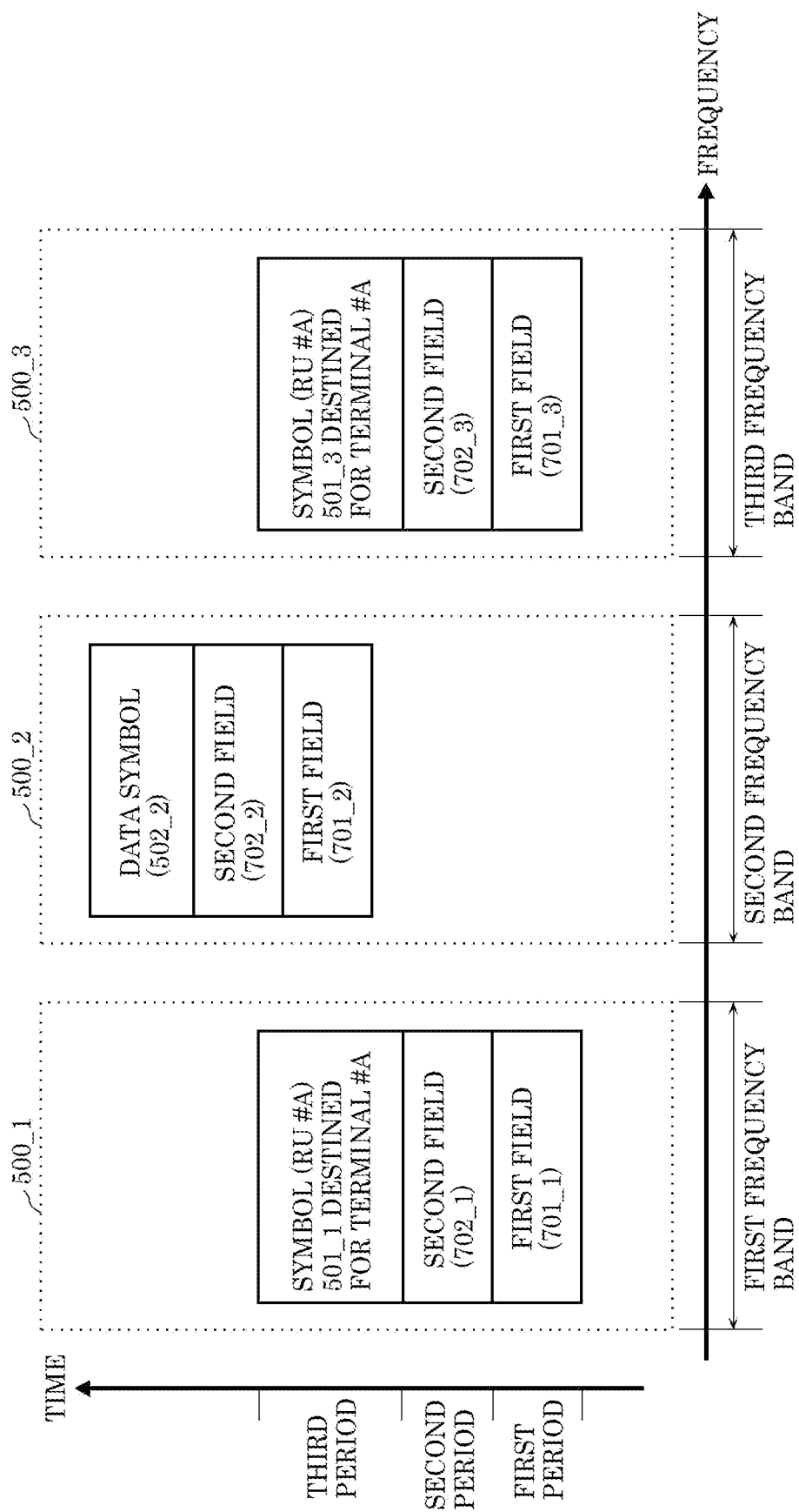
FIG. 12 illustrates an example of frame configurations.

FIG. 12 illustrates an example of a frame configuration of a modulated signal transmitted by the AP. Elements in FIG. 12 that operate the same as those in FIG. 5 and FIG. 7 have the same reference signs, and repeated description thereof will be omitted.

In FIG. 12, time is represented on the vertical axis, and frequency is (carriers are) represented on the horizontal axis. 500_1 indicates a frame configuration in the first frequency band, 500_2 indicates a frame configuration in the second frequency band, and 500_3 indicates a frame configuration in the third frequency band.

As illustrated in FIG. 12, first field 701_1 is present in the first period in the first frequency band. First field 701_3 is present in the first period in the third frequency band.

For example, first fields 701_1 and 701_3 include a symbol for the communication partner of the AP to perform signal detection, time synchronization, frequency synchronization, channel estimation, etc.

Second field 702_1 is present in the second period in the first frequency band. Second field 702_3 is present in the second period in the third frequency band.

Second field 701_1 is a field for transmitting control information to the communication partner of the AP, and includes, for example, information on the error encoding method used to generate symbol (RU #A) 501_1 destined for terminal #A, information on the modulation method of symbol (RU #A) 501_1 destined for terminal #A, and information on the transmitting method of symbol (RU #A) 501_1 destined for terminal #A. Second field 701_3 is a field for transmitting control information to the communication partner of the AP, and includes, for example, information on the error encoding method used to generate symbol (RU #A) 501_3 destined for terminal #A, information on the modulation method of symbol (RU #A) 501_3 destined for terminal #A, and information on the transmitting method of symbol (RU #A) 501_3 destined for terminal #A.

Symbol (RU #A) 501_1 destined for terminal #A is present in the third period in the first frequency band, and symbol (RU #A) 501_3 destined for terminal #A is present in the third period in the third frequency band.

As illustrated in FIG. 12, a modulated signal is present in the second frequency band at a ti that is unrelated to the modulated signal of the first frequency band or the modulated signal of the third frequency band. For example, as in FIG. 12, first field 701_2, second field. 702_2, and data symbol 502_2 are present.

The configuration of data symbol 502_2 in such a case will be described. FIG. 6A and FIG. 6B are conceivable configurations of data symbol 502_2.

FIG. 6A illustrates an example of a configuration of data symbol 502_X in the $X^{th}$ frequency band. In this example, X is 2. In FIG. 6A, time is represented on the vertical axis, and frequency is (carriers are) represented on the horizontal axis. As illustrated in FIG. 6A, data symbol 502_X is configured of symbol (RU #X1) 601_1 destined for terminal #X1. Note that symbol (RU #X1) 601_1 destined for terminal #X1 is not a symbol (RU #A) destined for terminal #A (however, symbol (RU #X1) 601_1 destined for terminal #X1 may conceivably be a symbol (RU #A) destined for terminal #A).

FIG. 6B illustrates an example of a configuration of data symbol 502_X in the $X^{th}$ frequency band. In this example, X is 2. In FIG. 6B, time is represented on the vertical axis, and frequency is (carriers are) represented on the horizontal axis. As illustrated in FIG. 6B, data symbol 502_X is configured of symbol (RU #X1) 601_1 destined for terminal #X1, symbol (RU #X2) 601_2 destined for terminal #X2, symbol (RU #X3) 601_3 destined for terminal #X3, and symbol (RU #X4) 601_4 destined for terminal #X4. Note that data symbol 502_X does not include a symbol (RU #A) destined for terminal #A (data symbol 502_X may conceivably include a symbol (RU #A) destined for terminal #A).

Although the example in FIG. 6B illustrates frequency division into four RUs, the number of frequency divisions is not limited to four. The number of frequency divisions, that is to say, the number of destination terminals may be 2 or more. Moreover, the number of carriers assigned to each terminal may be different. The configuration of data symbol 502_2 is not limited to the examples illustrated in FIG. 6A and FIG. 6B.

Although frequency division is performed in FIG. 6B, time division into four RUs may be performed if time is represented on the vertical axis and frequency is represented on the horizontal axis in FIG. 6B. The number of slots in the case of time division, that is to say, the number of destination terminals may be two or more, and the number of time slots assigned to each terminal may be different.

In one example, data symbol 502_3 has either one of the frame configurations illustrated in FIG. 6A and FIG. 6B.

As the example illustrated in FIG. 12 shows, a feature is that, in a given period, data symbols destined for the same terminal are present in the first frequency band and the third frequency band, and a data symbol destined for another terminal is present in the second frequency band. The timing at which first fields 701_1, 701_2, and 701_3 and second fields 702_1, 702_2, and 702_3 are transmitted is not limited to the example illustrated in FIG. 12.

A feature may be that, in a given period, data symbols destined for the same terminal are present in the first frequency band and the second frequency band.

Figure 13:
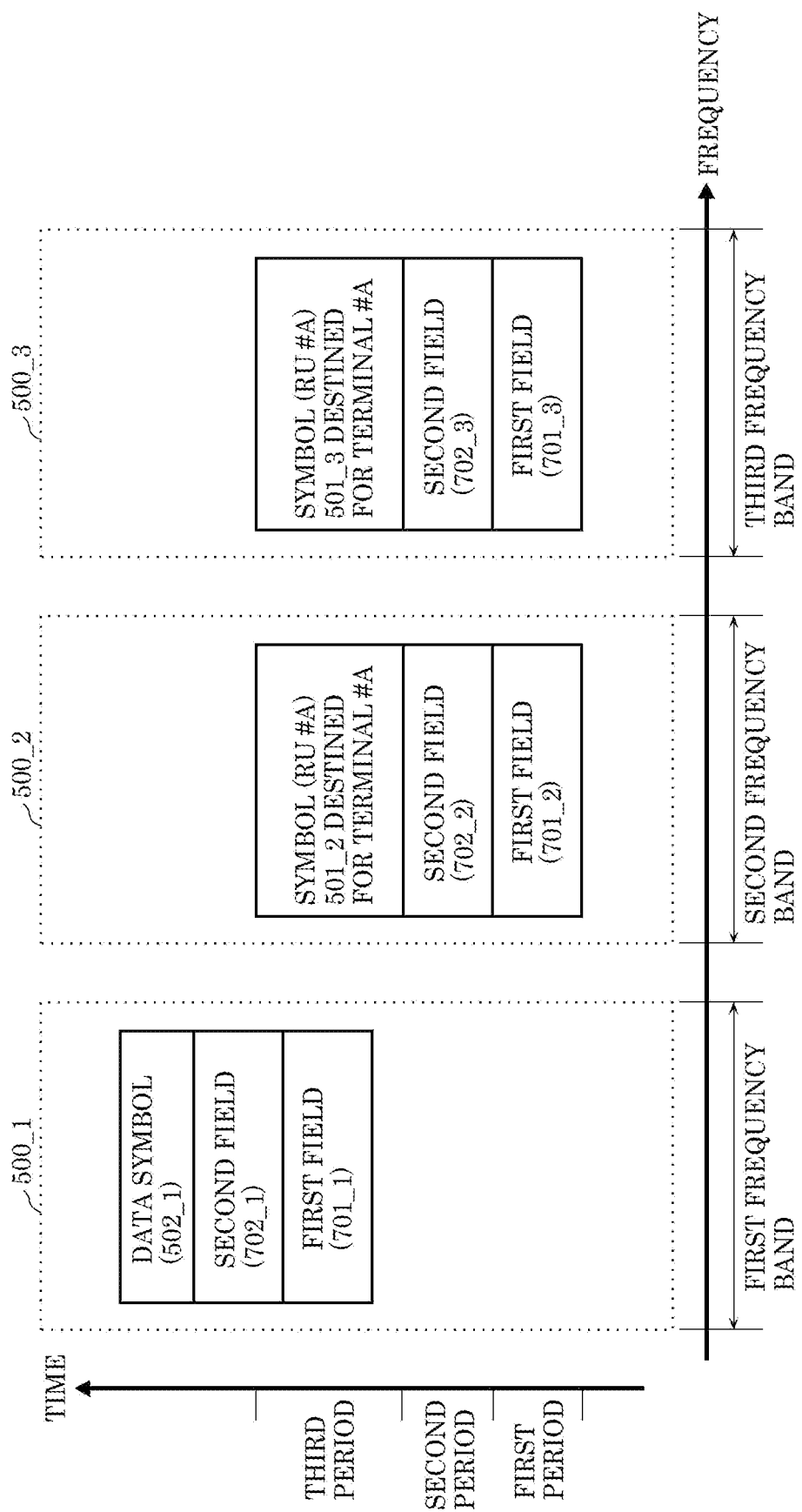
FIG. 13 illustrates an example of frame configurations.

FIG. 13 illustrates an example of a frame configuration of a modulated signal transmitted by the AP. Elements in FIG. 13 that operate the same as those in FIG. 5 and FIG. 7 have the same reference signs, and repeated description thereof will be omitted.

In FIG. 13, time is represented on the vertical axis, and frequency is (carriers are) represented on the horizontal axis. 500_1 indicates a frame configuration in the first frequency band, 500_2 indicates a frame configuration in the second frequency band, and 500_3 indicates a frame configuration in the third frequency band.

As illustrated in FIG. 13, first field 701_2 is present in the first period in the second frequency band. First field 701_3 is present in the first period in the third frequency band.

For example, first fields 701_2 and 701_3 include a symbol for the communication partner of the AP to perform signal detection, time synchronization, frequency synchronization, channel estimation, etc.

Second field 702_2 is present in the second period in the second frequency band. Second field 702_3 is present in the second period in the third frequency band.

Second field 701_2 is a field for transmitting control information to the communication partner of the AP, and includes, for example, information on the error encoding method used to generate symbol (RU #A) 501_2 destined for terminal #A, information on the modulation method of symbol (RU #A) 501_2 destined for terminal #A, and information on the transmitting method of symbol (RU #A) 501_2 destined for terminal #A. Second field 701_3 is a field for transmitting control information to the communication partner of the AP, and includes, for example, information on the error encoding method used to generate symbol (RU #A) 501_3 destined for terminal #A, information on the modulation method of symbol (RU #A) 501_3 destined for terminal #A, and information on the transmitting method of symbol (RU #A) 501_3 destined for terminal #A.

Symbol (RU #A) 501_2 destined for terminal #A is present in the third period in the second frequency band, and symbol (RU #A) 501_3 destined for terminal #A is present in the third period in the third frequency band.

As illustrated in FIG. 13, a modulated signal is present in the first frequency band at a timing that is unrelated to the modulated signal of the second frequency band or the modulated signal of the third frequency band. For example, as in FIG. 13, first field 701_1, second field 702_1, and data symbol 502_1 are present.

The configuration of data symbol 502_1 in such a case will be described. FIG. 6A and FIG. 6B are conceivable configurations of data symbol 502_1.

FIG. 6A illustrates an example of a configuration of data symbol 502_X in the $X^{th}$ frequency band. In this example, X is 1. In FIG. 6A, time is represented on the vertical axis, and frequency is (carriers are) represented on the horizontal axis. As illustrated in FIG. 6A, data symbol 502_X is configured of symbol (RU #X1) 601_1 destined for terminal #X1. Note that symbol (RU #X1) 601_1 destined for terminal #X1 is not a symbol (RU #A) destined for terminal #A (however, symbol (RU #X1) 601_1 destined for terminal #X1 may conceivably be a symbol (RU #A) destined for terminal #A).

FIG. 6B illustrates an example of a configuration of data symbol 502_X in the $X^{th}$ frequency band. In this example, X is 1. In FIG. 6B, time is represented on the vertical axis, and frequency is (carriers are) represented on the horizontal axis. As illustrated in FIG. 6B, data symbol 502_X is configured of symbol (RU #X1) 601_1 destined for terminal #X1, symbol (RU #X2) 601_2 destined for terminal #X2, symbol (RU #X3) 601_3 destined for terminal #X3, and symbol (RU #X4) 601_4 destined for terminal #X4. Note that data symbol 502_X does not include a symbol (RU #A) destined for terminal #A (data symbol 502_X may conceivably include a symbol (RU #A) destined for terminal #A).

Although the example in FIG. 6B illustrates frequency division into four RUs, the number of frequency divisions is not limited to four. The number of frequency divisions, that is to say, the number of destination terminals may be 2 or more. Moreover, the number of carriers assigned to each terminal may be different. The configuration of data symbol 502_1 is not limited to the examples illustrated in FIG. 6A and FIG. 6B.

Although frequency division is performed in FIG. 6B, time division into four RUs may be performed if time is represented on the vertical axis and frequency is represented on the horizontal axis in FIG. 6B. The number of slots in the case of time division, that is to say, the number of destination terminals may be two or more, and the number of time slots assigned to each terminal may be different.

In one example, data symbol 502_3 has either one of the frame configurations illustrated in FIG. 6A and FIG. 6B.

As the example illustrated in FIG. 13 shows, a feature is that, in a given period, data symbols destined for the same terminal are present in the second frequency band and the third frequency band, and a data symbol destined for another terminal is present in the first frequency band. The timing at which first fields 701_1, 701_2, and 701_3 and second fields 702_1, 702_2, and 702_3 are transmitted is not limited to the example illustrated in FIG. 13.

A feature may be that, in a given period, data symbols destined for the same terminal are present in the first frequency band and the second frequency band.

Figure 14:
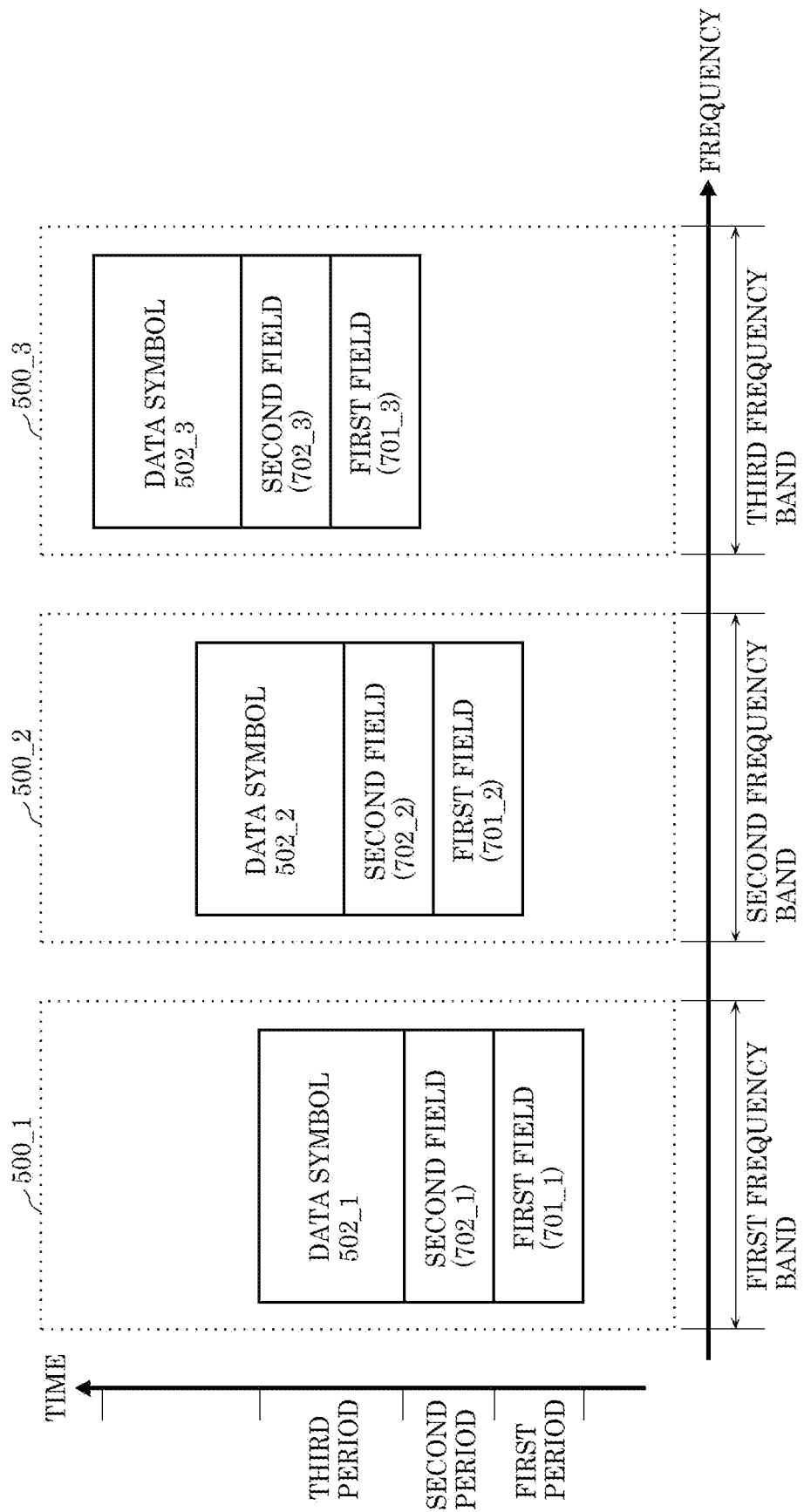
FIG. 14 illustrates an example of frame configurations.

FIG. 14 illustrates one example of a frame configuration of a modulated signal transmitted by the AP. Elements in FIG. 14 that operate the same as those in FIG. 5 and FIG. 7 have the same reference signs, and repeated description thereof will be omitted.

In FIG. 14, time is represented on the vertical axis, and frequency is (carriers are) represented on the horizontal axis. 500_1 indicates a frame configuration in the first frequency band, 500_2 indicates a frame configuration in the second frequency band, and 500_3 indicates a frame configuration in the third frequency band.

As illustrated in FIG. 14, first field 701_1 is present in the first period in the first frequency band.

For example, first field 701_1 includes a symbol for the communication partner of the AP to perform signal detection, time synchronization, frequency synchronization, channel estimation, etc.

Second field 702_1 is present in the second period in the first frequency band.

Second field 701_1 is a field for transmitting control information to the communication partner of the AP, and includes, for example, information on the error encoding method used to generate data symbol 502_1, information on the modulation method of data symbol 502_1, and information on the transmitting method of data symbol 502_1.

Data symbol 502_1 is present in the third period in the first frequency band.

As illustrated in FIG. 14, a modulated signal is present in the second frequency band at a timing that is unrelated to the modulated signal of the first frequency band. Moreover, a modulated signal is present in the third frequency band at a timing that is unrelated to the modulated signal of the first frequency band. Moreover, a modulated signal is present in the third frequency band at a timing that is unrelated to the modulated signal of the second frequency band.

For example, as in FIG. 14, first field 701_2, second field 702_2, and data symbol 502_2 are present in the second frequency band. Moreover, first field 701_3, second field 702_3, and data symbol 502_3 are present in the third frequency band.

The configuration of data symbols 502_1, 502_2, and 502_3 in such a case will be described. FIG. 6A and FIG. 6B are conceivable configurations of data symbols 502_1, 502_2, and 502_3. Data symbol 502_1 either has the configuration illustrated in FIG. 6A or the configuration illustrated in FIG. 6B. Data symbol 502_2 either has the configuration illustrated in FIG. 6A or the configuration illustrated in FIG. 6B. Data symbol 502_3 either has the configuration illustrated in FIG. 6A or the configuration illustrated in FIG. 5B.

FIG. 6A illustrates an example of a configuration of data symbol 502_X in the $X^{th}$ frequency band. In this example, X is 1, 2, or 3. In FIG. 6A, time is represented on the vertical axis, and frequency is (carriers are) represented on the horizontal axis. As illustrated in FIG. 6A, data symbol 502_X is configured of symbol (RU #X1) 601_1 destined for terminal #X1.

FIG. 6B illustrates an example of a configuration of data symbol 502_X in the $X^{th}$ frequency band. In this example, X is 1, 2, or 3. In FIG. 6B, time is represented on the vertical axis, and frequency is (carriers are) represented on the horizontal axis. As illustrated in FIG. 6B, data symbol 502_X is configured of symbol (RU #X1) 601_1 destined for terminal #X1, symbol (RU #X2) 601_2 destined for terminal #X2, symbol (RU #X3) 601_3 destined for terminal #X3, and symbol (RU #X4) 601_4 destined for terminal #X4.

Although the example in FIG. 6B illustrates frequency division into four RUs, the number of frequency divisions is not limited to four. The number of frequency divisions, that is to say, the number of destination terminals may be 2 or more. Moreover, the number of carriers assigned to each terminal may be different.

Although frequency division is performed in FIG. 6B, time division into four RUs may be performed if time is represented on the vertical axis and frequency is represented on the horizontal axis in FIG. 6B. The number of slots in the case of time division, that is to say, the number of destination terminals may be two or more, and the number of time slots assigned to each terminal may be different.

This configuration may have the following feature. Data symbol 502_1 and data symbol 502_2 do not include symbols (RUs) destined for the same terminal, data symbol 502_1 and data symbol 502_3 do not include symbols (RUs) destined for the same terminal, and data symbol 502_2 and data symbol 502_3 do not include symbols (RUs) destined for the same terminal.

However, this configuration need not have the above feature.

The frame configurations illustrated in FIG. 7, FIG. 8, FIG. 9, FIG. 10, FIG. 11, FIG. 12, FIG. 13, and FIG. 14 may include symbols other than those illustrated. For example, these figures may include a preamble, a reference symbol, a control information symbol, a pilot symbol, a mid-amble, a null symbol. (absence of a symbol), and/or a null carrier (absence of a symbol). FIG. 6A and FIG. 6B may include symbols other than those illustrated. For example, these figures may include a preamble, a reference symbol, a control information symbol, a pilot symbol, a mid-amble, a null symbol (absence of a symbol), and/or a null carrier (absence of a symbol).

For example, an AP that transmits a modulated signal using the third transmitting method or the sixth transmitting method selects any one of the frame configurations illustrated in FIG. 7, FIG. 8, FIG. 9, FIG. 10, FIG. 11, FIG. 12, FIG. 13, and FIG. 14, and transmits the modulated signal.

As another example, any two or more of the frame configurations illustrated in, for example, FIG. 7, FIG. 8, FIG. 9, FIG. 10, FIG. 11, FIG. 12, FIG. 13, and FIG. 14 are selection candidates, and the AP that transmits the modulated signal using the third transmitting method or the sixth transmitting method selects one frame configuration from among the selection candidates and transmits the modulated signal.

Such an AP that transmits a modulated signal using the third transmitting method or the sixth transmitting method can be said to have the following characteristics.

Figure 15:
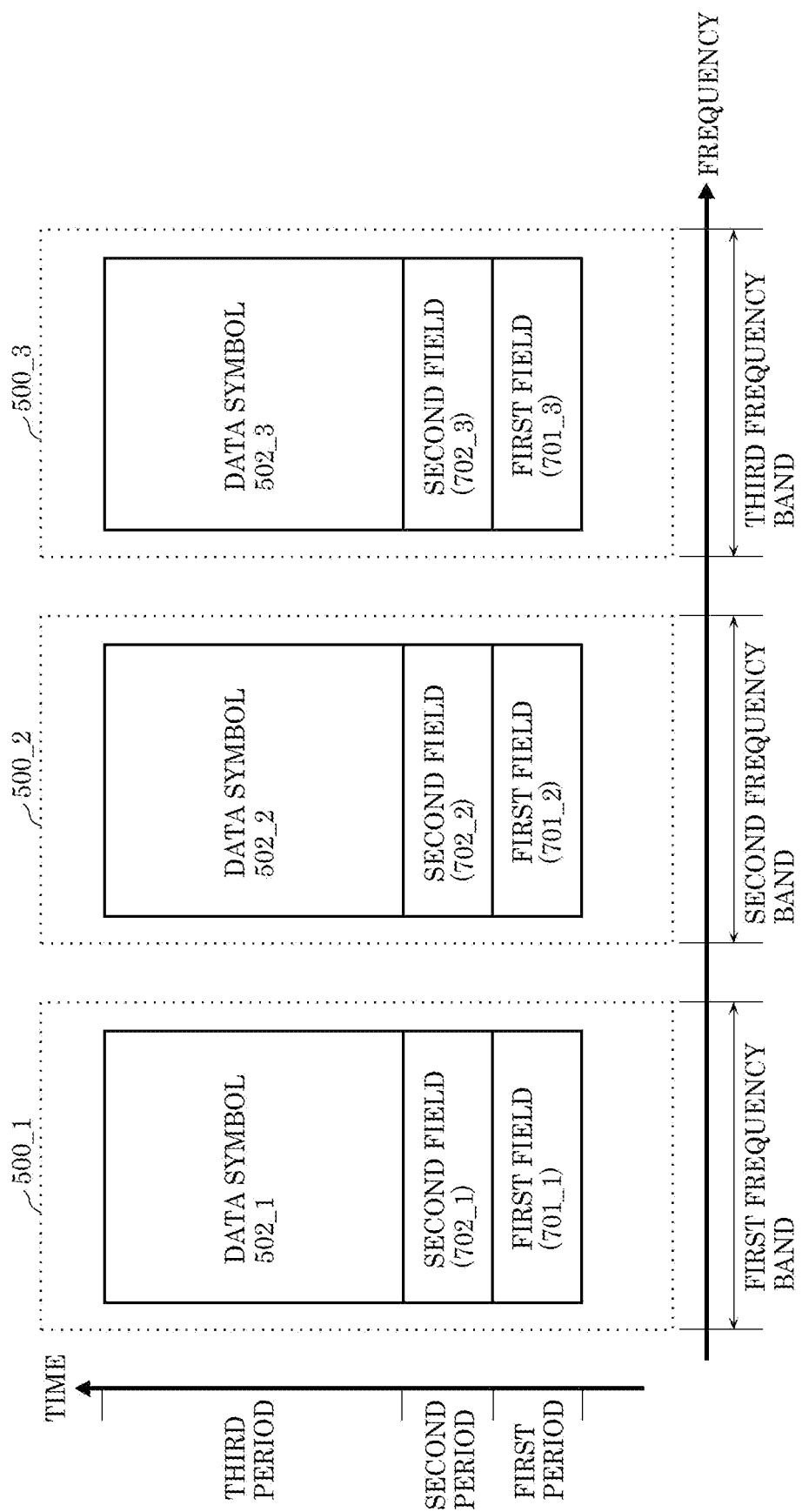
FIG. 15 illustrates an example of frame configurations.

Like in FIG. 15, when, in the third period, data symbol 502_1 is present in the first frequency band, data symbol 502_2 is present in the second frequency band, and data symbol 502_3 is present in the third frequency band, neither data symbol 502_1, data symbol 502_2, nor data symbol 502_3 has a configuration like that illustrated in FIG. 6B.

Like in FIG. 16, when, in the third period, data symbol 502_1 is present in the first frequency band and data symbol 502_2 is present in the second frequency band, neither data symbol 502_1 nor data symbol 502_2 has a configuration like that illustrated in FIG. 6B.

Like in FIG. 17, when, in the third period, data symbol 502_1 is present in the first frequency band and data symbol 502_3 is present in the third frequency band, neither data symbol 502_1 nor data symbol 502_3 has a configuration like that illustrated in FIG. 6B.

Like in FIG. 18, when, in the third period, data symbol 502_2 is present in the second frequency band and data symbol 502_3 is present in the third frequency band, neither data symbol 502_2 nor data symbol 502_3 has a configuration like that illustrated in FIG. 6B.

Using a frame configuration having such a feature achieves the advantageous effect that data transmission speed in the modulated signal transmitted by the AP is improved. This will be described using, for example, the frame configuration illustrated in FIG. 15 as an example.

For example, in FIG. 15, assume that data symbol 502_1 has a configuration like that in FIG. 6B, For example, consider a case in which the number of symbols (RUs #X1) 601_1 destined for terminal #X1 is the greatest with respect to time. Here, in another RU, while symbol (RU #X1) 601_1 destined for terminal #X1 is present, there is a time interval in which no symbol is present. Then, in data symbol 502_2 in the second frequency band and data symbol 502_3 in the third frequency band as well, while symbol (RU #X1) 601_1 destined for terminal #X1 is present, there is a time interval in which no symbol is present. In other words, adverse effects resulting from there being a time interval in which no symbol is present while symbol (RU #X1) 601_1 destined for terminal #X1 is present affect even the second frequency band and the third frequency band, which adversely reduces data transmission speed.

However, when the AP transmits a modulated signal using the third transmitting method or the sixth transmitting method having the above-described features, the above-described adverse effects can be reduced, which improves data transmission speed.

When the AP transmits a modulated signal using the third transmitting method or the sixth transmitting method like in FIG. 7, FIG. 8, FIG. 9, and FIG. 10, it is possible to achieve the advantageous effect that high-speed data transmission can be realized with a specific terminal.

When the AP transmits a modulated signal using the third transmitting method or the sixth transmitting method like in FIG. 11, FIG. 12, and FIG. 13, it is possible to achieve the advantageous effects that high-speed data transmission can be realized with a specific terminal, and multi-access, which enables data to be transmitted to a plurality of terminals, is possible.

Although the above describes an example of operations performed when there are three frequency bands—the first frequency band, the second frequency band, and the third frequency band—but the present disclosure is not limited to this example. The above can be implemented in the same manner so long as there are two or more frequency bands.

For example, the following cases are conceivable when there are two types of frequency bands, namely an $A^{th}$ frequency band and a $B^{th}$ frequency band.

Case X:

When the $A^{th}$ frequency band is the 2.4 GHz band and the $B^{th}$ frequency band is the 5 GHz band, the above can be carried out where the $A^{th}$ frequency band is considered to be the first frequency band described above, and the $B^{th}$ frequency band is considered to be the second frequency band described above.

Case Y:

When the $A^{th}$ frequency band is the 2.4 GHz band and the $B^{th}$ frequency band is the 6 GHz band, the above can be carried out where the $A^{th}$ frequency band is considered to be the first frequency band described above, and the $B^{th}$ frequency band is considered to be the third frequency band described above.

Case Z:

When the $A^{th}$ frequency band is the 5 GHz band and the $B^{th}$ frequency band is the 6 GHz band, the above can be carried out where the $A^{th}$ frequency band is considered to be the second frequency band described above, and the $B^{th}$ frequency band is considered to be the third frequency band described above.

Moreover, when there are four or more frequency bands, and the above-described first frequency band, second frequency band, and third frequency band are included in these four frequency bands, the above can be implemented in the same manner.

Moreover, the advantageous effects described in the present embodiment can be achieved by the AP transmitting the modulated signal described in the present embodiment and a terminal that receives the modulated signal performing processing, such as demodulation and error correction decoding, on the received modulated signal to obtain the data.

Supplemental Note 1

As a matter of course, the present disclosure may be carried out by combining embodiments and other information such as the supplementary notes described in the present specification.

The configuration of the access point is not limited to the example illustrated in FIG. 1; so long as the access point includes one or more or a plurality of transmit antennas for each frequency band, and generates and transmits one or more or a plurality of modulated signals for each frequency band, the present disclosure can be carried out.

The embodiments are merely examples. For example, while a "modulation method, an error correction coding method (error correction code, code length, coding rate, etc., to be used), control information, etc." are exemplified, it is possible to carry out the present disclosure with the same configuration even when other types of a "modulation method, an error correction coding method (error correction code, code length, coding rate, etc., to be used), control information, etc." are applied.

Regarding the modulation method, even when a modulation method other than the modulation methods described herein is used, it is possible to carry out the embodiments and the other subject matter described herein. For example, amplitude phase shift keying (APSK) (such as 16APSK, 64APSK, 128APSK, 256APSK, 1024APSK and 4096APSK), pulse amplitude modulation (PAM) (such as 4PAM, 8PAM, 16PAM, 64PAM, 128PAM, 256PAM, 1024PAM and 4096PAM), phase shift keying (PSK) (such as BPSK, QPSK, 8PSK, 16PSK, 64PSK, 128PSK, 256PSK, 1024PSK and 4096PSK), and quadrature amplitude modulation (QAM) (such as 4QAM, 8QAM, 16QAM, 64QAM, 128QAM, 256QAM, 1024QAM and 4096QAM) may be applied, or in each modulation method, uniform mapping or non-uniform mapping may be performed. Moreover, a method for arranging 2, 4, 8, 16, 64, 128, 256, 1024, etc., signal points on an I-Q plane (a modulation method having 2, 4, 8, 16, 64, 128, 256, 1024, etc., signal points) is not limited to a signal point arrangement method of the modulation methods described herein.

In the present specification, it can be considered that the device which includes the transmitting device, the receiving device, and the communication device is a communications and broadcast apparatus, such as a broadcast station, a base station, an access point, a terminal or a mobile phone, or a communication apparatus such as a television, a radio, or a personal computer. Moreover, it can also be considered that the transmitting device and the receiving device according to the present disclosure are each a device having a communication function, which is formed so as to be connectable via some interface to a device for executing an application in, for example, a television, a radio, a personal computer or a mobile phone. Moreover, in the present embodiment, symbols other than data symbols, such as pilot symbols (preamble, unique word, post-amble, reference symbol, mid-amble, etc.), control information symbols, or null symbols, etc., may be arranged in any way in a frame. Here, the terms "pilot symbol" and "control information symbol" are used, but the naming of such symbols is not important; the functions that they perform are.

A pilot symbol may be a known symbol that is modulated using PSK modulation in a transceiver, and the receiver may use this symbol to perform, for example, frequency synchronization, time synchronization, channel estimation (channel state information (CSI) estimation) for each modulated signal, and signal detection. Alternatively, a symbol transmitted by a transmitter can be known by a receiver by the receiver being synchronized.

The control information symbol is a symbol for transmitting information required to be transmitted to a communication partner in order to establish communication pertaining to anything other than data (such as application data) (this information is, for example, the modulation method, error correction coding method, coding rate of the error correction encoding method used in the communication, and/or upper layer settings information).

Note that the present disclosure is not limited to the embodiments; various modifications may be made to the embodiments. For example, each embodiment is described as being implemented as a communication device, but this example is not limiting, each embodiment may implement a corresponding communication method as software.

Note that a program for executing the above-described communication method may be stored in read only memory (ROM) in advance to cause a central processing unit (CPU) to operate this program.

Moreover, the program for executing the communication method may be stored in a computer-readable storage medium, the program stored in the recording medium may be recorded in RAM in a computer, and the computer may be caused to operate according to this program.

Each configuration of each of the above-described embodiments, etc., may be realized as a large scale integration (LSI) circuit, which is typically an integrated circuit that includes an input terminal and an output terminal. These integrated circuits may be formed as separate chips, or may be formed as one chip so as to include the entire configuration or part of the configuration of each embodiment. LSI is described here, but the circuit may also be referred to as an IC, a system LSI circuit, a super LSI circuit or an ultra LSI circuit depending on the degree of integration. Moreover, the circuit integration technique is not, limited to LSI, and may be realized by a dedicated circuit or a general purpose processor. After manufacturing of the LSI circuit, a programmable FPGA or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology. Adaption of biotechnology, for example, is a possibility.

The transmitting method supported by the base station and terminal may be a multi-carrier scheme such as OFDM, and may be a single-carrier scheme. The base station may support both a multi-carrier scheme and a single-carrier scheme. In such cases, a plurality of methods may be used to generate the single-carrier scheme modulated signal, and implementation is possible regardless of which method is used. Examples of single-carrier schemes include discrete Fourier transform (DFT)-spread orthogonal frequency division multiplexing (OFDM), trajectory constrained DFT-Spread OFDM, OFDM based single carrier (SC), single carrier (SC)-frequency division multiple access (FDMA), and guard interval DFT-spread OFDM.

Note that at least one of the field programmable gate array (FPGA) and the central processing unit (CPU) may be configured to download, via wired or wireless communication, some or all of the software required to implement the communication method described in the present disclosure. At least one of the FPGA and the CPU may be further configured to download, via wired or wireless communication, some or all of software required to perform updates. The downloaded software may be stored in storage, and based on the stored software, at least of the FPGA and the CPU may be operated to implement the digital signal processing described in the present disclosure.

Here, a device including at least one of the FPGA and the CPU may connect to a communications modem over a wired or wireless connection, and the device and the communications modem may implement the communication method described in the present disclosure.

For example, a communication device such as the base station, the AP, or the terminal described in the present specification may include at least one of the FPGA and the CPU, and include an interface for obtaining, from an external source, software for operating at least one of the FPGA and the CPU. The communication device may further include storage for storing software obtained from the external source, and implement the signal processing described in the present disclosure by operating the FPGA and the CPU based on the stored software.

In the frame configurations illustrated in, for example, FIG. 5A, FIG. 5B, FIG. 5C, FIG. 5D, FIG. 5E, FIG. 5F, FIG. 5G, FIG. 5H, FIG. 5I, FIG. 5J, FIG. 5K, FIG. 7, FIG. 8, FIG. 9, FIG. 10, FIG. 11, FIG. 12, FIG. 13, and FIG. 14, in the first frequency band transmitting method the second frequency band transmitting method, or the third frequency band transmitting method, a multiple-input multiple-output (MIMO) transmission scheme that transmits a plurality of modulated signals from a plurality of antennas may be used.

Moreover, a MIMO transmission scheme that transmits a plurality of modulated signals from a plurality of antennas may be used for one or more RUs among the RUs illustrated in FIG. 6B.

Supplemental Note 2

In the present specification, the first frequency band is exemplified as the 2.4 GHz band, the second frequency band is exemplified as the 5 GHz band, and the third frequency band is exemplified as the 6 (or 7) GHz band, but the first frequency band, the second frequency band, and the third frequency band are not limited to these examples. The following is also acceptable.

For example, assume the 2.4 GHz band includes a plurality of channels, the 5 GHz includes a plurality of channels, and the 6 (or 7) GHz band includes a plurality of channels. Under these conditions, the following cases are conceivable.

First Case:
The first frequency band is a first channel of the 2.4 GHz band, the second frequency band is a second channel of the 2.4 GHz band, and the third frequency band is a first channel of the 5 GHz band.

Second Case:
The first frequency band is a first channel of the 2.4 GHz band, the second frequency band is a first channel of the 5 GHz band, and the third frequency band is a second channel of the 5 GHz band.

Third Case:
The first frequency band is a first channel of the 2.4 GHz band, the second frequency band is a second channel of the 2.4 GHz band, and the third frequency band is a first channel of the 6 (or 7) GHz band.

Fourth Case:
The first frequency band is a first channel of the 2.4 GHz band, the second frequency band is a first channel of the 6 (or 7) GHz band, and the third frequency band is a second channel of the 6 (or 7) GHz band.

Fifth Case:
The first frequency band is a first channel of the 5 GHz band, the second frequency band is a second channel of the 5 GHz band, and the third frequency band is a first channel of the 6 (or 7) GHz band, Sixth Case:
The first frequency band is a first channel of the 5 GHz band, the second frequency band is a first channel of the 6 (or 7) GHz band, and the third frequency band is a second channel of the 6 (or 7) GHz band, Seventh Case:
The first frequency band is a first channel of the 2.4 GHz band, the second frequency band is a second channel of the 2.4 GHz band, and the third frequency band is a third channel of the 2.4 GHz band.

Eighth Case:
The first frequency band is a first channel of the 5 GHz band, the second frequency band is a second channel of the 5 GHz band, and the third frequency band is a third channel of the 5 GHz band.

Ninth Case:
The first frequency band is a first channel of the 6 (or 7) GHz band, the second frequency band is a second channel of the 6 (or 7) GHz band, and the third frequency band is a third channel of the 6 (or 7) GHz band.

Embodiment 3

In the present embodiment, additional information pertaining to Embodiment 1 and Embodiment 2 will be given.

FIG. 1 illustrates the configuration of a communication device such as an AP, for example.

Figure 19A:
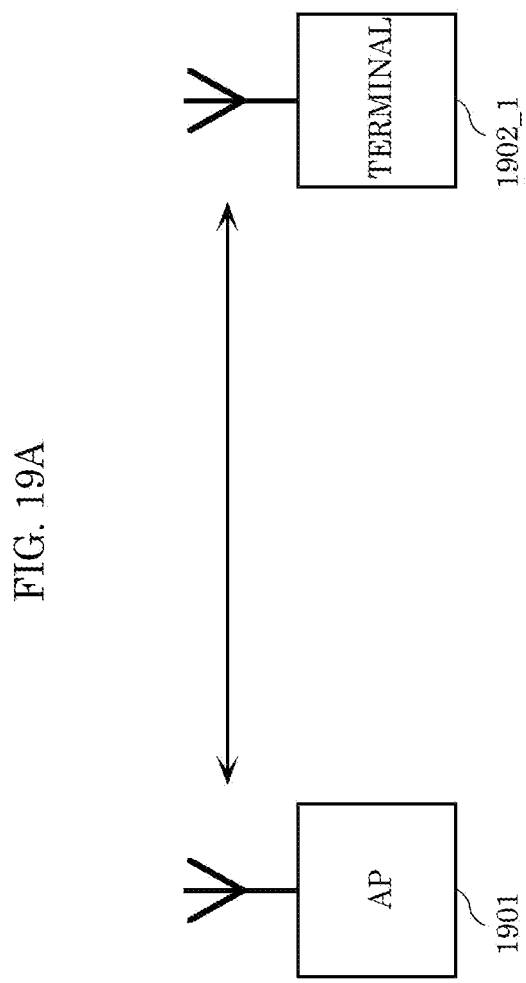
FIG. 19A illustrates one example of a communication state of an access point.

FIG. 19A illustrates one example of a communication state of an AP. As illustrated in FIG. 19A, an AP labeled 1901 communicates with terminal 1902_1.

Figure 19B:
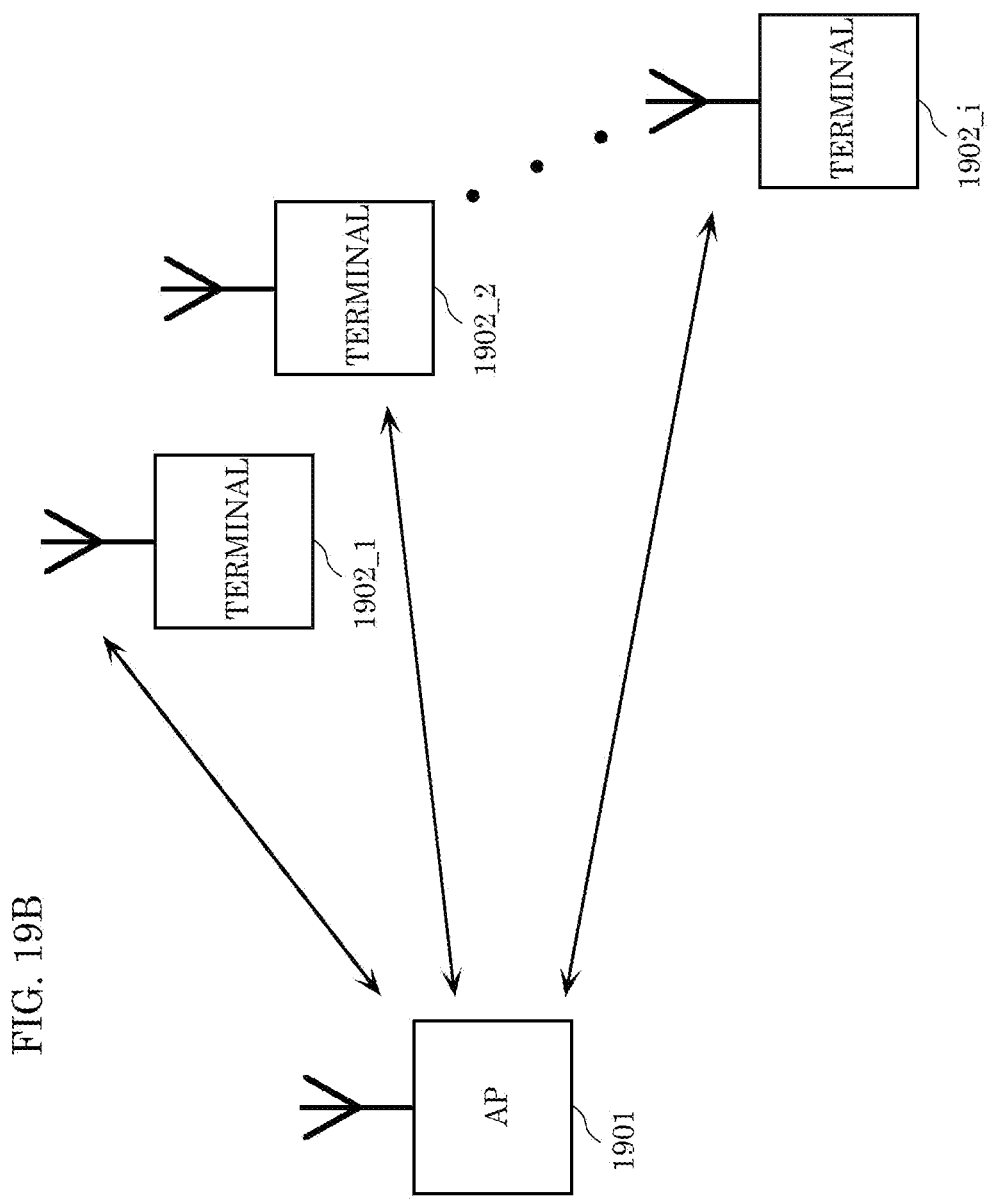
FIG. 19B illustrates one example of a communication state of an access point.

FIG. 19B illustrates one example of a communication state of an AP. As illustrated in FIG. 19B, an AP labeled 1901 communicates with terminals 1902_1 (i is an integer that is greater than or equal to 1 and less than or equal to N; N is an integer that: is greater than or equal to 2). In other words, the AP communicates with two or more terminals.

The AP according to Embodiment 1 and Embodiment 2, etc., assumes a communication state like those illustrated in FIG. 19A and FIG. 19B.

First, operations performed by the AP (communication device) illustrated in FIG. 1 upon transmitting a modulated signal using first frequency band 201, second frequency band 202, and third frequency band 203 will be described.

Communication device 113 receives an input of signal 114 including data, and outputs data 109.

Transmission data processor 107 receives inputs of data 109 and control signal 112, and outputs first data 101_1, second data 101_2, and third data. 101_3 based on control signal 112.

For example, when the AP transmits a modulated signal of first frequency band 201, transmission data processor 107 outputs first data 101_1, when the AP transmits a modulated signal of second frequency band 202, transmission data processor 107 outputs second data 101_2, and the AP transmits a modulated signal of third frequency band 203, transmission data processor 107 outputs third data 101_3.

In one example, when the AP transmits a modulated signal of first frequency band 201, a modulated signal of second frequency band 202, and a modulated signal of third frequency band 203, transmission data processor 107 outputs first data 101_1, second data 101_2, and third data 101_3. For example, the set of frequency bands that are used concurrently are as described in Embodiment 1 and Embodiment 2 and the like.

Transceiver device 102_1 receives inputs of first data 101_1 and control signal 112, performs processing such as error correction encoding and mapping based on information included in control signal 112, such as information on the transmitting method, modulation method, and error correction coding method, and generates and outputs first transmission signal 103_1 of first frequency band 201, First modulated signal transmission signal 103_1 is then output from antenna 104_1 as radio waves.

Transceiver device 102_2 receives inputs of second data 101_2 and control signal 112, performs processing such as error correction encoding and mapping based on information included in control signal 112, such as information on the transmitting method, modulation method, and error correction coding method, and generates and outputs second transmission signal 103_2 of second frequency band 202. Second modulated signal transmission signal 103_2 is then output from antenna 104_2 as radio waves.

Transceiver device 102_3 receives inputs of third data 101_3 and control signal 112, performs processing such as error correction encoding and mapping based on information included in control signal 112, such as information on the transmitting method, modulation method, and error correction coding method, and generates and outputs third transmission signal 103_3 of third frequency band 203. Third modulated signal transmission signal 103_3 is then output from antenna 104_3 as radio waves.

Note that each of antennas 104_1, 104_2, and 104_3 includes one or a plurality of antennas. When each antenna includes a plurality of antennas, a plurality of modulated signals are transmitted, which allows for the use of MIMO (or multiple-input single-output (MISO)).

Next, operations related to reception by the communication device illustrated in FIG. 1 will be described. When there is a modulated signal of first frequency band 201 transmitted by a terminal, transceiver device 102_1 included in the AP (communication device) illustrated in FIG. 1 receives an input of first received signal 199_1 received by antenna 105_1, performs processing such as demodulation (mapping) and error correction decoding, and outputs first data group 106_1.

When there is a modulated signal of second frequency band 202 transmitted by a terminal, transceiver device 102_2 included in the AP (communication device) illustrated in FIG. 1 receives an input of second received signal 199_2 received by antenna 105_2, performs processing such as demodulation (mapping) and error correction decoding, and outputs second data group 106_2.

When there is a modulated signal of third frequency hand 203 transmitted by a terminal, transceiver device 102_3 included in the AP (communication device) illustrated in FIG. 1 receives an input of third received signal 199_3 received by antenna 105_3, performs processing such as demodulation (mapping) and error correction decoding, and outputs third data group 106_3.

Reception data processor 108 receives inputs of first data group 106_1, second data group 106_2, and third data group 106_3, and outputs received data group 110.

Controller 111 receives an input of received data group 110, determines one or more frequency bands for modulated signal transmissions from among the first frequency band, the second frequency band, and the third frequency band, and outputs control signal 112 including information indicating the determination. Controller 111 also outputs control signal 112 including information indicating the transmitting method, modulation method, and error correction coding method of each modulated signal to be transmitted.

Note that each of antennas 105_1, 105_2, and 105_3 includes one or a plurality of antennas.

Although the configuration illustrated in FIG. 1 is exemplified as including a transmission and reception element for a first frequency hand modulated signal, a transmission and reception element for a second frequency band modulated signal, and a transmission and reception element for a third frequency band modulated signal, the AP is capable of implementing the embodiments of the present specification if it includes two or more of any of the transmission and reception element for the first frequency band modulated signal, the transmission and reception element for the second frequency band modulated signal, and the transmission and reception element for the third frequency band modulated signal.

The terminal that is the communication partner of AP 1901 illustrated in FIG. 19A and FIG. 19B may also have the configuration illustrated in FIG. 1, for example. Although the configuration illustrated in FIG. 1 is exemplified as including a transmission and reception element for a first frequency band modulated signal, a transmission and reception element for a second frequency band modulated signal, and a transmission and reception element for a third frequency band modulated signal, the AP is capable of implementing the embodiments of the present specification if it includes two or more of any of the transmission and reception element for the first frequency band modulated signal, the transmission and reception element for the second frequency band modulated signal, and the transmission and reception element for the third frequency band modulated signal.

FIG. 20A illustrates a configuration of a transmission unit included in transceiver devices 102_1, 102_2, and 102_3 illustrated in FIG. 1.

Error correction coding group 2002 receives inputs of control signal 2000 and data 2001, performs error correction coding based on information included in control signal 2000 about the error correction coding method, such as the type of code, code length, and coding rate, etc., and outputs encoded data group 2003. Error correction coding group 2002 may include one or more error correction coding units. Accordingly, encoded data group 2003 includes data in one or more code words.

Signal processing group 2004 receives inputs of control signal 2000 and encoded data group 2003, performs processing such as mapping (modulation), precoding, and interleaving based on control signal 2000, and outputs modulated signal group 2005.

For example, when signal processing group 2004 outputs a single modulated signal, signal processing group 2004, for example, performs interleaving and mapping processing, and outputs a single modulated signal as modulated signal group 2005. When signal processing group 2004 outputs a plurality of modulated signals, signal processing group 2004, for example, performs interleaving, mapping, and if necessary, precoding, and outputs a plurality of modulated signals as modulated signal group 2005.

Wireless communication processing group 2006 receives inputs of control signal 2000 and modulated signal group 2005, performs, based on control signal 2000, processing for generating, for example, an orthogonal frequency division multiplexing (OFDM) signal and processing such as quadrature modulation and frequency conversion, and outputs transmission signal group 2007. For example, when modulated signal group 2005 includes N modulated signals, wireless communication processing group 2006 generates transmission signal group 2007 of N transmission signals. N is an integer that is greater than or equal to 1. Transmission signal group 2005 is then transmitted from an antenna as radio waves. When transmission signal group 2005 includes a plurality of transmission signals, transmission signal group 2005 is output as radio waves using a plurality of antennas. When MIMO transmission is used, the plurality of modulated signals are transmitted at the same frequency and same time.

FIG. 20B illustrates a configuration of a reception unit included in transceiver devices 102_1, 102_2, and 102_3 illustrated in FIG. 1.

Wireless communication processing group 2052 receives inputs of control signal 2050 and received signal group 2051, performs processing for frequency conversion, quadrature demodulation, and OFDM, and outputs baseband signal group 2053. In this example, received signal group 2051 includes one or more received signals, and baseband signal group 2053 includes one or more baseband signals.

Signal processing group 2054 receives inputs of control signal 2050 and baseband signal group 2053, performs, for example, signal detection, time synchronization, frequency synchronization, frequency offset estimation, and/or channel estimation, performs demapping, and outputs reception bit log-likelihood 2055.

Error correction decoding group 2056 receives inputs of control signal 2050 and reception bit log-likelihood 2055, performs error correction decoding based on information indicating the error correction coding method that is included in control signal 2050, and outputs received data 2057.

In FIG. 21A, (1) and (2) indicate examples of bandwidths used when, for example, an AP (or terminal) transmits a modulated signal using the first frequency band.

In (1) in FIG. 21A, frequency is represented on the horizontal axis and time is represented on the vertical axis. Moreover, transmission symbol 2101, which is a symbol included in the modulated signal, is a 20 MHz symbol.

In (2) in FIG. 21A, frequency is represented on the horizontal axis and time is represented on the vertical axis. Moreover, transmission symbol 2101, which is a symbol included in the modulated signal, is a 40 MHz symbol.

In this way, when, for example, an AP (or terminal) transmits a modulated signal using the first frequency band, the bandwidth that is used is 20 MHz or 40 MHz. However, (1) and (2) in FIG. 21A are merely examples.

In FIG. 21B, (1), (2), (3), and (4) indicate examples of bandwidths used when, for example, an AP (or terminal) transmits a modulated signal using the second frequency band.

In (1) in FIG. 21B, frequency is represented on the horizontal axis and time is represented on the vertical axis. Moreover, transmission symbol 2101, which is a symbol included in the modulated signal, is a 20 MHz symbol, in (2) in FIG. 21B, frequency is represented on the horizontal axis and time is represented on the vertical axis. Moreover, transmission symbol 2101, which is a symbol included in the modulated signal, is a 40 MHz symbol.

In (3) in FIG. 21B, frequency is represented on the horizontal axis and time is represented on the vertical axis. Moreover, transmission symbol 2101, which is a symbol included in the modulated signal, is a 80 MHz symbol.

In (4) in FIG. 21B, frequency is represented on the horizontal axis and time is represented on the vertical axis. Moreover, transmission symbol 2101, which is a symbol included in the modulated signal, is a 160 MHz symbol.

In this way, when, for example, an AP (or terminal) transmits a modulated signal using the second frequency band, the bandwidth that is used is 20 MHz, 40 MHz, 80 MHz, or 160 MHz. However, (1), (2), (3), and (4) in FIG. 21B are merely examples.

In FIG. 21C, (1), (2), and (3), indicate examples of bandwidths used when, for example, an AP (or terminal) transmits a modulated signal using the third frequency band.

In (1) in FIG. 21C, frequency is represented on the horizontal axis and time is represented on the vertical axis. Moreover, transmission symbol 2101, which is a symbol included in the modulated signal, is a 80 MHz symbol.

In (2) in FIG. 21C, frequency is represented on the horizontal axis and tinge is represented on the vertical axis. Moreover, transmission symbol 2101, which is a symbol included in the modulated signal, is a 160 MHz symbol.

In (3) in FIG. 21C, frequency is represented on the horizontal axis and time is represented on the vertical axis. Moreover, transmission symbol 2101, which is a symbol included in the modulated signal, is a 320 MHz symbol.

In this way, when, for example, an AP (or terminal) transmits a modulated signal using the third frequency band, the bandwidth that is used is 80 MHz, 160 MHz, or 320 MHz. However, (1), (2), and (3) in FIG. 21C are merely examples.

Next, a case in which AP 1901 communicates with terminal 1902_1, such as is illustrated in FIG. 19A, will be described.

In Embodiment 2, "in a given period, data symbols destined for the same terminal are present in the first frequency band, the second frequency band, and the third frequency band", or "in a given period, data symbols destined for the same terminal are present in the first frequency band and the second frequency band", or "in a given period, data symbols destined for the same terminal are present in the first frequency band and the third frequency band", or "in a given period, data symbols destined for the same terminal are present in the second frequency band and the third frequency band" are described. An example of RTS and CTS transmitting methods used in such cases will be described.

FIG. 22A illustrates an example in which AP 1901 is transmitting RTSs to terminal 1902_1. In FIG. 22A, frequency is represented on the horizontal axis and time is represented on the vertical axis. As illustrated in FIG. 22A, RTSs labeled 1_11 and 112, RTSs labeled 2_11, 2_12, 2_13, 2_14, 2_15, 2_16, 2_17, and 2_18, and RTSs labeled 3_11, 3_12, 3_13, and 3_14 are present in the A1$^{th}$ period.

AP 1901 transmits RTSs labeled 1_11 and 1_12 using first frequency band 500_1. Each of RTSs labeled 1_11 and 1_12 is present within a span of 20 MHz, for example. RTS labeled 1_11 is present in the first channel of first frequency band 500_1, and RTS labeled 112 is present in the second channel of first frequency band 500_1. Although only the first channel and the second channel of first frequency band 500_1 are described, first frequency band 500_1 may include other channels, and AP 1901 may use a channel other than the first channel or the second channel to transmit an RTS.

AP 1901 transmits RTSs labeled 2_11, 2_12, 2_13, 2_14, 2_15, 2_16, 2_17, and 2_18 using second frequency band 500_2. Each of RTSs labeled 2_11, 2_12, 2_13, 2_14, 2_15, 2_16, 2_17, and 2_18 is present in a span of 20 MHz, for example. RTS labeled 2_11 is present in the first channel of second frequency band 500_2, RTS labeled 2_12 is present in the second channel of second frequency band 500_2, RTS labeled 2_13 is present in the third channel of second frequency band 500_2, RTS labeled 2_14 is present in the fourth channel of second frequency band 500_2, RTS labeled 2_15 is present in the fifth channel of second frequency band 500_2, RTS labeled 2_16 is present in the sixth channel of second frequency band 500_2, RTS labeled 2_17 is present in the seventh channel of second frequency band 500_2, and RTS labeled 2_18 is present in the eighth channel of second frequency band 500_2. Although only first through eighth channels of second frequency band 500_2 are described, second frequency band 500_2 may include other channels, and AP 1901 may use a channel other than the first through eighth channels to transmit an RTS.

AP 1901 transmits RTSs labeled 3_11, 3_12, 3_13, and 3_14 using third frequency band 500_3. Each of RTSs labeled 3_11, 3_12, 3_13, and 3_14 is present in a span of 80 MHz, for example. RTS labeled 3_11 is present in the first channel of third frequency band 500_3, RTS labeled 3_12 is present in the second channel of third frequency band 500_3, RTS labeled 3_13 is present in the third channel of third frequency band 500_3, and RTS labeled 3_14 is present in the fourth channel of third frequency band 500_3. Although only first through fourth channels of third frequency band 500_3 are described, third frequency band 500_3 may include other channels, and AP 1901 may use a channel other than the first through fourth channels to transmit an RTS.

As described in Embodiment 1, an RTS includes at least information indicating the address of a communication partner. An RTS transmitted by AP 1901 using the first frequency band may possibly include information indicating the address or addresses of one or more AP communication partners one or more terminals). Similarly, an RTS transmitted by AP 1901 using the second frequency band may possibly include information indicating the address or addresses of one or more AP communication partners one or more terminals). Similarly, an RTS transmitted by AP 1901 using the third frequency band may possibly include the address or addresses of one or more AP communication partners (i.e., one or more terminals).

As illustrated in FIG. 22A, when AP 1901 transmits RTSs, each of RTSs labeled 1_11 and 1_12, RTSs labeled 2_11, 2_12, 2_13, 2_14, 2_15, 2_16, 2_17, and 2_18, and RTSs labeled 3_11, 3_12, 3_13, and 3_14 includes information indicating the address of a single terminal (1902_1).

Terminal 1902_1 receives the RTSs illustrated in FIG. 22A that are transmitted by AP 1901. Then, in response to receiving the RTSs, terminal 1902_1 enters a state in which the terminal has completed preparation for reception in the first channel, the second channel, the third channel, the fourth channel, the fifth channel, the sixth channel, the seventh channel, and the eighth channel of second frequency band 500_2, and the first channel and the second channel of third frequency band 500_3. FIG. 22B illustrates an example in which terminal 1902_1 is transmitting CTSs to AP 1901. In FIG. 22B, frequency is represented on the horizontal axis and time is represented on the vertical axis. As illustrated in FIG. 22B, CTSs labeled 2_21, 2_22, 2_23, 2_24, 2_25, 2_26, 2_27, and 2_28, and CTSs labeled 3_21 and 3_22 are present in the A2$^{th}$ period.

Terminal 1902_1 transmits CTSs labeled 2_21, 2_22, 2_23, 2_24, 2_25, 2_26, 2_27, and 2_28 using second frequency band 500_2. Each of CTSs labeled 2_21, 2_22, 2_23, 2_24, 2_25, 2_26, 2_27, and 2_28 is present in a span of 20 MHz, for example. CTS labeled 2_21 is present in the first channel of second frequency band 500_2, CTS labeled 2_22 is present in the second channel of second frequency band 500_2, CTS labeled 2_23 is present in the third channel of second frequency band 500_2, CTS labeled 2_24 is present in the fourth channel of second frequency band 500_2, CTS labeled 2_25 is present in the fifth channel of second frequency band 500_2, CTS labeled 2_26 is present in the sixth channel of second frequency band 500_2, CTS labeled 2_27 is present in the seventh channel of second frequency band 500_2, and CTS labeled 2_28 is present in the eighth channel of second frequency band 500_2. Although only first through eighth channels of second frequency band 500_2 are described, second frequency band 500_2 may include other channels.

Terminal 1902_1 transmits CTSs labeled 3_21 and 3_22 using third frequency band 500_3. Each of CTSs labeled 3_21 and 3_22 is present within a span of 80 MHz, for example. CTS labeled 3_21 is present in the first channel of third frequency band 500_3, and CTS labeled 3_22 is present in the second channel of third frequency band 500_3. Although only first through fourth channels of third frequency band 500_3 are described, third frequency band 500_3 may include other channels.

AP 1901 receives the CTSs illustrated in FIG. 22B that are transmitted by terminal 1902_1. Then, in response to receiving the CTSs, AP 1901 determines to transmit symbol groups including data symbols in the first channel, second channel, third channel, fourth channel, fifth channel, sixth channel, seventh channel, and eighth channel of second frequency band 500_2 and in the first channel and the second channel of third frequency band 500_3. FIG. 22C illustrates an example in which AP 1901 is transmitting symbol groups including data symbols to terminal 1902_1. In FIG. 22C, frequency is represented on the horizontal axis and time is represented on the vertical axis. As illustrated in FIG. 22C, symbol groups labeled 2_31, 2_32, 2_33, 2_34, 2_35, 2_36, 2_37, and 2_38, and symbol groups labeled 3_31 and 3_32 are present in the A3$^{th}$ period.

AP 1901 transmits symbol groups labeled 2_31, 2_32, 2_33, 2_34, 2_35, 2_36, 2_37, and 2_38 using second frequency band 500_2. Each of symbol groups labeled 2_31, 2_32, 2_33, 2_34, 2_35, 2_36, 2_37, and 2_38 is present in a span of 20 MHz, for example. Symbol group labeled 2_31 is present in the first channel of second frequency band 500_2, symbol group labeled 2_32 is present in the second channel of second frequency band 500_2, symbol group labeled 2_33 is present in the third channel of second frequency band 500_2, symbol group labeled 2_34 is present in the fourth channel of second frequency band 500_2, symbol group labeled 2_35 is present in the fifth channel of second frequency band 500_2, symbol group labeled 2_36 is present in the sixth channel of second frequency band 500_2, symbol group labeled 2_37 is present in the seventh channel of second frequency band 500_2, and symbol group labeled 2_38 is present in the eighth channel of second frequency band 500_2. Although only first through eighth channels of second frequency band 500_2 are described, second frequency band 500_2 may include other channels.

AP 1901 transmits symbol groups labeled 3_31 and 3_32 using third frequency band 500_3. Each of symbol groups labeled 3_31 and 3_32 is present within a span of 80 MHz, for example. Symbol group labeled 3_31 is present in the first channel of third frequency band 500_3, and symbol group labeled 3_32 is present in the second channel of third frequency band 500_3. Although only first through fourth channels of third frequency band 500_3 are described, third frequency band 500_3 may include other channels.

Since, for example, an AP can transmit data symbols to a specific terminal using the second frequency band and the third frequency band as described above, this makes it possible to achieve the advantageous effect that the speed of data transmission to a specific terminal can be improved. One feature here is that the RTS includes only the address of a specific terminal. Note that the configuration method of the channels used in the first frequency band, the configuration method of the channels used in the second frequency band, and the configuration method of the channels used in the third frequency band are not limited to the above examples. Accordingly, the embodiment may be implemented in the same manner even with a configuration method other than the examples illustrated in FIG. 22A, FIG. 22B, and FIG. 22C.

Next, a second example of a case in which AP 1901 communicates with terminal 1902_1, such as is illustrated in FIG. 19A, will be given.

An example in which AP 1901 transmits RTSs to terminal 1902_1 is illustrated in FIG. 22A. As FIG. 22A has already been described, detailed repeated description thereof will be omitted.

Terminal 1902_1 receives the RTSs illustrated in FIG. 22A that are transmitted by AP 1901. Then, in response to receiving the RTSs, terminal 1902_1 enters a state in which the terminal has completed preparation for reception in the first channel of first frequency band 500_1, the first channel, the second channel, the third channel, and the fourth channel of second frequency band 500_2, and the first channel of third frequency band 500_3. FIG. 23A illustrates an example in which terminal 1902_1 is transmitting CTSs to AP 1901. In FIG. 23A, frequency is represented on the horizontal axis and time is represented on the vertical axis. As illustrated in FIG. 23A, CTS labeled 1_21, CTSs labeled 2_21, 2_22, 2_23, and 2_24, and CTS labeled 3_21 are present in the A2$^{th}$ period.

Terminal 1902_1 transmits CTS labeled 1_21 using first frequency band 500_1. CTS labeled 1_21 is present within a span of 20 MHz, for example. CTS labeled 1_21 is present in the first channel of first frequency band 500_1. Although only the first channel and the second channel of first frequency band 500_1 are described, first, frequency band 500_1 may include other channels.

Terminal 1902_1 transmits CTSs labeled 9_21, 2_22, 2_93, and 2_24 using second frequency band 500_2. Each of CTSs labeled 2_21, 2_22, 2_23, and 2_24 is present in a span of 20 MHz, for example. CTS labeled 2_21 is present in the first channel of second frequency band, CTS labeled 2_22 is present in the second channel of second frequency band 500_2, CTS labeled 2_23 is present in the third channel of second frequency band 500_2, and CTS labeled 2_24 is present in the fourth channel of second frequency band 500_2. Although only first through eighth channels of second frequency band 500_2 are described, second frequency band 500_2 may include other channels.

Terminal 1902_1 transmits CTS labeled 3_21 using third frequency band 500_3. CTS labeled 3_21 is present within a span of 80 MHz, for example. CTS labeled 3_21 is present in the first channel of third frequency band 500_3. Although only first through fourth channels of third frequency band 500_3 are described, third frequency band 500_3 may include other channels.

Figure 23B:
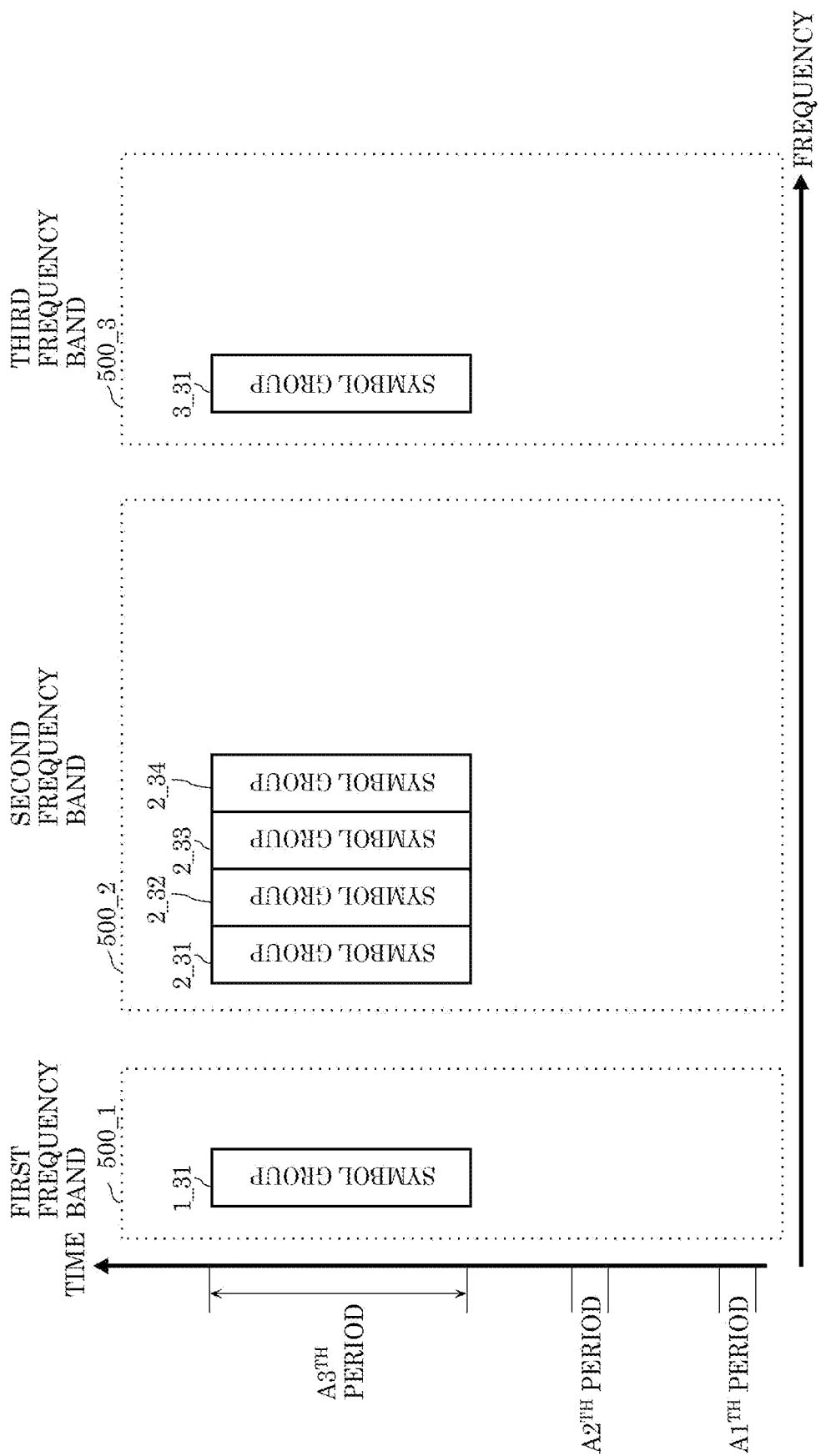
FIG. 23B illustrates an example of transmission of symbol groups.

AP 1901 receives the CTSs illustrated in FIG. 23A that are transmitted by terminal 1902_1. Then, in response to receiving the CTSs, AP 1901 determines to transmit symbol groups including data symbols in the first channel of first frequency band 500_1, the first channel, the second channel, the third channel, and the fourth channel of second frequency band 500_2, and the first channel of third frequency band 500_3. FIG. 23B illustrates an example in which AP 1901 is transmitting symbol groups including data symbols to terminal 1902_1. In FIG. 23B, frequency is represented on the horizontal axis and time is represented on the vertical axis. As illustrated in FIG. 23B, symbol group labeled 1_31, symbol groups labeled 2_31, 2_32, 2_33, and 2_34, and symbol group labeled 3_31 are present in the A3$^{th}$ period.

AP 1901 transmits symbol group labeled 1_31 using first frequency band 500_1. Symbol group labeled 1_31 is present within a span of 20 MHz, for example. Symbol group labeled 1_31 is present in the first channel of first frequency band 500_1. Although only the first channel and the second channel of first frequency band 500_1 are described, first frequency band 500_1 may include other channels.

AP 1901 transmits symbol groups labeled 2_31, 2_32, 2_33, and 2_34 using second frequency band 500_2. Each of symbol groups labeled 2_31, 2_32, 2_33, and 2_34 is present in a span of 20 MHz, for example. Symbol group labeled 2_31 is present in the first channel of second frequency band 500_2, symbol group labeled 2_32 is present in the second channel of second frequency band 500_2, symbol group labeled 2_33 is present in the third channel of second frequency band 500_2, and symbol group labeled 2_34 is present in the fourth channel of second frequency band 500_2. Although only first through eighth channels of second frequency band 500_2 are described, second frequency band 500_2 may include other channels.

AP 1901 transmits symbol group labeled 3_31 using third frequency band 500_3. Symbol group labeled 3_31 is present within a span of 80 MHz, for example. Symbol group labeled 3_31 is present in the first channel of third frequency band 500_3. Although only first through fourth channels of third frequency band 500_3 are described, third frequency band 500_3 may include other channels.

Since, for example, an AP can transmit data symbols to a specific terminal using the first frequency band, the second frequency band, and the third frequency band as described above, this makes it possible to achieve the advantageous effect that the speed of data transmission to a specific terminal can be improved. One feature here is that the RTS includes only the address of a specific terminal. Note that the configuration method of the channels used in the first frequency hand, the configuration method of the channels used in the second frequency band, and the configuration method of the channels used in the third frequency band are not limited to the above examples. Accordingly, the embodiment may be implemented in the same manner even with a configuration method other than the examples illustrated in FIG. 22A, FIG. 23A, and FIG. 23B.

Next, a third example of a case in which AP 1901 communicates with terminal 1902_1, such as is illustrated in FIG. 19A, will be given.

An example in which AP 1901 transmits RTSs to terminal 1902_1 is illustrated in FIG. 22A. As FIG. 22A has already been described, detailed repeated description thereof will be omitted.

Terminal 1902_1 receives the RTSs illustrated in FIG. 22A that are transmitted by AP 1901. Then, in response to receiving the RTSs, terminal 1902_1 enters a state in which the terminal has completed preparation for reception in the first channel and the second channel of first frequency band 500_1, and the first channel, the second channel, the third channel, and the fourth channel of second frequency band 500_2. In FIG. 24A, frequency is represented on the horizontal axis and time is represented on the vertical axis. As illustrated in FIG. 24A, CTSs labeled 1_21 and 1_22, and CTSs labeled 2_21, 2_22, 2_23, and 2_24 are present in the A2$^{th}$ period.

Terminal 1902_1 transmits CTSs labeled 1_21 and 1_22 using first frequency band 500_1. Each of CTSs labeled. 1_21 and 1_22 is present within a span of 20 MHz, CTS labeled 1_21 is present in the first channel of first frequency band 500_1, and CTS labeled 1_22 is present in the second channel of first frequency band 500_1. Although only the first channel and the second channel of first frequency band 500_1 are described, first frequency band 500_1 may include other channels.

Terminal 1902_1 transmits CTSs labeled 2_21, 2_22, 2_23, and 2_24, using second frequency band 500_2. Each of CTSs labeled 2_21, 2_22, 2_23, and 2_24 is present in a span of 20 MHz. CTS labeled 2_21 is present in the first channel of second frequency band, CTS labeled 2_22 is present in the second channel of second frequency band 500_2, CTS labeled 2_23 is present in the third channel of second frequency band 500_2, and CTS labeled 2_24 is present in the fourth channel of second frequency band 500_2. Although only first through eighth channels of second frequency band 500_2 are described, second frequency band 500_2 may include other channels.

AP 1901 receives the CTSs illustrated in FIG. 24A that are transmitted by terminal 1902_1. Then, in response to receiving the CTSs, AP 1901 determines to transmit symbol groups including data symbols in the first channel and the second channel of first frequency band 500_1 and in the first channel, the second channel, the third channel, and the fourth channel of second frequency band 500_2. FIG. 24B illustrates an example in which AP 1901 is transmitting data symbol groups including data symbols to terminal 1902_1. In FIG. 24B, frequency is represented on the horizontal axis and time is represented on the vertical axis. As illustrated in FIG. 24B, symbol groups labeled 1_31 and 1_32, and symbol groups labeled 231, 2_22, 2_33, and 23_4 are present in the A3$^{th}$ period.

AP 1901 transmits symbol groups labeled 1_31 and 1_32 using first frequency band 500_1. Each of symbol groups labeled 1_31 and 1_32 is present within a span of 20 MHz, for example. Symbol group labeled 1_31 is present in the first channel of first frequency band 500_1, and symbol group labeled 1_32 is present in the second channel of first frequency band 500_1. Although only the first channel and the second channel of first frequency band 500_1 are described, first frequency band 500_1 may include other channels.

AP 1901 transmits symbol groups labeled 2_31, 2_32, 2_33, and 2_34 using second frequency band 500_2. Symbol groups labeled 2_31, 2_32, 2_33, and 2_34 are present in a span of 20 MHz, for example. Symbol group labeled 2_31 is present in the first channel of second frequency band 500_2, symbol group labeled 2_32 is present in the second channel of second frequency band 500_2, symbol group labeled 2_33 is present in the third channel of second frequency band 500_2, and symbol group labeled 2_24 is present in the fourth channel of second frequency band 500_2. Although only first through eighth channels of second frequency band 500_2 are described, second frequency band 500_2 may include other channels.

Since an AP can transmit data symbols to a specific terminal using the first frequency band and the second frequency band as described above, this makes it possible to achieve the advantageous effect that the speed of data transmission to a specific terminal can be improved. One feature here is that the RTS includes only the address of a specific terminal. Note that the configuration method of the channels used in the first frequency band, the configuration method of the channels used in the second frequency band, and the configuration method of the channels used in the third frequency band are not limited to the above examples. Accordingly, the embodiment may be implemented in the same manner even with a configuration method other than the examples illustrated in FIG. 22A, FIG. 24A, and FIG. 24B.

Next, a fourth example of a case in which AP 1901 communicates with terminal 1902_1, such as is illustrated in FIG. 19A, will be given.

An example in which AP 1901 transmits RTSs to terminal 1902_1 is illustrated in FIG. 22A. As FIG. 22A has already been described, detailed repeated description thereof will be omitted.

Terminal 1902_1 receives the RTSs illustrated in FIG. 22A that are transmitted by AP 1901. Then, in response to receiving the RTSs, terminal 1902_1 enters a state in which the terminal has completed preparation for reception in the first channel and the second channel of first frequency band 500_1 and the first channel of third frequency band 500_3. FIG. 25A illustrates an example in which terminal 1902_1 is transmitting CTSs to AP 1901. In FIG. 25A, frequency is represented on the horizontal axis and time is represented on the vertical axis. As illustrated in FIG. 25A, CTSs labeled 1_21 and 1_22, and CTS labeled 3_21 are present in the A2$^{th}$ period.

Terminal 1902_1 transmits CTSs labeled 1_21 and 1_22 using first frequency band 500_1. Each of CTSs labeled 1_21 and 1_22 is present within a span of 20 MHz, for example. CTS labeled 1_21 is present in the first channel of first frequency band 500_1, and CTS labeled 1_22 is present in the second channel of first frequency band 500_1. Although only the first channel and the second channel of first frequency band 500_1 are described, first frequency band 500_1 may include other channels.

Terminal 1902_1 transmits CTS labeled 3_21 using third frequency band 500_3, CTS labeled 3_21 is present within a span of 80 MHz, for example. CTS labeled 3_21 is present in the first channel of third frequency band 500_3. Although only first through fourth channels of third frequency band 500_3 are described, third frequency band 500_3 may include other channels.

AP 1901 receives the CTSs illustrated in FIG. 25A that are transmitted by terminal 1902_1. Then, in response to receiving the CTSs, AP 1901 determines to transmit symbol groups including data symbols in the first channel and the second channel of first frequency band 500_1 and in the first channel of third frequency band 500_3. FIG. 25B illustrates an example in which AP 1901 is transmitting symbol groups including data symbols to terminal 1902_1. In FIG. 25B, frequency is represented on the horizontal axis and time is represented on the vertical axis. As illustrated in FIG. 25B, symbol groups labeled 1_31 and 1_32, and symbol group labeled 3_31 are present in the A3$^{th}$ period.

AP 1901 transmits symbol groups labeled 1_31 and 1_32 using first frequency band 500_1. Symbol groups labeled 1_31 and 1_32 are present within a span of 20 MHz, for example. Symbol group labeled 1_31 is present in the first channel of first frequency band 500_1, and symbol group labeled 1_32 is present in the second channel of first frequency band 500_1. Although only the first channel and the second channel of first frequency band 500_1 are described, first frequency band 500_1 may include other channels.

AP 1901 transmits symbol group labeled 3_31 using third frequency band 500_3. Symbol group labeled 3_31 is present within a span of 80 MHz, for example. Symbol group labeled 3_31 is present in the first channel of third frequency band 500_3. Although only first through fourth channels of third frequency band 500_3 are described, third frequency band 500_3 may include other channels.

Since, for example, an AP can transmit data symbols to a specific terminal using the first frequency band and the third frequency band as described above, this makes it possible to achieve the advantageous effect that the speed of data transmission to a specific terminal can be improved. One feature here is that the RTS includes only the address of a specific terminal. Note that the configuration method of the channels used in the first frequency band, the configuration method of the channels used in the second frequency band, and the configuration method of the channels used in the third frequency band are not limited to the above examples. Accordingly, the embodiment may be implemented in the same manner even with a configuration method other than the examples illustrated in FIG. 22A, FIG. 25A, and FIG. 25B.

Next, a fifth example of a case in which AP 1901 communicates with terminal 1902_1, such as is illustrated in FIG. 19A, will be given.

FIG. 26A illustrates an example in which AP 1901 is transmitting RTSs to terminal 1902_1. In FIG. 26A, frequency is represented on the horizontal axis and time is represented on the vertical axis. As illustrated in FIG. 26A, RTSs labeled 2_11, 2_12, 2_13, 2_14, 2_15, 2_16, 2_17, and 2_18, and RTSs labeled 3_13 and 3_14 are present in the A1$^{th}$ period.

AP 1901 transmits RTSs labeled 2_11, 2_12, 2_13, 2_14, 2_15, 2_16, 2_17 and 2_18 using second frequency band 500_2. Each of RTSs labeled 2_11, 2_12, 2_13, 2_14, 2_15, 2_16, 2_17, and 2_18 is present in a span of 20 MHz, for example. RTS labeled 2_11 is present in a first channel of second frequency band 500_2, RTS labeled 2_12 is present in a second channel of second frequency band 500_2, RTS labeled 2_13 is present in a third channel of second frequency band 500_2, RTS labeled 2_14 is present in a fourth channel of second frequency band 500_2, RTS labeled 2_15 is present in a fifth channel of second frequency band 500_2, RTS labeled 2_16 is present in a sixth channel of second frequency band 500_2, RTS labeled 2_17 is present in a seventh channel of second frequency band 500_2, and RTS labeled 2_18 is present in an eighth channel of second frequency band 500_2. Although only first through eighth channels of second frequency band 500_2 are described, second frequency band 500_2 may include other channels, and AP 1901 may use a channel other than the first through eighth channels to transmit an RTS.

AP 1901 transmits RTSs labeled 3_13 and 3_14 using third frequency band 500_3. Each of RTSs labeled 3_13 and 3_14 is present within a span of 80 MHz, for example. RTS labeled 3_13 is present in the third channel of third frequency band 500_3, and RTS labeled 3_14 is present in the fourth channel of third frequency band 500_3. Although only first through fourth channels of third frequency band 500_3 are described, third frequency band 500_3 may include other channels, and AP 1901 may use a channel other than the first through fourth channels to transmit an RTS.

As described in Embodiment 1, an RTS includes at least information indicating the address of a communication partner. An RTS transmitted by AP 1901 using the second frequency band may possibly include information indicating the address or addresses of one or more AP communication partners (i.e., one or more terminals). Similarly, an RTS transmitted by AP 1901 using the third frequency band may possibly include the address or addresses of one or more AP communication partners (i.e., one or more terminals).

As illustrated in FIG. 26A, when AP 1901 transmits RTSs, each of RTSs labeled 2_11, 2_12, 2_13, 2_14, 2_15, 2_16, 2_17, and 2_18, and RTSs labeled 3_13 and 3_14 includes information indicating the address of a single terminal (1902_1).

Terminal 1902_1 receives the RTSs illustrated in FIG. 26A that are transmitted by AP 1901. Then, in response to receiving the RTSs, terminal 1902_1 enters a state in which the terminal has completed preparation for reception in the first channel, the second channel, the third channel, the fourth channel, the fifth channel, the sixth channel, the seventh channel, and the eighth channel of second frequency band 500_2, and the third channel and the fourth channel of third frequency band 500_3. FIG. 26B illustrates an example in which terminal 1902_1 is transmitting CTSs to AP 1901. In FIG. 26B, frequency is represented on the horizontal axis and time is represented on the vertical axis. As illustrated in FIG. 26B, CTSs labeled 2_21, 2_22, 2_23, 2_24, 2_25, 2_26, 2_27, and 2_28, and CTSs labeled 3_23 and 3_24 are present in the A2$^{th}$ period.

Terminal 1902_1 transmits CTSs labeled 2_21, 2_22, 2_23, 2_24, 2_25, 2_26, 2_27, and 2_28 using second frequency band 500_2. Each of CTSs labeled 2_21, 2_22, 2_23, 2_24, 2_25, 2_26, 2_27, and 2_28 is present in a span of 20 MHz, for example. CTS labeled 2_21 is present in the first channel of second frequency band 500_2, CTS labeled 2_22 is present in the second channel of second frequency band 500_2, CTS labeled 2_23 is present in the third channel of second frequency band 500_2, CTS labeled 2_24 is present in the fourth channel of second frequency band 500_2, CTS labeled 2_25 is present in the fifth channel of second frequency band 500_2, CTS labeled 2_26 is present in the sixth channel of second frequency band 500_2, CTS labeled 2_27 is present in the seventh channel of second frequency band 500_2, and CTS labeled 2_28 is present in the eighth channel of second frequency band 500_2.

Although only first through eighth channels of second frequency band 500_2 are described, second frequency band 500_2 may include other channels.

Terminal 1902_1 transmits CTSs labeled 3_23 and 3_24 using third frequency band 500_3. Each of CTSs labeled 3_23 and 3_24 is present within a span of 80 MHz, for example. CTS labeled 3_23 is present in the third channel of third frequency band 500_3, and CTS labeled 3_24 is present in the fourth channel of third frequency band 500_3. Although only first through fourth channels of third frequency band 500_3 are described, third frequency band 500_3 may include other channels.

Figure 26C:
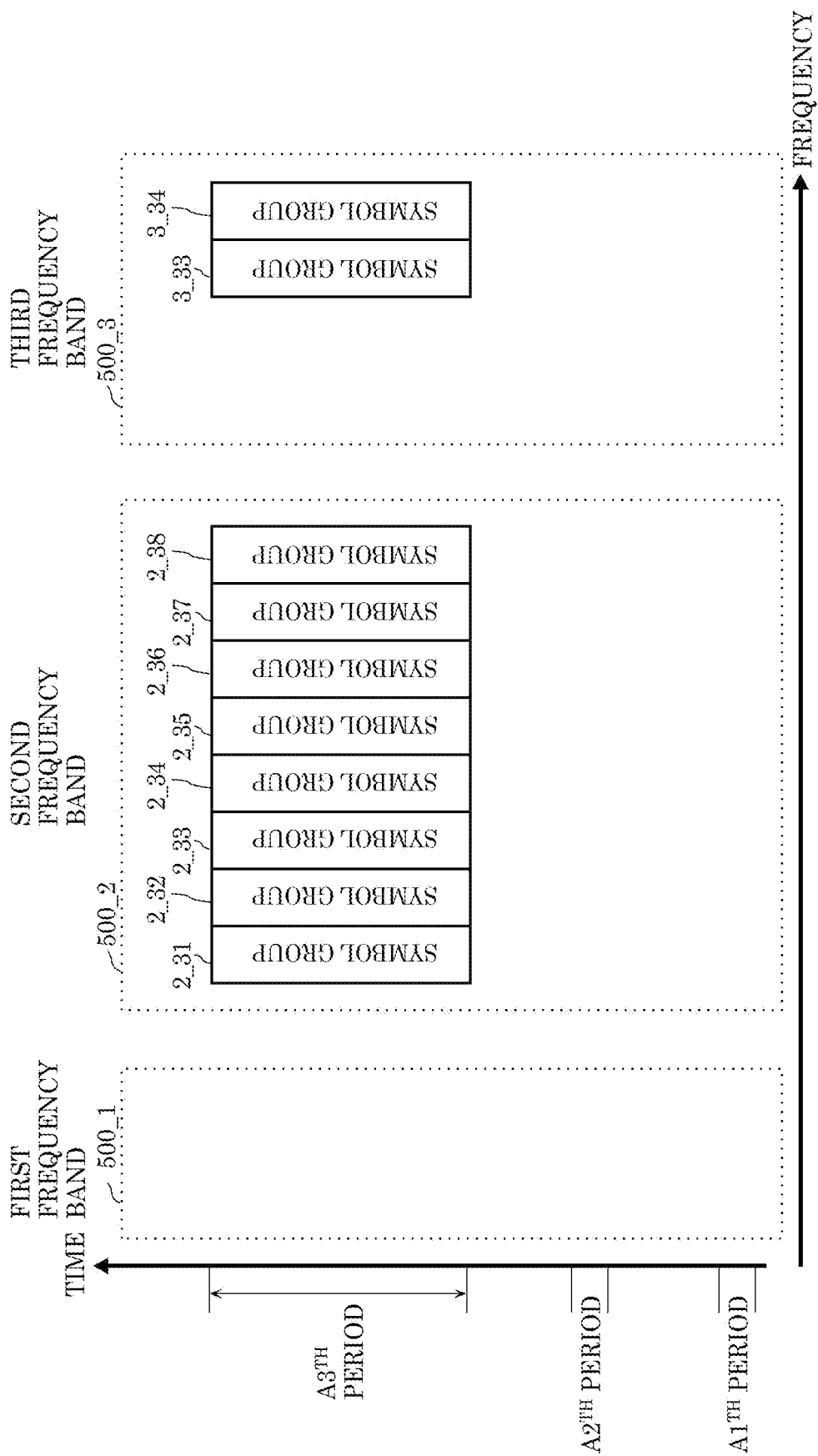
FIG. 26C illustrates an example of transmission of symbol groups.

AP 1901 receives the CTSs illustrated in FIG. 26B that are transmitted by terminal 1902_1. Then, in response to receiving the CTSs, AP 1901 determines to transmit symbol groups including data symbols in the first channel, second channel, third channel, fourth channel, fifth channel, sixth channel, seventh channel, and eighth channel of second frequency band 500_2 and in the third channel and the fourth channel of third frequency band 500_3. FIG. 26C illustrates an example in which AP 1901 is transmitting symbol groups including data symbols to terminal 1902_1. In FIG. 26C, frequency is represented on the horizontal axis and time is represented on the vertical axis. As illustrated in FIG. 26C, symbol groups labeled 2_31, 2_32, 2_33, 2_34, 2_35, 2_36, 2_37, and 2_38, and symbol groups labeled 3_33 and 3_34 are present in the A$3^{th}$ period.

AP 1901 transmits symbol groups labeled 2_31, 2_32, 2_33, 2_34, 2_35, 2_36, 2_37, and 2_38 using second frequency band 500_2. Each of symbol groups labeled 2_31, 2_32, 2_33, 2_34, 2_35, 2_36, 2_37, and 2_38 is present in a span of 20 MHz, for example. Symbol group labeled 2_31 is present in the first channel of second frequency band 500_2, symbol group labeled 2_32 is present in the second channel of second frequency band 500_2, symbol group labeled 2_33 is present in the third channel of second frequency band 500_2, symbol group labeled 2_34 is present, in the fourth channel of second frequency band 500_2, symbol group labeled 2_35 is present in the fifth channel of second frequency band 500_2, symbol group labeled 2_36 is present in the sixth channel of second frequency band 500_2, symbol group labeled 2_37 is present in the seventh channel of second frequency band 500_22, and symbol group labeled 2_38 is present in the eighth channel of second frequency band 500_2. Although only first through eighth channels of second frequency band 500_2 are described, second frequency band 500_2 may include other channels.

AP 1901 transmits symbol groups labeled 3_33 and 3_34 using third frequency band 500_3. Each of symbol groups labeled 3_33 and 3_34 is present within a span of 80 MHz, for example. Symbol group labeled 3_33 is present in the third channel of third frequency band 500_3, and symbol group labeled 3_34 is present in the fourth channel of third frequency band 500_3. Although only first through fourth channels of third frequency band 500_3 are described, third frequency band 500_3 may include other channels.

Since, for example, an AP can transmit data symbols to a specific terminal using the second frequency band and the third frequency band as described above, this makes it possible to achieve the advantageous effect that the speed of data transmission to a specific terminal can be improved. One feature here is that the RTS includes only the address of a specific terminal. Note that the configuration method of the channels used in the first frequency band, the configuration method of the channels used in the second frequency band, and the configuration method of the channels used in the third frequency band are not limited to the above examples.

Accordingly, the embodiment may be implemented in the same manner even with a configuration method other than the examples illustrated in FIG. 26A, FIG. 26B, and FIG. 26C.

Next, a sixth example of a case in which AP 1901 communicates with terminal 1902_1, such as is illustrated in FIG. 19A, will be given.

FIG. 27A illustrates an example in which AP 1901 is transmitting RTSs to terminal 1902_1, In FIG. 27A, frequency is represented on the horizontal axis and time is represented on the vertical axis. As illustrated in FIG. 27A, RTSs labeled 1_11 and 1_12, and RTSs labeled 2_13, 2_14, 2_15, and 2_16 are present in the A$1^{th}$ period.

AP 1901 transmits RTSs labeled 1_11 and 1_12 using first frequency band 500_1. Each of RTSs labeled 1_11 and 1_12 is present within a span of 20 MHz, for example. RTS labeled 1_11 is present in the first channel of first frequency band 500_1, and RTS labeled 1_12 is present in the second channel of first frequency band 500_1. Although only the first channel and the second channel of first frequency band 500_1 are described, first frequency band 500_1 may include other channels, and AP 1901 may use a channel other than the first channel or the second channel to transmit an RTS.

AP 1901 transmits RTSs labeled 2_13, 2_14, 2_15, and 2_16 using second frequency band 500_2. Each of RTSs labeled 2_13, 2_14, 2_15, and 2_16 is present in a span of 20 MHz, for example.

RTS labeled 2_13 is present in the third channel of second frequency band 500_2, RTS labeled 2_14 is present in the fourth channel of second frequency band 500_2, RTS labeled 2_15 is present in the fifth channel of second frequency band 500_2, and RTS labeled 2_16 is present in the sixth channel of second frequency band 500_2. Although only first through eighth channels of second frequency band 500_2 are described, second frequency band 500_2 may include other channels, and AP 1901 may use a channel other than the first through eighth channels to transmit an RTS.

As described in Embodiment 1, an RTS includes at least information indicating the address of a communication partner. An RTS transmitted by AP 1901 using the first frequency band may possibly include information indicating the address or addresses of one or more AP communication partners (i.e., one or more terminals). Similarly, an RTS transmitted by AP 1901 using the second frequency band may possibly include information indicating the address or addresses of one or more AP communication partners (i.e., one or more terminals).

As illustrated in FIG. 27A, when AP 1901 transmits RTSs, each of RTSs labeled 1_11 and 1_12, and RTSs labeled 2_13, 2_14, 2_15, and 2_16 includes information indicating the address of a single terminal 1902_1).

Terminal 1902_1 receives the RTSs illustrated in FIG. 27A that are transmitted by AP 1901. Then, in response to receiving the RTSs, terminal 1902_1 enters a state in which the terminal has completed preparation for reception in the first channel and the second channel of the first frequency band and the third channel and the fourth channel of second frequency band. 500_2. FIG. 27B illustrates an example in which terminal 1902_1 is transmitting CTSs to AP 1901. In FIG. 27B, frequency is represented on the horizontal axis and time is represented on the vertical axis. As illustrated in FIG. 27B, CTSs labeled 1_21 and 1_22, and CTSs labeled 2_23 and 2_24 are present in the A$2^{th}$ period.

Terminal 1902_1 transmits CTSs labeled 1_21 and 1_22 using first frequency band 500_1. Each of CTSs labeled 1_21 and 1_22 is present within a span of 20 MHz, for example. CTS labeled 1_21 is present in the first channel of first frequency band 500_1, and CTS labeled 1_22 is present in the second channel of first frequency band 500_1. Although only the first channel and the second channel of first frequency band 500_1 are described, first frequency band 500_1 may include other channels.

Terminal 1902_1 transmits CTSs labeled 2_23 and 2_24 using second frequency band 500_2. Each of CTSs labeled 2_23 and 2_24 is present within a span of 20 MHz, for example. CTS labeled 2_23 is present in the third channel of second frequency band 500_2, and CTS labeled 2_24 is present in the fourth channel of second frequency band 500_2. Although only first through eighth channels of second frequency band 500_2 are described, second frequency band 500_2 may include other channels.

AP 1901 receives the CTSs illustrated in FIG. 27B that are transmitted by terminal 1902_1. Then, in response to receiving the CTSs, AP 1901 determines to transmit symbol groups including data symbols in the first channel and the second channel of first frequency band 500_1 and in the third channel and the fourth channel of second frequency band 500_2. FIG. 27C illustrates an example in which AP 1901 is transmitting symbol groups including data symbols to terminal 1902_1. In FIG. 27C, frequency is represented on the horizontal axis and time is represented on the vertical axis. As illustrated in FIG. 27C, symbol groups labeled 1_31 and 1_32, and symbol groups labeled 2_33 and 2_34 are present in the A3$^{th}$ period.

AP 1901 transmits symbol groups labeled 1_31 and 1_32 using first frequency band 500_1. Each of symbol groups labeled 1_31 and 1_32 is present within a span of 20 MHz, for example. Symbol group labeled 1_31 is present in the first channel of first frequency band 500_1, and symbol group labeled 1_32 is present in the second channel of first frequency band 500_1. Although only the first channel and the second channel of first frequency band 500_1 are described, first frequency band 500_1 may include other channels.

AP 1901 transmits symbol groups labeled 2_33 and 2_34 using second frequency band 500_2. Each of symbol groups labeled 2_33 and 2_34 is present within a span of 20 MHz, far example. Symbol group labeled 2_33 is present in the third channel of second frequency band 500_2, and symbol group labeled 2_34 is present in the fourth channel of second frequency band 500_2. Although only first through eighth channels of second frequency band 500_2 are described, second frequency band 500_2 may include other channels.

Since, for example, an AP can transmit data symbols to a specific terminal using the first frequency band and the second frequency band as described above, this makes it possible to achieve the advantageous effect that the speed of data transmission to a specific terminal can be improved. One feature here is that the RTS includes only the address of a specific terminal. Note that the configuration method of the channels used in the first frequency band, the configuration method of the channels used in the second frequency band, and the configuration method of the channels used in the third frequency band are not limited to the above examples. Accordingly, the embodiment may be implemented in the same manner even with a configuration method other than the examples illustrated in FIG. 27A, FIG. 27B, and FIG. 27C.

Next, a seventh example of a case in which AP 1901 communicates with terminal 1902_1, such as is illustrated in FIG. 19A, will be given.

FIG. 28A illustrates an example in which AP 1901 is transmitting RTSs to terminal 1902_1. In FIG. 28A, frequency is represented on the horizontal axis and time is represented on the vertical axis. As illustrated in FIG. 28A, RTSs labeled 1_11 and 1_12, and RTSs labeled 3_13 and 3_14 are present in the A1$^{th}$ period.

AP 1901 transmits RTSs labeled 1_11 and 1_12 using first frequency band 500_1. Each of RTSs labeled 1_11 and 1_12 is present within a span of 20 MHz, for example. RTS labeled 1_11 is present in the first channel of first frequency band 500_1, and RTS labeled 1_12 is present in the second channel of first frequency band 500_1. Although only the first channel and the second channel of first frequency band 500_1 are described, first frequency band 500_1 may include other channels, and AP 1901 may use a channel other than the first channel or the second channel to transit an RTS.

AP 1901 transmits RTSs labeled 3_13 and 3_14 using third frequency band 500_3. Each of RTSs labeled 3_13 and 3_14 is present within a span of 80 MHz, for example. RTS labeled 3_13 is present in the third channel of third frequency band 500_3, and RTS labeled 3_14 is present in the fourth channel of third frequency band 500_3. Although only first through fourth channels of third frequency band 500_3 are described, third frequency band 500_3 may include other channels, and AP 1901 may use a channel other than the first through fourth channels to transmit an RTS.

As described in Embodiment 1, an RTS includes at least information indicating the address of a communication partner. An RTS transmitted by AP 1901 using the first frequency band may possibly include information indicating the address or addresses of one or more AP communication partners one or more terminals), Similarly, an RTS transmitted by AP 1901 using the third frequency band may possibly include information indicating the address or addresses of one or more AP communication partners (i.e., one or more terminals).

As illustrated in FIG. 28A, when AP 1901 transmits RTSs, each of RTSs labeled 1_11 and 1_12, and RTSs labeled 3_13 and 3_14 includes information indicating the address of a single terminal (1902_1).

Terminal 1902_1 receives the RTSs illustrated in FIG. 28A that are transmitted by AP 1901. Then, in response to receiving the RTSs, terminal 1902_1 enters a state in which the terminal has completed preparation for reception in the first channel and the second channel of the first frequency band and the third channel and the fourth channel of third frequency band 500_3. FIG. 28B illustrates an example, in which terminal 1902_1 is transmitting CTSs to AP 1901. In FIG. 28B, frequency is represented on the horizontal axis and time is represented on the vertical axis. As illustrated in FIG. 28B, CTSs labeled 1_21 and 1_22, and CTSs labeled 3_23 and 3_24 are present in the A2$^{th}$ period.

Terminal 1902_1 transmits CTSs labeled 1_21 and 1_22 using first frequency band 500_1. Each of CTSs labeled 1_21 and 1_22 is present within a span of 20 MHz, for example. CTS labeled 1_21 is present in the first channel of first frequency band 500_1, and CTS labeled 1_22 is present in the second channel of first frequency band 500_1. Although only the first channel and the second channel of first frequency band 500_1 are described, first frequency band 500_1 may include other channels.

Terminal 1902_1 transmits CTSs labeled 3_23 and 3_24 using third frequency band 500_3. Each of CTSs labeled 3_23 and 3_24 is present within a span of 80 MHz, for example. CTS labeled 3_23 is present in the third channel of third frequency band 500_3, and CTS labeled 3_24 is present in the fourth channel of third frequency band 500_3. Although only first through fourth channels of third frequency band 500_3 are described, third frequency band 500_3 may include other channels.

Figure 28C:
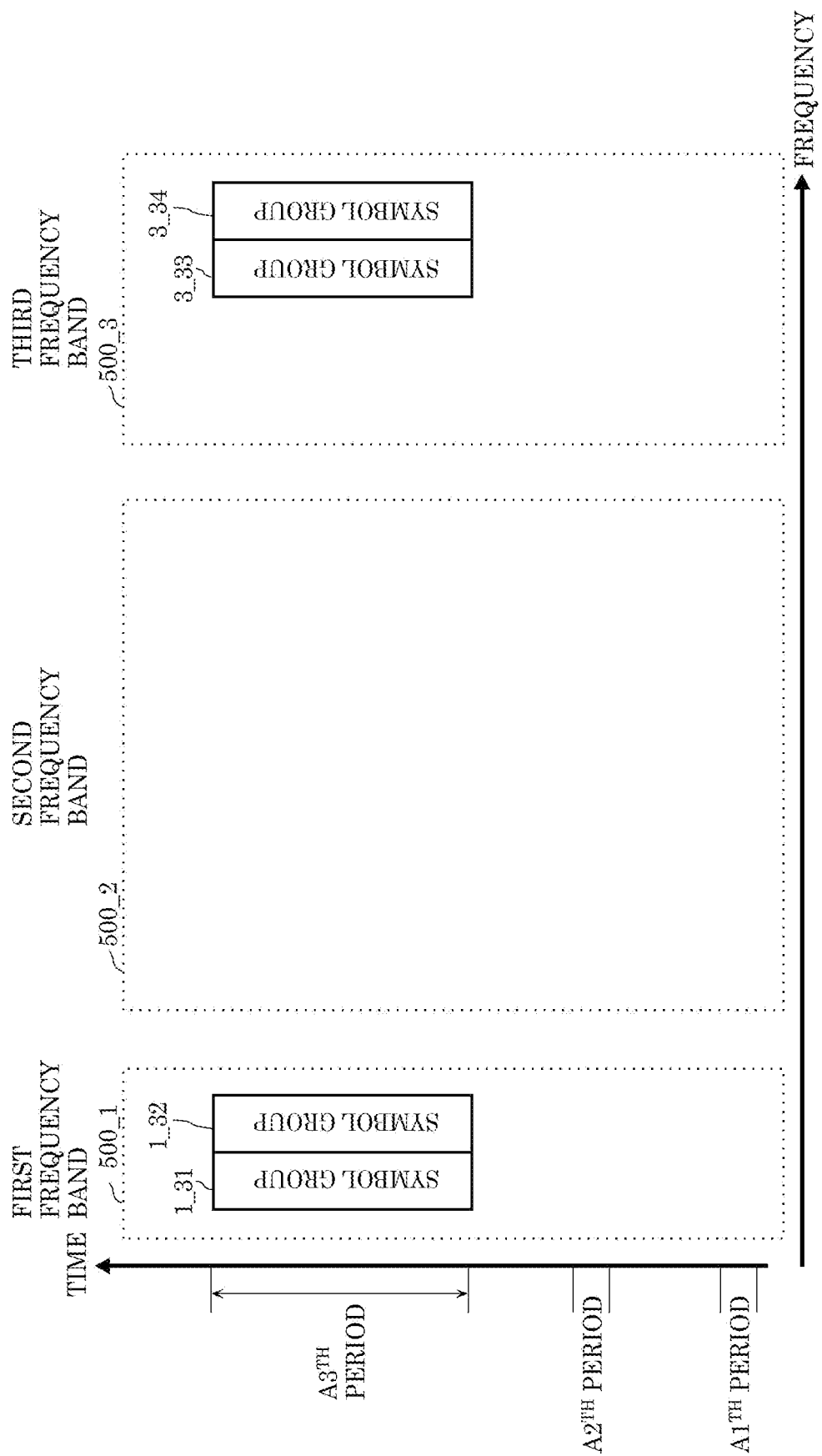
FIG. 28C illustrates an example of transmission of symbol groups.

AP 1901 receives the CTSs illustrated in FIG. 28B that are transmitted by terminal 1902_1. Then, in response to receiving the CTSs, AP 1901 determines to transmit symbol groups including data symbols in the first channel and the second channel of first frequency band 500_1 and in the third channel and the fourth channel of third frequency band 500_3. FIG. 28C illustrates an example in which AP 1901 is transmitting symbol groups including data symbols to terminal 1902_1. In FIG. 28C, frequency is represented on the horizontal axis and time is represented on the vertical axis. As illustrated in FIG. 28C, symbol groups labeled 1_31 and 1_32, and symbol groups labeled 3_33 and 3_34 are present in the A3$^{th}$ period.

AP 1901 transmits symbol groups labeled 1_31 and 1_32 using first frequency band 500_1. Each of symbol groups labeled 1_31 and 1_32 is present within a span of 20 MHz, for example. Symbol group labeled 1_31 is present in the first channel of first frequency band 500_1, and symbol group labeled 1_32 is present in the second channel of first frequency band 500_1. Although only the first channel and the second channel of first frequency band 500_1 are described, first frequency band 500_1 may include other channels.

AP 1901 transmits symbol groups labeled 3_33 and 3_34 using third frequency band 500_3. Each of symbol groups labeled 3_33 and 3_34 is present within a span of 80 MHz, for example. Symbol group labeled 3_33 is present in the third channel of third frequency band 500_3, and symbol group labeled 3_34 is present in the fourth channel of third frequency band 500_3. Although only first through fourth channels of third frequency band 500_3 are described, third frequency band 500_3 may include other channels.

Since, for example, an AP can transmit data symbols to a specific terminal using the first frequency band and the third frequency band as described above, this makes it possible to achieve the advantageous effect that the speed of data transmission to a specific terminal can be improved. One feature here is that the RTS includes only the address of a specific terminal. Note that the configuration method of the channels used in the first frequency band, the configuration method of the channels used in the second frequency band, and the configuration method of the channels used in the third frequency band are not limited to the above examples. Accordingly, the embodiment may be implemented in the same manner even with a configuration method other than the examples illustrated in FIG. 28A, FIG. 28B, FIG. 28C.

In the first through seventh examples in which AP 1901 communicates with terminal 1902_1 like in FIG. 19A, upon AP 1901 transmitting RTSs, the communication partner address information included in the RTSs is exemplified as being address information for a single communication partner. Hereinafter, an example in which the communication partner address information included in the RTSs upon AP 1901 transmitting the RTSs includes address information for two or more communication partners will be given.

Consider a case in which AP 1901 is communicating with a plurality of terminals, that is to say, terminals 1902_i, as is the case in FIG. 19B. Note that i is an integer that is greater than or equal to 1 and less than or equal to N, and N is an integer that is greater than or equal to 2. Hereinafter, for the sake of simplicity, an example in which AP 1901 communicates with terminals 1902_1 and 1902_2 will be given.

FIG. 29A illustrates an example in which AP 1901 is transmitting RTSs to terminals 1902_1 and 1902_2. In FIG. 29A, frequency is represented on the horizontal axis and time is represented on the vertical axis. As illustrated in FIG. 29A, RTSs labeled 2_11, 2_12, 2_13, 2_14, 2_15, 2_16, 2_17, and 2_18, are present in the A1$^{th}$ period.

AP 1901 transmits RTSs labeled 2_11, 2_12, 2_13, 2_14, 2_15, 2_16, 2_17 and 2_18 using second frequency band 500_2. Each of RTSs labeled 2_11, 2_12, 2_13, 2_14, 2_15, 2_16, 2_17, and 2_18 is present in a span of 20 MHz, for example. RTS labeled 2_11 is present in a first channel of second frequency band 500_2, RTS labeled 2_12 is present in a second channel of second frequency band 500_2, RTS labeled 2_13 is present in a third channel of second frequency band 500_2, RTS labeled 2_14 is present in a fourth channel of second frequency band 500_2, RTS labeled 2_15 is present in a fifth channel of second frequency band 500_2, RTS labeled 2_16 is present in a sixth channel of second frequency bald 500_2, RTS labeled 2_17 is present in a seventh channel of second frequency band 500_2, and RTS labeled 2_18 is present in an eighth channel of second frequency band 500_2. Although only first through eighth channels of second frequency band 500_2 are described, second frequency band 500_2 may include other channels, and AP 1901 may use a channel other than the first through eighth channels to transmit an RTS.

As described in Embodiment 1, an RTS includes at least information indicating the address of a communication partner. An RTS transmitted by AP 1901 using the second frequency band may possibly include information indicating the address or addresses of one or more AP communication partners one or more terminals).

In FIG. 29A, each of RTSs labeled 2_11, 2_12, 2_13, 2_14, 2_15, 2_16, 2_17, and 2_18 includes information indicating the address of the terminal labeled 1902_1 and information in indicating the address of the terminal labeled 1902_2.

Figure 29B:
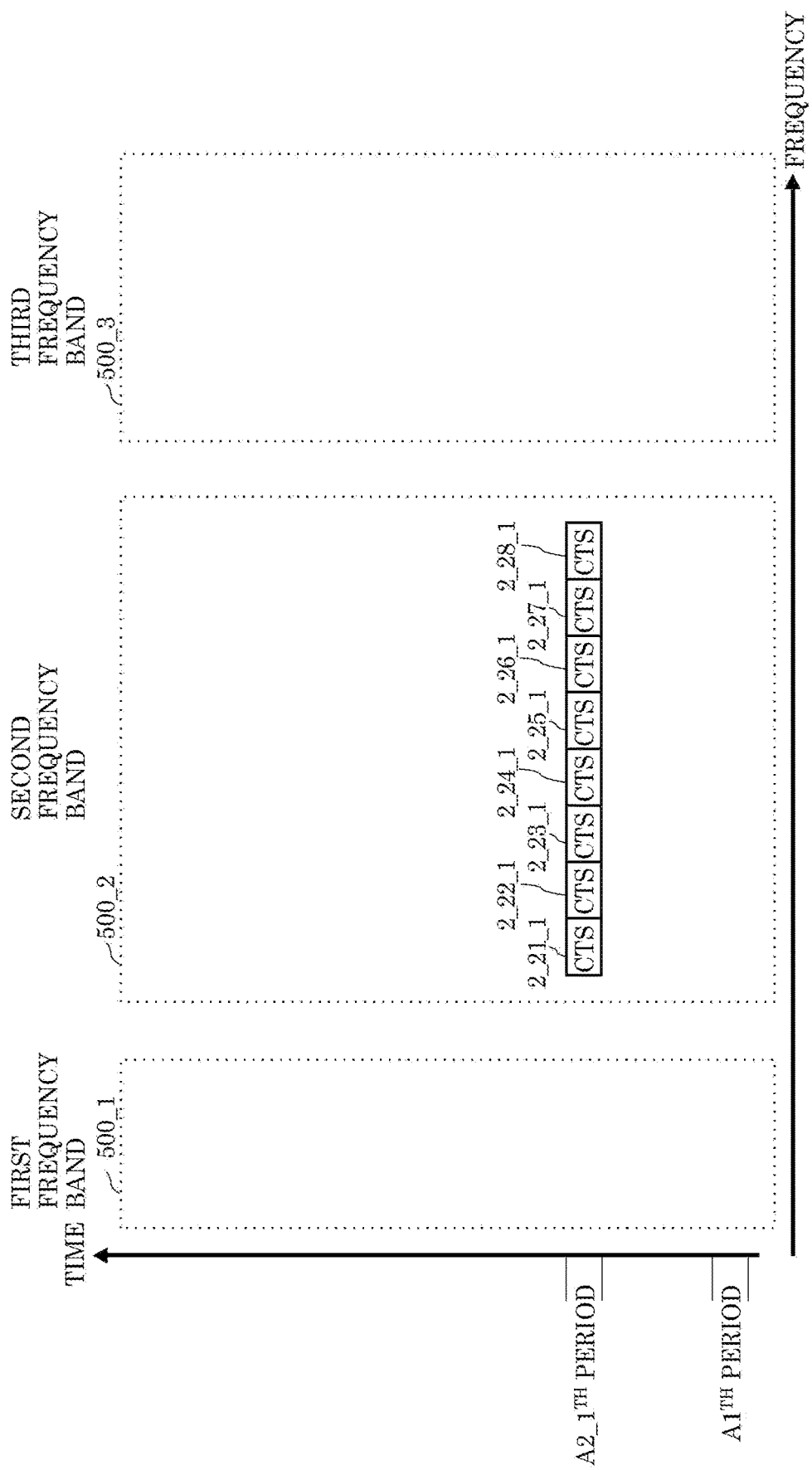
FIG. 29B illustrates an example of transmission of CTSs.

Terminal 1902_1 receives the RTSs illustrated in FIG. 29A that are transmitted by AP 1901. Then, in response to receiving the RTSs, terminal 1902_1 enters a state in which the terminal has completed preparation for reception in the first channel, the second channel, the third channel, the fourth channel, the fifth channel, the sixth channel, the seventh channel, and the eighth channel of the second frequency band. FIG. 29B illustrates an example in which terminal 1902_1 is transmitting CTSs to AP 1901. In FIG. 29B, frequency is represented on the horizontal axis and time is represented on the vertical axis. As illustrated in FIG. 29B, CTSs labeled 2_21_1, 2_22_1, 2_23_1, 2_24_1, 2_25_1, 2_26_1, 2_27_1, and 2_28_1 are present in the A2_1$^{th}$ period.

Terminal 1902_1 transmits CTSs labeled 2_21_1, 2_22_1, 2_23_1, 2_24_1, 2_25_1, 2_26_1, 2_27_1, and 2_28_1 using second frequency band 500_2. Each of CTSs labeled 2_21_1, 2_22_1, 2_23_1, 2_24_1, 2_25_1, 2_26_1, 2_27_1, and 2_28_1 is present in a span of 20 MHz, for example. CTS labeled 2_21_1 is present in the first channel of second frequency band 500_2, CTS labeled 2_22_1 is present in the second channel of second frequency band 500_2, CTS labeled 2_23_1 is present in the third channel of second frequency band 500_2, CTS labeled 2_24_1 is present in the fourth channel of second frequency band 500_4 CTS labeled 2_25_1 is present in the fifth channel of second frequency band 500_2, CTS labeled 2_26_1 is present in the sixth channel of second frequency band 500_2, CTS labeled 2_27_1 is present in the seventh channel of second frequency band 500_2, and CTS labeled 2_28_1 is present in the eighth channel of second frequency band 500_2. Although only first through eighth channels of second frequency band 500_2 are described, second frequency band 500_2 may include other channels.

Terminal 1902_2 receives the RTSs illustrated in FIG. 29A that are transmitted by AP 1901. Then, in response to receiving the RTSs, terminal 1902_2 enters a state in which the terminal has completed preparation for reception in the first channel, the second channel, the third channel, and the fourth channel of the second frequency band. FIG. 29C illustrates an example in which terminal 1902_2 is transmitting CTSs to AP 1901. In FIG. 29C, frequency is represented on the horizontal axis and time is represented on the vertical axis. As illustrated in FIG. 29C, CTSs labeled 2_21_2, 2_22_2, 2_23_2, and 2_24_2 are present in the A2_2$^{th}$ period.

Terminal 1902_2 transmits CTSs labeled 2_21_2, 2_22_2, 2_23_2, and 2_24_2 using second frequency band 500_2. Each of CTSs labeled 2_21_2, 2_22_2, 2_23_4 and 2_24_2 is present in a span of 20 MHz, for example. CTS labeled 2_21_2 is present in the first channel of second frequency band 500_2, CTS labeled 2_22_2 is present in the second channel of second frequency band 500_2, CTS labeled 2_23_2 is present in the third channel of second frequency band 500_2, and CTS labeled 2_24_2 is present in the fourth channel of second frequency band 500_2. Although only first through eighth channels of second frequency band 500_2 are described, second frequency band 500_2 may include other channels.

AP 1901 receives the CTSs illustrated in FIG. 29B that are transmitted by terminal 1902_1 and the CTSs illustrated in FIG. 29C that are transmitted by terminal 1902_2. Then, in response to receiving these CTSs, AP 1901 determines to transmit symbol groups including data symbols in the first channel, second channel, third channel, fourth channel, fifth channel, sixth channel, seventh channel, and eighth channel of second frequency band 500_2. FIG. 29D illustrates an example in which AP 1901 is transmitting symbol groups including data symbols to terminals 1902_1 and 1902_2. In FIG. 29D, frequency is represented on the horizontal axis and time is represented on the vertical axis. As illustrated in FIG. 28C, symbol groups labeled 2_31, 2_32, 2_33, 2_34, 2_35, 2_36, 2_37, and 2_38 are present in the A3$^{th}$ period.

AP 1901 transmits symbol groups labeled 2_31, 2_32, 2_33, 2_34, 2_35, 2_36, 2_37, and 2_38 using second frequency band 500_2. Each of symbol groups labeled 2_31, 2_32, 2_33, 2_34, 2_35, 2_36, 2_37, and 2_38 is present in a span of 20 MHz, for example. Symbol group labeled 2_31 is present in the first channel of second frequency band 500_2, symbol group labeled 2_32 is present in the second channel of second frequency band 500_2, symbol group labeled 2_33 is present in the third channel of second frequency band 500_2, symbol group labeled 2_34 is present in the fourth channel of second frequency band 500_2, symbol group labeled 2_35 is present in the fifth channel of second frequency band 5002_, symbol group labeled 2_36 is present in the sixth channel of second frequency band 500_2, symbol group labeled 2_37 is present in the seventh channel of second frequency band 500_4 and symbol group labeled 2_38 is present in the eighth channel of second frequency band 500_2. Although only first through eighth channels of second frequency band 500_2 are described, second frequency band 500_2 may include other channels.

The symbol groups labeled 2_31, 2_32, 2_33, 2_34, 2_35, 2_36, 2_37, and 2_38 include data symbols destined for terminal 19021 and data symbols destined for terminal 1902_2, For example, as illustrated in FIG. 6B, AP 1901 transmits symbol groups in which the frequencies of data symbols destined for terminal 1902_1 and data symbols destined for terminal 1902_2 are divided. Data symbols destined for terminal 1902_1 and data symbols destined for terminal 1902_2 may be divided by time division. Alternatively, groups labeled 2_31, 2_32, 2_33, 2_34, 2_35, 2_36, 2_37, and 2_38 may be arranged by preparing two regions comprised of time and frequency, and including data symbols destined for terminal 1902_1 in one region and including data symbols destined for terminal 1902_2 in the other region. The embodiment can be implemented in the same manner even with such a configuration.

One feature of the above example is that in cases in which an AP transmits symbols destined for a plurality of (two or more) terminals, the AP transmits modulated signals using any one of first frequency band 500_1, second frequency band 500_2, and third frequency band 500_3. This is described in greater detail in Embodiment 2.

When AP 1901 uses first frequency band 500_1 to transmit a modulated signal of the symbol group including the data symbols destined for terminal 1902_1 and the data symbols destined for terminal 1902_2, AP 1901 transmits RTSs using first frequency band 500_1, and terminals 1902_1 and 1902_2 transmit CTSs using first frequency band 500_1. In other words, in FIG. 29A, FIG. 29B, FIG. 29C, and FIG. 29D, second frequency band 500_2 may be considered to be the first frequency band, and the embodiment can be carried out in the same manner.

Similarly, when AP 1901 uses third frequency band 500_3 to transmit a modulated signal of the symbol group including the data symbols destined for terminal 1902_1 and the data symbols destined for terminal 1902_2, AP 1901 transmits RTSs using third frequency band 500_3, and terminals 1902_1 and 1902_2 transmit CTSs using third frequency band 500_3. In other words, in FIG. 29A, FIG. 29B, FIG. 29C, and FIG. 29D, third frequency band 500_3 may be considered to be the first frequency band, and the embodiment can be carried out in the same manner.

Implementing the above makes it possible to achieve the advantageous effects described in Embodiment 2. In the examples given with reference to FIG. 29A through FIG. 29D, although AP 1901 is described as communicating with terminals 1902_1 and 1902_2, even when AP 1901 communicates with three or more terminals, so long as the above features are satisfied, the embodiment can be implemented in the same manner. In such cases, each terminal transmits CTSs to the AP, as illustrated in FIG. 29B and FIG. 29C.

Figure 30:
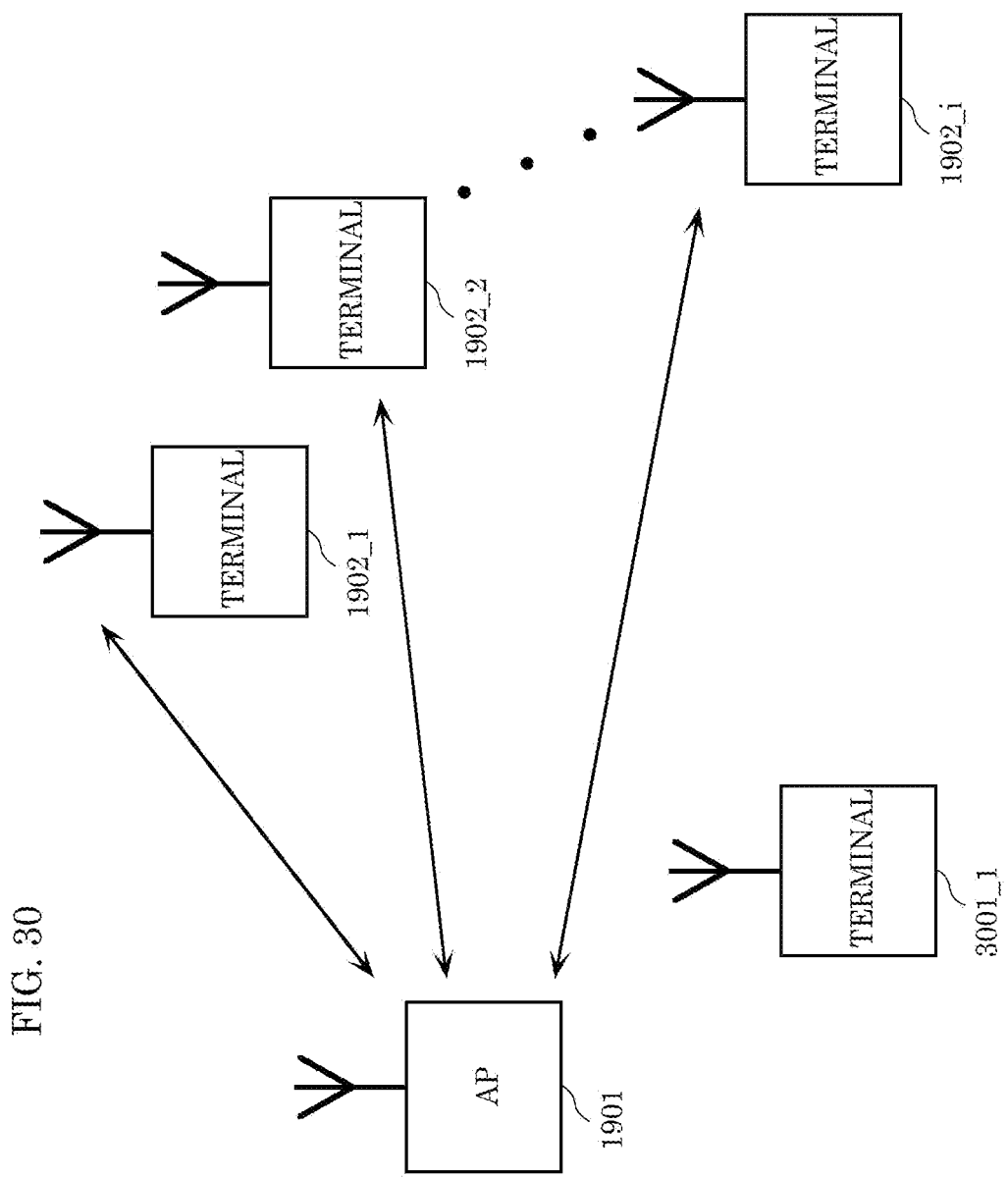
FIG. 30 illustrates one example of communication between a terminal and an access point.

Next, in a state in which AP 1901 and terminals are communicating like in FIG. 19B, a case in which terminal 3001_1 begins communicating with AP 1901, like in FIG. 30, will be described.

FIG. 31A illustrates an example in which AP 1901 is transmitting RTSs to terminal 3001_1. In FIG. 31A, frequency is represented on the horizontal axis and time is represented on the vertical axis. As illustrated in FIG. 31A, RTSs labeled B1_11 and B_12, and RTSs labeled B3_11 and B3_12 are present in the B1$^{th}$ period.

AP 1901 transmits RTSs labeled B1_11 and B1_12 using first frequency band 500_1. Each of RTSs labeled B1_11 and 131_12 is present in a span of 20 MHz, for example. RTS labeled B1_11 is present in the first channel of first frequency band 500_1, and RTS labeled B1_12 is present in the second channel of first frequency band 500_1. Although only the first channel and the second channel of first frequency band 500_1 are described, first frequency band 500_1 may include other channels, and AP 1901 may use a channel other than the first channel or the second channel to transmit an RTS.

AP 1901 transmits RTSs labeled B3_11 and B3_12 using third frequency band 500_3. Each of RTSs labeled B3_11 and B3_12 is present in a span of 80 MHz, for example. RTS labeled B3_11 is present in the first channel of third frequency band 500_3, and RTS labeled B3_12 is present in the second channel of third frequency band 500_3. Although only first through fourth channels of third frequency band 500_3 are described, third frequency band 500_3 may include other channels, and AP 1901 may use a channel other than the first through fourth channels to transmit an RTS.

As described in Embodiment 1, an RTS includes at least information indicating the address of a communication partner. An RTS transmitted by AP 1901 using the first frequency band may possibly include information indicating the address or addresses of one or more AP communication partners (i.e., one or more terminals). Similarly, an RTS transmitted by AP 1901 using the third frequency band may possibly include information indicating the address or addresses of one or more AP communication partners (i.e., one or more terminals).

As illustrated in FIG. 31A, when AP 1901 transmits RTSs, each of RTSs labeled B1_11 and B1_12, and RTSs labeled B3_11 and B3_12 includes information indicating the address of a single terminal (3001_1).

As illustrated in FIG. 31A, AP 1901 is currently communicating with, for example, terminals 1902_1 and 1902_2 in second frequency band 500_2, as indicated by 2_11, 2_12, 2_13, 2_14, 2_15, 2_16, 2_17, and 2_18. Here, 2_11 is the first channel of second frequency band 500_2, 2_12 is the second channel of second frequency band 500_2, 2_13 is the third channel of second frequency band 500_2, 2_14 is the fourth channel of second frequency band 500_2, 2_15 is the fifth channel of second frequency band 500_2, 2_16 is the sixth channel of second frequency band 500_2, 2_17 is the seventh channel of second frequency band 500_2, and 2_18 is the eighth channel of second frequency band 500_2.

Terminal 3001_1 receives the RTSs illustrated in FIG. 31A that are transmitted by AP 1901. Then, in response to receiving the RTSs, terminal 3001_1 enters a state in which the terminal has completed preparation for reception in the first channel and the second channel of first frequency band 500_1, and the first channel and the second channel of third frequency band. 500_3. In FIG. 31B, frequency is represented on the horizontal axis and time is represented on the vertical axis. As illustrated in FIG. 31B, CTSs labeled. B1_21 and B1_22, and CTSs labeled B3_21 and B3_22 are present in the B2$^{th}$ period.

Terminal 3001_1 transmits CTSs labeled B1_21 and B1_22 using first frequency band 500_1. Each of CTSs labeled B1_21 and B1_22 is present in a span of 20 MHz, for example. CTS labeled B1_21 is present in the first channel of first frequency band 500_1, and CTS labeled B1_22 is present in the second channel of first frequency band 500_1. Although only the first channel and the second channel of first frequency band 500_1 are described, first frequency band 500_1 may include other channels.

Terminal 3001_1 transmits CTSs labeled B3_21 and B3_22 using third frequency band 500_3. Each of CTSs labeled 133_21 and B3_22 is present in a span of 80 MHz, for example. CTS labeled B3_21 is present the first channel of third frequency band 500_3, and CTS labeled B3_22 is present in the second channel of third frequency band 500_3. Although only first through fourth channels of third frequency band 500_3 are described, third frequency band 500_3 may include other channels.

As illustrated in FIG. 31B, AP 1901 is currently communicating with, for example, terminals 1902_1 and 1902_2 in second frequency band 500_2, as indicated by 2_11, 2_12, 2_13, 2_14, 2_15, 2_16, 2_17, and 2_18. Here, 2_11 is the first channel of second frequency band 500_2, 2_12 is the second channel of second frequency band 500_2, 2_13 is the third channel of second frequency band 500_2, 2_14 is the fourth channel of second frequency band 500_2, 2_15 is the fifth channel of second frequency band 500_2, 2_16 is the sixth channel of second frequency band 500_2, 2_17 is the seventh channel of second frequency band 500_2, and 2_18 is the eighth channel of second frequency band 500_2.

AP 1901 receives the CTSs illustrated in FIG. 31B that are transmitted by terminal 3001_1. Then, in response to receiving the CTSs, AP 1901 determines to transmit symbol groups including data symbols in the first channel and the second channel of first frequency band 500_1 and in the first channel and the second channel of third frequency band 500_3. FIG. 31C illustrates an example in which AP 1901 is transmitting symbol groups including data symbols to terminal 3001_1. In FIG. 31C, frequency is represented on the horizontal axis and time is represented on the vertical axis. As illustrated in FIG. 31C, symbol groups labeled B1_31 and B1_32, and symbol groups labeled B3_31 and B3_32 are present in the B3$^{th}$ period.

AP 1901 transmits symbol groups labeled B1_31 and B1_32 using first frequency band 500_1. Each of symbol groups labeled B1_31 and B1_32 is present within a span of 20 MHz, fir example. Symbol group labeled B1_31 is present in the first channel of first frequency band 500_1, and symbol group labeled B1_32 is present in the second channel of first frequency band 500_1. Although only the first channel and the second channel of first frequency band 500_1 are described, first frequency band 500_1 may include other channels.

As illustrated in FIG. 31C, AP 1901 is currently communicating with, for example, terminals 1902_1 and 1902_2 in second frequency band 500_2, as indicated by 2_11, 2_12, 2_13, 2_14, 2_15, 2_16, 2_17, and 2_18. Here, 2_11 is the first channel of second frequency band 500_2, 2_12 is the second channel of second frequency band 500_2, 2_13 is the third channel of second frequency band 500_2, 2_14 is the fourth channel of second frequency band 500_2, 2_15 is the fifth channel of second frequency band 500_2, 2_16 is the sixth channel of second frequency band 500_2, 2_17 is the seventh channel of second frequency band 500_2, and 2_18 is the eighth channel of second frequency band 500_2.

Since, for example, an AP can transmit data symbols to a specific terminal using the first frequency band and the third frequency band as described above, this makes it possible to achieve the advantageous effect that the speed of data transmission to a specific terminal can be improved. Here, the RTSs illustrated in FIG. 31A are characterized in that they include only the address of a specific terminal. Note that the configuration method of the channels used in the first frequency band, the configuration method of the channels used in the second frequency band, and the configuration method of the channels used in the third frequency band are not limited to the above examples. Accordingly, the embodiment may be implemented in the same manner even with a configuration method other than the examples illustrated in FIG. 31A, FIG. 31B, and FIG. 31C. Since the AP is communicating with a terminal other than the above terminal in another frequency band, namely second frequency band 500_2, it is possible to achieve the advantageous effect that data transmission speed in the communication system can be improved.

In the examples illustrated in FIG. 31A through FIG. 31C, the AP is exemplified as currently communicating in second frequency band 500_2, but this example is not limiting. For example, the AP may be currently communicating in first frequency band 500_1, and may transmit data symbols to a specific terminal using second frequency band 500_2 and third frequency band 500_3. In such cases, the RTSs transmitted by AP 1901 using second frequency band 500_2 and third frequency band 500_3 include only the address of a specific terminal.

The AP may be currently communicating in third frequency band 500_3, and may transmit data symbols to a specific terminal using first frequency band 500_1 and second frequency band 500_2. In such cases, the RTSs transmitted by AP 1901 using first frequency band 500_1 and second frequency band 500_2 include only the address of a specific terminal.

Figure 32:
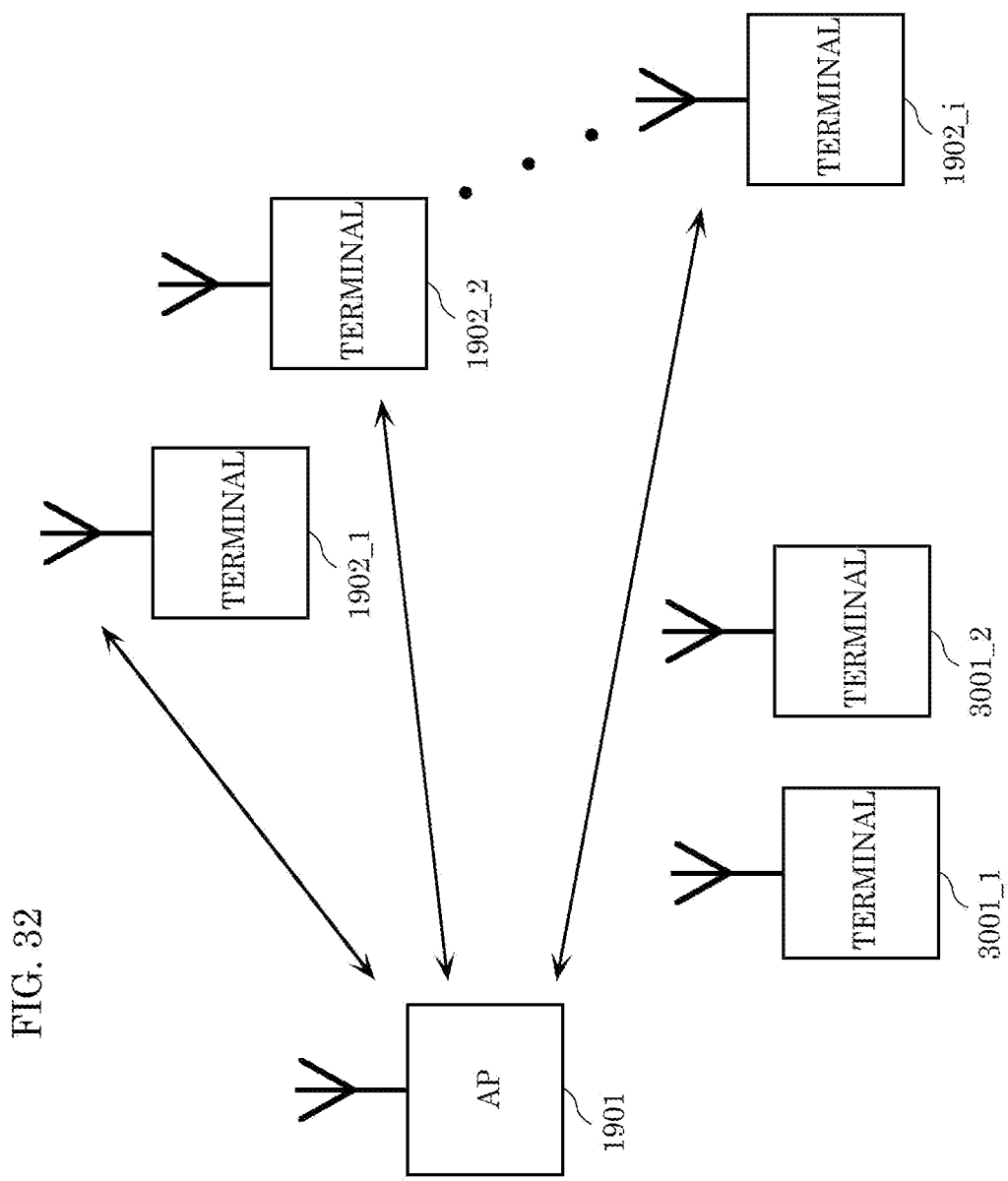
FIG. 32 illustrates one example of communication between a terminal and an access point.

Next, in a state in which AP 1901 and terminals are communicating like in FIG. 19B, a case in which terminal 3001_1 and terminal 3001_2 begin communicating with AP 1901, like in FIG. 32, will be described. Although FIG. 32 illustrates an example in which two terminals begin communicating with the AP, two or more terminals may begin communicating with the AP.

FIG. 33A illustrates an example in which AP 1901 is transmitting RTSs to terminal 3001_1 and terminal 3001_2. In FIG. 33A, frequency is represented on the horizontal axis and time is represented on the vertical axis. As illustrated in FIG. 33A, RTSs labeled B3_11 and B3_12 are present in the B1$^{th}$ period.

AP 1901 transmits RTSs labeled B3_11 and B3_12 using third frequency band 500_3. Each of RTSs labeled B3_11 and B3_12 is present in a span of 80 MHz, for example. RTS labeled B3_11 is present in the first channel of third frequency band 500_3, and RTS labeled B3_12 is present in the second channel of third frequency band 500_3. Although only first through fourth channels of third frequency band 500_3 are described, third frequency band 500_3 may include other channels, and AP 1901 may use a channel other than the first through fourth channels to transmit an RTS.

As described in Embodiment 1, an RTS includes at least information indicating the address of a communication partner. An RTS transmitted by AP 1901 using the third frequency band may possibly include information indicating the address or addresses of one or more AP communication partners (i.e., one or more terminals).

As illustrated in FIG. 33A, when AP 1901 transmits RTSs, each of RTSs labeled B3_11 and B3_12 includes information indicating the address of a plurality of terminals (3001_1 and 3001_2).

As illustrated in FIG. 33A, AP 1901 is currently communicating with, for example, terminals 1902_1 and 1902_2 in second frequency band 500_2, as indicated by 2_11, 2_12, 2_13, 2_14, 2_15, 2_16, 2_17, and 2_18. Here, 2_11 is the first channel of second frequency band 500_2, 2_12 is the second channel of second frequency band 500_2, 2_13 is the third channel of second frequency band 500_2, 2_14 is the fourth channel of second frequency band 500_2, 2_15 is the fifth channel of second frequency band 500_2, 2_16 is the sixth channel of second frequency band 500_2, 2_17 is the seventh channel of second frequency band 500_2, and 2_18 is the eighth channel of second frequency band 500_2.

Terminal 3001_1 receives the RTSs illustrated in FIG. 33A that are transmitted by AP 1901. Then, in response to receiving the RTSs, terminal 3001_1 enters a state in which the terminal has completed preparation for reception in the first channel and the second channel of third frequency band 500_3. In FIG. 33B, frequency is represented on the horizontal axis and time is represented on the vertical axis. As illustrated in FIG. 33B, CTSs labeled B3_21_1 and B3_22_1 are present in the B2_1$^{th}$ period.

Terminal 3001_1 transmits CTSs labeled B3_21_1 and B3_22_1 using third frequency band 500_3. Each of CTSs labeled B3_21_1 and B3_22_1 is present in a span of 80 MHz, for example. CTS labeled B3_21_1 is present in the first channel of third frequency band 500_3, and CTS labeled B3_22_1 is present in the second channel of third frequency band 500_3. Although only first through fourth channels of third frequency band 500_3 are described, third frequency band 500_3 may include other channels.

As illustrated in FIG. 33B, AP 1901 is currently communicating with, for example, terminals 1902_1 and 1902_2 in second frequency band 500_2, as indicated by 2_11, 2_12, 2_13, 2_14, 2_15, 2_16, 2_17, and 2_18. Here, 2_11 is the first channel of second frequency band 500_2, 2_12 is the second channel of second frequency band 500_2, 2_13 is the third channel of second frequency band 500_2, 2_14 is the fourth channel of second frequency band 500_2, 2_15 is the fifth channel of second frequency band 500_2, 2_16 is the sixth channel of second frequency band 500_2, 2_17 is the seventh channel of second frequency band 500_2, and 2_18 is the eighth channel of second frequency band 500_2.

Terminal 3001_2 receives the RTSs illustrated in FIG. 33A that are transmitted by AP 1901. Then, in response to receiving the RTSs, terminal 3001_2 enters a state in which the terminal has completed preparation for reception in the first channel and the second channel of third frequency band 500_3. In FIG. 33C, frequency is represented on the horizontal axis and time is represented on the vertical axis. As illustrated in FIG. 33C, CTSs labeled B3_21_1 and B3_22_1 are present in the B2_1$^{th}$ period.

Terminal 3001_2 transmits CTSs labeled B3_21_2 and B3_22_2 using third frequency band 500_3. Each of CTSs labeled B3_21_2 and B3_22_2 is present in a span of 80 MHz, for example. CTS labeled B3_21_2 is present in the first channel of third frequency band 500_3, and CTS labeled B3_22_2 is present in the second channel of third frequency band 500_3. Although only first through fourth channels of third frequency band 500_3 are described, third frequency band 500_3 may include other channels.

As illustrated in FIG. 33C, AP 1901 is currently communicating with, for example, terminals 1902_1 and 1902_2 in second frequency band 500_2, as indicated by 2_11, 2_12, 2_13, 2_14, 2_15, 2_16, 2_17, and 2_18. Here, 2_11 is the first channel of second frequency band 500_2, 2_12 is the second channel of second frequency band 500_2, 2_13 is the third channel of second frequency band 500_2, 2_14 is the fourth channel of second frequency band 500_2, 2_15 is the fifth channel of second frequency band 500_2, 2_16 is the sixth channel of second frequency band 500_2, 2_17 is the seventh channel of second frequency band 500_2, and 2_18 is the eighth channel of second frequency band 500_2.

Figure 33D:
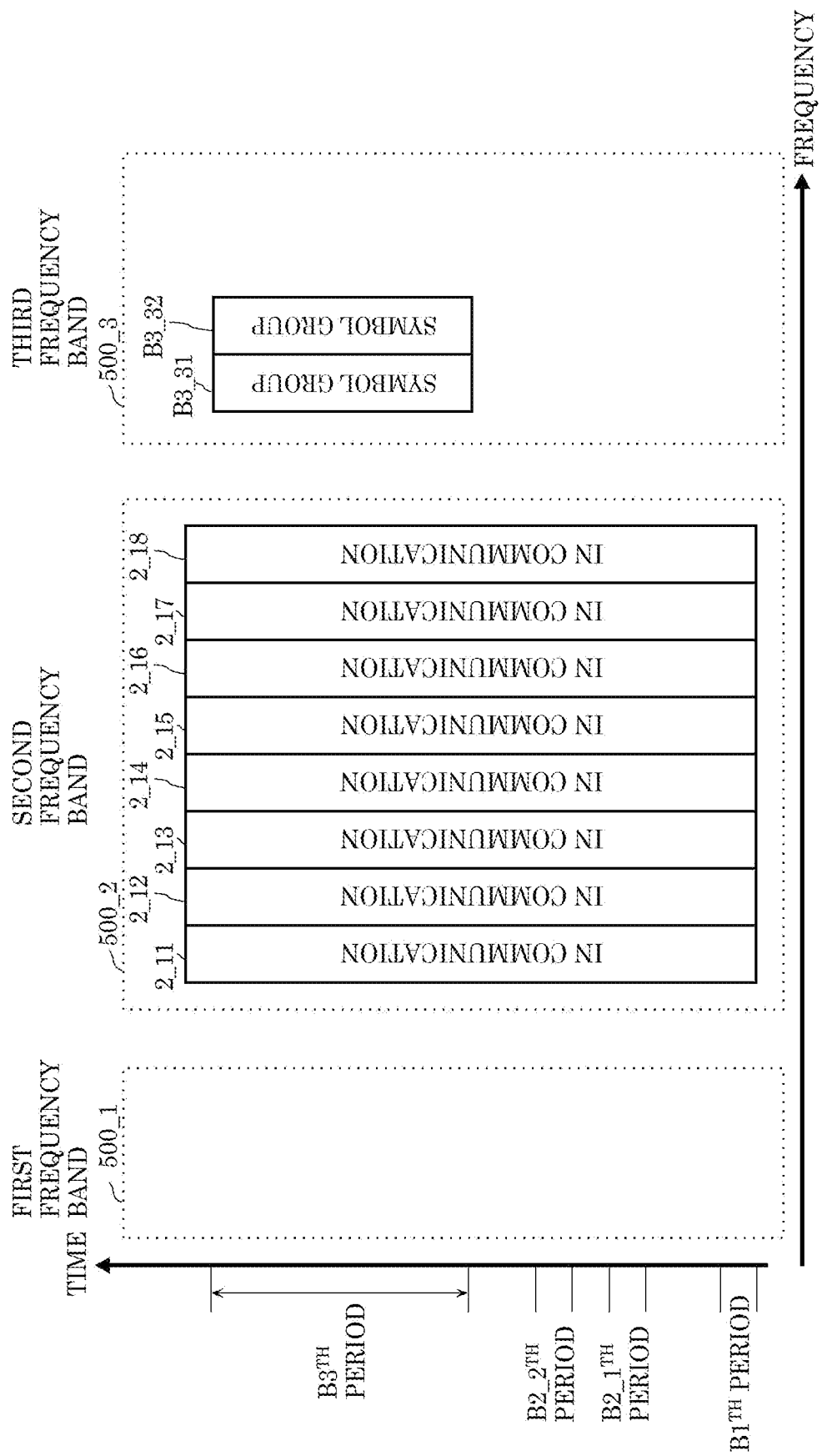
FIG. 33D illustrates an example of transmission of symbol groups.

AP 1901 receives the CTSs illustrated in FIG. 33B that are transmitted by terminal 3001_1 and the CTSs illustrated in FIG. 33C that are transmitted by terminal 3001_2. Then, in response to receiving the CTSs, AP 1901 determines to transmit symbol groups including data symbols in the first channel and the second channel of third frequency band 500_3. FIG. 33D illustrates an example in which AP 1901 is transmitting symbol groups including data symbols to terminal 3001_1 and terminal 3001_2. In FIG. 33D, frequency is represented on the horizontal axis and time is represented on the vertical axis. As illustrated in FIG. 33D, symbol groups labeled B3_31 and B3_32 are present in the B$3^{th}$ period.

AP 1901 transmits symbol groups labeled B3_31 and B3_32 using third frequency band 500_3. Each of symbol groups labeled B3_31 and B3_32 is present within a span of 80 MHz, tier example. Symbol group labeled B3_31 is present in the first channel of third frequency band 500_3, and symbol group labeled B3_32 is present in the second channel of third frequency band 500_3. Although only first through fourth channels of third frequency band 500_3 are described, third frequency band 500_3 may include other channels.

As illustrated in FIG. 33D, AP 1901 is currently communicating with, for example, terminals 1902_1 and 1902_2 in second frequency band 500_2, as indicated by 2_11, 2_2, 2_13, 2_14, 2_15, 2_16, 2_17, and 2_18. Here, 2_11 is the first channel of second frequency band 500_2, 2_12 is the second channel of second frequency band 500_2, 2_13 is the third channel of second frequency band 500_2, 2_14 is the fourth channel of second frequency band 500_2, 2_15 is the fifth channel of second frequency band 500_2, 2_16 is the sixth channel of second frequency band 500_2, 2_17 is the seventh channel of second frequency band 500_2, and 2_18 is the eighth channel of second frequency band 500_2.

As described above, for example, the AP is communicating with a plurality of terminals using second frequency band 500_2, and during this communication, a plurality of other terminals and the AP begin communicating using, for example, third frequency band 500_3, i.e., a single frequency band. This makes it possible to achieve the advantageous effect that data transmission speed can be improved in the communication system. Were, the RTSs illustrated in FIG. 33A are characterized in that they include the addresses of a plurality of terminals. Note that the configuration method of the channels used in the first frequency band, the configuration method of the channels used in the second frequency band, and the configuration method of the channels used in the third frequency band are not limited to the above examples. Accordingly, the embodiment may be implemented in the same manner even with a configuration method other than the examples illustrated in FIG. 33A, FIG. 33B, FIG. 33C, and FIG. 33D.

In the examples illustrated in FIG. 31A through FIG. 31C, the AP is exemplified as currently communicating in second frequency band 500_2, but this example is not limiting. For example, the AP may be currently communicating in first frequency band 500_1, and may transmit data symbols to a plurality of terminals using second frequency band 500_2. In such cases, the RTSs transmitted by AP 1901 using second frequency band 500_2 include the addresses of a plurality of terminals.

Similarly, the AP may be currently communicating in first frequency band 500_1, and may transmit data symbols to a plurality of terminals using third frequency band 500_3. In such cases, the RTSs transmitted by AP 1901 using third frequency band 500_3 include the addresses of a plurality of terminals.

The AP may be currently communicating third frequency band 500_3, and may transmit data symbols to a plurality of terminals using first frequency band 500_1. In such cases, the RTSs transmitted by AP 1901 using first frequency band 500_1 include the addresses of a plurality of terminals.

Similarly, the AP may be currently communicating in third frequency band 500_3, and may transmit data symbols to a plurality of terminals using second frequency band 500_2. In such cases, the RTSs transmitted by AP 1901 using second frequency band 500_2 include the addresses of a plurality of terminals.

Supplemental Note 3

Figure 34:
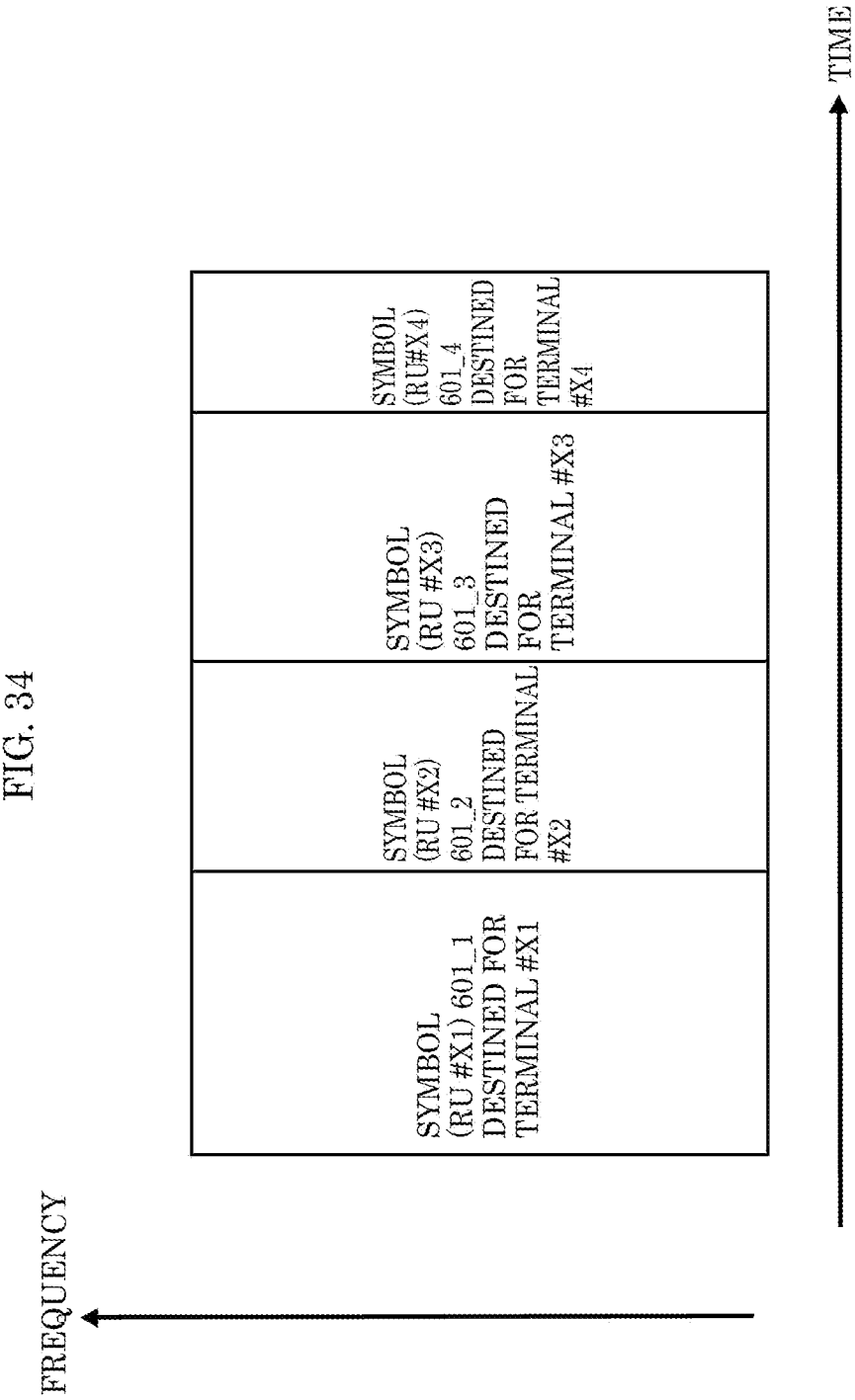
FIG. 34 illustrates an example of transmission of symbols.
Figure 35:
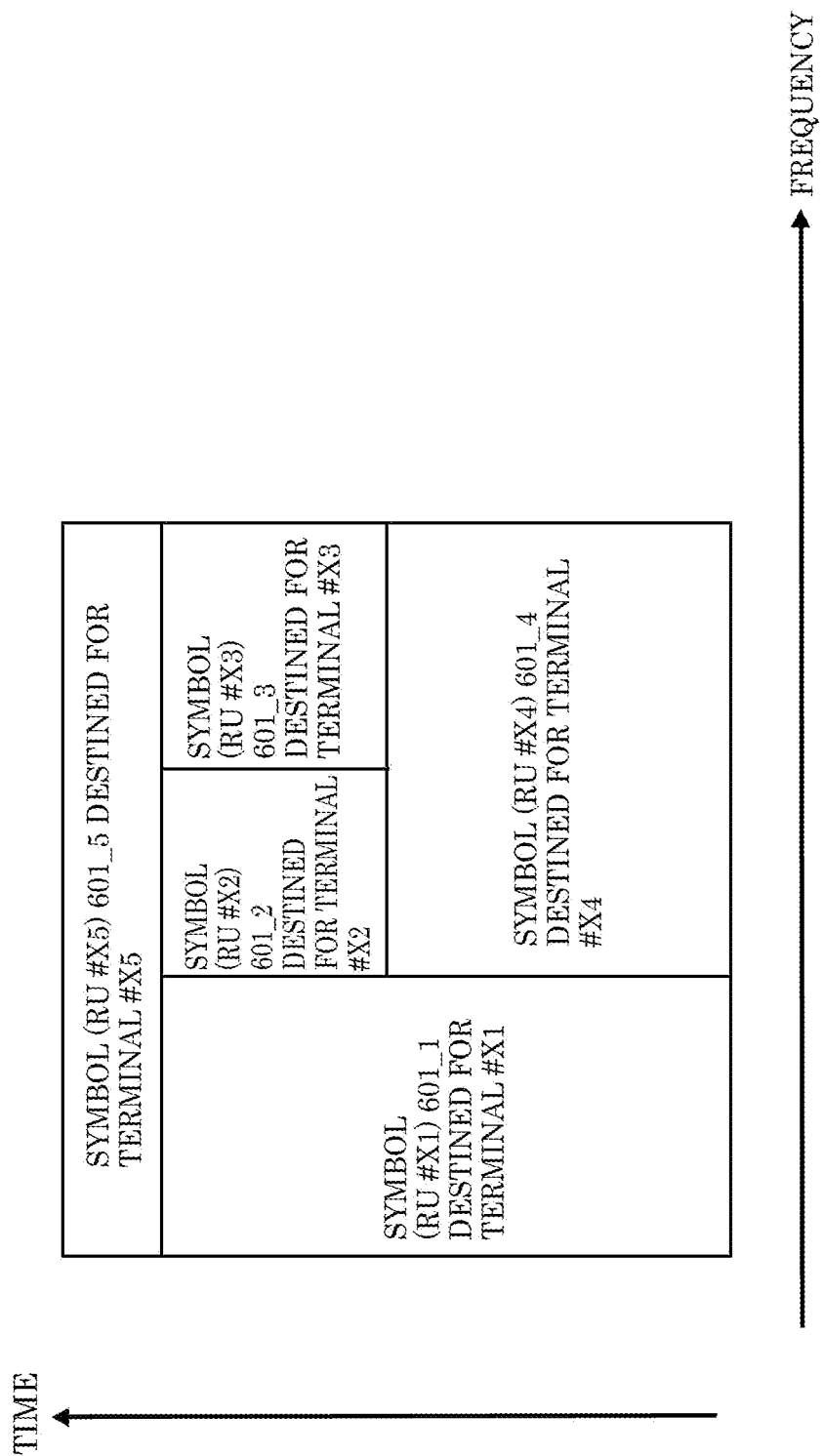
FIG. 35 illustrates an example of transmission of symbols.

In the present specification, when the AP, for example, transmits symbols destined for a plurality of terminals in a frame in the time-frequency domain, frequency division, such as illustrated in FIG. 6B, may be performed, and the AP may transmit the symbols destined for the plurality of terminals, and, alternatively, time division, such as illustrated in FIG. 34, may be performed, and the AP may transmit the symbols destined for the plurality of terminals, and, alternatively, two or more regions comprised of time and frequency may be provided, and the AP may transmit the symbols destined for the plurality of terminals, such as illustrated in FIG. 35. In FIG. 34, time is represented on the horizontal axis and frequency is represented on the vertical axis. In FIG. 35, frequency is represented on the horizontal axis and time is represented on the vertical axis.

In the present specification, in descriptions related to the AP, operations may be operations performed by a base station, a repeater, a terminal, a communication device, a personal computer, or a mobile phone. In the present specification, in descriptions related to the terminal, operations may be operations performed by an AP, a base station, a repeater, a communication device, a personal computer, or a mobile phone.

Embodiment 4

In the present embodiment, a communication method related to Embodiment 1 through Embodiment 3 will be described.

In the present embodiment, multi-band communication and multichannel communication will be described. As used herein, multi-band communication and multichannel communication are defined as follows.

Multi-Band Communication:

Multi-band communication is the simultaneous reception of a plurality of modulated signals transmitted by one or more communication partners, i.e., one or more communication devices (for example, access points (APs)), by a first communication device (for example, a terminal). These plurality of modulated signals include modulated signals in a plurality of frequency bands (for example, the 5 GHz band and the 6 GHz band).

Note that the first communication device may simultaneously communicate with the one or more communication devices that are the communication partners using a plurality of frequency bands. Examples are given in Embodiment 1 through Embodiment 3.

Multichannel Communication:

Multichannel communication is the simultaneous reception of a plurality of modulated signals transmitted by one or more communication partners, i.e., one or more communication devices (for example, access points (APs)), by a first communication device (for example, a terminal). These plurality of modulated signals include modulated signals in a plurality of channels of the first frequency band (for example, the first channel and the second channel of the 5 GHz band).

Note that the first communication device may simultaneously communicate with the one or more communication devices that are the communication partners using a plurality of channels of the first frequency band. Examples are given in Embodiment 1 through Embodiment 3.

In the present specification, both terms "multi-band" and "multichannel" are used individually, but "multi-band" and "multichannel" may collectively be referred to as "multichannel".

The present embodiment will be described using a wireless LAN communication system based on the IEEE 802.11 standard as an example.

First, a wireless LAN medium access control (MAC) frame will be described.

There are three types of MAC frames: a management frame; a control frame; and a data frame.

First, the management frame will be described. Examples of management frames are given below.

A data frame is a frame for transmitting user data.

Figure 36:
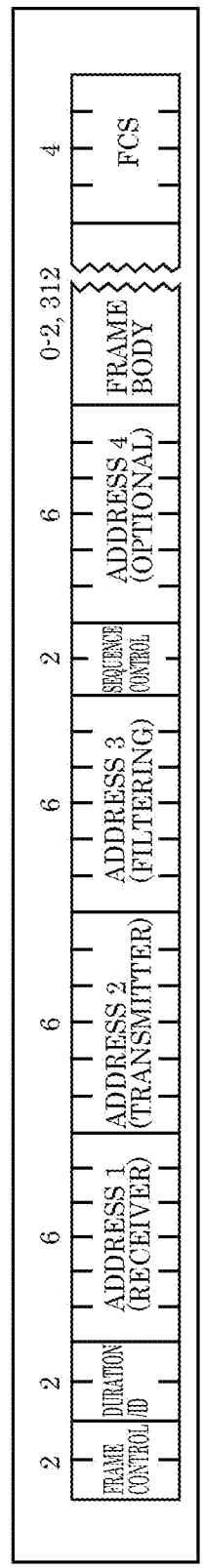
FIG. 36 illustrates an example of a configuration of a data frame.

An example of a configuration of a data frame according to the IEEE 802.11 standard is illustrated in FIG. 36. The values in FIG. 36 indicate the data length of the field they are above, and are in units of bytes.

For example, a data frame includes the following:
2 bytes long Frame Control (field);
2 bytes long Duration/Identifier (ID) (field);
6 bytes long (Receiver) Address 1 (field);
6 bytes long (Transmitter) Address 2 (field);
6 bytes long (Filtering) Address 3 (field);
2 bytes long Sequence Control (field);
6 bytes long (Optional) Address 4 (field);
Frame Body; and
4 bytes long Frame Check Sequence (FCS) (field).

TABLE 1 shows how the Address fields of the data frame are used.

TABLE 1

| Function | ToDS | FromDS | Address 1 (Receiver) | Address 2 (Transmitter) | Address 3 | Address 4 |
| --- | --- | --- | --- | --- | --- | --- |
| IBSS | 0 | 0 | Destination address (DA) | Source address (SA) | BSSID | Not used |
| To AP (infrastructure) | 1 | 0 | BSSID | Source address (SA) | Destination address (DA) | Not used |
| From AP (infrastructure) | 0 | 1 | Destination address (DA) | BSSID | Source address (SA) | Not used |
| WDS (bridge) | 1 | 1 | Receiver address (RA) | Transmitter address (TA) | Destination address (DA) | Source address (SA) |

Beacon Frame:
A frame for informing surrounding wireless communication devices of network information.
Probe Request Frame:
A frame for a terminal to inquire whether there is a wireless communication cell in the surrounding area.
Probe Response Frame:
A response frame to the probe request.
Association Request Frame:
A frame transmitted by a terminal to a base station for requesting connection association.
Association Response Frame:
A response frame to the association request
Disassociation Frame:
A frame for disconnecting communication.
Authentication Frame:
A frame for performing authentication between wireless communication devices.
De-Authentication Frame:
A frame for disconnecting (cancelling authentication),
Action Frame:
A universal frame for additional functions.
Examples of Control Frames are Given Below.
Request to Send (RTS) Frame:
A frame for requesting data transmission.
Clear to Send (CTS) Frame:
A frame for transmitting that the wireless communication device specified in the RTS is clear to transmit.
Acknowledgement (ACK) Frame:
A frame for acknowledging and responding to normal receipt of data.
Block ACK Request Frame:
A frame for requesting a block ACK.
Block ACK Frame:
A frame for acknowledging and responding, to normal receipt of data of a plurality of MAC frames.

In TABLE 1, IBSS stands for Independent Basic Service Set, AP stands for Access Point, WDS stands for Wireless Distribution System, DS stands for Distribution System, BSSID stands for Basic Service Set Identifier (ID), DA stands for Destination Address, SA stands for Source Address, RA stands for Receiver Address, and TA stands for Transmitter Address.

Next, BSSID and Service Set ID (SSID) will be described.

BSSID:
In an infrastructure network, a BSSID is the MAC address of a wireless communication interface of an access point. In an ad hoc network, a BSSID is randomly generated and the Universal/Local bit is set to 1.
SSID:
An identifier that is longer than the normal 48-bit identifier (0 to 32 bytes long).

Next, a configuration example of the management frame will be given.

Figure 37:
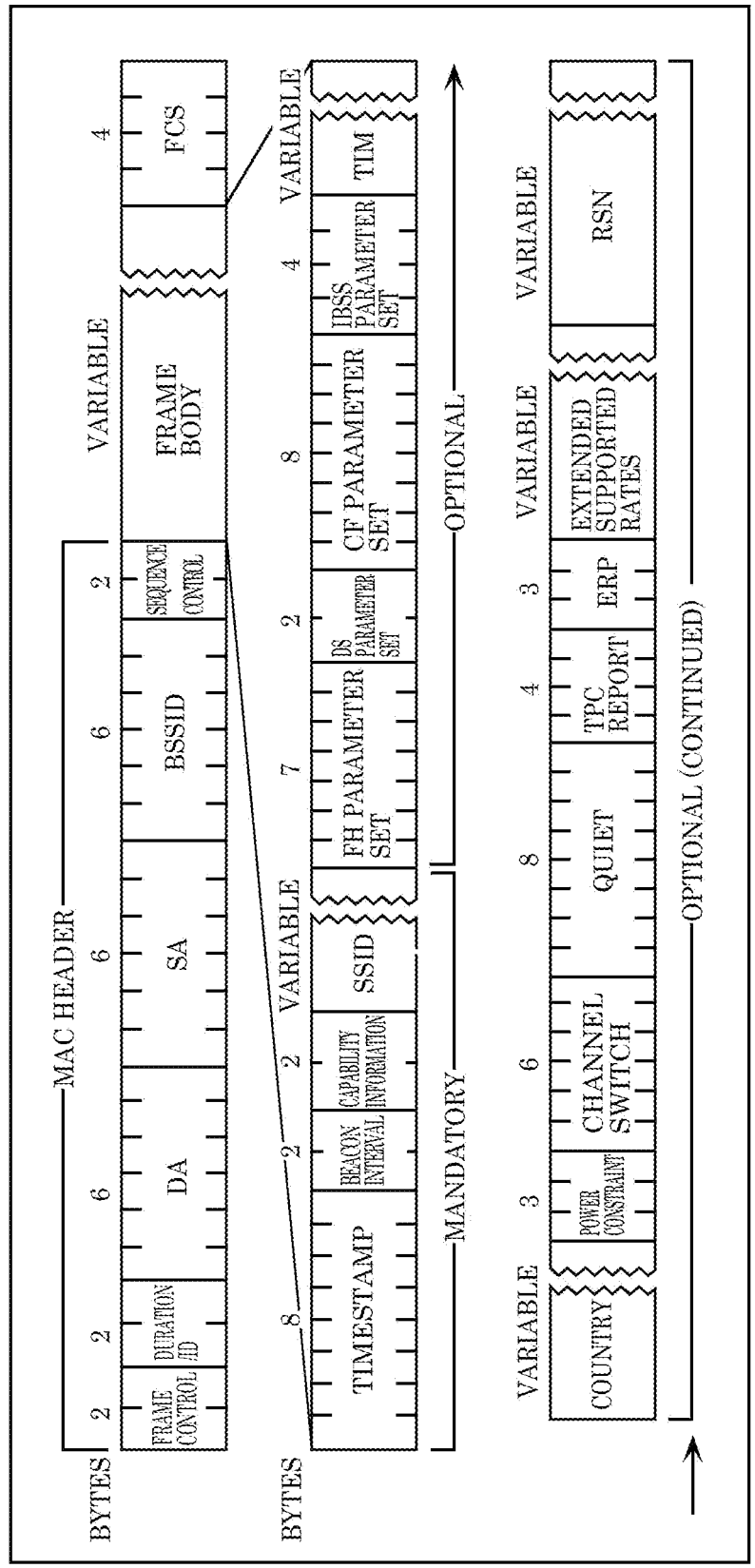
FIG. 37 illustrates an example of a configuration of a beacon frame.

An example of a configuration of a beacon frame according to the IEEE 802.11 standard is illustrated in FIG. 37. The values in FIG. 37 indicate the data length of the field they are above, and are in units of bytes.

For example, a beacon frame includes the following:
2 bytes long Frame Control (field);
2 bytes long Duration (field);
6 bytes long Destination Address (DA) (field);
6 bytes long Source Address (SA) (field);
6 bytes long BSSID (field); and
2 bytes long Sequence Control (field).

The above make up the MAC header. A beacon frame also includes the following:
Variable-length Frame Body (field);
4 bytes long Frame Check. Sequence (FCS) (field):
8 bytes long Timestamp (field);
2 bytes long Beacon Interval (field);
2 bytes long Capability Info (field);

Variable-length SSID (field);
7 bytes long Frequency Hopping (FH) Parameter Set (field);
2 bytes long Direct Sequence (DS) Parameter Set (field);
8 bytes long Contention Free (CF) Parameter Set (field);
4 bytes long IBSS Parameter Set (field);
Variable-length Traffic Indication Map (TIM) (field);
Variable-length Country (field);
3 bytes long Power Constraint (field);
6 bytes long Channel Switch (field);
8 bytes long Quiet (field);
4 bytes long Transmit Power Control (TPC) Report (field);
Variable-length Effective Radiated Power (ERP) (field);
Variable-length Extended Supported Rates (field); and
Variable-length Robust Security Network (RSN) (field).

Note that in a beacon frame transmitted by an AP, the BSSID is typically the BSSID of the AP, and the SSID is typically the SSID of the AP. The DA is typically all 1's (to indicate broadcast), and the SA and the BSSID are typically the MAC address of the AP.

Figure 38:
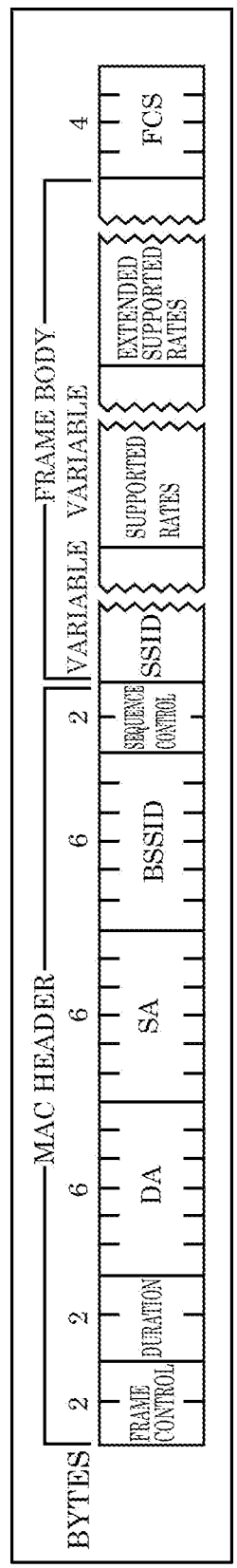
FIG. 38 illustrates an example of a configuration of a probe request frame.

An example of a configuration of a probe request frame according to the IEEE 802.11 standard is illustrated in FIG. 38. The values in FIG. 38 indicate the data length of the field they are above, and are in units of bytes.

For example, a probe request frame includes the following:
2 bytes long Frame Control (field);
2 bytes long Duration (field);
6 bytes long Destination. Address (DA) (field);
6 bytes long Source Address (SA) (field);
6 bytes long BSSID (field); and
2 bytes long Sequence Control (field).

The above make up the MAC header. A probe request frame also includes the following:
Variable-length SSID (field); and
Variable-length Supported Rates (field).

The above make up the Frame Body. A probe request frame also includes the following:
4 bytes long FCS (field).

In a probe request frame transmitted by a terminal, the DA is typically the MAC address of the AP, and the SA and BSSID are typically the MAC address of the terminal. The SSID is typically the SSID of the AP.

Figure 39:
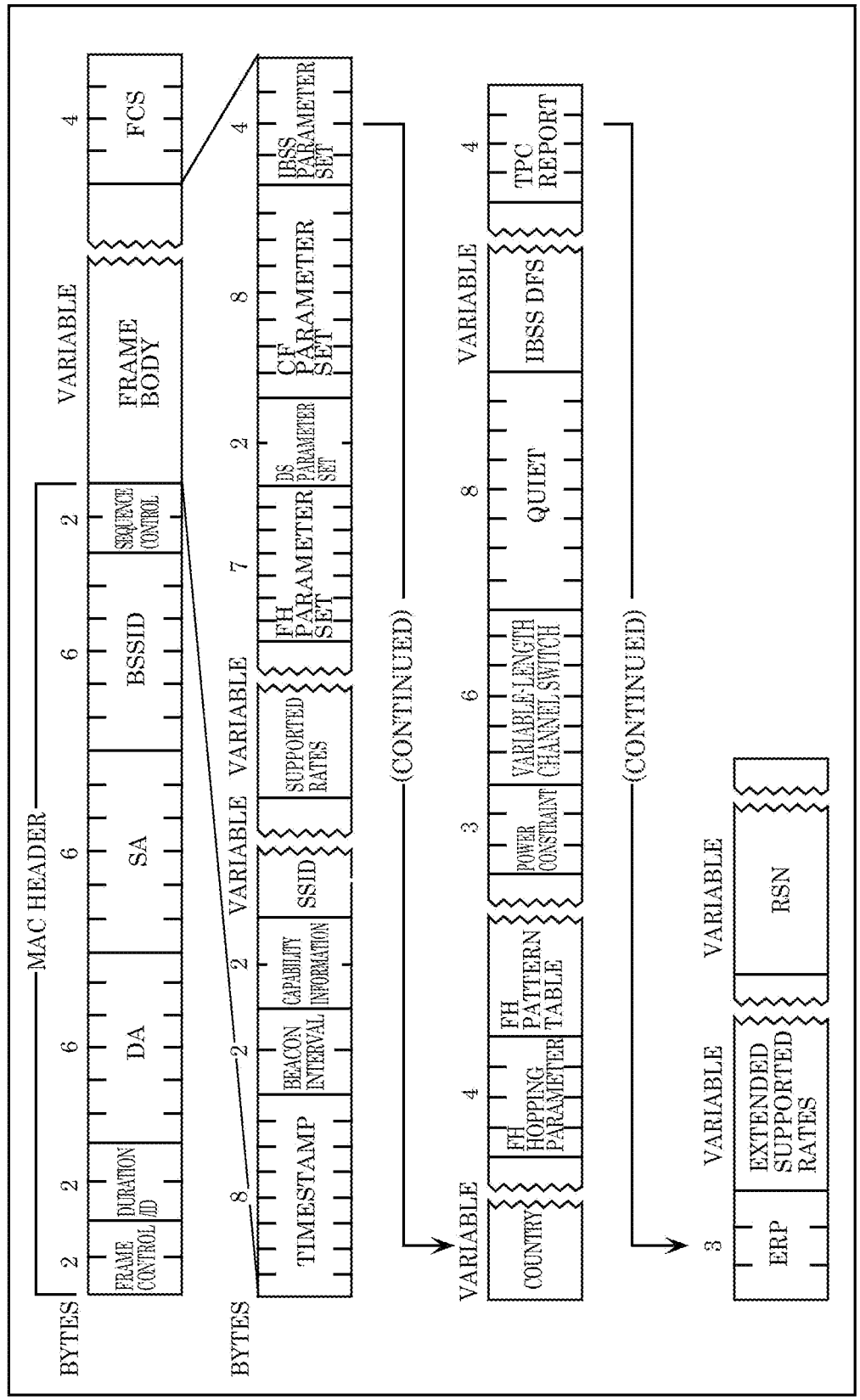
FIG. 39 illustrates an example of a configuration of a probe response frame.

An example of a configuration of a probe response frame according to the IEEE 802.11 standard is illustrated in FIG. 39. The values in FIG. 39 indicate the data length of the field they are above, and are in units of bytes.

For example, a probe response frame includes the following:
2 bytes long Frame Control (field);
2 bytes long Duration (field);
6 bytes long Destination Address (DA) (field);
6 bytes long Source Address (SA) (field);
6 bytes long BSSID (field); and
2 bytes long Sequence Control (field).

The above make up the MAC header. A probe response frame also includes the following:
Variable-length Body (field);
4 bytes long Frame Check Sequence (FCS) (field);
8 bytes long Timestamp (field);
2 bytes long Beacon Interval (field);
2 bytes long Capability Info (field);
Variable-length SSID (field);
7 bytes long Frequency Hopping (FH) Parameter Set (field);
2 bytes long Direct Sequence (DS) Parameter Set (field);
8 bytes long Contention Free (CO Parameter Set (field);
4 bytes long IBSS Parameter Set (field);
Variable-length Country (field);
4 bytes long FH Hopping Parameter (field);
FH Pattern Table (field);
3 bytes long Power Constraint (field);
6 bytes long Variable-length Channel Switch (field);
8 bytes long Quiet (field);
4 bytes long Transmit Power Control (TPC) Report (field);
Variable-length Effective Radiated Power (ERP) (field);
Variable-length Extended Supported Rates (field); and
Variable-length Robust Security Network (RSN) (field).

In a probe response frame transmitted by an AP, the DA is typically the MAC address of a terminal, and the SA and BSSID are typically the MAC address of the AP. The SSID is typically the SSID of the AP.

Figure 40:
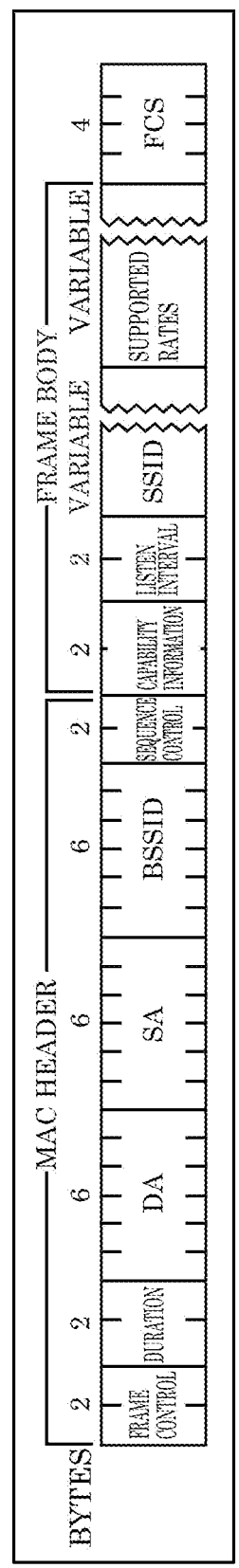
FIG. 40 illustrates an example of a configuration of an association request frame.

An example of a configuration of an association request frame according to the IEEE 802.11 standard is illustrated in FIG. 40. The values in FIG. 40 indicate the data length of the field they are above, and are in units of bytes.

For example, an association request frame includes the following:
2 bytes long Frame Control (field);
2 bytes long Duration (field);
6 bytes long Destination Address (DA) (field);
6 bytes long Source Address (SA) (field);
6 bytes long BSSID (field); and
2 bytes long Sequence Control (field).

The above make up the MAC header. An association request frame also includes the following:
2 bytes long Capability Info (field);
2 bytes long Listen Interval (field);
Variable-length SSID (field); and
Variable-length Supported Rates (field).

The above make up the Frame Body. An association request frame also includes the following:
4 bytes long FCS (field).

In an association request frame transmitted by a terminal, the DA is typically the MAC address of the AP, and the SA and BSSID are typically the MAC address of the terminal. The SSID is typically the SSID of the AP.

Figure 41:
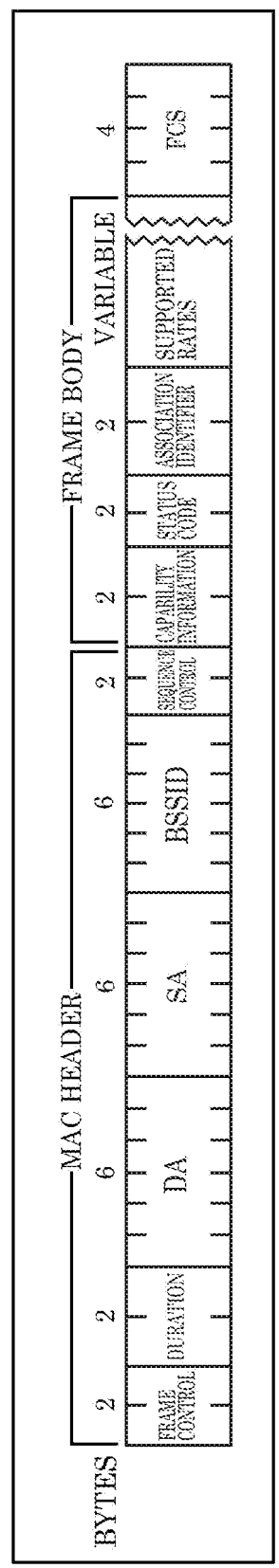
FIG. 41 illustrates an example of a configuration of an association response frame.

An example of a configuration of an association response frame according to the IEEE 802.11 standard is illustrated in FIG. 41. The values in FIG. 41 indicate the data length of the field they are above, and are in units of bytes.

For example, an association response frame includes the following:
2 bytes long Frame Control (field);
2 bytes long Duration (field);
6 bytes long Destination Address (DA) (field);
6 bytes long Source Address (SA) (field);
6 bytes long BSSID (field); and
2 bytes long Sequence Control (field).

The above make up the MAC header, An association response frame also includes the following:
2 bytes long Capability Info (field);
2 bytes long Status Code (field);
2 bytes long Association Identifier (field); and
Variable-length Supported Rates (field).

The above make up the Frame Body. An association response frame also includes the following:
4 bytes long FCS (field).

In an association response frame transmitted by an AP, the DA is typically the MAC address of a terminal, and the SA and BSSID are typically the MAC address of the AP.

Next, a transmission example of a beacon frame will be given. This example will assume a system status like that illustrated in FIG. 42.

Figure 42:
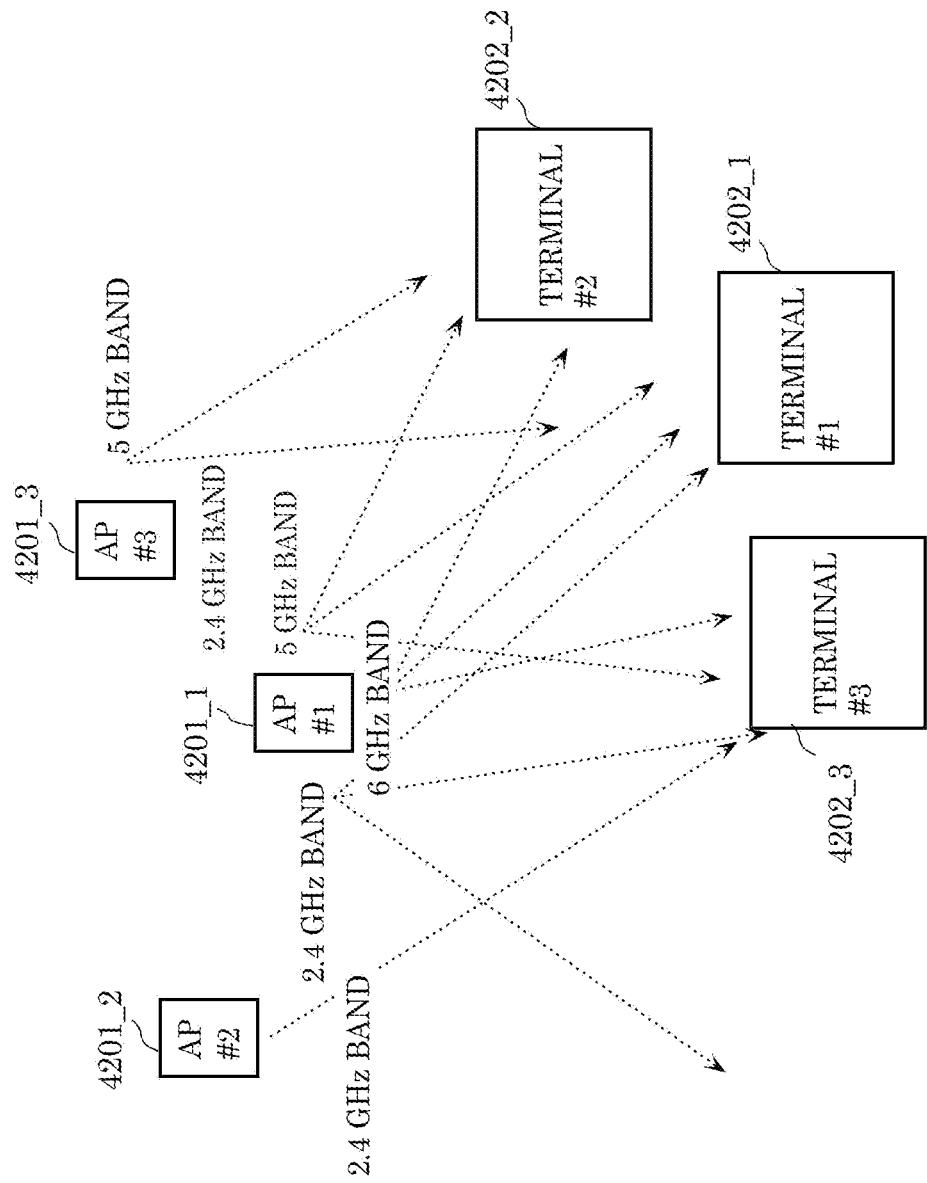
FIG. 42 illustrates an example of a state of a system.

In FIG. 42, AP #1 labeled 4201_1 is capable of transmitting a 2.4 GHz band modulated signal, a 5 GHz band modulated signal, and a 6 GHz band modulated signal. AP #2 labeled 4201_2 is capable of transmitting a 2.4 GHz band modulated signal. AP #3 labeled 4201_3 is capable of transmitting a 2.4 GHz band modulated signal and a 5 GHz band modulated signal.

Even if an AP capable of transmitting modulated signals of two or more frequency bands, such as AP #1 labeled 4201_1, transmits a modulated signal of any one of the frequency bands, the MAC address used is a first MAC address. Even if AP #3 labeled 4201_3 transmits a modulated signal of any one of the frequency bands, the MAC address used is a third MAC address. It goes without saying that the first MAC address and the second MAC address are different, the first MAC address and the third MAC address are different, and the second MAC address and the third MAC address are different.

AP #1 labeled 4201_1 uses a $1\_1^{th}$ SSID for the 2.4 GHz band, a $1\_2^{th}$ SSID for the 5 GHz and a $1\_3^{th}$ SSID for the 6 GHz band. It goes without saying that the $1\_1^{th}$ SSID and the $1\_2^{th}$ SSID are different, the $1\_1^{th}$ SSID and the $1\_3^{th}$ SSID are different, and the $1\_2^{th}$ SSID and the $1\_3^{th}$ SSID are different.

AP #2 labeled 4201_2 uses a $2\_1^{th}$ SSID for the 2.4 GHz.

AP #3 labeled. 4201_3 uses a $3\_1^{th}$ SSW for the 2.4 GHz band, and a $3\_2^{th}$ SSID for the 5 GHz, it goes without saying that the $3\_1^{th}$ SSID and the $3\_2^{th}$ SSID are different.

AP #1 labeled 4201_1 transmits a beacon frame on the 2.4 GHz band. The SA (field) and the BSSID (field) of the beacon frame on the 2.4 GHz band is the first MAC address. The SSID (field) of the beacon frame on the 2.4 GHz band is the $1\_1^{th}$ SSID.

AP #1 labeled 4201_1 transmits a beacon frame on the 5 GHz band. The SA (field) and the BSSID (field) of the beacon frame on the 5 GHz band is the first MAC address. The SSID (field) of the beacon frame on the 5 GHz band is the $1\_2^{th}$ SSID.

AP #1 labeled 4201_1 transmits a beacon frame on the 6 GHz band. The SA (field) and the BSSID (field) of the beacon frame on the 6 GHz band is the first MAC address. The SSID (field) of the beacon frame on the 6 GHz band is the $1\_3^{th}$ SSID.

AP #2 labeled 4201_2 transmits a beacon frame on the 2.4 GHz band. The SA (field) and the BSSID (field) of the beacon frame on the 2.4 GHz band is the second MAC address. The SSID (field) of the beacon frame on the 2.4 GHz band is the $2\_1^{th}$ SSID.

AP #3 labeled 4201_3 transmits a beacon frame on the 2.4 GHz band. The SA (field) and the BSSID (field) of the beacon frame on the 2.4 GHz band is the third MAC address. The SSID (field) of the beacon frame on the 2.4 GHz band is the $3\_1^{th}$ SSID.

AP #3 labeled 4201_3 transmits a beacon frame on the 5 GHz band. The SA (field) and the BSSID (field) of the beacon frame on the 5 GHz band is the third MAC address. The SSID (field) of the beacon frame on the 5 GHz band is the $3\_2^{th}$ SSID.

For example, AP #1 labeled 4201_1 is capable of multi-band transmission and reception via the 2.4 GHz band modulated signal and the 5 GHz band modulated signal, capable of multi-band transmission and reception via the 2.4 GHz band modulated signal and the 6 GHz band modulated signal, and capable of multi-band transmission and reception via the 5 GHz band modulated signal and the 6 GHz band modulated signal.

Terminal #1 labeled 4202_1, terminal #2 labeled 4202_2, and terminal #3 labeled 4202_3 are capable of receiving one or more of the 2.4 GHz band beacon frame, the 5 GHz band beacon frame, and the 6 GHz band beacon frame transmitted by AP #1 labeled 4201_1, the 2.4 GHz band beacon frame transmitted by AP #2 labeled 4201_2, and the 2.4 GHz band beacon frame and 5 GHz band beacon frame transmitted by AP #3 labeled 4201_3.

For example, terminal #1 labeled 4202_1 receives the 2.4 GHz band beacon frame, the 5 GHz band beacon frame, and the 6 GHz band beacon frame transmitted by AP #1 labeled 4201_1. An example of operations performed by terminal #1 labeled 4202_1 in such a case will be given with reference to FIG. 43.

Figure 43:
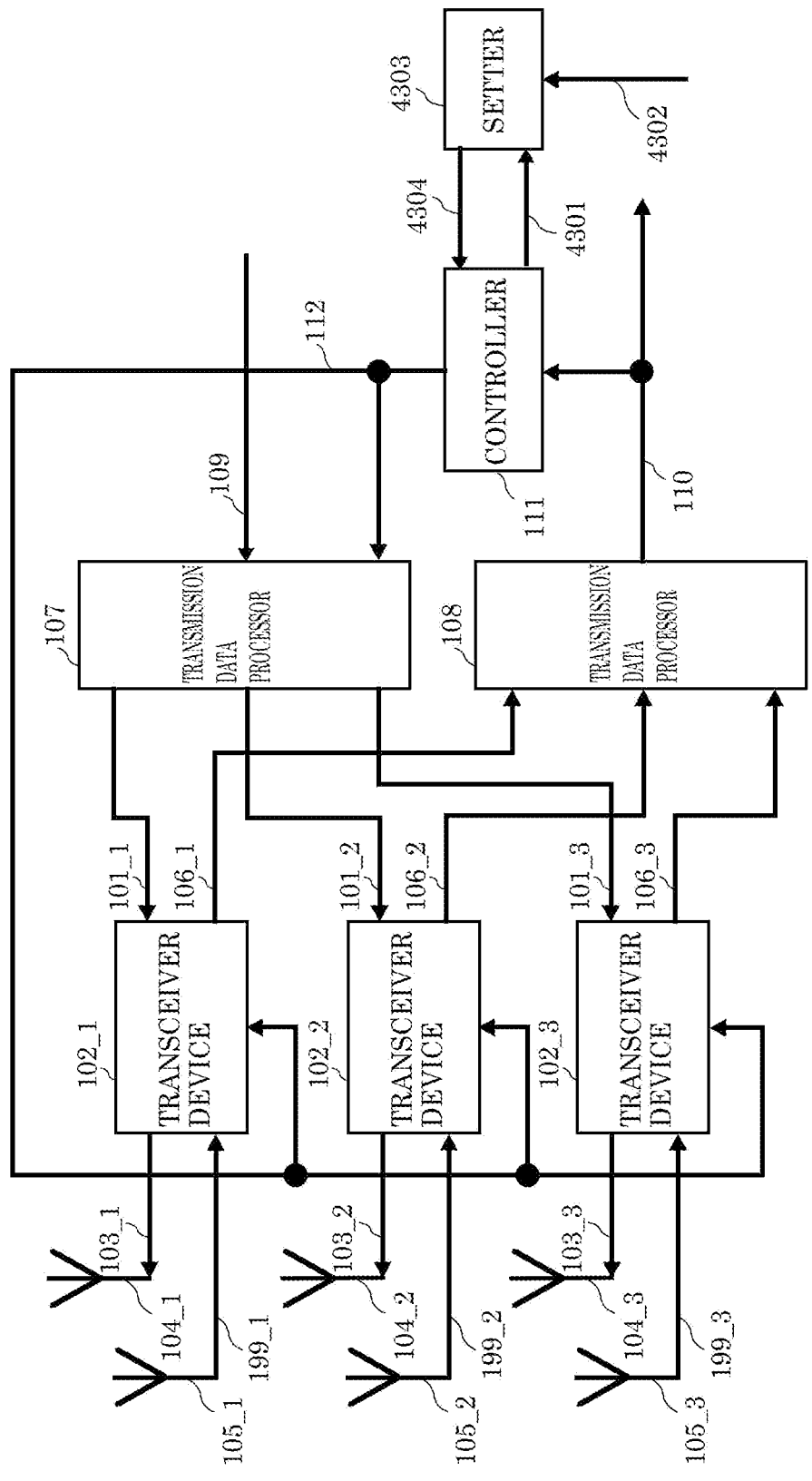
FIG. 43 illustrates an example of a configuration of a terminal.

FIG. 43 illustrates one example of a configuration of a terminal including terminal #1 labeled 4202_1. Elements in FIG. 43 that operate the same as those in FIG. 1 have the same reference signs, and repeated description thereof in detail will be omitted.

In FIG. 43, transceiver device 102_1 is a device that performs processing for transmitting and processing for receiving first frequency band modulated signals, which are 2.4 GHz band modulated signals in this example. Transceiver device 102_2 is a device that performs processing for transmitting and processing for receiving second frequency band modulated signals, which are 5 GHz band modulated signals in this example. Transceiver device 102_3 is a device that performs processing for transmitting and processing for receiving third frequency band modulated signals, which are 6 GHz band modulated signals in this example.

Transceiver device 102_1 performs processing for receiving 2.4 GHz band modulated signals. Accordingly, in the example illustrated in FIG. 42, a beacon frame transmitted by AP #1 labeled 4201_1, a beacon frame transmitted by AP #2 labeled 2401_2, and a beacon frame transmitted by AP #3 labeled 4201_3 are received, and data is obtained from the beacon frames.

Similarly, transceiver device 102_2 performs processing for receiving 5 GHz band modulated signals. Accordingly, in the example illustrated in FIG. 42, a beacon frame transmitted by AP #1 labeled 4201_1 and a beacon frame transmitted by AP #3 labeled 4201_3 are received, and data is obtained from the beacon frames.

Transceiver device 102_3 performs processing for receiving 6 GHz band modulated signals. Accordingly, in the example illustrated in FIG. 42, a beacon frame transmitted by AP #1 labeled 4201_1 is received, and data is obtained from the beacon frame.

Reception data processor 108 receives inputs of first data group 106_1, second data group 106_2, and third data group 106_3, and thus obtains data from the beacon frames on the respective frequency bands. Reception data processor 108 also receives other data.

Controller 111 receives an input of received data group 100, and obtains the data of the beacon frames. Controller 111 outputs the obtained beacon frame data as beacon frame information signal 4301.

Reception data processor 108 receives inputs of first data group 106_1, second data group 106_2, and third data group 106_3, and thus obtains data from the beacon frames on the respective frequency bands. Reception data processor 108 also receives other data.

Controller 111 receives an input of received data group 100 and obtains the data of the beacon frames. Controller 111 outputs the obtained beacon frame data as beacon frame information signal 4301.

Setter 4303 receives an input of settings signal 4302. Settings signal 4302 includes information indicating the SSID of the AP that a terminal in FIG. 43 (terminal #1 labeled 4202_1 in this example) is to connect to. For example, settings signal 4302 includes information indicating the $1\_1^{th}$ SSID, the $1\_2^{th}$ SSID, and the $1\_3^{th}$ SSID, and setter 4303 performs the following processes based on the information indicating the $1\_1^{th}$ SSID, the $1\_2^{th}$ SSID, and the $1\_3^{th}$ SSID.

Setter 4303 obtains the SA (field) or the BSSID (field) of the beacon frame including the $1\_1^{th}$ SSID, the SA (field) or the BSSID (field) of the beacon frame including the $1\_2^{th}$ SSID, and the SA (field) or the BSSID (field) of the beacon frame including the $1\_3^{th}$ SSID. In other words, setter 4303 obtains the MAC address of the AP corresponding to the $1\_1^{th}$ SSID, the MAC address of the AP corresponding to the $1\_2^{th}$ SSID, and the MAC address of the AP corresponding to the $1\_3^{th}$ SSID.

When the SA (field) or the BSSID (field) of the beacon frame including the $1\_1^{th}$ SSID and the SA (field) or the BSSID (field) of the beacon frame including the $1\_2^{th}$ SSID are the same, setter 4303 determines that multi-band communication is possible via the AP corresponding to the $1\_1^{th}$ SSID and the AP corresponding to the $1\_2^{th}$ SSID. Note that setter 4303 may determine the AP corresponding to the $1\_1^{th}$ SSID and the AP corresponding to the $1\_2^{th}$ SSID to be the same device. When the SA (field) or the BSSID (field) of the beacon frame including the $1\_1^{th}$ SSID and the SA (field) or the BSSID (field) of the beacon frame including the $1\_2^{th}$ SSID are different, setter 4303 determines that multi-band communication is not possible via the AP corresponding to the $1\_1^{th}$ SSID and the AP corresponding to the $1\_2^{th}$ SSID.

When the SA (field) or the BSSID (field) of the beacon frame including the $1\_1^{th}$ SSID and the SA (field) or the BSSID (field) of the beacon frame including the $1\_3^{th}$ SSID are the same, setter 4303 determines that multi-band communication is possible via the AP corresponding to the $1\_1^{th}$ SSID and the AP corresponding to the $1\_3^{th}$ SSID. Note that setter 4303 may determine the AP corresponding to the $1\_1^{th}$ SSID and the AP corresponding to the $1\_3^{th}$ SSID to be the same device. When the SA (field) or the BSSID (field) of the beacon frame including the $1\_1^{th}$ SSID and the SA (field) or the BSSID (field) of the beacon frame including the $1\_3^{th}$ SSID are different, setter 4303 determines that multi-band communication is not possible via the AP corresponding to the $1\_1^{th}$ SSID and the AP corresponding to the $1\_3^{th}$ SSID.

When the SA (field) or the BSSID (field) of the beacon frame including the $1\_2^{th}$ SSID and the SA (field) or the BSSID (field) of the beacon frame including the $1\_3^{th}$ SSID are the same, setter 4303 determines that multi-band communication is possible via the AP corresponding to the $1\_2^{th}$ SSID and the AP corresponding to the $1\_3^{th}$ SSID. Note that setter 4303 may determine the AP corresponding to the $1\_2^{th}$ SSID and the AP corresponding to the $1\_3^{th}$ SSID to be the same device. When the SA (field) or the BSSID (field) of the beacon frame including the $1\_2^{th}$ SSID and the SA (field) or the BSSID (field) of the beacon frame including the $1\_3^{th}$ are different, setter 4303 determines that multi-band communication is not possible via the AP corresponding to the $1\_2^{th}$ SSID and the AP corresponding to the $1\_3^{th}$ SSID.

Setter 4303 then outputs signal 4304 of information related to whether or not the above multi-band communication is possible or not to controller 111. Based on signal 4304 of information related to whether or not multi-band communication is possible or not, controller 111 outputs control signal 112 including information indicating whether transceiver devices 102_1, 102_2, and 102_3 are to perform transmission processing or reception processing for multi-band communication. Transceiver devices 102_1, 102_2, and 102_3 determine whether to perform operations for transmission for multi-band communication or reception for multi-band communication, based on control signal 112.

A terminal having the configuration illustrated in FIG. 43 transmits the association request frame illustrated in FIG. 44. The association request frame illustrated in FIG. 44 includes a Multi-band Transmission Capability Information (field) and a Multi-band Reception Capability Information (field), in addition to the following illustrated in FIG. 40: Frame Control (field); Duration (field); Destination Address (DA) (field); Source Address (SA) (field); BSSID (field); Sequence Control (field); Capability Information (field); Listen Interval (field); SSID (field); Supported Rates (field); and FCS (field).

For example, the Multi-band Transmission Capability Information (field) in FIG. 44 includes information indicating whether a terminal having the configuration illustrated in FIG. 43 is capable or incapable of multi-band modulated signal transmission.

For example, the Multi-band. Reception Capability Information (field) in FIG. 44 includes information indicating whether a terminal having the configuration illustrated in FIG. 43 is capable or incapable of reception when a communication partner transmits a multi-band modulated signal.

Here, terminal #1 labeled 4202_1 having the configuration illustrated in FIG. 43 that is capable of multi-band communication transmits, to AP #1 labeled 4201_1, an association request frame on the 2.4 GHz band (transmits a 2.4 GHz band modulated signal), an association request frame on the 5 GHz band (transmits a 5 GHz band modulated signal) and an association frame on the 6 GHz band (transmits a 6 GHz band modulated signal).

For example, when terminal #1 labeled 4202_1 is capable of multi-band transmission via the 2.4 GHz band and another frequency band. (in this example, the 5 GHz band or the 6 GHz band), the Multi-band Transmission Capability Information (field) in the association request frame on the 2.4 GHz band is information indicating that terminal #1 labeled 4202_1 is capable of multi-band modulated signal transmission.

When terminal #1 labeled 4202_1 is capable of multi-band transmission via the 5 GHz band and another frequency band (in this example, the 2.4 GHz band or the 6 GHz band), the Multi-band Transmission Capability Information (field) in the association request frame on the 5 GHz band is information indicating that terminal #1 labeled 4202_1 is capable of multi-band modulated signal transmission.

When terminal #1 labeled 4202_1 is capable of multi-band transmission via the 6 GHz band and another frequency band (in this example, the 2.4 GHz band or the 5 GHz band), the Multi-band Transmission Capability information (field) in the association request frame on the 6 GHz band is information indicating that terminal #1 labeled 4202_1 is capable of multi-band modulated signal transmission.

However, when there is multi-band transmission that the terminal does not support, the following processes are performed.

When a terminal is not capable of multi-band transmission via the 2.4 GHz band and another frequency band (in this example, the 5 GHz band or the 6 GHz band), the Multi-band Transmission Capability Information (field) in the association request frame on the 2.4 GHz band is information indicating that the terminal is not capable of multi-band modulated signal transmission.

When a terminal is not capable of multi-band transmission via the 5 GHz band and another frequency band (in this example, the 2.4 GHz band or the 6 GHz band), the Multi-band Transmission Capability Information (field) in the association request frame on the 5 GHz hand is information indicating that the terminal is not capable of multi-band modulated signal transmission.

When a terminal is not capable of multi-band transmission via the 6 GHz band and another frequency band (in this example, the 2.4 GHz band or the 5 GHz band), the Multi-band Transmission Capability Information (field) in the association request frame on the 6 GHz band is information indicating that the terminal is not capable of multi-band modulated signal transmission.

Terminal #1 labeled 4201_1 sets the Multi-band Reception Capability Information (field) illustrated in FIG. 44 as follows.

For example, when terminal #1 labeled 4202_1 is capable of multi-band reception via the 2.4 GHz band and another frequency band (in this example, the 5 GHz band or the 6 GHz band) that is to say, is capable of demodulating a multi-band modulated signal transmitted by a communication partner, the Multi-band Reception Capability Information (field) of the association request frame on the 2.4 GHz band is information indicating that terminal #1 labeled 4202_1 can receive, i.e., demodulate a multi-band modulated signal transmitted by a communication partner.

When terminal #1 labeled 4202_1 is capable of multi-band reception via the 5 GHz hand and another frequency band (in this example, the 2.4 GHz band or the 6 GHz hand) that is to say, is capable of demodulating a multi-band modulated signal transmitted by a communication partner, the Multi-band Reception Capability Information (field) of the association request frame on the 5 GHz band is information indicating that terminal #1 labeled 4202_1 can receive, i.e., demodulate a multi-band modulated signal transmitted by a communication partner.

When terminal #1 labeled 4202_1 is capable of multi-band reception via the 6 GHz band and another frequency band (in this example, the 2.4 GHz band or the 5 GHz band) that is to say, is capable of demodulating a multi-band modulated signal transmitted by a communication partner, the Multi-band Reception Capability Information (field) of the association request frame on the 6 GHz band is information indicating that terminal #1 labeled 4202_1 can receive, i.e. demodulate a multi-band modulated signal transmitted by a communication partner.

However, when there is multi-band reception that a terminal does not support, the following processes are performed.

When a terminal is not capable of multi-band reception via the 2.4 GHz band and another frequency band (in this example, the 5 GHz band or the 6 GHz band) that is to say, is not capable of demodulating a multi-band modulated signal transmitted by a communication partner, the Multi-band Reception Capability Information (field) of the association request frame on the 2.4 GHz band is information indicating that the terminal cannot receive, i.e., cannot demodulate a multi-band modulated signal transmitted by a communication partner.

When a terminal is not capable of multi-band reception via the 5 GHz band and another frequency band (in this example, the 2.4 GHz band or the 6 GHz band) that is to say, is not capable of demodulating a multi-band modulated signal transmitted by a communication partner, the Multi-band Reception Capability Information (field) of the association request frame on the 5 GHz band is information indicating that the terminal cannot receive, i.e., cannot demodulate a multi-band modulated signal transmitted by a communication partner.

When a terminal is not capable of multi-band reception via the 6 GHz band and another frequency band (in this example, the 2.4 GHz band or the 5 GHz band) that is to say, is not capable of demodulating a multi-band modulated signal transmitted by a communication partner, the Multi-band Reception Capability Information (field) of the association request frame on the 6 GHz band is information indicating that the terminal cannot receive, i.e., cannot demodulate a multi-band modulated signal transmitted by a communication partner.

FIG. 45 illustrates a configuration of an association request frame transmitted by a terminal that differs from the example illustrated in FIG. 44. FIG. 45 differs from FIG. 44 in that the frame includes Multi-band Capability Information instead of the Multi-band Transmission Capability Information and the Multi-band Reception Capability Information.

For example, the Multi-band Capability Information (field) in FIG. 45 includes information indicating whether a terminal having the configuration illustrated in FIG. 43 is capable or incapable of communication via multi-band modulated signals.

For example, when terminal #1 labeled 4202_1 is capable of multi-band communication via the 2.4 GHz band and another frequency band (in this example, the 5 GHz band or the 6 GHz band), the Multi-band Capability Information (field) illustrated in FIG. 45 and included in the association request frame on the 2.4 GHz band is information indicating that terminal #1 labeled 4202_1 is capable of communication via multi-band modulated signals.

When terminal #1 labeled 4202_1 is capable of multi-band communication via the 5 GHz band and another frequency band (in this example, the 2.4 GHz band or the 6 GHz band), the Multi-band Capability Information (field) illustrated in FIG. 45 and included in the association request frame on the 5 GHz band is information indicating that terminal #1 labeled 4202_1 is capable of communication via multi-band modulated signals.

When terminal #1 labeled 4202_1 is capable of multi-band communication via the 6 GHz band and another frequency band (in this example, the 2.4 GHz band or the 5 GHz band), the Multi-band Capability Information (field) illustrated in FIG. 45 and included in the association request frame on the 6 GHz band is information indicating that terminal #1 labeled 4202_1 is capable of communication via multi-band modulated signals.

However, when there is multi-band transmission that the terminal does not support, the following processes are performed.

When a terminal is not capable of multi-band communication via the 2.4 GHz band and another band (in this example, the 5 GHz band or the 6 GHz band), the Multi-band Capability Information (field) in the association request frame on the 2.4 GHz band is information indicating that the terminal is not capable of communication via multi-band modulated signals.

When a terminal is not capable of multi-band communication via the 5 GHz band and another band (in this example, the 2.4 GHz band or the 6 GHz band), the Multi-band Capability Information (field) in the association request frame on the 5 GHz band is information indicating that the terminal is not capable of communication via multi-band modulated signals.

When a terminal is not capable of multi-band communication via the 6 GHz band and another band (in this example, the 2.4 GHz band or the 5 GHz band), the Multi-band Capability Information (field) in the association request frame on the 6 GHz band is information indicating that the terminal is not capable of communication via multi-band modulated signals.

Note that the above can be implemented even if the Multi-band Transmission Capability Information (field) and the Multi-band Reception Capability information (field) illustrated in FIG. 44 are arranged in the Capability information Field illustrated in FIG. 40. The above can be implemented even if the Multi-band. Capability Information (field) illustrated in FIG. 45 is arranged in the Capability Information Field illustrated in FIG. 40.

Although the terms Multi-band Transmission Capability Information (field) and Multi-band Reception Capability Information (field) are used in FIG. 44, these may be referred to by some other name. Although the term Multi-band Capability Information (field) is used in FIG. 45, this may be referred to by some other name.

Information other than the information depicted in FIG. 44 may be included in the association request frame. Similarly, information other than the information depicted in FIG. 45 may be included in the association request frame.

AP #1 labeled 4201_1 illustrated in FIG. 42 receives the association request frame transmitted on the 2.4 GHz band (i.e., the 2.4 GHz band modulated signal transmitted) by terminal #1 labeled 4202_1, the association request frame transmitted on the 5 GHz band the 5 GHz band modulated signal transmitted) by terminal #1 labeled 4202_1, and the association request frame transmitted on the 6 GHz band the 6 GHz band modulated signal transmitted) by terminal #1 labeled 4202_1. Then, based on the data obtained from these association request frames, AP #1 labeled 4201_1 determines a transmitting method, a modulation method, a error correction coding method, and a multi-band configuration method, generates a data frame, and transmits a modulated signal of the data frame to terminal #1 labeled 4202_1.

The configuration of AP #1 labeled 4201_1 illustrated in FIG. 42 is illustrated in FIG. 1.

Transceiver device 102_1 illustrated in FIG. 1 demodulates the association request frame on the 2.4 GHz band, and obtains the data of the association request frame on the 2.4 GHz band.

Transceiver device 102_2 illustrated in FIG. 1 demodulates the association request frame on the 5 GHz band, and obtains the data of the association request frame on the 5 GHz band.

Transceiver device 102_3 illustrated in FIG. 1 demodulates the association request frame on the 6 GHz band, and obtains the data of the association request frame on the 6 GHz band.

Controller 111 illustrated in FIG. 1 obtains, via the reception data processor, the data of the association request frame on the 2.4 GHz band, the data of the association request frame on the 5 GHz band, and the data of the association request frame on the 6 GHz band. Then, based on this data, controller 111 generates data for an association response frame on the 2.4 GHz band, data for an association response frame on the 5 GHz band, and data for an association response frame on the 6 GHz band, and outputs this data as control signal 112.

Transceiver device 102_1 in AP #1 labeled 4201_1 illustrated in FIG. 42 receives an input of control signal 112, and generates and outputs a modulated signal of an association response frame on the 2.4 GHz band from the data of the association response frame on the 2.4 GHz band that is included in control signal 112. The modulated signal of an association response frame on the 2.4 GHz band is output as radio waves from antenna 103_1.

Transceiver device 102_2 in AP #1 labeled 4201_1 illustrated in FIG. 42 receives an input of control signal 112, and generates and outputs a modulated signal of an association response frame on the 5 GHz band from the data of the association response frame on the 5 GHz band that is included in control signal 112. The modulated signal of an association response frame on the 5 GHz band is output as radio waves from antenna 108_2.

Transceiver device 102_3 in AP #1 labeled 4201_1 illustrated in FIG. 42 receives an input of control signal 112, and generates and outputs a modulated signal of an association response frame on the 6 GHz band from the data of the association response frame on the 6 GHz band that is included in control signal 112. The modulated signal of an association response frame on the 6 GHz band is output as radio waves from antenna 103_3.

There may be a frequency band in which an association response frame is not transmitted by AP #1 labeled 4201_1.

FIG. 46 illustrates an example of a configuration of an association response frame transmitted by an AP. The association response frame illustrated in FIG. 46 includes a Multi-band Transmission Support Information (field) and a Multi-band Reception Support Information (field), in addition to the following illustrated in FIG. 41: Frame Control (field); Duration (field); Destination Address (DA) (field); Source Address (SA) (field); BSSID (field); Sequence Control (field); Capability Information (field); Status Code (field); Association Identifier (field); Supported Rates (field); and FCS (field).

For example, the Multi-band Transmission Support information (field) illustrated in FIG. 46 includes information indicating whether an AP having the configuration in FIG. 1 supports or does not support multi-band modulated signal transmission.

For example, the Multi-band Reception Support information (field) illustrated in FIG. 46 includes information indicating whether an AP having the configuration in FIG. 1 is capable or incapable of reception when a communication partner transmits a multi-band modulated signal.

For example, when AP #1 labeled 4201_1 illustrated in FIG. 42 is capable of multi-bald transmission via the 2.4 GHz band and another frequency band (in this example, the 5 GHz band or the 6 GHz band), the Multi-band Transmission Support Information (field) in the association response frame on the 2.4 GHz band is information indicating that AP #1 labeled 4201_1 is capable of multi-band modulated signal transmission.

When AP #1 labeled 4201_1 illustrated in FIG. 42 is capable of multi-band transmission via the 5 GHz band and another frequency band (in this example, the 2.4 GHz band or the 6 GHz band), the Multi-band Transmission Support Information (field) in the association response frame on the 5 GHz band is information indicating that AP #1 labeled 4201_1 is capable of multi-band modulated signal transmission.

When AP #1 labeled 4201_1 illustrated in FIG. 42 is capable of multi-band transmission via the 6 GHz band and another frequency band (in this example, the 2.4 GHz band or the 5 GHz band), the Multi-band Transmission Support Information (field) in the association response frame on the 6 GHz band is information indicating that AP #1 labeled 4201_1 is capable of multi-band modulated signal transmission.

However, when there is multi-band transmission that the AP does not support, the following processes are performed.

For example, when the AP is not capable of multi-band transmission via the 2.4 GHz band and another frequency band (in this example, the 5 GHz band or the 6 GHz band), the Multi-band Transmission Support Information (field) in the association response frame on the 2.4 GHz band is information indicating that the AP does not support multi-band modulated signal transmission.

When the AP is not capable of multi-band transmission via the 5 GHz band and another frequency band (in this example, the 2.4 GHz band or the 6 GHz band), the Multi-band Transmission Support Information (field) in the association response frame on the 5 GHz band is information indicating that the AP does not support multi-band modulated signal transmission.

When the AP is not capable of multi-band transmission via the 6 GHz band and another frequency band (in this example, the 2.4 GHz band or the 5 GHz band), the Multi-band Transmission Support Information (field) in the association response frame on the 6 GHz band is information indicating that the AP does not support multi-band modulated signal transmission.

AP #1 labeled 4201_1 in FIG. 42 sets the Multi-band Reception Support Information (field) illustrated in FIG. 46 as follows.

For example, when AP #1 labeled 4201_1 in FIG. 42 is capable of multi-band reception via the 2.4 GHz band and another frequency band (in this example, the 5 GHz band or the 6 GHz band) that is to say, is capable of demodulating a multi-band modulated signal transmitted by a communication partner, the Multi-band Reception Support Information (field) of the association response frame on the 2.4 GHz band is information indicating that AP #1 labeled 4201_1 can receive, i.e., demodulate a multi-band modulated signal transmitted by a communication partner.

When AP #1 labeled 4201_1 in FIG. 42 is capable of multi-band reception via the 5 GHz band and another frequency band (in this example, the 2.4 GHz band or the 6 GHz band) that is to say, is capable of demodulating a multi-band modulated signal transmitted by a communication partner, the Multi-band Reception Support information (field) of the association response frame on the 5 GHz band is information indicating that AP #1 labeled 4201_1 can receive, i.e., demodulate a multi-band modulated signal transmitted by a communication partner.

When AP #1 labeled 4201_1 in FIG. 42 is capable of multi-band reception via the 6 GHz band and another frequency band (in this example, the 2.4 GHz band or the 5 GHz band) that is to say, is capable of demodulating a multi-band modulated signal transmitted by a communication partner, the Multi-band Reception Support Information (field) of the association response frame on the 6 GHz band is information indicating that AP #1 labeled 4201_1 can receive, i.e., demodulate a multi-band modulated signal transmitted by a communication partner.

However, when there is multi-band reception that the AP does not support, the following processes are performed.

When the AP is not capable of multi-band reception via the 2.4 GHz band and another frequency band (in this example, the 5 GHz band or the 6 GHz band) that is to say, is not capable of demodulating a multi-band modulated signal transmitted by a communication partner, the Multi-band Reception Support Information (field) of the association response frame on the 2.4 GHz band is information indicating that the AP cannot receive, i.e., cannot demodulate a multi-band modulated signal transmitted by a communication partner.

When the AP is not capable of multi-band reception via the 5 GHz band and another frequency band (in this example, the 2.4 GHz band or the 6 GHz band) that is to say, is not capable of demodulating a multi-band modulated signal transmitted by a communication partner, the Multi-band Reception Support Information (field) of the association response frame on the 5 GHz band is information indicating that the AP cannot receive, i.e., cannot demodulate a multi-band modulated signal transmitted by a communication partner.

When the AP is not capable of multi-band reception via the 6 GHz band and another frequency band (in this example, the 2.4 GHz band or the 5 GHz band) that is to say, is not capable of demodulating a multi-band modulated signal transmitted by a communication partner, the Multi-band Reception Support Information (field) of the association response frame on the 6 GHz band is information indicating that the AP cannot receive, i.e., cannot demodulate a multi-band modulated signal transmitted by a communication partner.

FIG. 47 illustrates a configuration of an association response frame transmitted by an AP that differs from the example illustrated in FIG. 46. FIG. 47 differs from FIG. 46 in that the frame includes Multi-band Communication Support Information (field) instead of the Multi-band Transmission Support Information (field) and the Multi-band Reception Support Information (field).

For example, the Multi-band Communication Support Information (field) in FIG. 47 includes information indicating whether an AP having the configuration illustrated in FIG. 1 is capable or incapable of communication via multi-band modulated signals.

For example, when AP #1 labeled 4201_1 in FIG. 42 is capable of multi-band communication via the 2.4 GHz band and another frequency band (in this example, the 5 GHz band or the 6 GHz band), the Multi-band Communication Support Information (field) illustrated in FIG. 47 and included in the association response frame on the 2.4 GHz band is information indicating that AP #1 labeled 4201_1 is capable of communication via multi-band modulated signals.

When AP #1 labeled 4201_1 in FIG. 42 is capable of multi-band communication via the 5 GHz band and another frequency band (in this example, the 2.4 GHz band or the 6 GHz band), the Multi-band Communication Support Information (field) illustrated in FIG. 47 and included in the association response frame on the 5 GHz band is information indicating that AP #1 labeled 4201_1 is capable of communication via multi-band modulated signals.

When AP #1 labeled 4201_1 illustrated in FIG. 42 is capable of multi-band transmission via the 6 GHz band and another frequency band (in this example, the 2.4 GHz band or the 5 GHz band), the Multi-band Transmission Support Information (field) in the association response frame on the 6 GHz band that is illustrated in FIG. 47 is information indicating that AP #1 labeled 4201_1 is capable of multi-band modulated signal transmission.

However, when there is multi-band transmission that the AP does not support, the following processes are performed.

When the AP is not capable of multi-band communication via the 2.4 GHz band and another band (in this example, the 5 GHz band or the 6 GHz band), the Multi-band Communication Support Information (field) illustrated in FIG. 47 and included in the association response frame on the 2.4

GHz band is information indicating that the AP is not capable of communication via multi-band modulated signals.

When the AP is not capable of multi-band communication via the 5 GHz band and another band (in this example, the 2.4 GHz band or the 6 GHz band), the Multi-band Communication Support Information (field) illustrated in FIG. 47 and included in the association response frame on the 5 GHz band is information indicating that the AP is not capable of communication via multi-band modulated signals.

When the AP is not capable of multi-band communication via the 6 GHz band and another band (in this example, the 2.4 GHz band or the 5 GHz band), the Multi-band Communication Support Information (field) it in FIG. 47 and included in the association response frame on the 6 GHz band is information indicating that the AP is not capable of communication via multi-band modulated signals.

Note that the above can be implemented even if the Multi-band Transmission. Support Information (field) and the Multi-band Reception Support Information (field) illustrated in FIG. 46 are arranged in the Capability Information. Field illustrated in FIG. 41. The above can be implemented even if the Multi-band Communication Support Information (field) illustrated in FIG. 47 is arranged in the Capability Information Field illustrated in FIG. 41.

Although the terms Multi-band Transmission Support Information (field) and Multi-band Reception Support Information (field) are used in FIG. 46, these may be referred to by some other name. Although the term Multi-band Communication Support Information (field) is used in FIG. 47, this may be referred to by some other name.

Information other than the information depicted in FIG. 46 may be included in the association response frame. Similarly, information other than the information depicted in FIG. 47 may be included in the association response frame.

Terminal #1 labeled 4202_1 it in FIG. 42 receives the association response frame transmitted on the 2.4 GHz band the 2.4 GHz band modulated signal transmitted) by AP #1 labeled 4201_1, the association response frame transmitted on the 5 GHz band (i.e., the 5 GHz band modulated signal transmitted) by AP #1 labeled 4201_1, and the association response frame transmitted on the 6 GHz band (i.e., the 6 GHz band modulated signal transmitted) by AP #1 labeled 4201_1.

In terminal #1 labeled 4202_1 having the configuration illustrated in FIG. 43, transceiver device 102_1 receives an input of the modulated signal including the association response frame on the 2.4 GHz band received by antenna 105_1, demodulates the modulated signal, and obtains the data of the association response frame on the 2.4 GHz band.

Transceiver device 102_2 receives an input of the modulated signal including the association response frame on the 5 GHz band received by antenna 105_2, demodulates the modulated signal, and obtains the data of the association response frame on the 5 GHz band.

Transceiver device 102_3 receives an input of the modulated signal including the association response frame on the 6 GHz band received by antenna 105_3, demodulates the modulated signal, and obtains the data of the association response frame on the 6 GHz band.

Then, for example, controller 111 obtains the data of the association response frame on the 2.4 GHz, the data of the association response frame on the 5 GHz band, and the data of the association response frame on the 6 GHz band via reception data processor 108, and based on the obtained data, determines a transmitting method, a modulation method, an error correction coding method, and a multi-band configuration method based on this data. AP #1 labeled 4201_1 also determines, based on the data obtained from these association response frames, a transmitting method, a modulation method, an error correction coding method, and a multi-band configuration method. Based on this determined information, transceiver device 102_1, transceiver device 102_2, and transceiver device 102_3 generate a modulated signal of a data frame.

As a result of the generation of the association request frames and the association response frames as described above, the AP and the terminal can transmit and receive multi-band modulated signals, which makes it possible to achieve the advantageous effect of improved data transmission speed and improved data reception quality in a system including the AP and the terminal.

FIG. 48 illustrates a configuration of a beacon frame transmitted by an AP that differs from the example illustrated in FIG. 37. The beacon frame illustrated in FIG. 48 includes a Multi-band Transmission Support Information (field) and a Multi-band Reception Support Information (field), in addition to the following illustrated in FIG. 37: Frame Control (field); Duration (field); Destination Address (DA) (field); Source Address (SA) (field); BSSID (field); Sequence Control (field); Frame Body (field); Frame Check Sequence (FCS) (field); Timestamp (field); Beacon Interval (field); Capability Information (field): SSID (field); Frequency Hopping (FH) (field); Direct Sequence (DS) Parameter Set (field); Contention Free (CF) parameter Set (field); IBSS Parameter Set (field): Traffic Indication Map (TIM) (field); Country (Field); Power Constraint (field); Channel Switch (field); Quiet (field); Transmit Power Control (TPC) Report (field); Effective Radiated Power (ERP) (field); Extended Supported Rates (field); and Robust Security Network (RSN) (field).

For example, the Multi-band Transmission Support Information (field) illustrated in FIG. 48 includes information indicating whether an AP having the configuration in FIG. 1 supports or does not support multi-band modulated signal transmission.

For example, the Multi-band Reception Support Information (field) illustrated in FIG. 48 includes information indicating whether an AP having the configuration in FIG. 1 is capable or incapable of reception when a communication partner transmits a multi-band modulated signal.

For example; when AP #1 labeled 4201_1 illustrated in FIG. 42 is capable of multi-band transmission via the 2.4 GHz band and another frequency band (in this example, the 5 GHz band or the 6 GHz band), the Multi-band Transmission. Support Information (field) in the beacon frame on the 2.4 GHz band is information indicating that AP #1 labeled 4201_1 is capable of multi-band modulated signal transmission.

When AP #1 labeled 4201_1 illustrated in FIG. 42 is capable of multi-band transmission via the 5 GHz band and another frequency band (in this example, the 2.4 GHz band or the 6 GHz band), the Multi-band Transmission Support Information (field) in the beacon frame on the 5 GHz band is information indicating that AP #1 labeled 4201_1 is capable of multi-band modulated signal transmission.

When AP #1 labeled 4201_1 illustrated in FIG. 42 is capable of multi-band transmission via the 6 GHz band and another frequency band (in this example, the 2.4 GHz band or the 5 GHz band), the Multi-band Transmission Support Information (field) in the beacon frame on the 6 GHz band is information indicating that AP #1 labeled 4201_1 is capable of multi-band modulated signal transmission.

However, when there is multi-band transmission that the AP does not support, the following processes are performed.

For example, when the AP is not capable of mufti-band transmission via the 2.4 GHz band and another frequency band (in this example, the 5 GHz band or the 6 GHz band), the Multi-band Transmission Support Information (field) in the beacon frame on the 2.4 GHz band is information indicating that the AP does not support multi-band modulated signal transmission.

When the AP is not capable of multi-band transmission via the 5 GHz band and another frequency band (in this example, the 2.4 GHz band or the 6 GHz band), the Multi-band Transmission Support Information (field) in the beacon frame on the 5 GHz band is information indicating that the AP does not support multi-band modulated signal transmission.

When the AP is not capable of multi-band transmission via the 6 GHz band and another frequency band (in this example, the 2.4 GHz band or the 5 GHz band), the Multi-band Transmission Support Information (field) in the beacon frame on the 6 GHz band is information indicating that the AP does not support multi-band modulated signal transmission.

AP #1 labeled 4201_1 in FIG. 42 sets the Multi-hand Reception Support Information (field) illustrated in FIG. 48 as follows.

For example, when AP #1 labeled 4201_1 in FIG. 42 is capable of multi-band reception via the 2.4 GHz band and another frequency band (in this example, the 5 GHz band or the 6 GHz band) that is to say, is capable of demodulating a multi-band modulated signal transmitted by a communication partner, the Multi-band Reception Support Information (field) of the beacon frame on the 2.4 GHz band is information indicating that AP #1 labeled 4201_1 can receive, i.e., demodulate a multi-band modulated signal transmitted by a communication partner.

When AP #1 labeled 4201_1 in FIG. 42 is capable of multi-band reception via the 5 GHz band and another frequency band (in this example, the 2.4 GHz band or the 6 GHz band) that is to say, is capable of demodulating a multi-band modulated signal transmitted by a communication partner, the Multi-band Reception Support Information (field) of the beacon frame on the 5 GHz band is information indicating that AP #1 labeled 4201_1 can receive, i.e., demodulate a multi-band modulated signal transmitted by a communication partner.

When AP #1 labeled 4201_1 in FIG. 42 is capable of multi-band reception via the 6 GHz band and another frequency band (in this example, the 2.4 GHz band or the 5 GHz band) that is to say, is capable of demodulating a multi-band modulated signal transmitted by a communication partner, the Multi-band Reception Support Information (field) of the beacon frame on the 6 GHz band is information indicating that AP #1 labeled 4201_1 can receive, i.e., demodulate a multi-band modulated signal transmitted by a communication partner.

However, when there is multi-band reception that the AP does not support, the following processes are performed.

When the AP is not capable of multi-band reception via the 2.4 GHz band and another frequency band (in this example, the 5 GHz band or the 6 GHz band) that is to say, is not capable of demodulating a multi-band modulated signal transmitted by a communication partner, the Multi-band Reception Support Information (field) of the beacon frame on the 2.4 GHz band is information indicating that the AP cannot receive, i.e., cannot demodulate a multi-band modulated signal transmitted by a communication partner.

When the AP is not capable of multi-band reception via the 5 GHz band and another frequency band (in this example, the 2.4 GHz band or the 6 GHz band) that is to say, is not capable of demodulating a multi-band modulated signal transmitted by a communication partner, the Multi-band Reception Support Information (field) of the beacon frame on the 5 GHz band is information indicating that the AP cannot receive, i.e., cannot demodulate a multi-band modulated signal transmitted by a communication partner.

When the AP is not capable of multi-band reception via the 6 GHz band and another frequency band (in this example, the 2.4 GHz band or the 5 GHz band) that is to say, is not capable of demodulating a multi-band modulated signal transmitted by a communication partner, the Multi-band Reception Support Information (field) of the beacon frame on the 6 GHz band is information indicating that the AP cannot receive, i.e., cannot demodulate a multi-band modulated signal transmitted by a communication partner.

FIG. 49 illustrates a configuration of a beacon frame transmitted by an AP that differs from the example illustrated in FIG. 48. FIG. 49 differs from FIG. 48 in that the frame includes Multi-band Communication Support Information (field) instead of the Multi-band Transmission Support Information (field) and the Multi-band Reception Support Information (field).

For example, the Multi-band Communication Support Information (field) in FIG. 49 includes information indicating whether an AP having the configuration illustrated in FIG. 1 is capable or incapable of communication via multi-band modulated signals.

For example, when AP #1 labeled 4201_1 in FIG. 42 is capable of multi-band communication via the 2.4 GHz band and another frequency band (in this example, the 5 GHz band or the 6 GHz band), the Multi-band Communication Support Information (field) illustrated in FIG. 49 and included in the beacon frame on the 2.4 GHz band is information indicating that AP #1 labeled 4201_1 is capable of communication via multi-band modulated signals.

When AP #1 labeled 4201_1 in FIG. 42 is capable of multi-band communication via the 5 GHz band and another frequency band (in this example, the 2.4 GHz band or the 6 GHz band), the Multi-band Communication Support Information (field) illustrated in FIG. 49 and included in the beacon frame on the 5 GHz band is information indicating that AP #1 labeled 4201_1 is capable of communication via multi-band modulated signals.

When AP #1 labeled 4201_1 in FIG. 42 is capable of multi-band communication via the 6 GHz band and another frequency band (in this example, the 2.4 GHz band or the 5 GHz band), the Multi-band Communication Support Information (field) illustrated in FIG. 49 and included in the beacon frame on the 6 GHz band is information indicating that AP #1 labeled 4201_1 is capable of communication via multi-band modulated signals.

However, when there is multi-band transmission that the AP does not support, the following processes are performed.

When the AP is not capable of multi-band communication via the 2.4 GHz band and another band (in this example, the 5 GHz band or the 6 GHz band), the Multi-band. Communication Support Information (field) illustrated in FIG. 49 and included in the beacon frame on the 2.4 GHz band is information indicating that the AP is not capable of communication via multi-band modulated signals.

When the AP is not capable of multi-band communication via the 5 GHz band and another band (in this example, the 2.4 GHz band or the 6 GHz band), the Multi-band Communication Support Information (field) illustrated in FIG. 49 and included in the beacon frame on the 5 GHz band is information indicating that the AP is not capable of communication via multi-band modulated signals.

When the AP is not capable of multi-band communication via the 6 GHz band and another band (in this example, the 2.4 GHz band or the 5 GHz band), the Multi-band Communication Support Information (field) illustrated in FIG. 49 and included in the beacon frame on the 6 GHz band is information indicating that the AP is not capable of communication via multi-band modulated signals.

Note that the above can be implemented even if the Multi-band Transmission Support Information (field) and the Multi-band Reception Support Information (field) illustrated in FIG. 48 are arranged in the Capability Information. Field illustrated in FIG. 37. The above can be implemented even if the Multi-band Communication Support Information (field) illustrated in FIG. 49 is arranged in the Capability Information Field illustrated in FIG. 37.

Although the terms Multi-band Transmission Support information (field) and Multi-band Reception Support Information (field) are used in FIG. 48, these may be referred to by some other name. Although the term Multi-band Communication Support information (field) is used in FIG. 49, this may be referred to by some other name.

Information other than the information depicted in FIG. 48 may be included in the beacon frame. Similarly, information other than the information depicted in FIG. 49 may be included in the beacon frame.

Terminal #1 labeled 4202_1 illustrated in FIG. 42 receives the 2.4 GHz band beacon frame (2.4 GHz band modulated signal) transmitted by AP #1 labeled 4201_1, the 5 GHz band beacon frame (5 GHz band modulated signal) transmitted by AP #1 labeled 4201_1, and the 6 GHz band beacon frame (6 GHz band modulated signal) transmitted by AP #1 labeled 4201_1.

As described above, controller 111 illustrated in FIG. 43 receives an input of received data group 100 and obtains the data of the beacon frames. Controller 111 outputs the obtained beacon frame data as beacon frame information signal 4301.

Note that the information related to multi-band (multi-band transmission support information, multi-band reception support information, and multi-band communication support information) that is included in the 2.4 GHz band beacon frame (2.4 GHz band modulated signal) is referred to as "first multi-band related information", the information related to multi-band that is included in the 5 GHz band beacon frame (5 GHz band modulated signal) is referred to as "second multi-band related information", and the information related to multi-band that is included in the 6 GHz band beacon frame (6 GHz band modulated signal) is referred to as "third multi-band related information".

Reception data processor 108 receives inputs of first data group 106_1, second data group 106_2, and third data group 106_3, and thus obtains data from the beacon frames on the respective frequency bands. Reception data processor 108 also receives other data.

Controller 111 receives an input of received data group 100, and obtains the data of the beacon frames. Controller 111 outputs the obtained beacon frame data as beacon frame information signal 4301.

Setter 4303 receives an input of settings signal 4302. Settings signal 4302 includes information indicating the SSID of the AP that a terminal in FIG. 43 (terminal #1 labeled 4202_1 in this example) is to connect to. For example, settings signal 4302 includes information indicating the $1\_1^{th}$ SSID, the $1\_2^{th}$ SSID, and the $1\_3^{th}$ SSID, and setter 4303 performs the following processes based on the information indicating the $1\_1^{th}$ SSID, the $1\_2^{th}$ SSID, and the $1\_3^{th}$ SSID.

Setter 4303 obtains the SA (field) or the BSSID (field) of the beacon frame including the $1\_1^{th}$ SSID, the SA (field) or the BSSID (field) of the beacon frame including the $1\_2^{th}$ SSID, and the SA (field) or the BSSID (field) of the beacon frame including the $1\_3^{th}$ SSID. In other words, setter 4303 obtains the MAC address of the AP corresponding to the $1\_1^{th}$ SSID, the MAC address of the AP corresponding to the $1\_2^{th}$ SSID, and the MAC address of the AP corresponding to the $1\_3^{th}$ SSID.

Setter 4303 obtains the first multi-band related information, the second multi-band related information, and the third multi-band related information.

When the SA (field) or the BSSID (field) of the beacon frame including the $1\_1^{th}$ SSID and the SA (field) or the BSSID (field) of the beacon frame including the $1\_2^{th}$ SSID are the same and the first multi-band related information and the second multi-band related information indicate that multi-band communication is possible, setter 4303 determines that multi-band communication is possible via the AP corresponding to the $1\_1^{th}$ SSID and the AP corresponding to the $1\_2^{th}$ SSID. Note that setter 4203 may determine the AP corresponding to the $1\_1^{th}$ SSID and the AP corresponding to the $1\_2^{th}$ SSID to be the same device.

When the SA (field) or the BSSID (field) of the beacon frame including the $1\_1^{th}$ SSID and the SA (field) or the BSSID (field) of the beacon frame including the $1\_2^{th}$ SSID are different, setter 4303 determines that multi-band communication is not possible via the AP corresponding to the $1\_1^{th}$ SSID and the AP corresponding to the $1\_2^{th}$ SSID.

When either the first multi-band related information or the second multi-band related information indicates that multi-band communication is not possible, setter 4303 determines that multi-band communication is not possible via the AP corresponding to the $1\_1^{th}$ SSID and the AP corresponding to the $1\_2^{th}$ SSID.

When the SA (field) or the BSSID (field) of the beacon frame including the $1\_1^{th}$ SSID and the SA (field) or the BSSID (field) of the beacon frame including the $1\_3^{th}$ SSID are the same and the first multi-band related information and the third multi-band related information indicate that multi-band communication is possible, setter 4303 determines that multi-band communication is possible via the AP corresponding to the $1\_1^{th}$ SSID and the AP corresponding to the $1\_3^{th}$ SSID. Note that setter 4303 may determine the AP corresponding to the $1\_1^{th}$ SSID and the AP corresponding to the $1\_3^{th}$ SSID to be the same device.

When the SA (field) or the BSSID (field) of the beacon frame including the $1\_1^{th}$ SSID and the SA (field) or the BSSID (field) of the beacon frame including the $1\_3^{th}$ SSID are different, setter 4303 determines that multi-band communication is not possible via the AP corresponding to the $1\_1^{th}$ SSID and the AP corresponding to the $1\_3^{th}$ SSID.

When either the first multi-band related information or the third multi-band related information indicates that multi-band communication is not possible, setter 4303 determines that multi-band communication is not possible via the AP corresponding to the $1\_1^{th}$ SSID and the AP corresponding to the $1\_3^{th}$ SSID.

When the SA (field) or the BSSID (field) of the beacon frame including the $1\_2^{th}$ SSID and the SA (field) or the BSSID (field) of the beacon frame including the $1\_3^{th}$ SSID are the same and the second multi-band related information and the third multi-band related information indicate that multi-band communication is possible, setter 4303 determines that multi-band communication is possible via the AP corresponding to the $1\_2^{th}$ SSID and the AP corresponding to the $1\_3^{th}$ SSID. Note that setter 4303 may determine the AP corresponding to the $1\_2^{th}$ SSID and the AP corresponding to the $1\_3^{th}$ SSID to be the same device.

When the SA (field) or the BSSID (field) of the beacon frame including the $1\_2^{th}$ SSID and the SA (field) or the BSSID (field) of the beacon frame including the $1\_3^{th}$ SSID are different, setter 4303 determines that multi-band communication is not possible via the AP corresponding to the $1\_2^{th}$ SSID and the AP corresponding to the $1\_3^{th}$ SSID.

When either the second multi-band related information or the third multi-band related information indicates that multi-band communication is not possible, setter 4303 determines that multi-band communication is not possible via the AP corresponding to the $1\_2^{th}$ SSID and the AP corresponding to the $1\_3^{th}$ SSID.

Setter 4303 then outputs signal 4304 of information related to whether or not the above multi-band communication is possible or not to controller 111. Based on signal 4304 of information related to whether or not multi-band communication is possible or not, controller 111 outputs control signal 112 including information indicating whether transceiver devices 102_1, 102_2, and 102_3 are to perform transmission processing or reception processing for multi-band communication. Transceiver devices 102_1, 102_2, and 102_3 determine whether to perform operations for transmission for multi-band communication or reception for multi-band communication, based on control signal 112.

As another method, setter 4303 may obtain the first multi-band related information, the second multi-band related information, and the third multi-band related information, and search for an AP that can communicate using multichannel communication.

For example, assume setter 4303 specifies communication with a 2.4 GHz band AP via settings signal 4302. Setter 4303 then obtains, via the first multi-band related information, information indicating that multi-band communication is possible on the first frequency band (2.4 GHz band). Based on this, setter 4303 searches for an SSID capable of multi-band communication on the second frequency band (5 GHz band) or the third frequency band (6 GHz band).

Here, setter 4303 obtains second multi-band related information from the second frequency band beacon frame, and searches for a beacon frame having information indicating that multi-band communication is possible. As described above, setter 4303 checks SSIDs, SAs, and BSSIDs to detect an AP (SSID) on the 5 GHz band that is capable of performing multi-band communication with the 2.4 GHz band.

Similarly, setter 4303 obtains third multi-band related information from the third frequency band beacon frame; and searches for a beacon frame having information indicating that mufti-band communication is possible. As described above, setter 4303 checks SSIDs, SAs, and BSSIDs to detect an AP (SSID) on the 6 GHz band that is capable of performing multi-band communication with the 2.4 GHz band.

In this way, by configuring the beacon frame like in FIG. 48 or FIG. 49, it is possible to detect an AP that is capable of multi-band communication. Accordingly, this makes it possible to achieve the advantageous effect that procedures for implementing multi-band communication can be simplified.

In the present embodiment, the terminal is exemplified as having the configuration illustrated in FIG. 43 and the AP is exemplified as having the configuration illustrated in FIG. 1, but the configurations of the terminal and the AP are not limited to those illustrated in FIG. 43 and FIG. 1. For example, the terminal and AP may use a transmission method such as multiple-input multiple-output (MIMO), multiple-input single-output (MISO), or single-input multiple-output (SIMO) for the first frequency band transmitting method or the second frequency band transmitting method or the third frequency band transmitting method. Accordingly, transceiver devices 102_1, 102_2, and 102_3 in FIG. 43 and FIG. 1 may be connected to a plurality of transmit antennas and may be connected to a plurality of receive antennas.

In particular, when MIMO transmission or MISO transmission is used, transceiver devices 102_1, 102_2, and 102_3 transmit a plurality of modulated signals from a plurality of antennas at the same frequency (same frequency band), at the same time.

Although the AP and the terminal are exemplified as being capable of communicating on three frequency bands in the present embodiment, so long as the AP and the terminal support communicating on two or more frequency bands, when the present embodiment is carried out in the same manner, multi-band communication is possible. Accordingly, although the configuration example of the AP illustrated in FIG. 1 includes transceiver devices 102_1, 102_4 and 102_3, the AP may have a configuration in which any one of the transceiver devices 102_1, 102_2, and 102_3 is omitted when, for example, the AP is capable of communicating on two frequency bands. When the AP is capable of communicating on four or more frequency bands, the configuration illustrated in FIG. 1 may additionally include one or more transceiver devices. Similarly, although the configuration example of the terminal illustrated in FIG. 43 includes transceiver devices 102_1, 102_2, and 102_3, the terminal may have a configuration in which any one of the transceiver devices 102_1, 102_2, and 102_3 is omitted when, for example, the AP is capable of communicating on two frequency bands. When the terminal is capable of communicating on four or more frequency bands, the configuration illustrated in FIG. 1 may additionally include one or more transceiver devices.

The AP and the terminal may transmit frames other than the management frame, the control frame, and the data frame. Moreover, a frame other than the beacon frame, the probe request frame, the probe response frame, the association request frame, the association response frame, the disassociation frame, the authentication frame, the de-authentication frame, and the action may be present as a management frame. Moreover, a frame other than the request to send (RTS) frame, the clear to send (CTS) frame, the acknowledgement (ACK) frame, the block ACK request frame, the block ACK frame may be present as a control frame.

The present embodiment is merely one example; for example, the AP and the terminal may be switched and the embodiment may be carried out in the same manner. In the present embodiment, the terms "AP" and "terminal" are used, but the AP may be referred to as a base station, a communication device, a terminal, a broadcast station, a node, etc., and the embodiment may be carried out, and the terminal may be referred to as a communication device, an access point, a node, a base station, etc., and the embodiment may be carried out.

For example, multi-band communication may be performed between a first AP and a second AP. In other words, the transmission of modulated signals for multi-band transmission may be performed by a plurality of APs.

In the present embodiment, multi-band communication using the first frequency band, the second frequency band, and the third frequency band is described, but the present embodiment can of course be carried out in the same manner if the first frequency band is considered to mean "first channel", the second frequency band is considered to mean "second channel", and the third frequency band is considered to mean "third channel".

In the above embodiments, communication schemes that use RTS and CTS are described, but the communication schemes may be schemes that do not use RTS or CTS. For example, the above embodiments and the like may be applied to time division duplex (TDD), time division multiple access (TDMA), or time division multiplexing (TDM) and carried out in the same manner as described above. In such cases, RTS and CTS may be used, and, alternatively, may not be used. The communication device and the communication system described in the above embodiments may be configured to switch between communicating using RTS and CTS and communicating without using RTS and CTS, and may switch between communicating using CSMA/CA and communicating using one of TDD, TDMA, and TDM.

Although a communication device, which is, for example, an access point, is described as including three transceiver devices 102_1, 102_2, and 102_3 in FIG. 1, etc., a terminal need not necessarily include three transceiver devices, and may include two transceiver devices. For example, terminals anticipated to be relatively frequently used while connected to a power outlet (primary examples include, but are not limited to personal computers and servers; other examples include smartphones, mobile phones, and tablets) may include three transceiver devices, and terminals anticipated to be relatively infrequently used while connected to a power outlet (primary examples include, but are not limited to smartphones, mobile phones, and tablets; other examples include personal computers and servers) may include two transceiver devices. Since power consumption increases when three transceiver devices are operated, this is to inhibit draining the battery of terminals that are relatively less frequently used while connected to a power outlet.

The Multi-band Transmission Capability Information (field) and the Multi-band Reception Capability Information (field) illustrated in FIG. 44 may be arranged in an extended field. In such cases, in FIG. 44, the Multi-band Transmission Capability Information (field) and/or the Multi-band Reception Capability Information (field) need not necessarily be included. For example, information indicating whether an extended field is included or not is included in the frame illustrated in FIG. 44.

When the information indicating whether an extended field is included or not indicates that an extended field is not included, neither the Multi-band Transmission Capability information (field) nor the Multi-band Reception Capability information (field) is included in the frame illustrated in FIG. 44. However, when the information indicating whether an extended field is included or not indicates that an extended field is included, the Multi-band Transmission Capability Information (field) and/or the Multi-band Reception Capability Information (field) are/is included in the frame illustrated in FIG. 44.

The communication device that receives the frame described above can know whether the receive frame includes an extended field or not via the information indicating whether an extended field is included or not that is described above. With this, the communication device can know, for example, whether the Multi-band. Transmission Capability Information (field) and/or the Multi-band Reception Capability Information (field) are/is included in the frame or not.

Note that information indicating whether an extended frame is included or not may include, for example, information indicating the data size of the extended field and information indicating the included information. The extended field may also include information other than the Multi-band Transmission Capability Information (field) and the Multi-band Reception Capability Information (field).

The Multi-band Transmission Support Information (field) and the Multi-band Reception Support Information (field) illustrated in FIG. 46 may be arranged in an extended field. In such cases, in FIG. 46, the Multi-band Transmission Support Information (field) and/or the Multi-band Reception Support information (field) need not necessarily be included. For example, information indicating whether an extended field is included or not is included in the frame illustrated in FIG. 46.

When the information indicating whether an extended field is included or not indicates that an extended field is not, included, neither the Multi-band Transmission Support Information (field) nor the Multi-band Reception Support Information (field) is included in the frame illustrated in FIG. 46. However, when the information indicating whether an extended field is included or not indicates that an extended field is included, the Multi-band Transmission Support information (field) and/or the Multi-band Reception Support Information (field) are/is included in the frame illustrated in FIG. 46.

The communication device that receives the frame described above can know whether the receive frame includes an extended field or not via the information indicating whether an extended field is included or not that is described above. With this, the communication device can know, for example, whether the Multi-band Transmission Support Information (field) and/or the Multi-band Reception Support Information (field) are/is included in the frame or not.

Note that information indicating whether an extended frame is included or not may include, for example, information indicating the data size of the extended field and information indicating the included information. The extended field may also include information other than the Multi-band Transmission Support Information (field) and the Multi-band Reception Support Information (field).

The Multi-band Capability Information (field) illustrated in FIG. 45 may be arranged in an extended field. In such cases, in FIG. 45, the Multi-band Capability Information (field) need not necessarily be included. For example, information indicating whether an extended field is included or not is included in the frame illustrated in FIG. 45.

When the information indicating whether an extended field is included or not indicates that an extended field is not included, the Multi-band Capability Information (field) is not included in the frame illustrated in FIG. 45. However, when the information indicating whether an extended field is included or not indicates that an extended field is included, the Multi-band Capability Information (field) is included in the frame illustrated in FIG. 45.

The communication device that receives the frame described above can know whether the receive frame includes an extended field or not via the information indicating whether an extended field is included or not that is described above. With this, the communication device can know, for example, whether the Multi-band Capability Information (field) is included in the frame or not.

Note that information indicating whether an extended frame is included or not may include, for example, information indicating the data size of the extended field and information indicating the included information. The extended field may include information other than the Multi-band Capability Information (field).

The Multi-band Communication Support Information (field) and illustrated in FIG. 47 may be arranged in an extended field. In such cases, in FIG. 47, the Multi-band Communication Support (field) need not necessarily be included. For example, information indicating whether an extended field is included or not is included in the frame illustrated in FIG. 47.

When the information indicating whether an extended field is included or not indicates that an extended field is not included, the Multi-band Communication Support (field) is not included in the frame illustrated in FIG. 47. However, when the information indicating whether an extended field is included or not indicates that an extended field is included, the Multi-band Communication Support (field) is included in the frame illustrated in FIG. 47.

The communication device that receives the frame described above can know whether the receive frame includes an extended field or not via the information indicating whether an extended field is included or not that is described above. With this, the communication device can know, for example, whether the Multi-band Communication Support (field) is included in the frame or not.

Note that information indicating whether an extended frame is included or not may include, for example, information indicating the data size of the extended field and information indicating the included information. The extended field may also include information other than the Multi-band Communication Support (field).

Note that when RTS 1_11, etc., in FIG. 22A, etc., CTS 2_21, etc., in FIG. 22B, etc., and symbol group 2_31, etc., in FIG. 22C, etc., are transmitted using a multi-carrier scheme such as OFDMA, each of these indicates a single unit of communication in OFDMA, that is to say, a single resource unit. More specifically, a resource unit corresponds to a group of a predetermined number (for example 16, or an integer of one or more) subcarriers.

In FIG. 22A, FIG. 26A, FIG. 27A, FIG. 28A, FIG. 29A, FIG. 31A, FIG. 33A and the like, when a plurality of RTSs are present in a given interval of time, the receiver address (for example, the MAC address) included in each RTS may be the same (and alternatively may be different). In FIG. 22A, FIG. 26A, FIG. 27A, FIG. 28A, FIG. 29A, FIG. 31A, FIG. 33A and the like, two or more RTSs that have the same receiver address may be present in a given interval of time. However, the method of setting the RTS receiver address is not limited to these examples.

In FIG. 22A, FIG. 26A, FIG. 27A, FIG. 28A, FIG. 29A, FIG. 31A, FIG. 33A and the like, when a plurality of RTSs are present in a given interval of time, the transmitter address (for example, the MAC address) included in each RTS may be the same (and alternatively may be different). In FIG. 22A, FIG. 26A, FIG. 27A, FIG. 28A, FIG. 29A, FIG. 31A, FIG. 33A and the like, two or more RTSs that have the same transmitter address may be present in a given interval of time. However, the method of setting the RTS transmitter address is not limited to these examples.

In FIG. 22B, FIG. 23A, FIG. 24A, FIG. 25A, FIG. 26B, FIG. 27B, FIG. 28B, FIG. 29B, FIG. 29C, FIG. 31B, FIG. 33B, FIG. 33C and the like, when a plurality of CTSs are present in a given interval of time, the receiver address (for example, the MAC address) included in each CTS may be the same (and alternatively may be different). In FIG. 22B, FIG. 23A, FIG. 24A, FIG. 25A, FIG. 26B, FIG. 27B, FIG. 28B, FIG. 29B, FIG. 29C, FIG. 31B, FIG. 33B, FIG. 33C and the like, two or more CTSs having the same receiver address may be present in the same interval of time. However, the method of setting the CTS receiver address is not limited to these examples.

In the frames illustrated in, for example, FIG. 3A, FIG. 3B, FIG. 3C, FIG. 4A, FIG. 4B, FIG. 5A, FIG. 5B, FIG. 5C, FIG. 5D, FIG. 5E, FIG. 5F, FIG. 5G, FIG. 5H, FIG. 5I, FIG. 5J, FIG. 5K, FIG. 6A, FIG. 6B, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 22A, FIG. 22B, FIG. 22C, FIG. 23A, FIG. 23B, FIG. 24A, FIG. 24B, FIG. 25A, FIG. 25B, FIG. 26A, FIG. 26B, FIG. 26C, FIG. 27A, FIG. 27B, FIG. 27C, FIG. 28A, FIG. 28B, FIG. 28C, FIG. 29A FIG. 29B, FIG. 29C, FIG. 29D, FIG. 31A, FIG. 31B, FIG. 31C, FIG. 33A, FIG. 33B, FIG. 33C, and FIG. 33D, a trigger frame (trigger signal) for adjusting symbol transmission timing may be present in a given interval of time.

In the present specification, operations described in sections of the description related to an AP may be operations performed by a base station, a repeater, a terminal, a communication device, a personal computer, a mobile phone, a smartphone, a tablet, a server, an e Node B (eNB), a g Node B (gNB), a vehicle, an automobile, a satellite, a robot, a motorcycle, a boat, a drone, aircraft, a mobile body, an appliance, or a computer. In the present specification, operations described in sections of the description related to a terminal may be operations performed by an AP, a base station, a repeater, a communication device, a personal computer, a mobile phone, a smartphone, a tablet, a server, an e Node B (eNB), a g Node B (gNB), a vehicle, an automobile, a satellite, a robot, a motorcycle, a boat, a drone, aircraft, a mobile body, an appliance, or a computer.

As used in the present specification, the term "$X^{th}$ frequency band" may be restated as "frequency band X". Moreover, the term "$X^{th}$ period" may be restated as "period X". The same applies when "X" is replaced with a letter, number, or a combination of the two, such as "A", "B", or "A1".

The configurations and communication methods used by the communication device or the access point according to the above embodiments can be worded as follows. However, the wording is not limited to the following examples.

Figure 50:
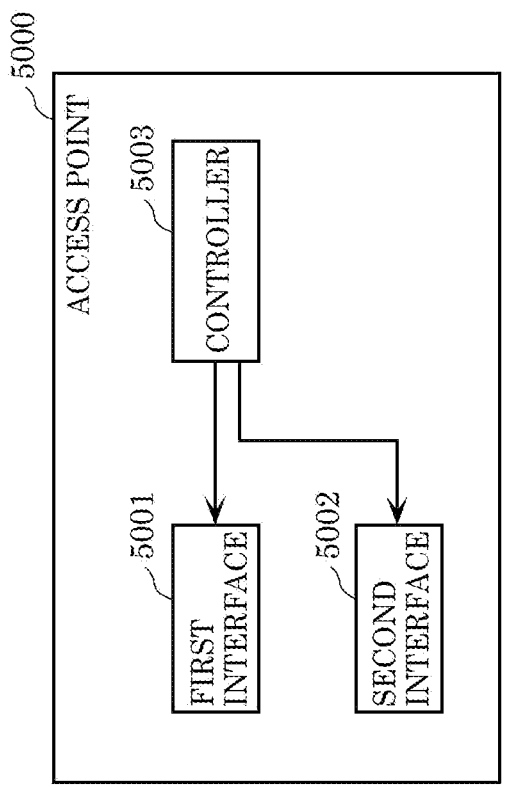
FIG. 50 illustrates an example of a configuration of an access point.

FIG. 50 illustrates an example of a configuration of access point 5000.

As illustrated in FIG. 50, access point 5000 includes first interface 5001, second interface 5002, and controller 5003.

First interface 5001 wirelessly communicates using a first band.

Second interface 5002 wirelessly communicates using a second band different than the first band.

Controller 5003 selects one type of request to send (RTS)/clear to send (CTS) control from among three mutually different types using at least one of first interface 5001 and second interface 5002, and carries out the selected one type of RTS/CTS control with a terminal.

Here, a first type among the three mutually different types transmits a first RTS signal destined for a single terminal and receives a first CTS signal transmitted in response to the first RTS signal in one of the first band and the second band. A second type transmits a second RTS signal destined for a plurality of terminals and receives a second CTS signal transmitted in response to the second RTS signal in one of the first band and the second band. A third type transmits a third RTS signal destined for a plurality of terminals and receives a third CTS signal in response to the third RTS signal in each of the first band and the second band.

For example, after receiving a CTS signal via the selected one type of RTS/CTS control, controller 5003 transmits communication data using at least one resource unit in which the CTS signal was received.

For example, in the third type, a medium access control (MAC) address of a source of the third RTS signal transmitted in each of the first band and the second band is the same.

Figure 51:
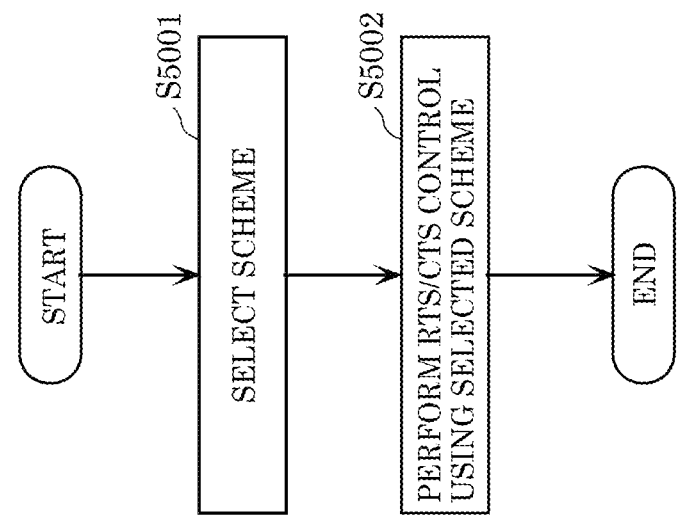
FIG. 51 is a flow chart illustrating an example of a communication method executed by an access point.

FIG. 51 is a flow chart illustrating an example of a communication method executed by access point 5000.

As illustrated in FIG. 51, in step S5001, controller 5003 selects one type of request to send (RTS)/clear to send (CTS) control from among three mutually different types using at least one of first interface 5001 and second interface 5002.

In step S5002, controller 5003 carries out the selected one type of RTS/CTS control with a terminal.

With this, access point 5000 improves the data transmission speed of the communication system.

In the above embodiments, each element may be configured as dedicated hardware or may be realized by executing a software program suitable for the element. Each of the elements may be realized by means of a program executing unit, such as a central processing unit (CPU) or a processor, reading and executing the software program recorded on a recording medium such as a hard disk or a semiconductor memory. Here, the software program for realizing the access point and the like according to each of the embodiments is the program described below.

The program causes a computer to execute a communication method executed by an access point including a first interface that wirelessly communicates using a first band and a second interface that wirelessly communicates using a second band different than the first band. The communication method includes: selecting one type of request to send. (RTS)/clear to send (CTS) control from among three mutually different types using at least one of the first interface and the second interface; and carrying out the selected one type of RTS/CTS control with a terminal. A first type among the three mutually different types transmits a first RTS signal destined for a single terminal and receives a first CTS signal transmitted in response to the first RTS signal in one of the first band and the second band, a second type among the three mutually different types transmits a second RTS signal destined for a plurality of terminals and receives a second CTS signal transmitted in response to the second RTS signal in one of the first band and the second band, and a third type among the three mutually different types transmits a third RTS signal destined for a plurality of terminals and receives a third CTS signal in response to the third RTS signal in each of the first band and the second band.

Hereinbefore, an access point and the like according to one or more aspects has been described based on exemplary embodiments, but the present invention is not limited to the above exemplary embodiments. Various modifications of the exemplary embodiments as well as embodiments resulting from combinations of elements from different exemplary embodiments that may be conceived by those skilled in the art are intended to be included within the scope of the one or more aspects as long as these do not depart from the novel teachings and advantages of the present invention.

INDUSTRIAL APPLICABILITY

The present invention is applicable in wireless communication access points.

What is claimed is:

1. An access point, comprising:
a first interface configured to wirelessly communicate using a first band;
a second interface configured to wirelessly communicate using a second band different than the first band; and
a controller configured to select one type of request to send (RTS)/clear to send (CTS) control from among three mutually different types using at least one of the first interface and the second interface, and carry out the selected one type of RTS/CTS control with a terminal,
wherein a first, type among the three mutually different types transmits a first RTS signal and receives a first CTS signal transmitted in response to the first RTS signal in one of the first band and the second band,
a second type among the three mutually different types transmits a second RTS signal destined for a plurality of terminals and receives a second CTS signal transmitted in response to the second RTS signal in one of the first band and the second band, and
a third type among the three mutually different types transmits a third RTS signal destined for a plurality of terminals and receives a third CTS signal in response to the third RTS signal in each of the first band and the second band.

2. The access point according to claim 1,
wherein after receiving a CTS signal via the selected one, type of RTS/CTS control, the controller is configured to transmit communication data using at least one resource unit in which the CTS signal was received.

3. The access point according to claim 1,
wherein in the third type, a medium access control (MAC) address of a source of the third RTS signal transmitted in each of the first band and the second band is the same.

4. A communication method executed by an access point including a first interface configured to wirelessly communicate using a first band and a second interface configured to wirelessly communicate using a second band different than the first band, the communication method comprising:
selecting one type of request to send (RTS)/clear to send (CTS) control from among three mutually different types using at least one of the first interface and the second interface; and
carrying out the selected one type of RTS/CTS control with a terminal,
wherein a first type among the three mutually different types transmits a first RTS signal destined for a single terminal and receives a first CTS signal transmitted in response to the first RTS signal in one of the first band and the second band,
a second type among the three mutually different types transmits a second RTS signal destined for a plurality of terminals and receives a second CTS signal transmitted in response to the second RTS signal in one of the first band and the second band, and
a third type among the three mutually different types transmits a third RTS signal destined for a plurality of terminals and receives a third CTS signal in response to the third RTS signal in each of the first band and the second band.

* * * * *